US012370709B2

(12) United States Patent
Robertson et al.

(10) Patent No.: US 12,370,709 B2
(45) Date of Patent: Jul. 29, 2025

(54) SHAVING DEVICE

(71) Applicant: INSIGNIA IP DEVELOPMENT COMPANY, LLC, Magnolia, TX (US)

(72) Inventors: Ruairidh Robertson, Sandwich, MA (US); David Carpenter, Jaffrey, NH (US); Alan Kenneth Stratton, Milford, NH (US); George K. Bonnoitt, Jr., Amherst, NH (US)

(73) Assignee: INSIGNIA IP DEVELOPMENT COMPANY, LLC, Magnolia, TX (US)

( * ) Notice: Subject to any disclaimer, the term of this patent is extended or adjusted under 35 U.S.C. 154(b) by 0 days.

(21) Appl. No.: 17/379,374

(22) Filed: Jul. 19, 2021

(65) Prior Publication Data

US 2022/0176578 A1 Jun. 9, 2022

Related U.S. Application Data

(63) Continuation of application No. 15/413,976, filed on Jan. 24, 2017, now Pat. No. 11,065,773, which is a
(Continued)

(51) Int. Cl.
*B26B 21/52* (2006.01)
*B26B 21/10* (2006.01)
(Continued)

(52) U.S. Cl.
CPC ............ *B26B 21/521* (2013.01); *B26B 21/10* (2013.01); *B26B 21/165* (2013.01); *B26B 21/22* (2013.01);
(Continued)

(58) Field of Classification Search
CPC ..... B26B 21/521; B26B 21/10; B26B 21/165; B26B 21/22; B26B 21/24; B26B 21/4062;
(Continued)

(56) References Cited

U.S. PATENT DOCUMENTS 3,740,841 A * 6/1973 Risher .................... B26B 21/16 30/57
5,167,069 A 12/1992 Quinn
(Continued)

FOREIGN PATENT DOCUMENTS

CN 2074705 U 4/1991
CN 103648735 A 3/2014
(Continued)

OTHER PUBLICATIONS

Notice of Allowance mailed Jan. 12, 2021, issued in U.S. Appl. No. 15/433,988.
(Continued)

*Primary Examiner* — Liang Dong
(74) *Attorney, Agent, or Firm* — Grossman, Tucker, Perreault & Pfleger, PLLC

(57) ABSTRACT

A shaving device comprising a head assembly having a support member and a blade cartridge. The support member is configured to be detachably coupled to a handle. The blade cartridge has a first and a second face wherein at least one of the first or second faces comprises at least one razor blade. The blade cartridge is configured to be rotatably coupled to the support member about a pivot axis such that the blade cartridge is pivotable by a user to select one of the first or second faces.

20 Claims, 85 Drawing Sheets

Related U.S. Application Data continuation of application No. 14/977,560, filed on Dec. 21, 2015, now Pat. No. 9,550,303, which is a continuation-in-part of application No. 14/873,857, filed on Oct. 2, 2015, now Pat. No. 9,808,945, which is a continuation of application No. 14/627,282, filed on Feb. 20, 2015, now Pat. No. 9,259,846.

(60) Provisional application No. 62/201,551, filed on Aug. 5, 2015, provisional application No. 62/060,700, filed on Oct. 7, 2014.

(51) Int. Cl.
*B26B 21/16* (2006.01)
*B26B 21/22* (2006.01)
*B26B 21/24* (2006.01)
*B26B 21/40* (2006.01)
*B26B 21/44* (2006.01)

(52) U.S. Cl.
CPC ............ *B26B 21/225* (2013.01); *B26B 21/24* (2013.01); *B26B 21/4062* (2013.01); *B26B 21/44* (2013.01); *B26B 21/52* (2013.01); *B26B 21/523* (2013.01); *B26B 21/4018* (2013.01); *B26B 21/443* (2013.01)

(58) Field of Classification Search
CPC ....... B26B 21/44; B26B 21/52; B26B 21/523; B26B 21/4018; B26B 21/443
See application file for complete search history.

(56) References Cited

U.S. PATENT DOCUMENTS

| | | | | |
|---|---|---|---|---|
| 5,343,622 | A | 9/1994 | Andrews | |
| 5,522,137 | A | 6/1996 | Andrews | |
| 5,575,068 | A | 11/1996 | Pedersen | |
| D388,540 | S | 12/1997 | Ramar | |
| 5,911,480 | A | 6/1999 | Morgan | |
| 6,082,007 | A | 7/2000 | Andrews | |
| 6,115,924 | A | 9/2000 | Oldroyd | |
| 6,125,542 | A | 10/2000 | Somma | |
| 6,161,288 | A | 12/2000 | Andrews | |
| 6,189,222 | B1 | 2/2001 | Doyle | |
| 6,266,888 | B1 | 7/2001 | Zowaski | |
| 6,434,828 | B1 | 8/2002 | Andrews | |
| 6,725,550 | B1 | 4/2004 | Shah | |
| 6,915,580 | B2 | 7/2005 | Dassel | |
| 7,086,160 | B2 | 8/2006 | Coffin et al. | |
| 7,140,116 | B2 | 11/2006 | Coffin | |
| 7,578,062 | B2 | 8/2009 | Blackburn | |
| 7,895,754 | B2 | 3/2011 | Blackburn | |
| 7,913,393 | B2 | 3/2011 | Royle et al. | |
| 7,937,837 | B2 | 5/2011 | Psimadas et al. | |
| 8,122,606 | B2 | 2/2012 | Hart | |
| D656,677 | S | 3/2012 | Cavazos Jimenez et al. | |
| D659,285 | S | 5/2012 | Lukan et al. | |
| 8,205,343 | B2 | 6/2012 | Winter et al. | |
| D664,712 | S | 7/2012 | Christie et al. | |
| 8,474,144 | B2 | 7/2013 | Royle | |
| 8,567,068 | B2 | 10/2013 | Luxton | |
| 8,595,938 | B2 | 12/2013 | Bodet | |
| D700,995 | S | 3/2014 | Lee et al. | |
| 8,745,876 | B2 | 6/2014 | Hage et al. | |
| 8,745,883 | B2 | 6/2014 | Murgida et al. | |
| 9,032,631 | B2 | 5/2015 | Christie et al. | |
| D749,264 | S | 2/2016 | Leatherman et al. | |
| D749,267 | S | 2/2016 | Letherman | |
| 9,259,846 | B1 | 2/2016 | Robertson | |
| 9,522,472 | B2 | 12/2016 | Leicht et al. | |
| 9,550,303 | B2 | 1/2017 | Robertson et al. | |
| 9,687,989 | B2 | 6/2017 | Robertson et al. | |
| 9,764,487 | B2 | 9/2017 | Robertson et al. | |
| 9,808,945 | B2 | 11/2017 | Robertson | |
| D806,950 | S | 1/2018 | Robertson | |
| 2005/0005400 | A1* | 1/2005 | Park | H04M 1/0212 16/367 |
| 2005/0034314 | A1 | 2/2005 | Cuisinier | |
| 2005/0138814 | A1 | 6/2005 | Pennella et al. | |
| 2005/0198840 | A1 | 9/2005 | Worrick, III et al. | |
| 2005/0198841 | A1 | 9/2005 | Worrick | |
| 2007/0089960 | A1 | 4/2007 | Kanehisa | |
| 2008/0155831 | A1 | 7/2008 | Royle | |
| 2009/0013534 | A1 | 1/2009 | Mallaridas | |
| 2010/0083505 | A1* | 4/2010 | Royle | B26B 21/225 30/527 |
| 2010/0101093 | A1 | 4/2010 | Avans et al. | |
| 2011/0146079 | A1 | 6/2011 | Clarke et al. | |
| 2011/0277326 | A1 | 11/2011 | Bodet | |
| 2011/0283539 | A1 | 11/2011 | Bryan | |
| 2012/0198698 | A1 | 8/2012 | Szczepanowski et al. | |
| 2012/0255185 | A1 | 10/2012 | Patel et al. | |
| 2012/0311865 | A1 | 12/2012 | Hamilton et al. | |
| 2013/0152400 | A1 | 6/2013 | Nunez | |
| 2013/0312265 | A1 | 11/2013 | Wilson et al. | |
| 2013/0312272 | A1 | 11/2013 | Wilson et al. | |
| 2014/0026726 | A1 | 1/2014 | Griffin et al. | |
| 2014/0083265 | A1 | 3/2014 | Provost et al. | |
| 2014/0096402 | A1* | 4/2014 | Nakasuka | B26B 21/521 30/531 |
| 2014/0116211 | A1 | 5/2014 | Griffin et al. | |
| 2014/0165800 | A1 | 6/2014 | Griffin et al. | |
| 2014/0237830 | A1 | 8/2014 | Wilson et al. | |
| 2015/0090085 | A1 | 4/2015 | Griffin et al. | |
| 2015/0157109 | A1 | 6/2015 | Provost et al. | |
| 2015/0158192 | A1 | 6/2015 | Tucker et al. | |
| 2015/0174775 | A1 | 6/2015 | Hodgson | |
| 2015/0174776 | A1 | 6/2015 | Hawes | |
| 2015/0190935 | A1 | 7/2015 | Griffin et al. | |
| 2015/0190936 | A1 | 7/2015 | Griffin et al. | |
| 2015/0321366 | A1 | 11/2015 | Papadopoulos-Papageorgis et al. | |
| 2016/0096280 | A1 | 4/2016 | Robertson | |
| 2016/0107324 | A1 | 4/2016 | Robertson | |
| 2017/0021513 | A1 | 1/2017 | Liberatore | |
| 2017/0043492 | A1 | 2/2017 | Robertson et al. | |
| 2017/0282387 | A1 | 10/2017 | Robertson et al. | |
| 2017/0291320 | A1 | 10/2017 | Robertson et al. | |
| 2017/0361481 | A1 | 12/2017 | Robertson et al. | |
| 2018/0001496 | A1 | 1/2018 | Robertson et al. | |
| 2022/0055240 | A1 | 2/2022 | Wilson et al. | |

FOREIGN PATENT DOCUMENTS

| | | | | |
|---|---|---|---|---|
| CN | 104582913 A | 4/2015 | | |
| DE | 102009050344 A1 | 5/2011 | | |
| EP | 2379289 | 10/2011 | | |
| RU | 2441746 C2 | 2/2012 | | |
| WO | 9727030 | 7/1997 | | |
| WO | WO-9727030 A1 | * | 7/1997 | B26B 21/14 |
| WO | 03095162 | 11/2003 | | |
| WO | 2008085002 | 7/2008 | | |
| WO | WO-2008085002 A1 | * | 7/2008 | B26B 21/14 |
| WO | 2013148480 | 10/2013 | | |
| WO | 2013165954 | 11/2013 | | |
| WO | 2015134700 | 9/2015 | | |
| WO | 2016057066 | 4/2016 | | |
| WO | 2017024156 | 2/2017 | | |

OTHER PUBLICATIONS

U.S. Office Action mailed Nov. 24, 2021, received in U.S. Appl. No. 15/708,635.

U.S. Office Action mailed Dec. 7, 2021, received in U.S. Appl. No. 16/871,544.

U.S. Office Action mailed May 12, 2021, received in U.S. Appl. No. 15/708,635.

Indian Office Action with English translation issued May 31, 2021, received in Indian Patent Application No. 201927010292.

Brazilian Office Action with English translation issued Jun. 15, 2021, received in Brazil Patent Application No. BR12-2020-015146-3.

(56) References Cited

OTHER PUBLICATIONS

Brazilian Office Action with English translation issued Jul. 21, 2021, received in Brazil Patent Application No. BR11-2019-003255-0.
Chinese Office Action with English translation issued Jul. 21, 2021, received in Chinese Patent Application No. CN201780060517.1.
Japan Office Action from related application 2021-131391 mailed Aug. 30, 2022, with English translation.
Canada Office Action from related application 2,994,679 mailed Nov. 3, 2022.
Brazil Office Action from related application BR112019003255-0 mailed Aug. 9, 2022 with English translation.
First Examination Report from related Indian Appln. No. 202128020189, dated May 31, 2022, with English translation.
First Office Action from related Chinese Appln. No. 202110190114.7, dated Jun. 2, 2022. English translation attached.
European Office Action from related application 20156592.6 dated Jun. 2, 2022.
Office Action dated Apr. 9, 2015, issued in U.S. Appl. No. 14/627,282, 15 pages.
International Search Report and Written Opinion dated May 15, 2015, issued in PCT Patent Application No. PCT/US15/16767, 14 pages.
Notice of Allowance dated Aug. 14, 2015, issued in U.S. Appl. No. 14/627,282, 11 pages.
Office Action dated Mar. 24, 2016, issued in U.S. Appl. No. 14/873,857, 12 pages.
Office Action dated Jun. 15, 2016, issued in U.S. Appl. No. 14/977,560, 13 pages.
Final Office Action dated Jul. 27, 2016, issued in U.S. Appl. No. 14/873,857, 13 pages.
Notice of Allowance dated Sep. 1, 2016, issued in U.S. Appl. No. 14/977,560, 10 pages.
International Search Report and Written Opinion dated Oct. 14, 2016, issued in PCT International Patent Application No. PCT/US2016/045591, 10 pages.
Office Action dated Sep. 21, 2016, issued in U.S. Appl. No. 15/135,485, 19 pages.
U.S. Office Action dated Dec. 15, 2016, issued in U.S. Appl. No. 14/873,857, 21 pages.
U.S. Notice of Allowance dated Feb. 9, 2017, issued in U.S. Appl. No. 15/135,485, 12 pages.
U.S. Office Action dated Feb. 22, 2017, issued in U.S. Appl. No. 15/241,042, 13 pages.
U.S. Notice of Allowance dated Apr. 10, 2017, issued in U.S. Appl. No. 15/241,042, 13 pages.
Preliminary Report on Patentability dated Apr. 20, 2017, issued in PCT Patent Application No. PCT/US2015/016767, 12 pages.
Preliminary Report on Patentability dated Apr. 20, 2017, issued in PCT Patent Application No. PCT/US2015/054155, 6 pages.
U.S. Final Office Action dated May 4, 2017, issued in U.S. Appl. No. 14/873,857, 17 pages.
Notice of Allowance mailed Jul. 28, 2017, issued in U.S. Appl. No. 14/873,857, 15 pages.
U.S. Office Action mailed May 21, 2018, issued in U.S. Appl. No. 15/716,504, 13 pages.
U.S. Office Action mailed May 22, 2018, issued in U.S. Appl. No. 15/708,635, 12 pages.
U.S. Notice of Allowance mailed Aug. 7, 2018, issued in U.S. Appl. No. 15/716,504, 11 pages.
U.S. Office Action mailed Jan. 10, 2018, issued in U.S. Appl. No. 15/628,082, 19 pages,.
International Search Report and Written Opinion mailed Oct. 25, 2017, issued in PCT Patent Application No. PCT/US2017/047496, 8 pages.

* cited by examiner

10

SHAVING DEVICE

CROSS REFERENCE TO RELATED APPLICATION

This application is a continuation of U.S. patent application Ser. No. 15/413,976, filed Jan. 24, 2017, which is a continuation of U.S. patent application Ser. No. 14/977,560, (now U.S. Pat. No. 9,550,303), filed Dec. 21, 2015, which is continuation-in-part of U.S. patent application Ser. No. 14/873,857 (now U.S. Pat. No. 9,808,945) filed Oct. 2, 2015, which itself is a continuation of U.S. patent application Ser. No. 14/627,282, (now U.S. Pat. No. 9,259,846), filed Feb. 20, 2015 which claims the benefit of U.S. Provisional Application Ser. No. 62/060,700, filed Oct. 7, 2014, the entire disclosures of which are fully incorporated herein by reference. This application also claims the benefit of U.S. Provisional Application Ser. No. 62/201,551, filed Aug. 5, 2015, the entire disclosure of which is fully incorporated herein by reference.

FIELD

The present disclosure relates generally to personal grooming device and, more particularly, to a personal shaving device for shaving hair.

BACKGROUND

Shaving razors are available in a variety of forms. For example, shaving razors may include a disposable razor cartridge configured to be selectively coupled a handle. The razor cartridge may include one or more razor blades disposed on a cutting surface of the disposable razor cartridge. Once the razor blades are dull, the user may disconnect the razor cartridge from the handle and reconnect a new razor cartridge.

FIGURES

The above-mentioned and other features of this disclosure, and the manner of attaining them, will become more apparent and better understood by reference to the following description of embodiments described herein taken in conjunction with the accompanying drawings, wherein:

FIG. 14 shows another view of the resistive pivot mechanism consistent with

Figure 15:
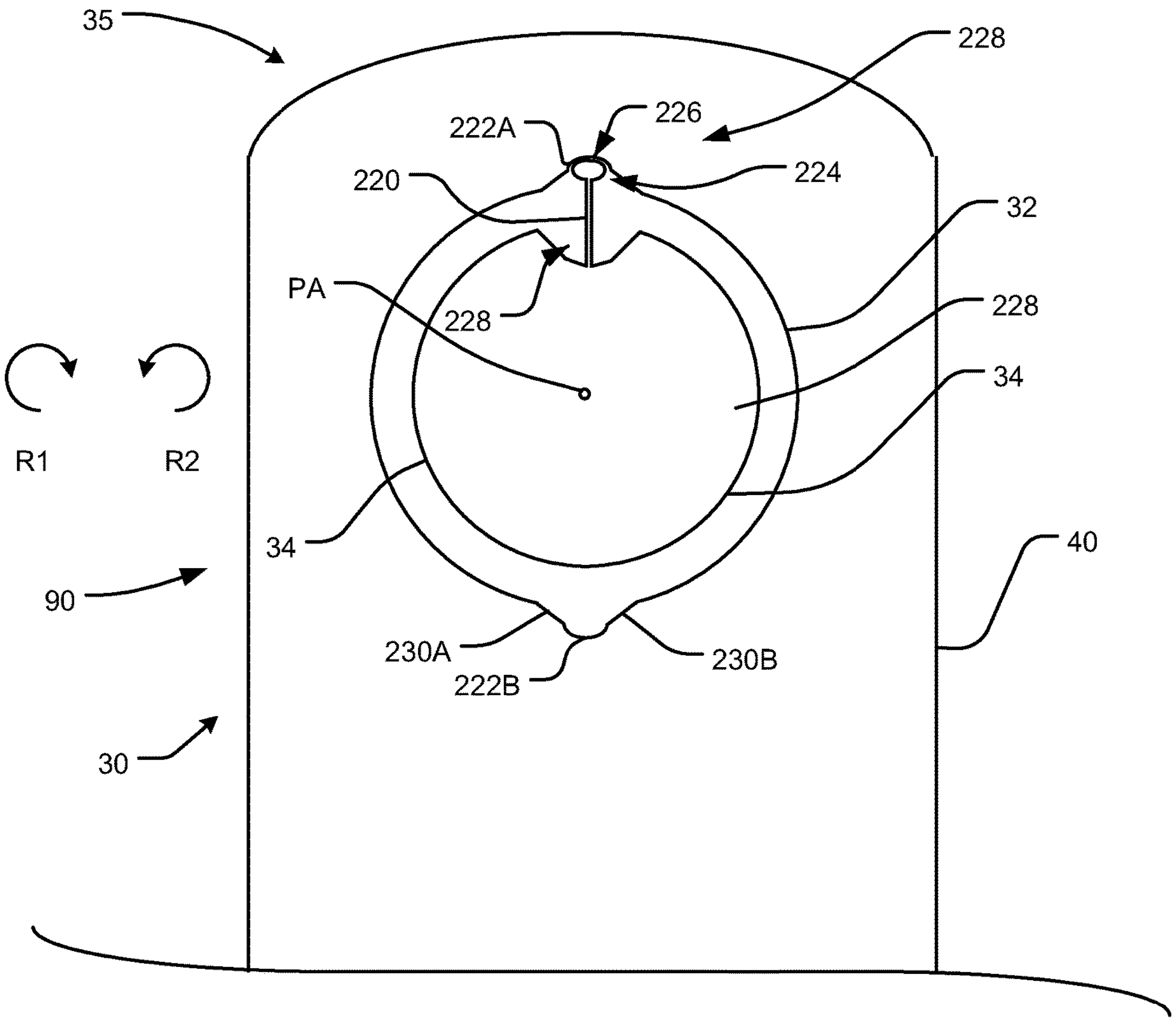
Figure 16A:
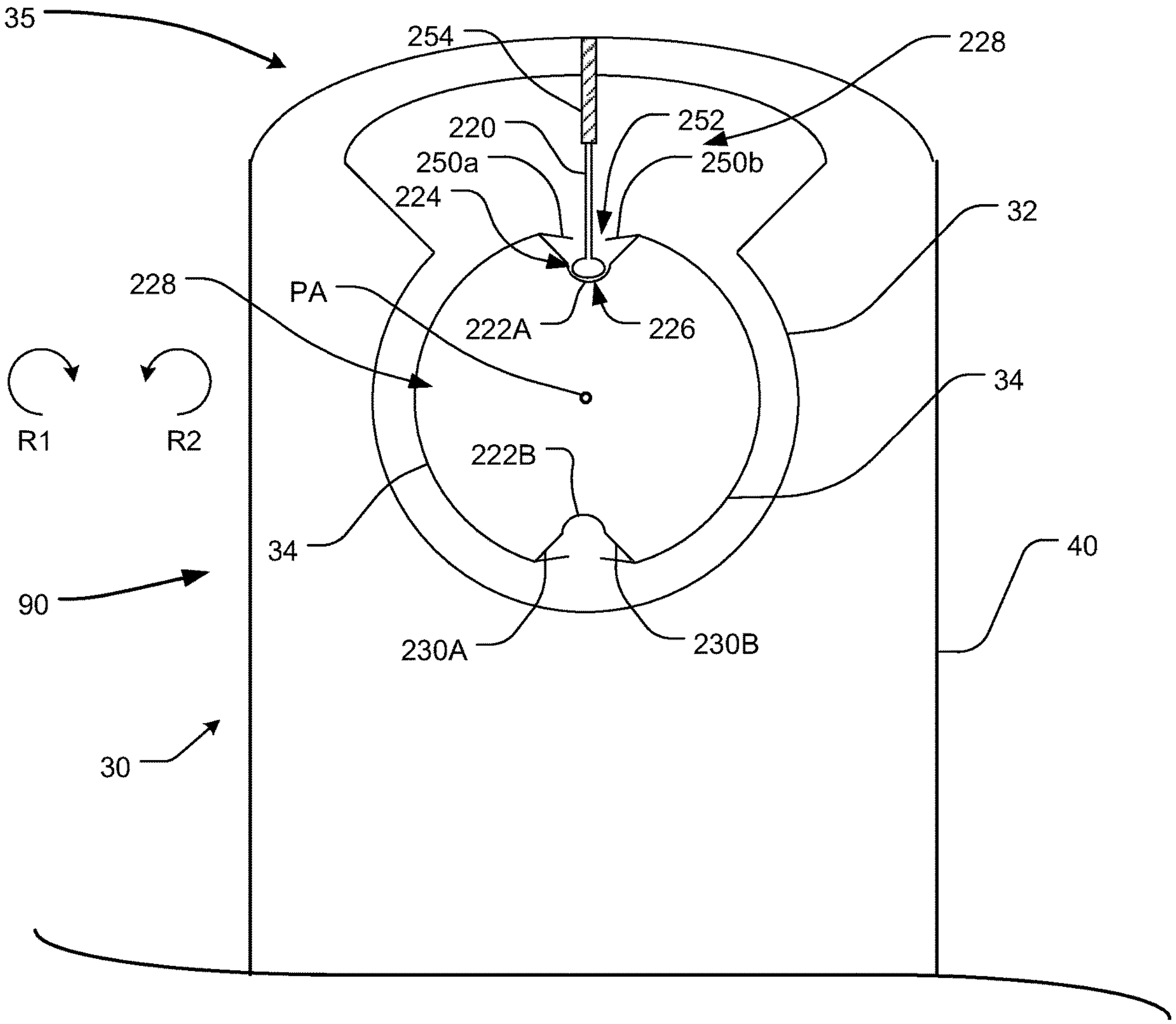
Figure 16B:
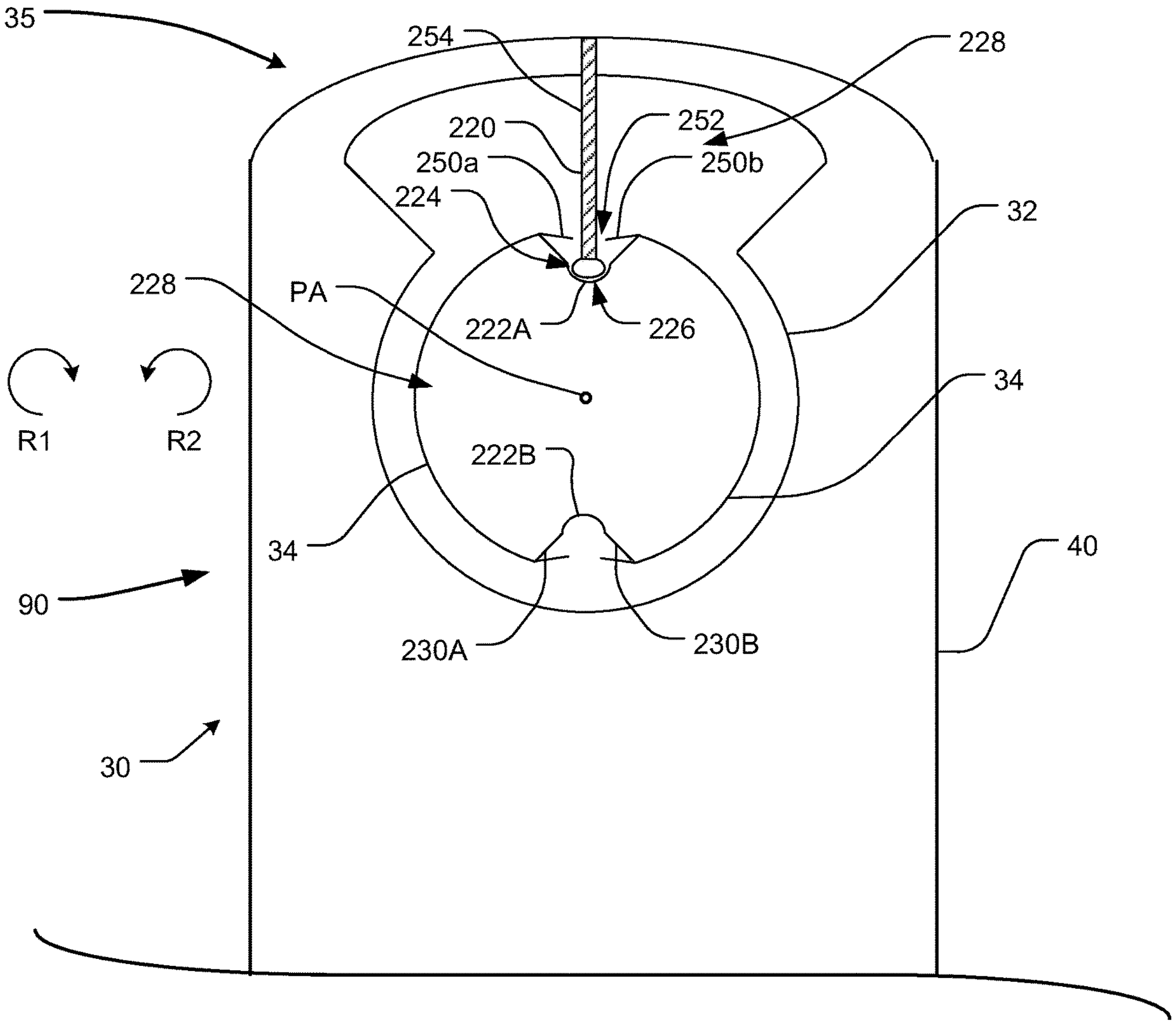
Figure 17A:
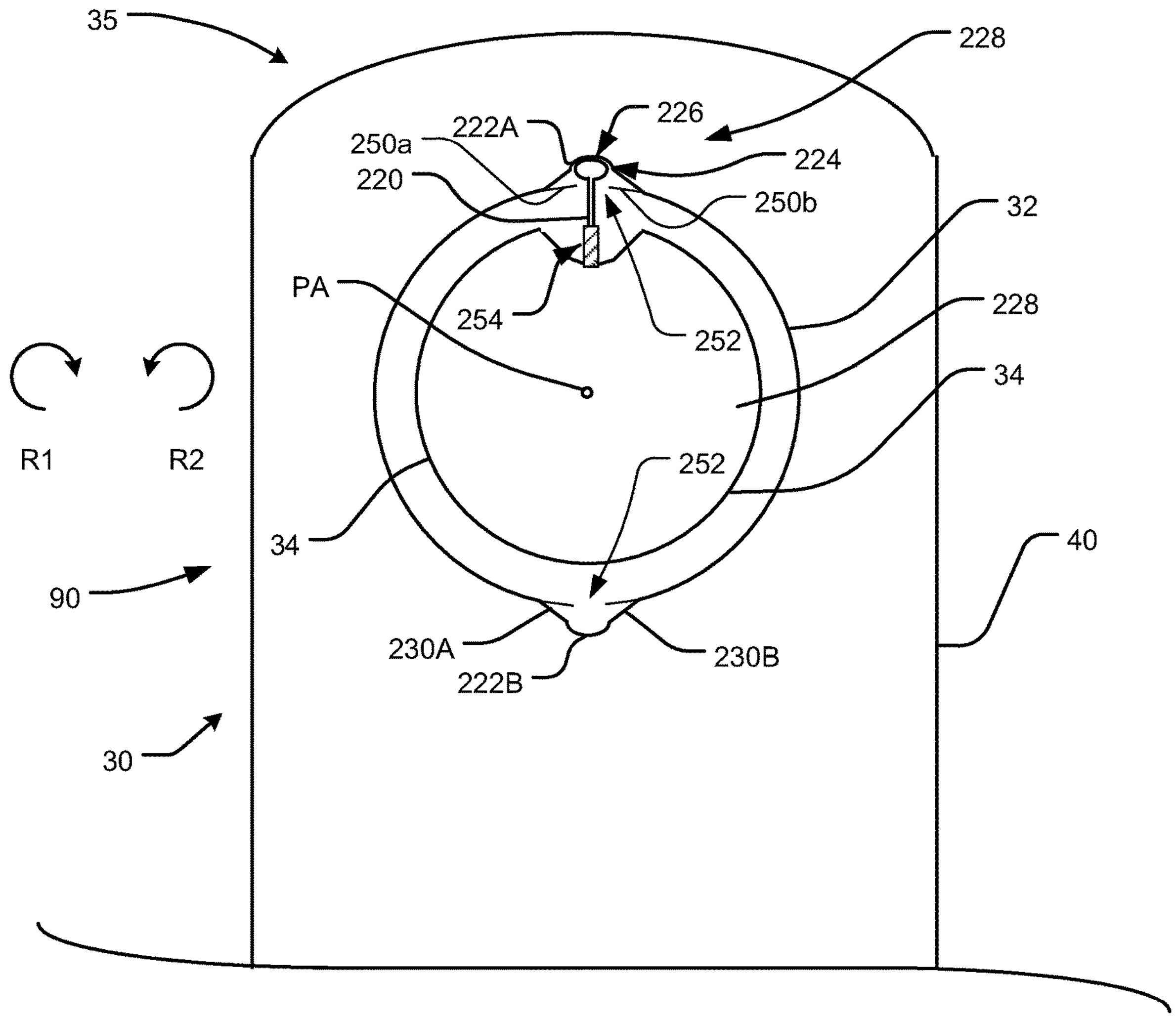
Figure 17B:
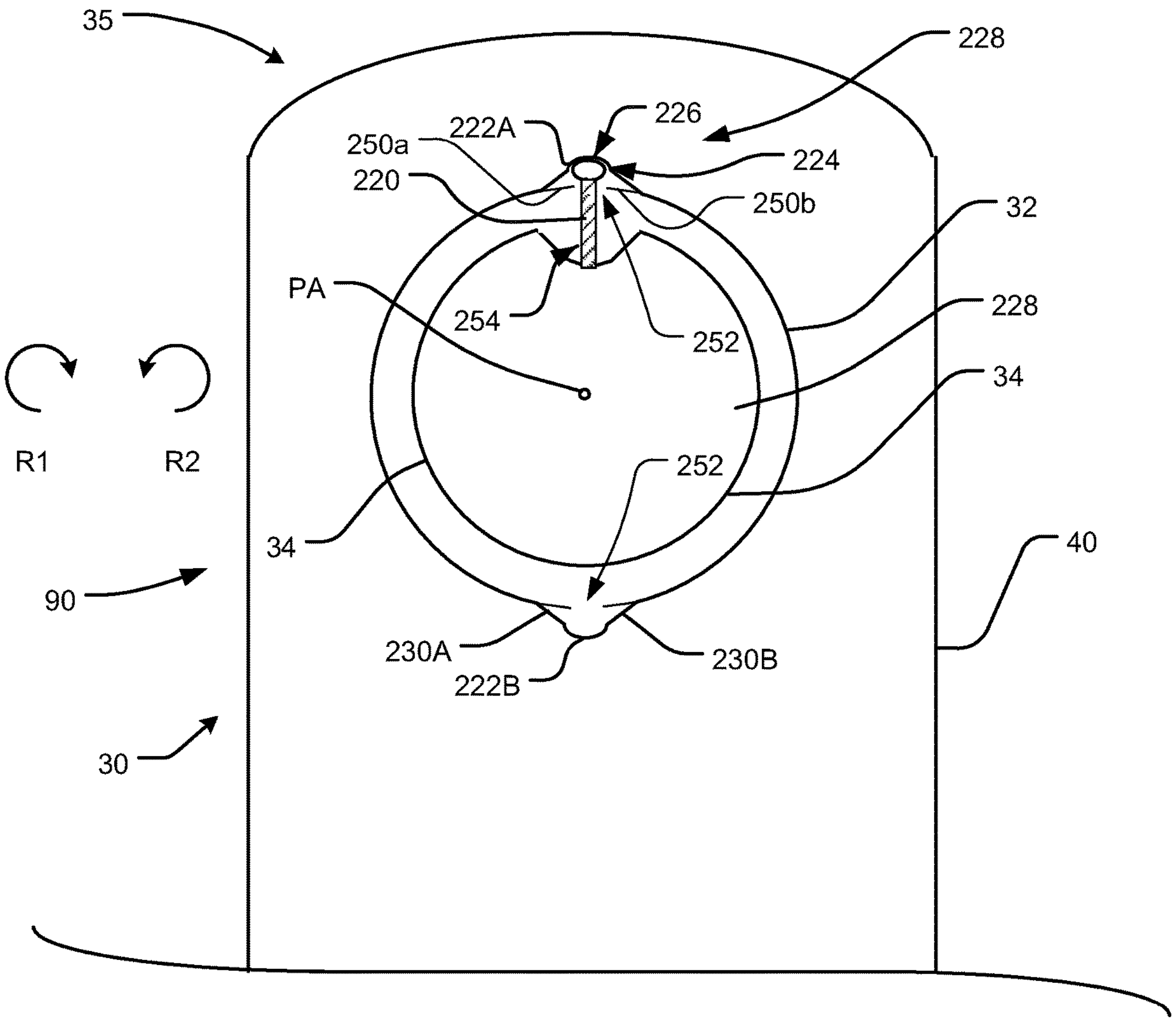
Figure 18:
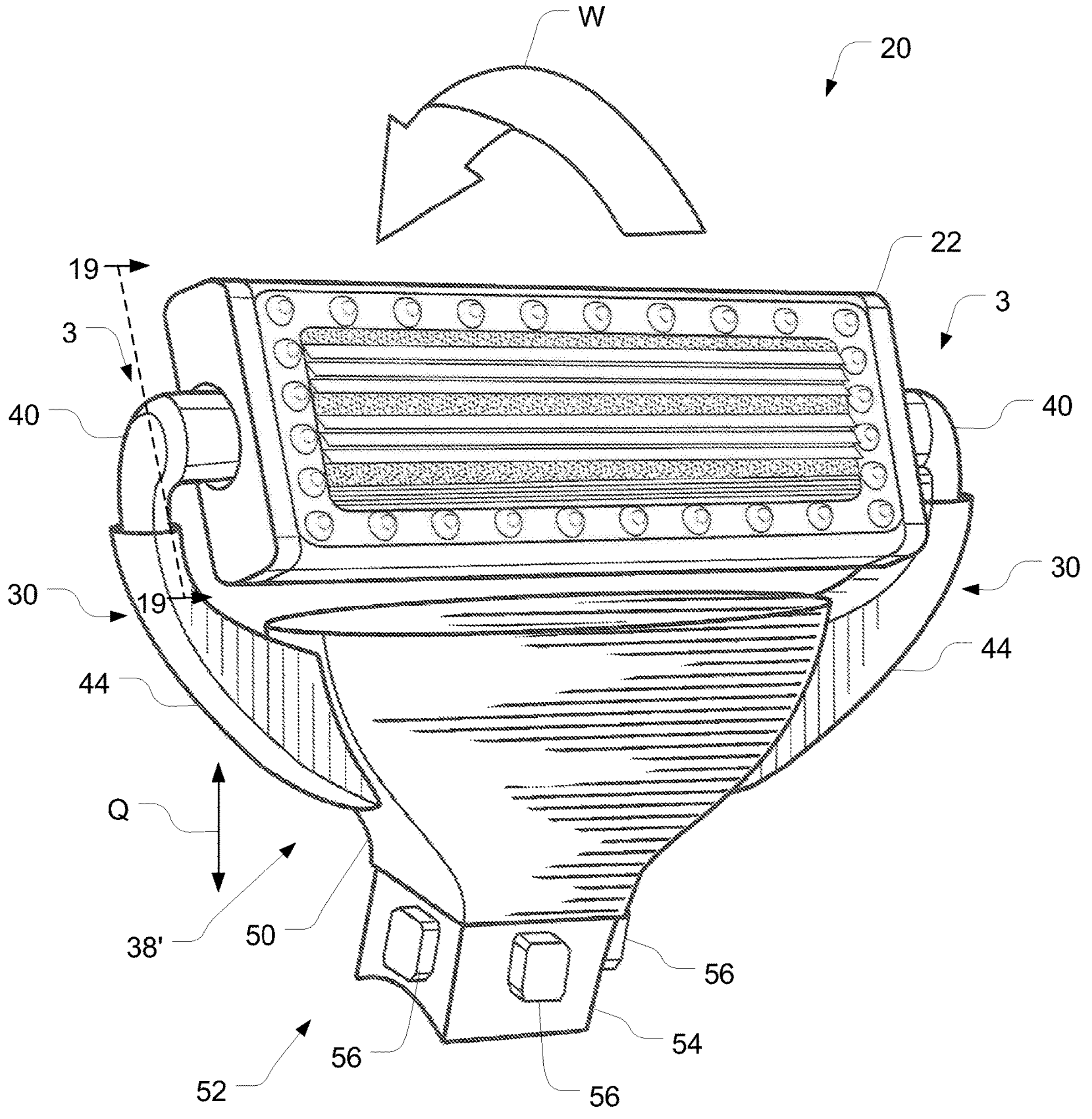
Figure 19:
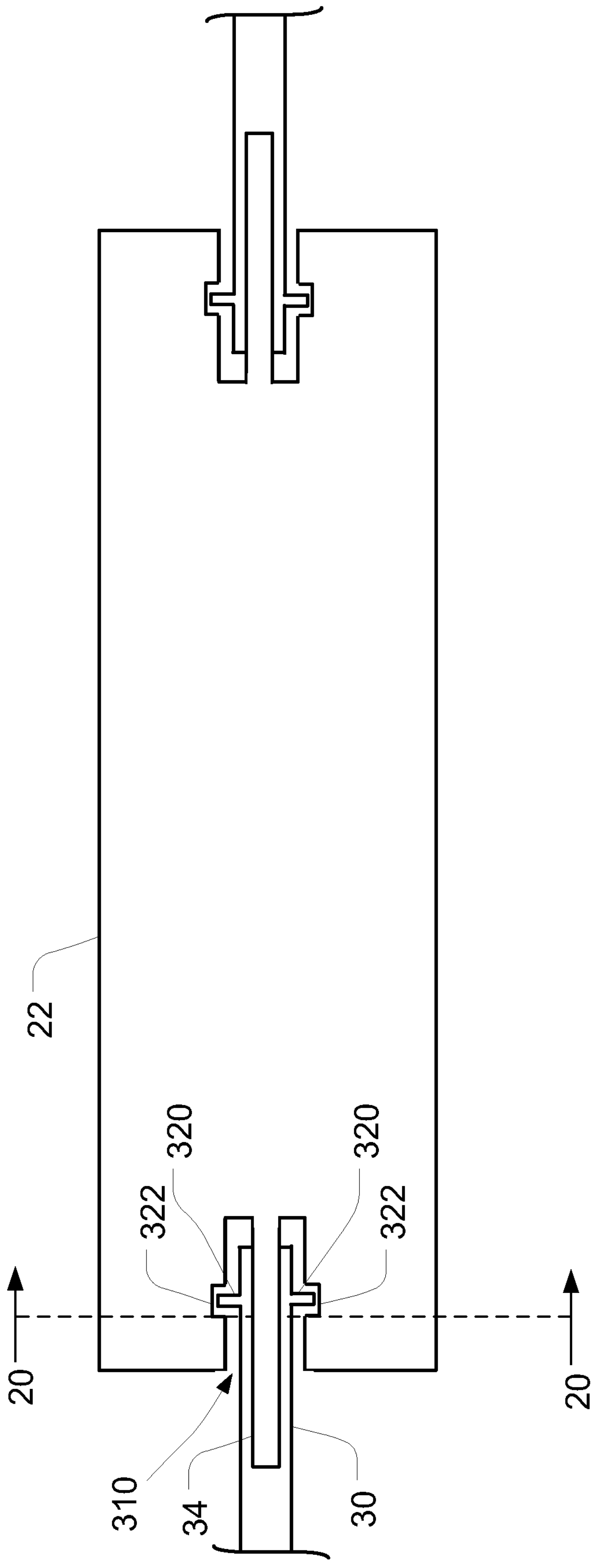
Figure 20:
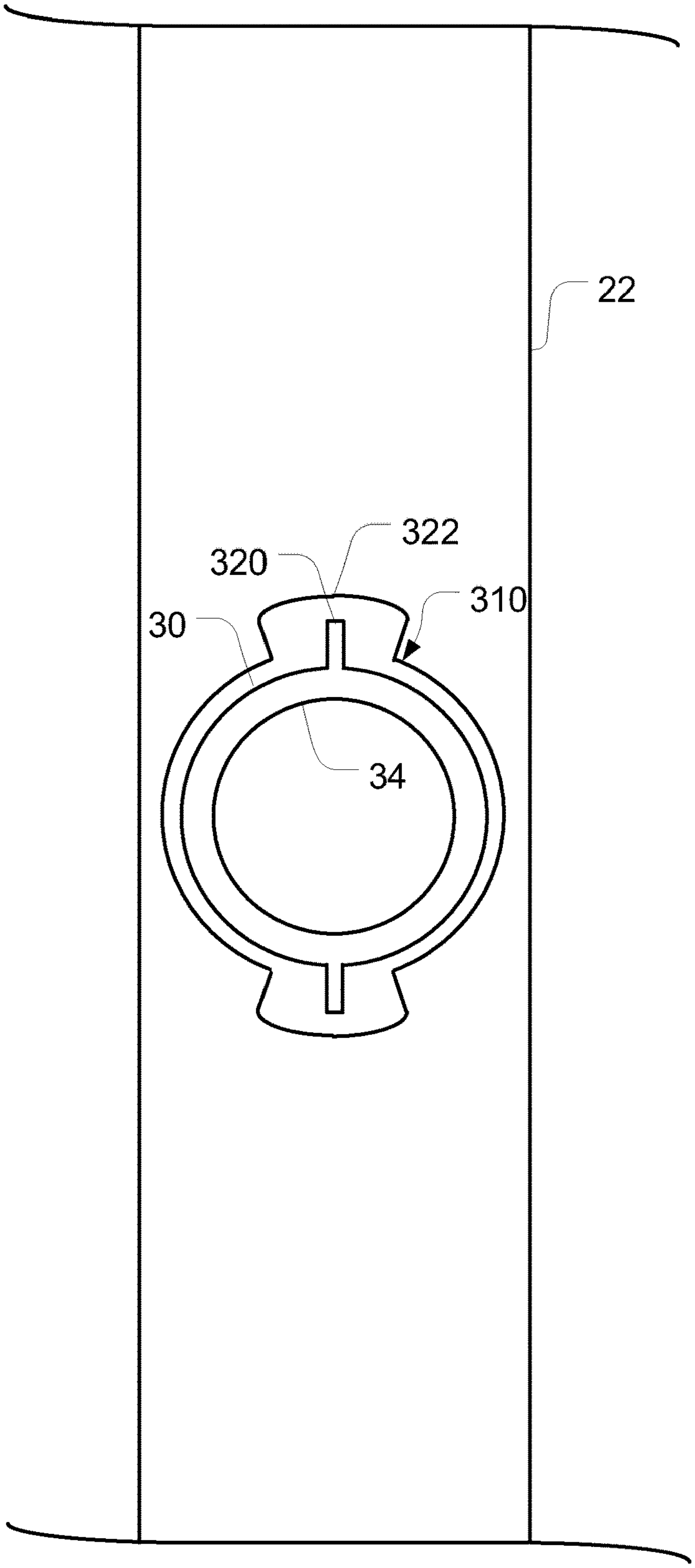
Figure 21:
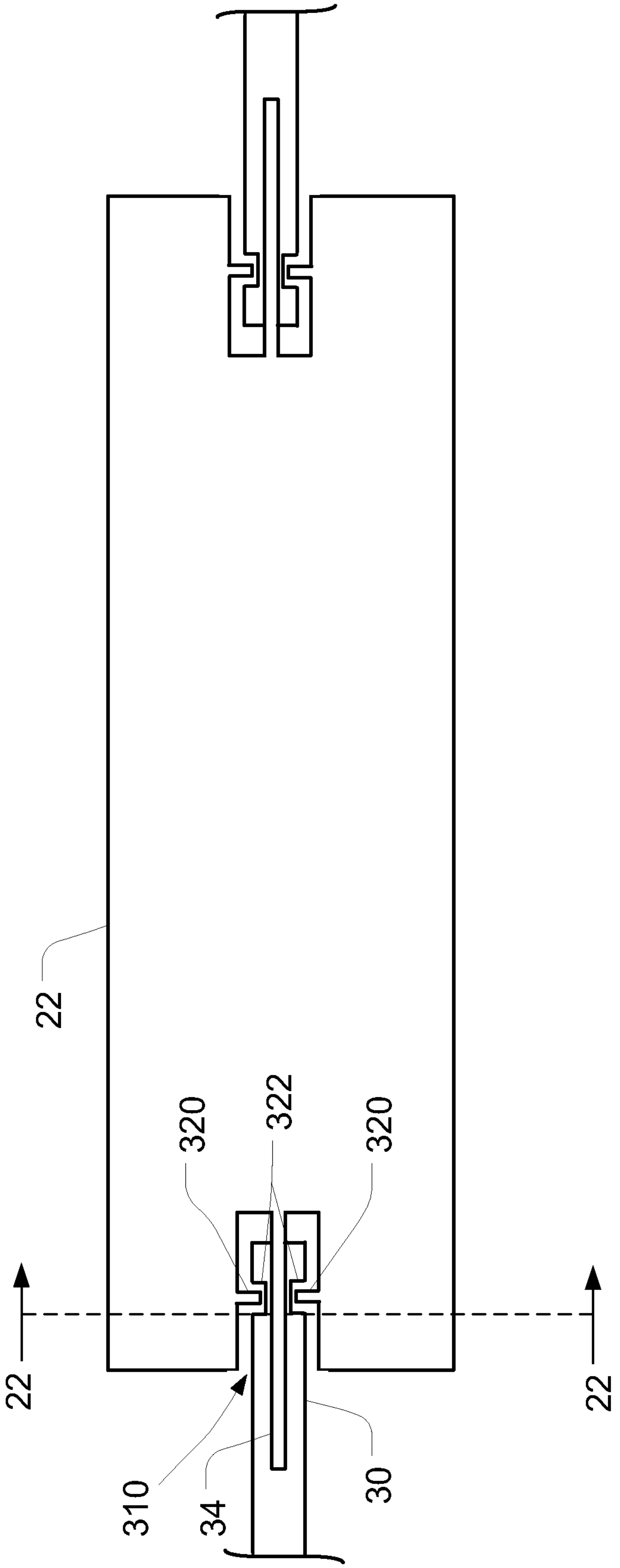
Figure 22:
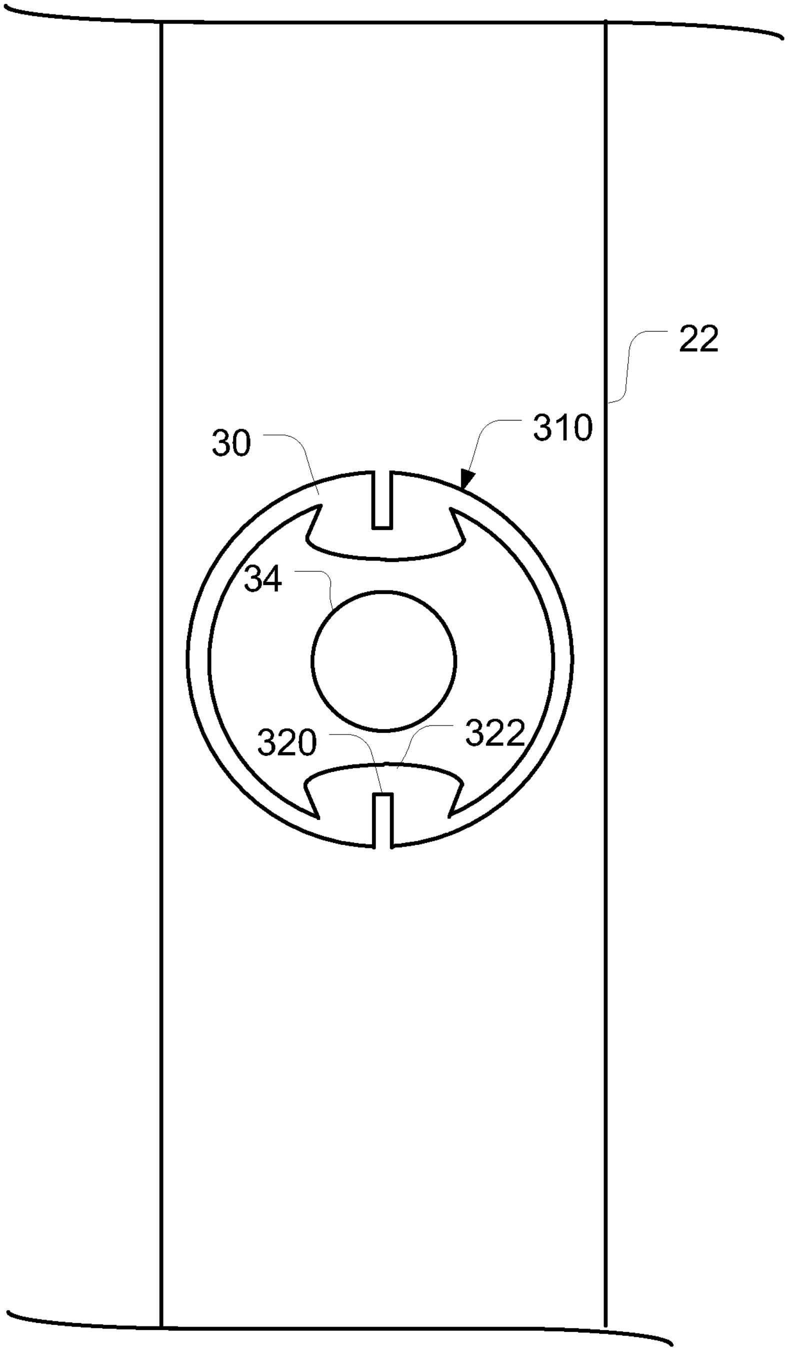
Figure 23:
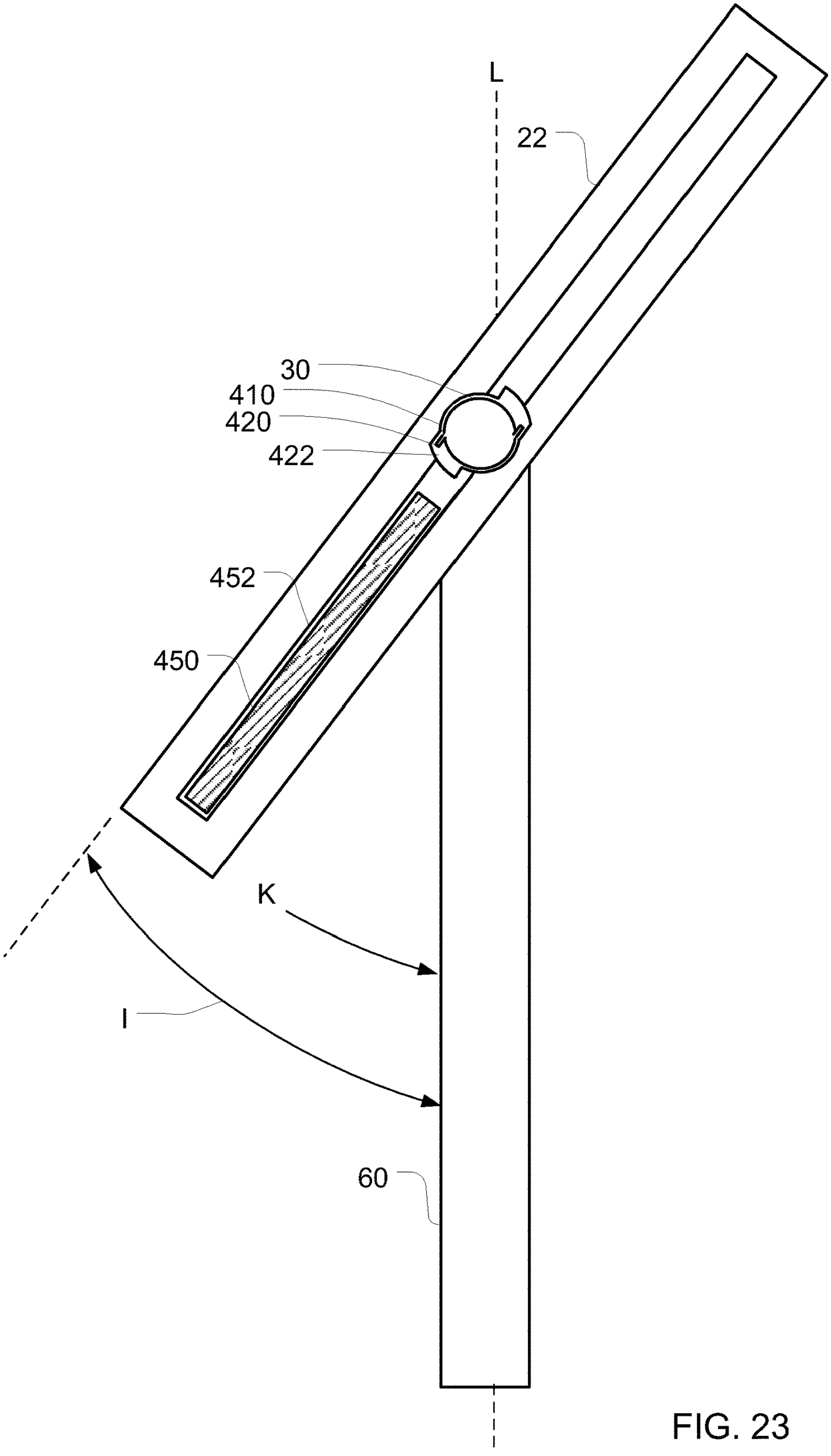
Figure 24:
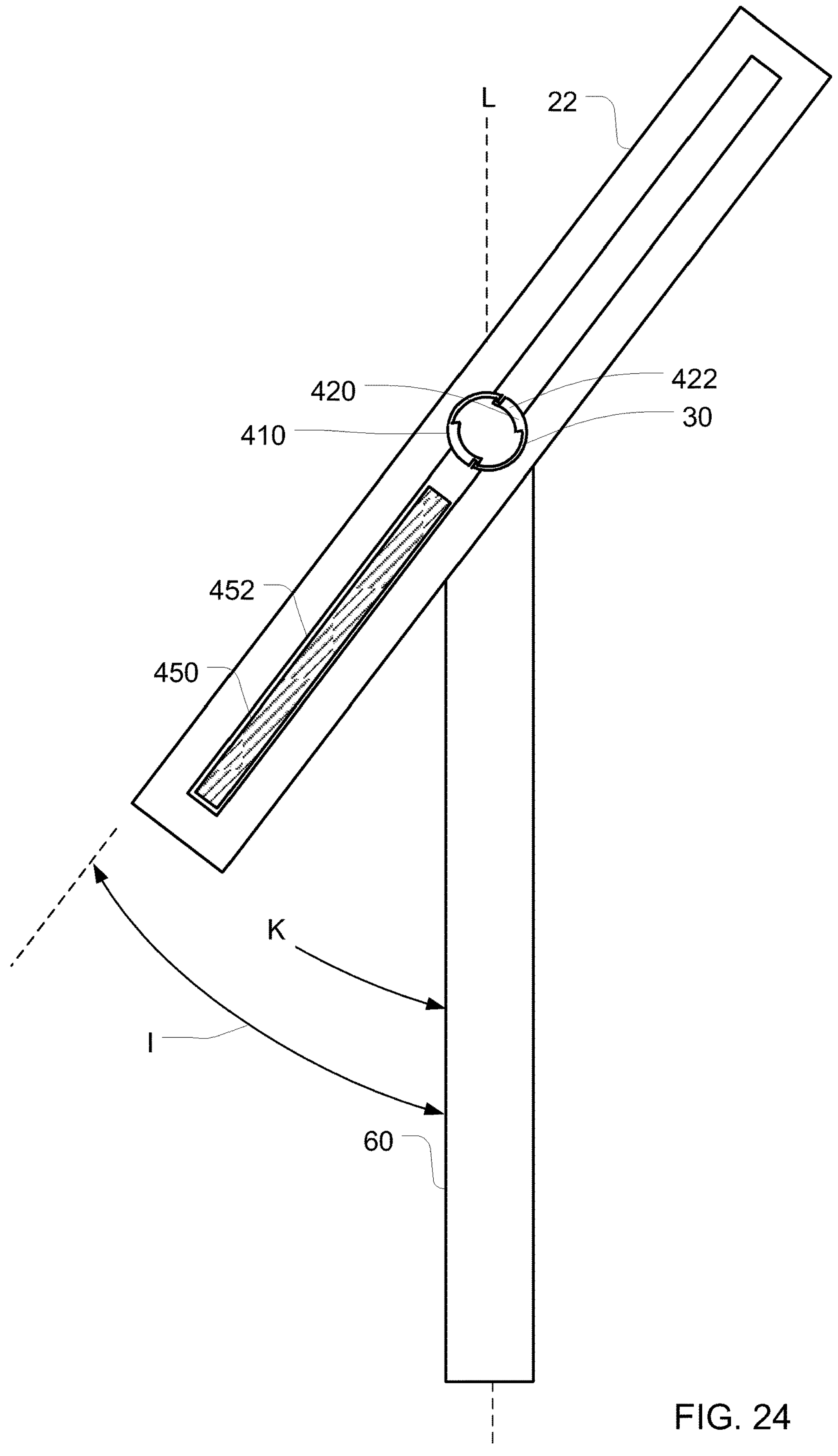
Figure 25:
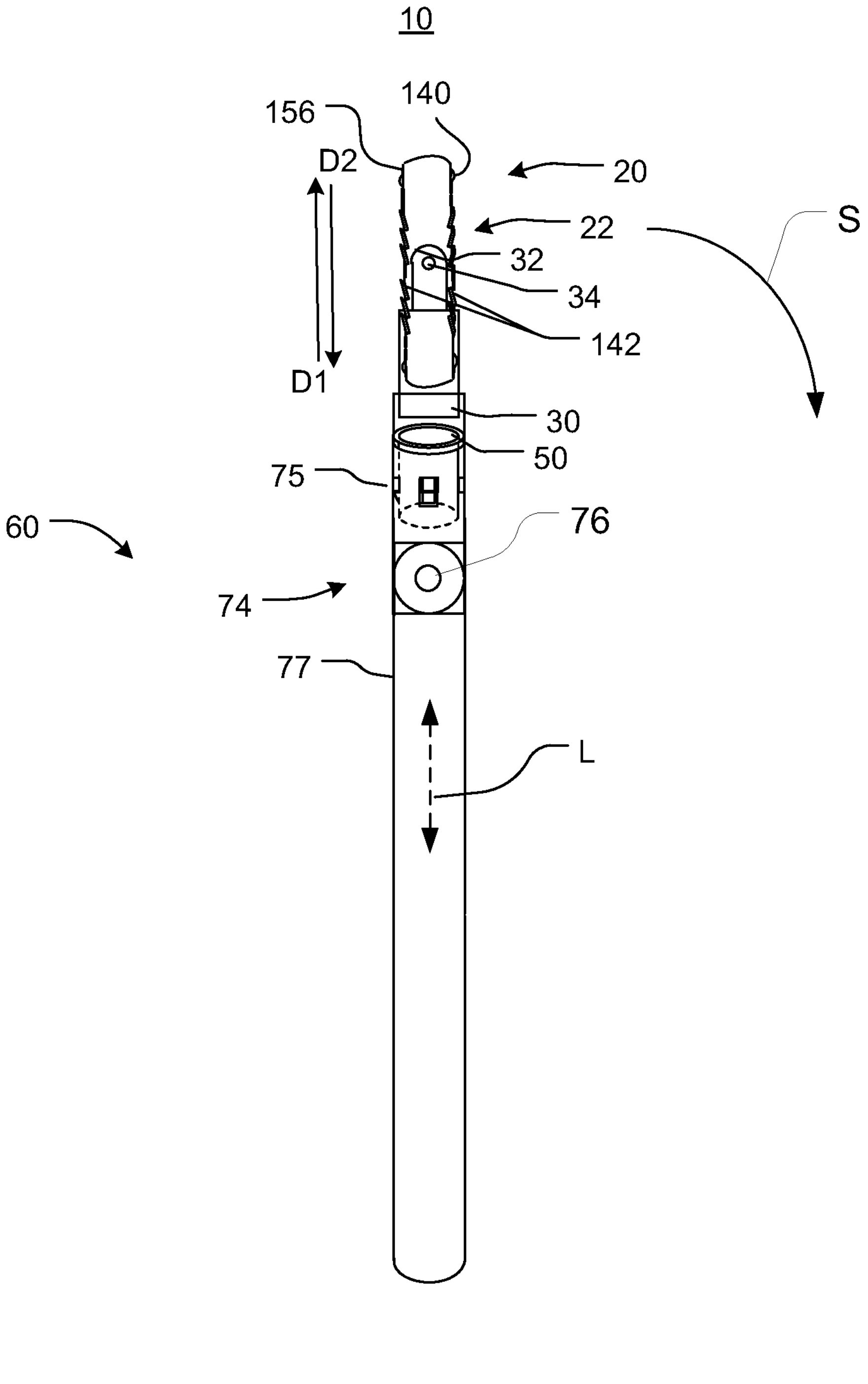
Figure 26:
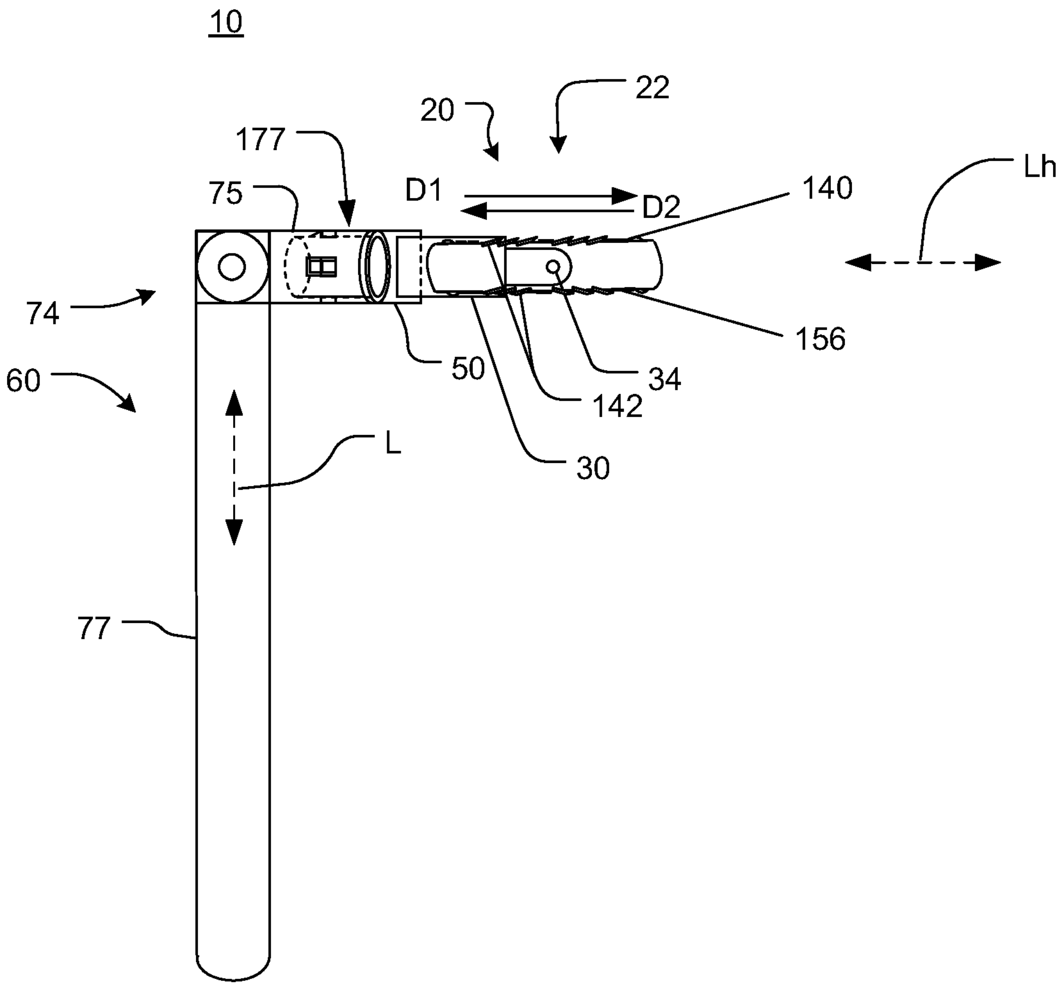
Figure 27:
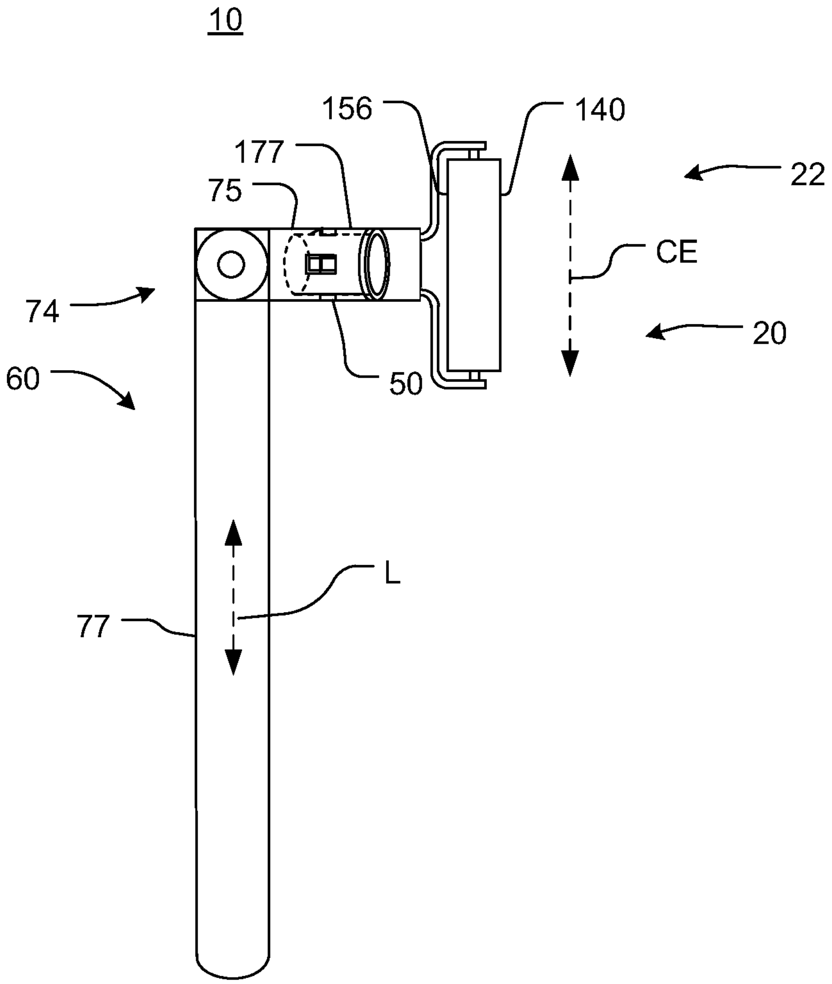
Figure 28:
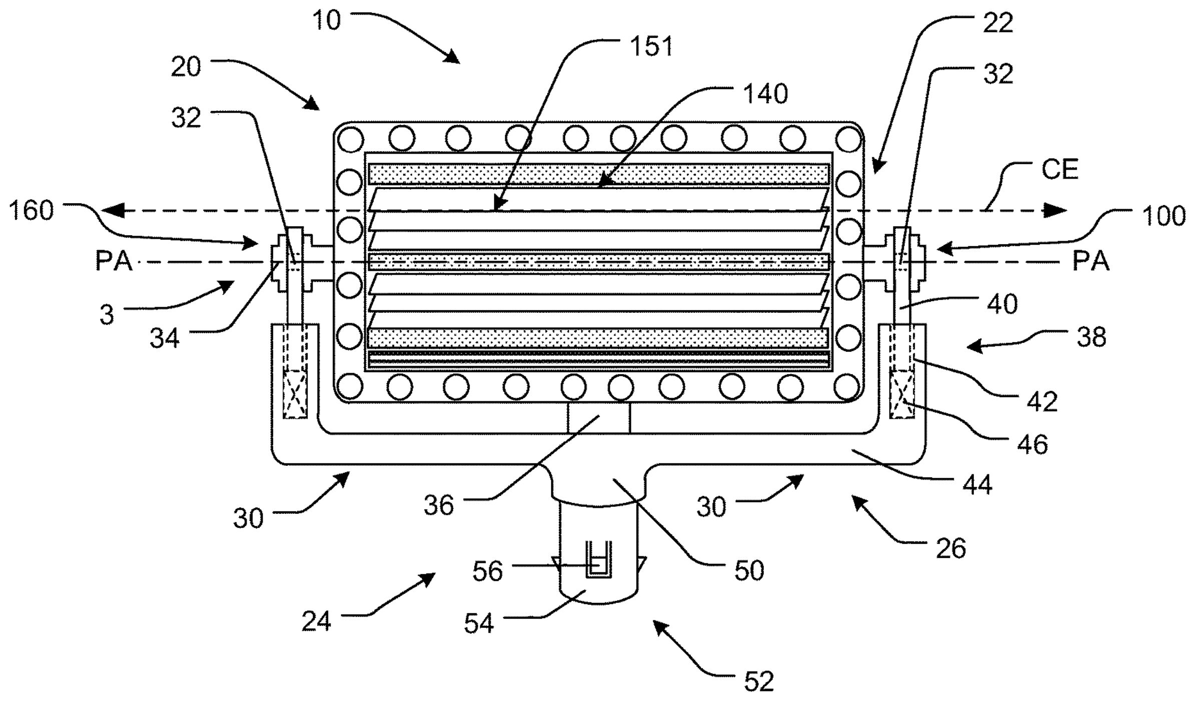
Figure 29:
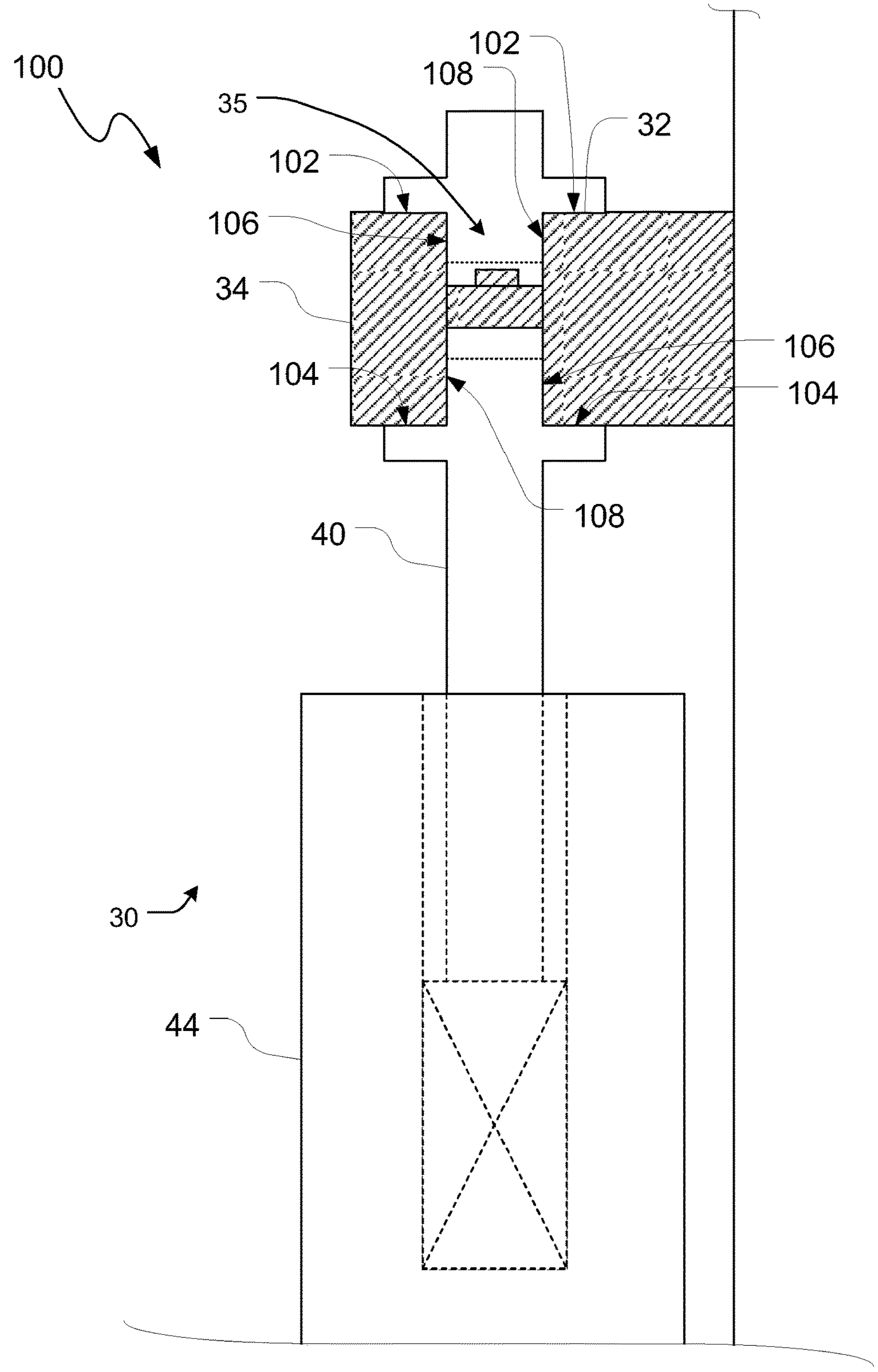
Figure 30A:
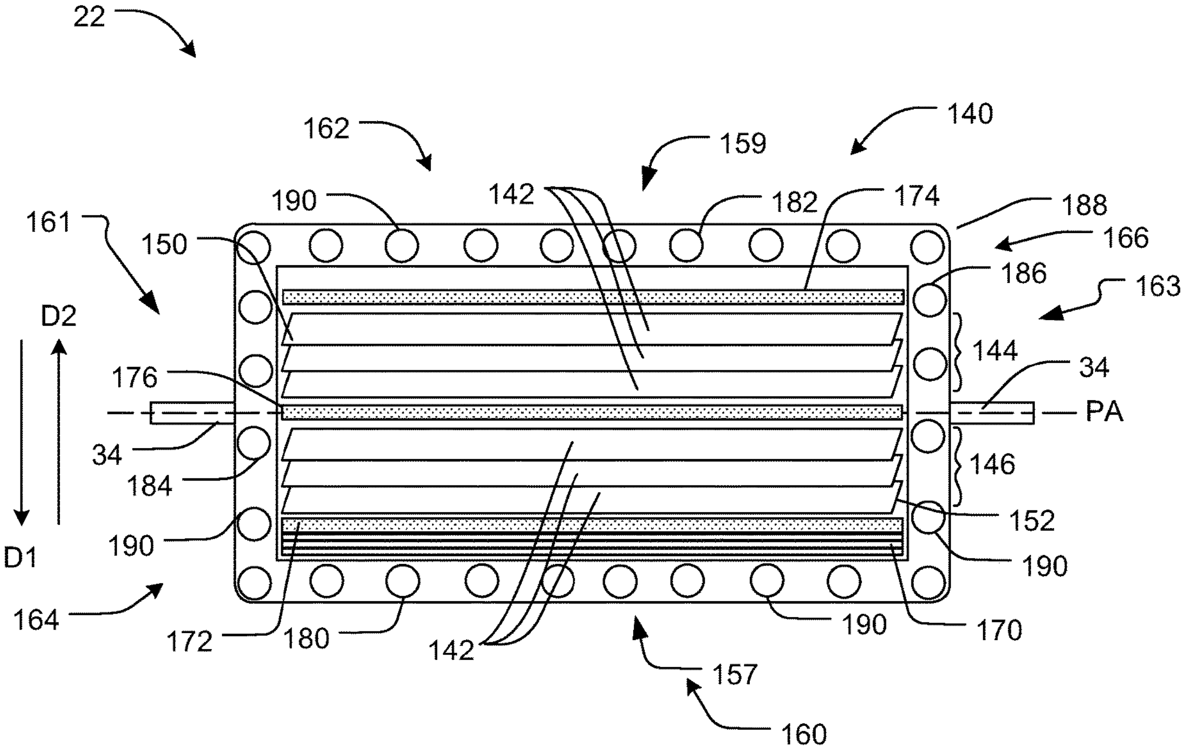
Figure 30B:
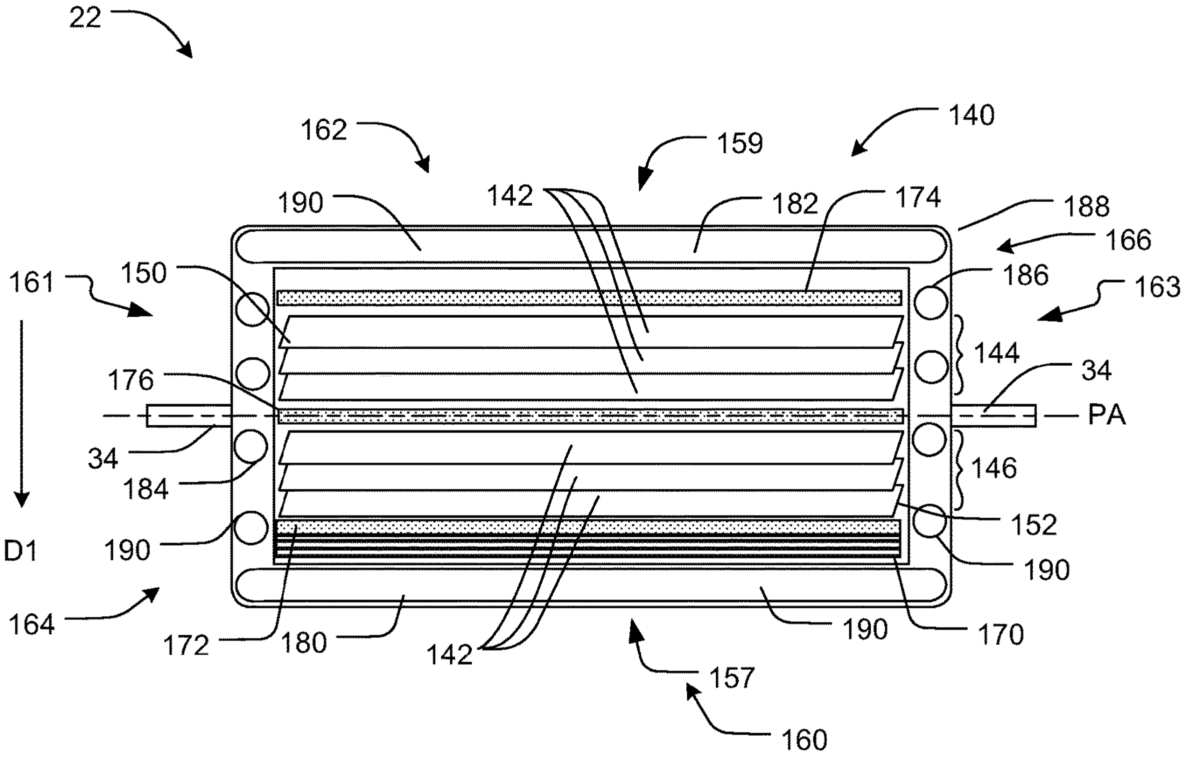
Figure 31:
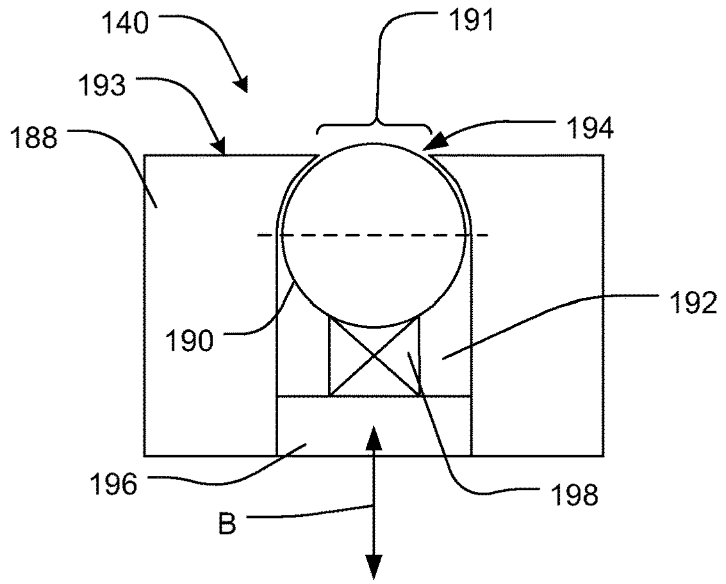
Figure 32:
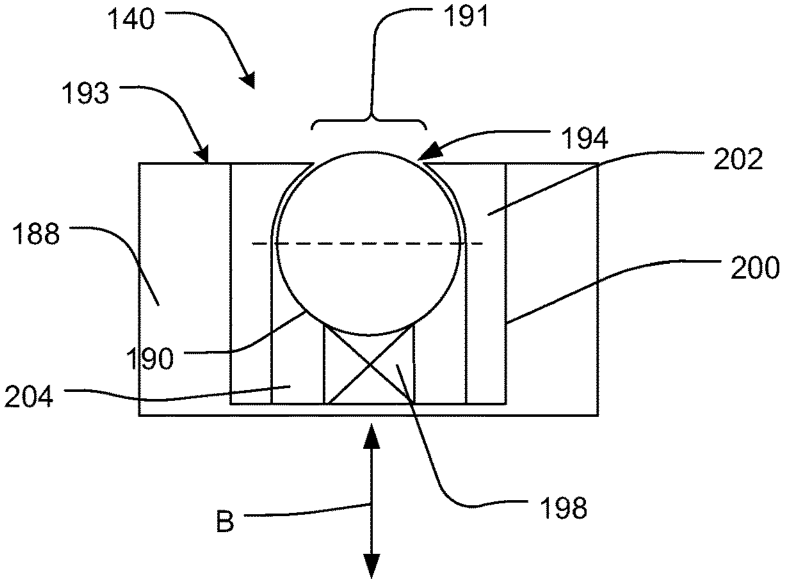
Figure 33:
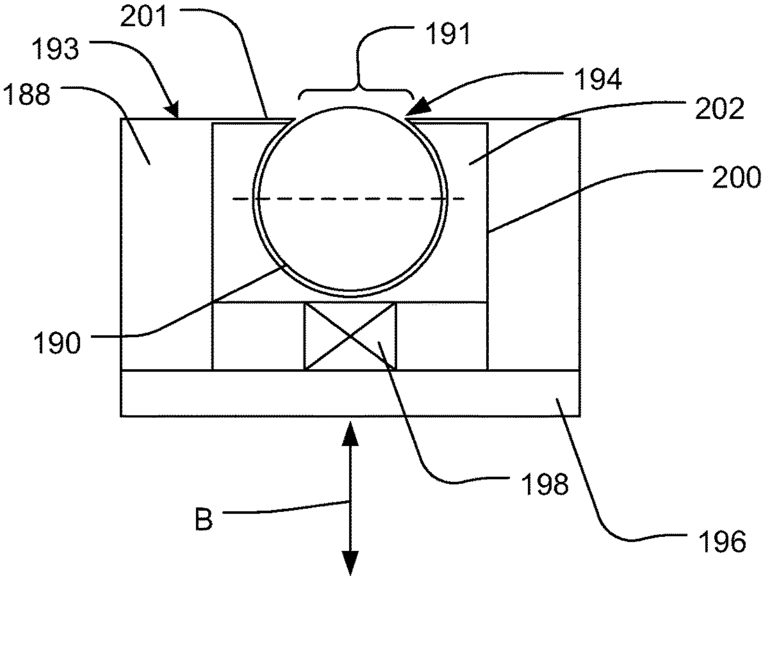
Figure 34:
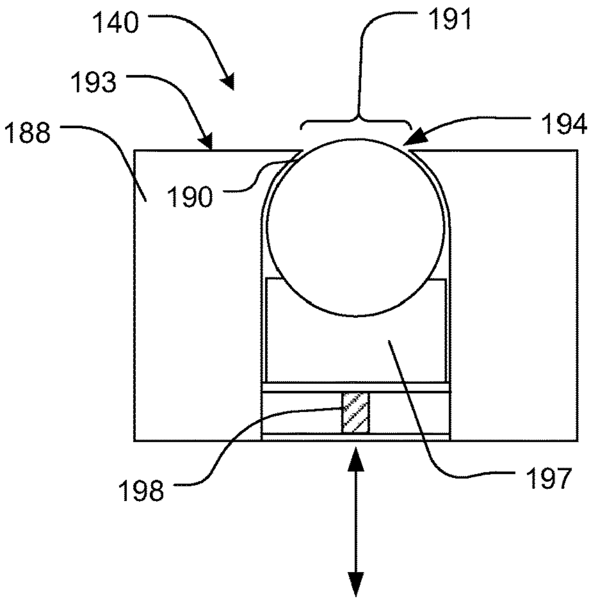
Figure 35A:
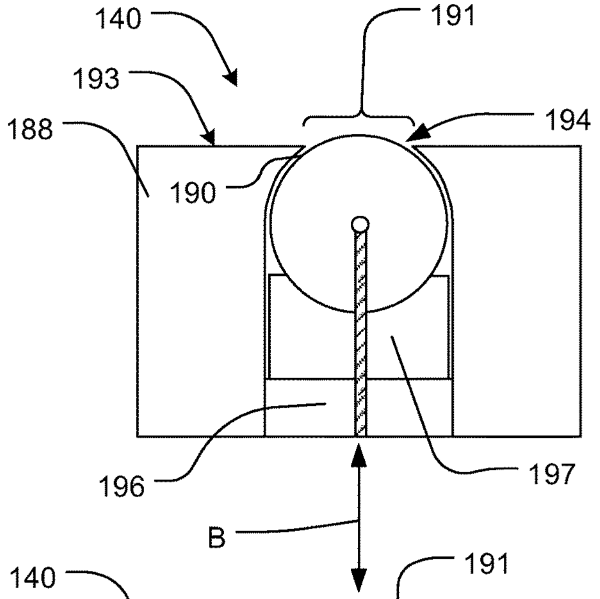
Figure 35B:
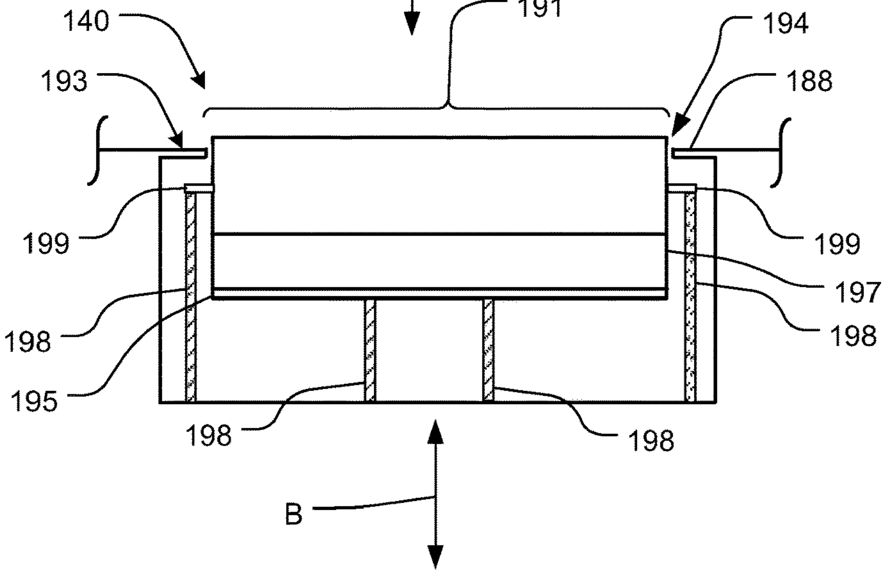
Figure 35C:
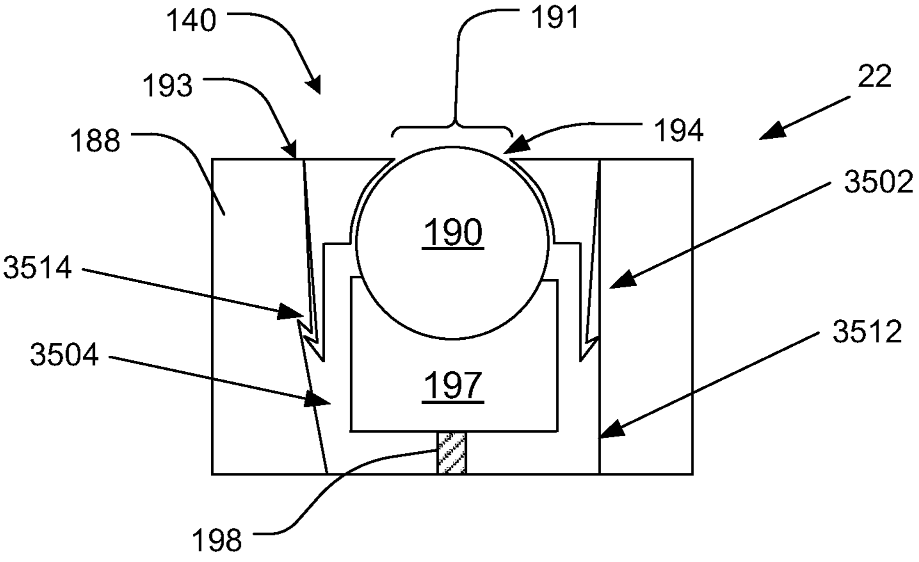
Figure 35D:
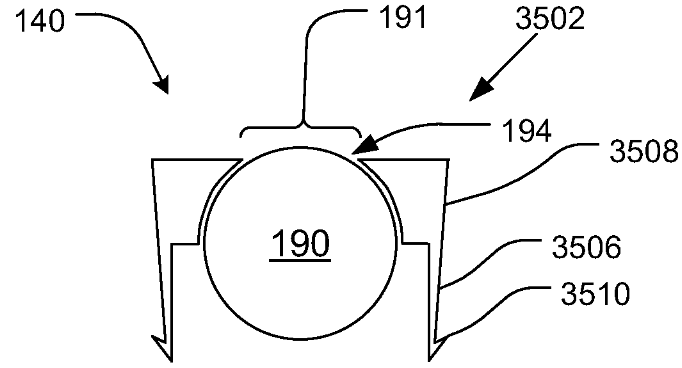
Figure 35E:
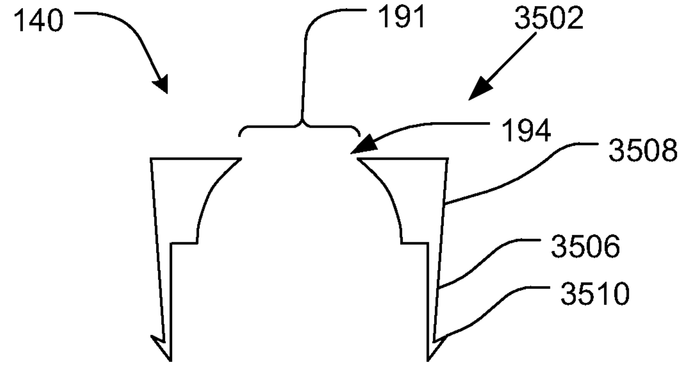
Figure 35F:
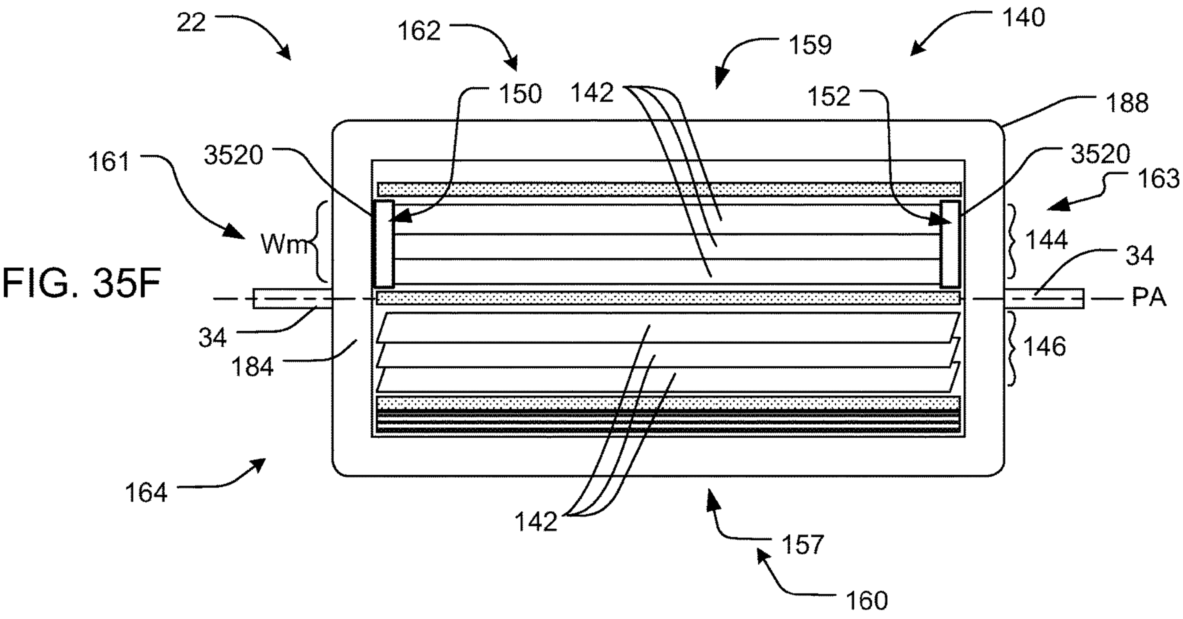
Figure 35G:
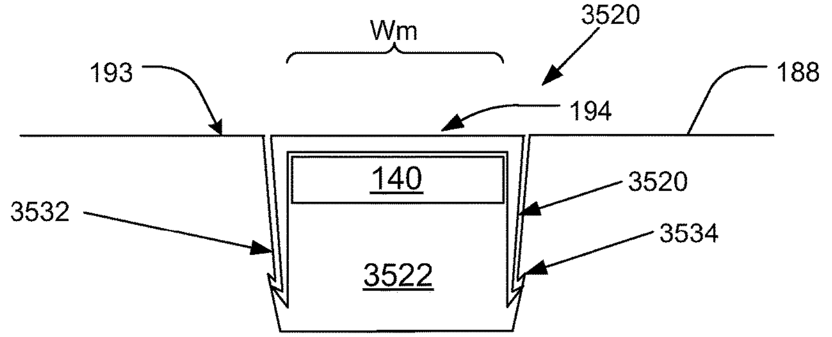
Figure 35H:
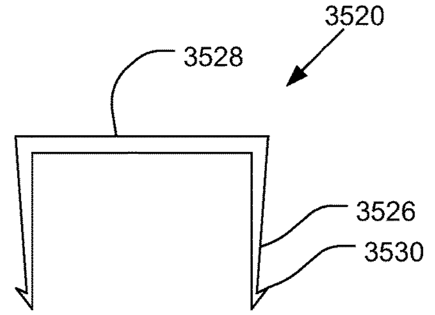
Figure 36:
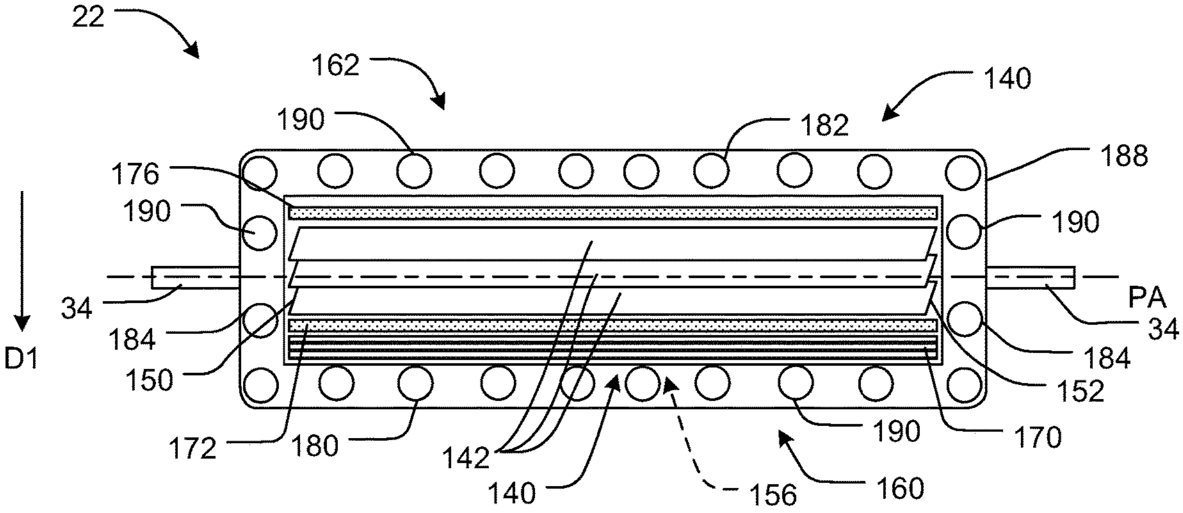
Figure 37:
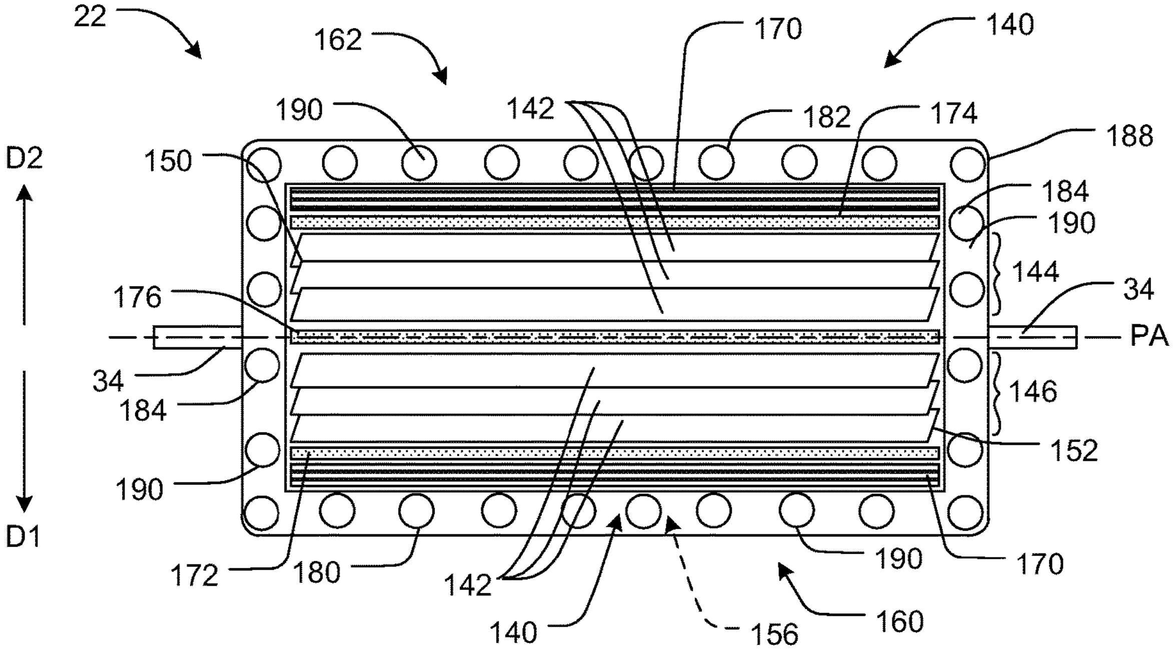
Figure 38:
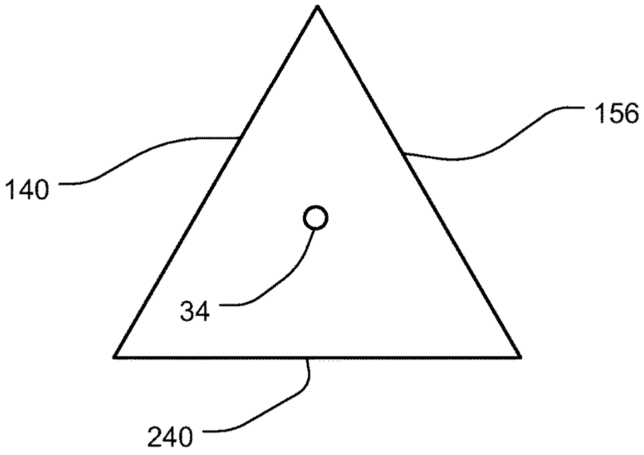
Figure 39:
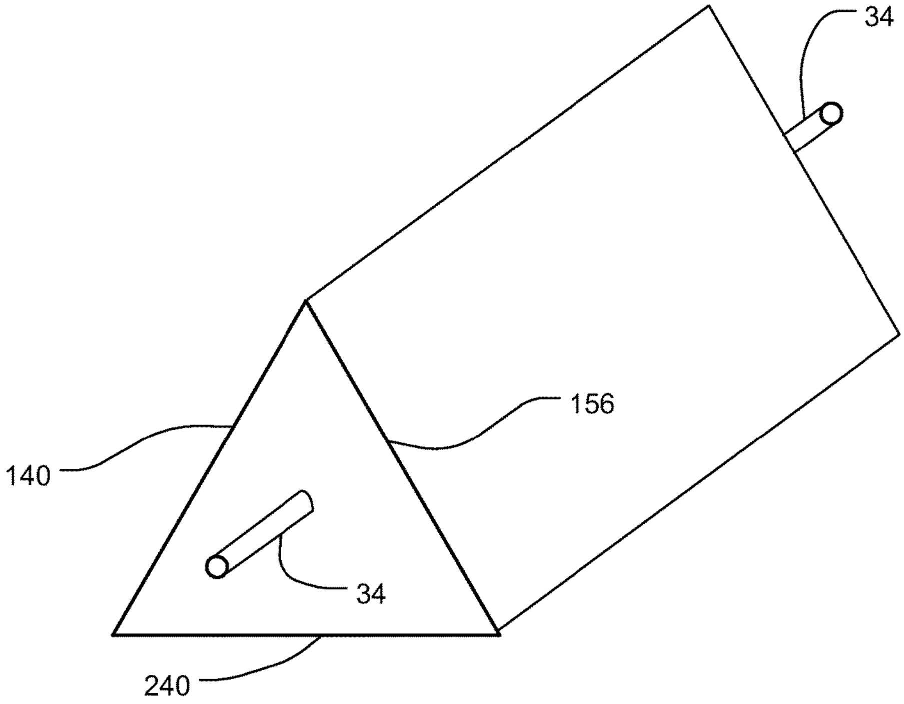
Figure 40:
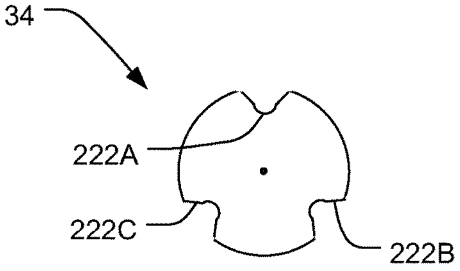
Figure 41:
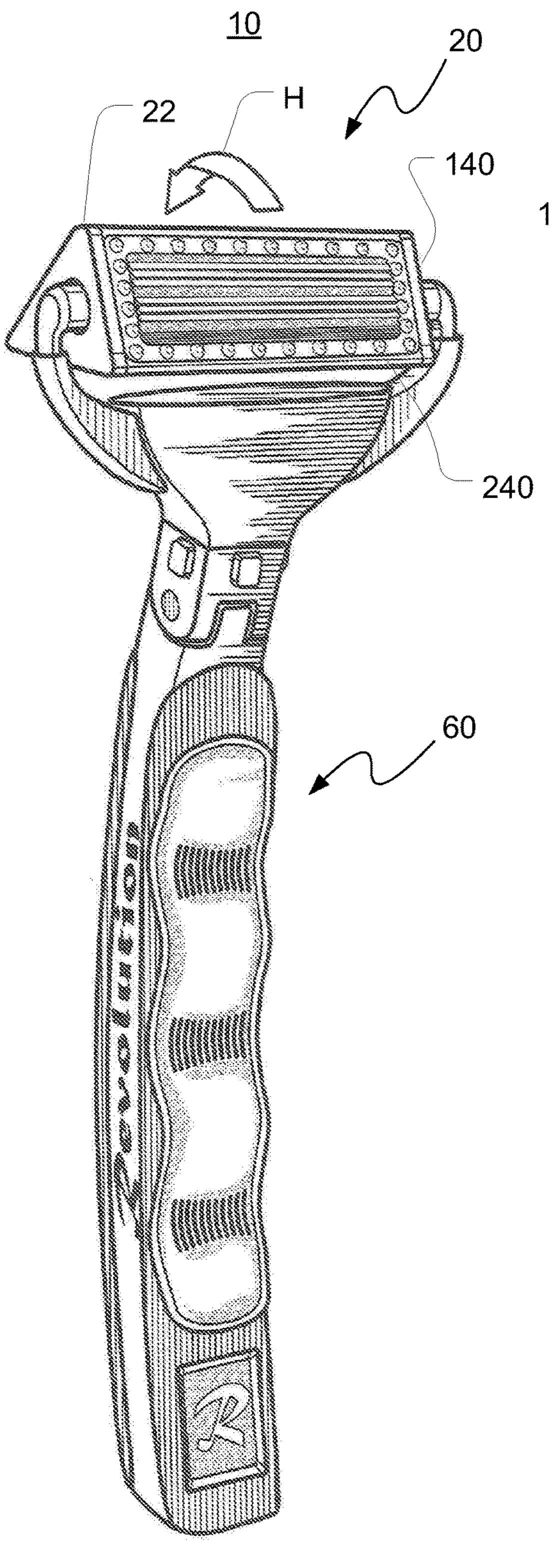
Figure 42:
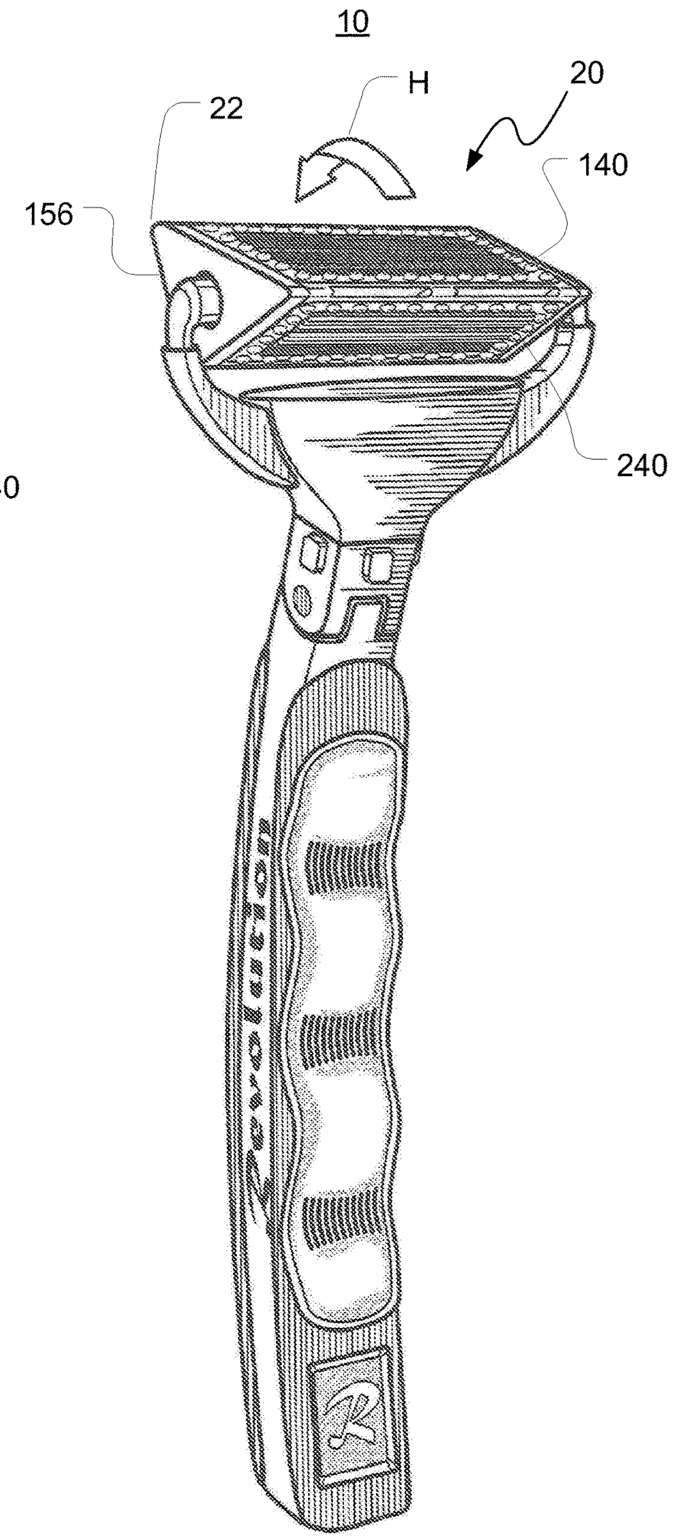
Figure 43:
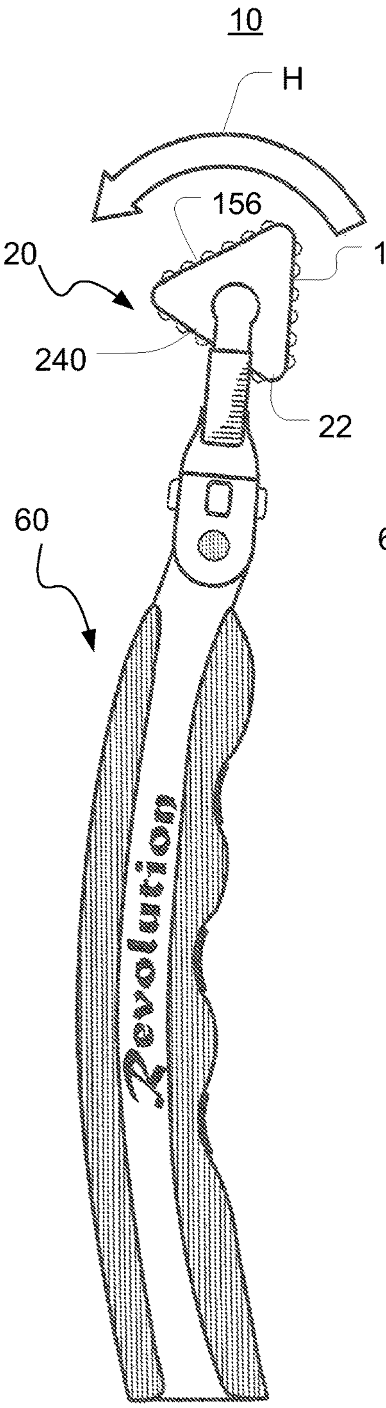
Figure 44:
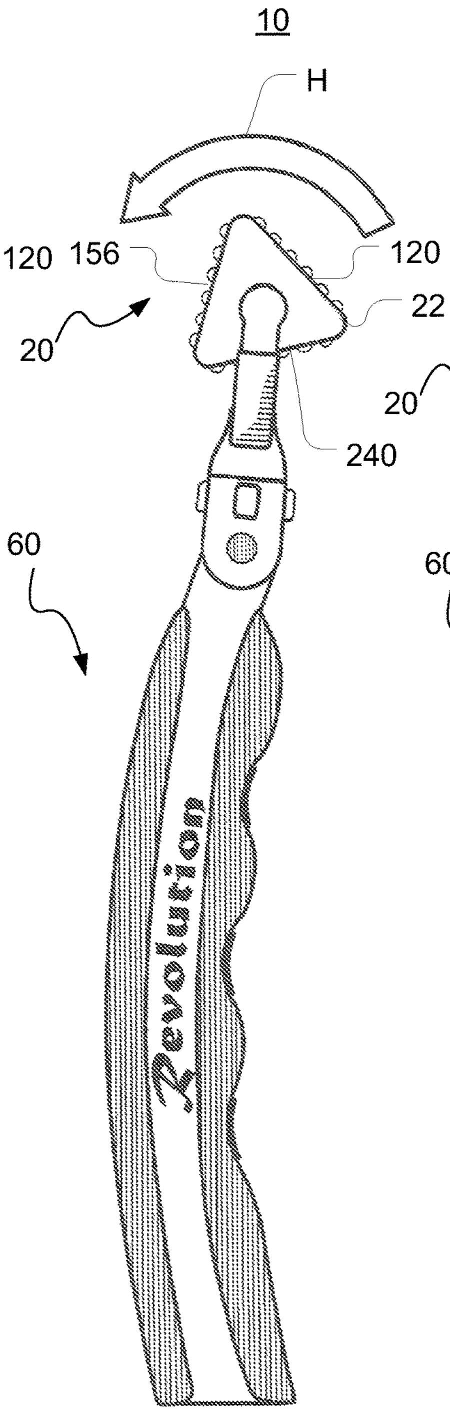
Figure 45:
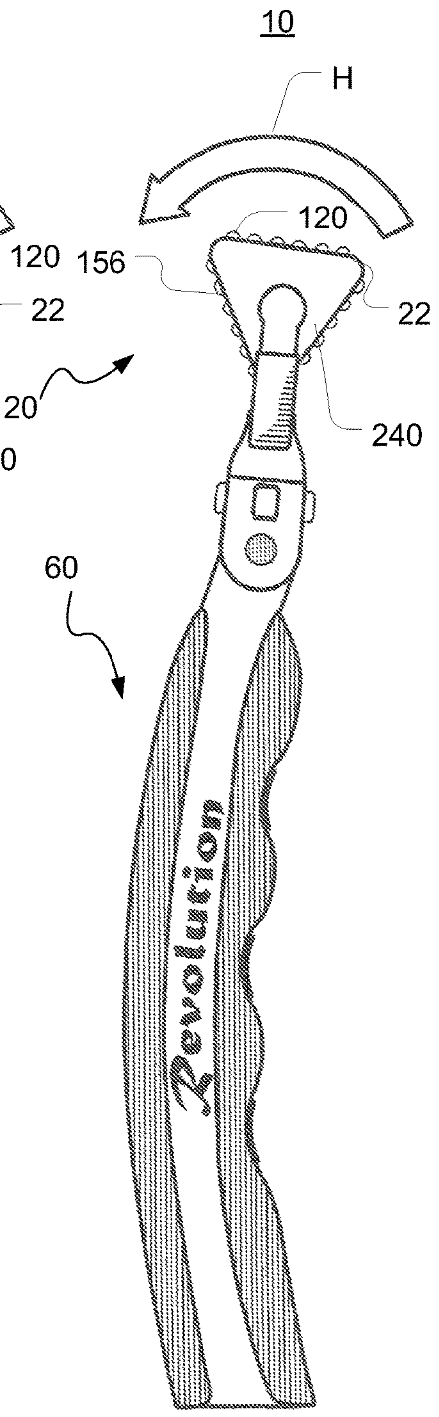
Figure 50:
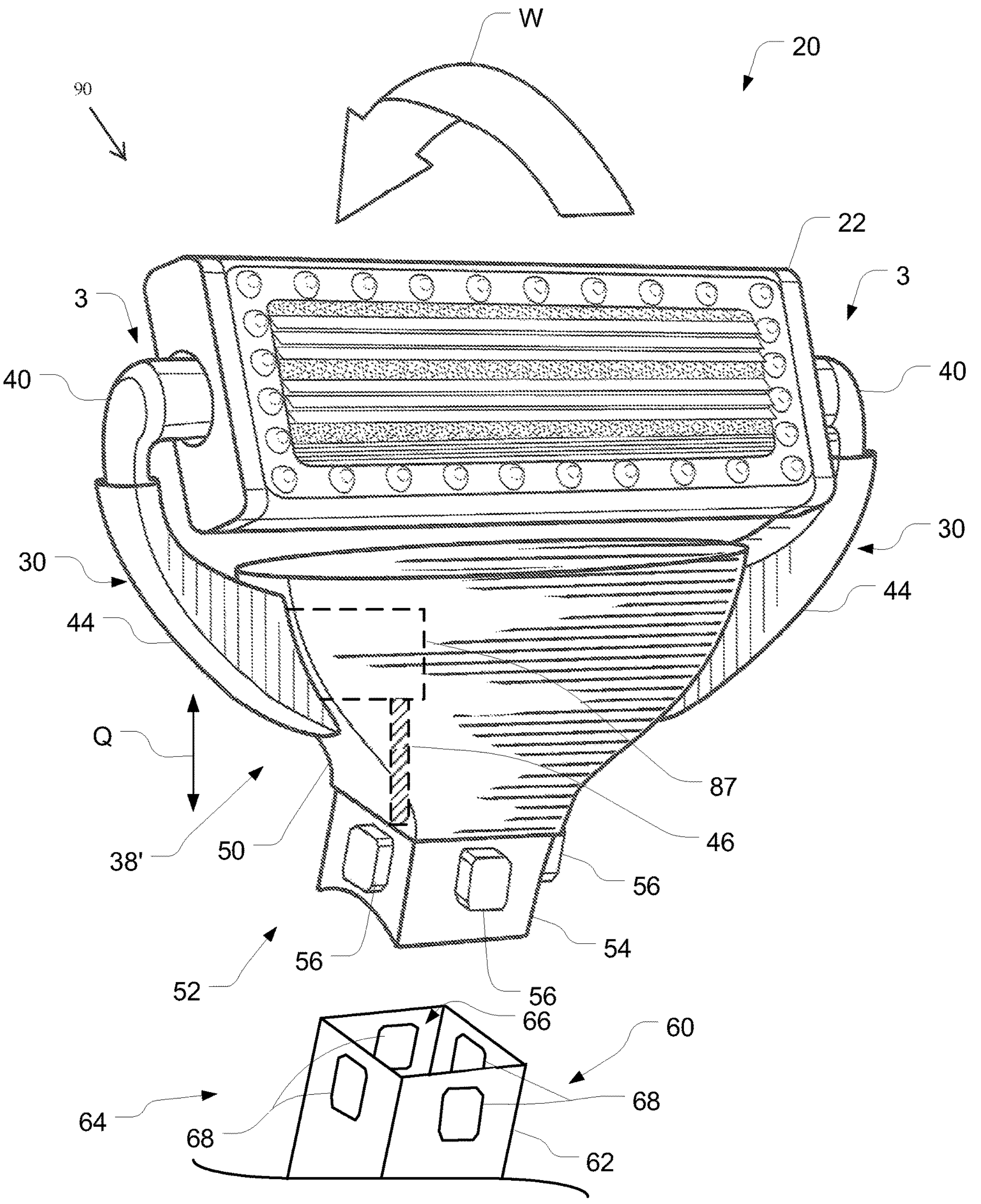
Figure 51:
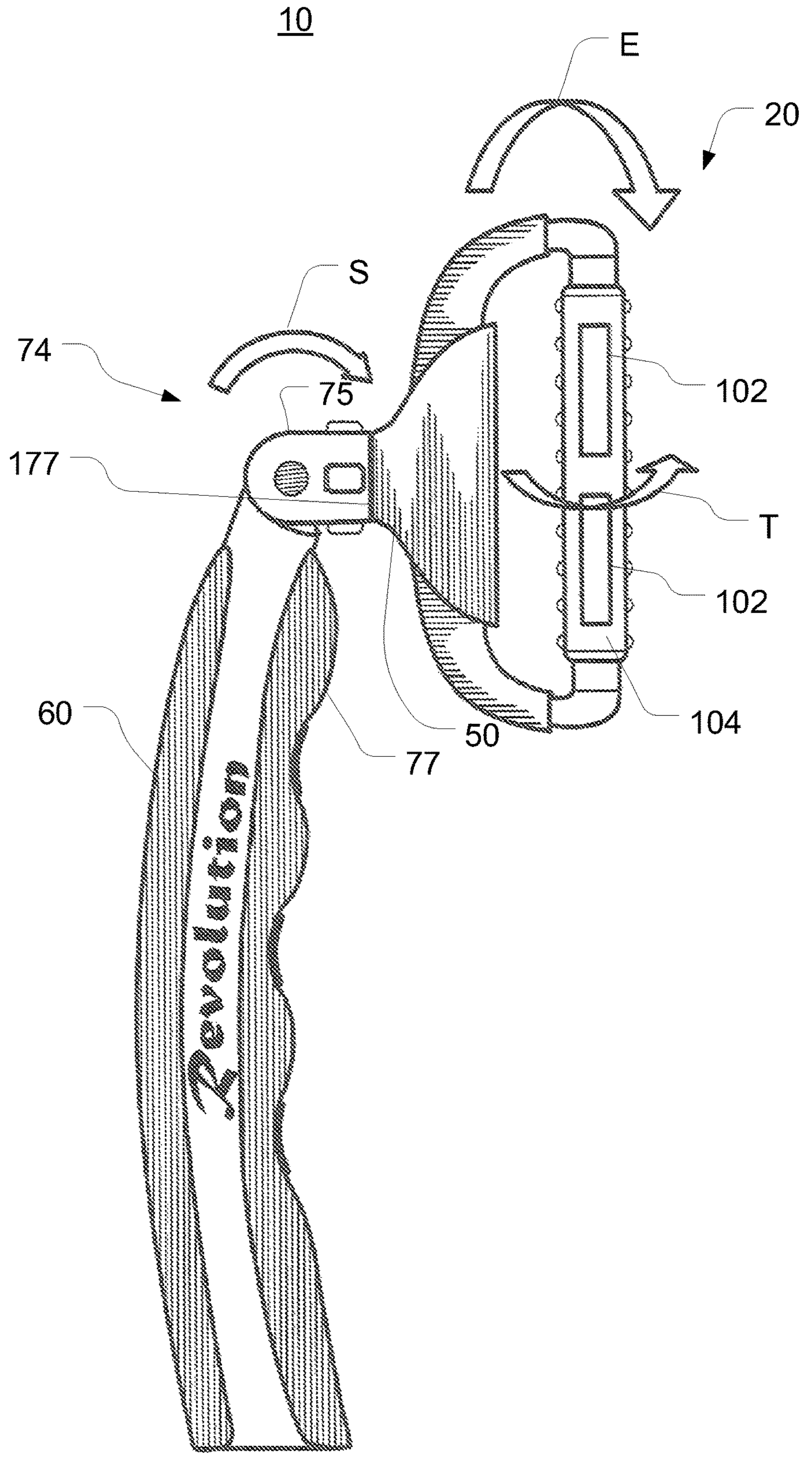
Figure 52:
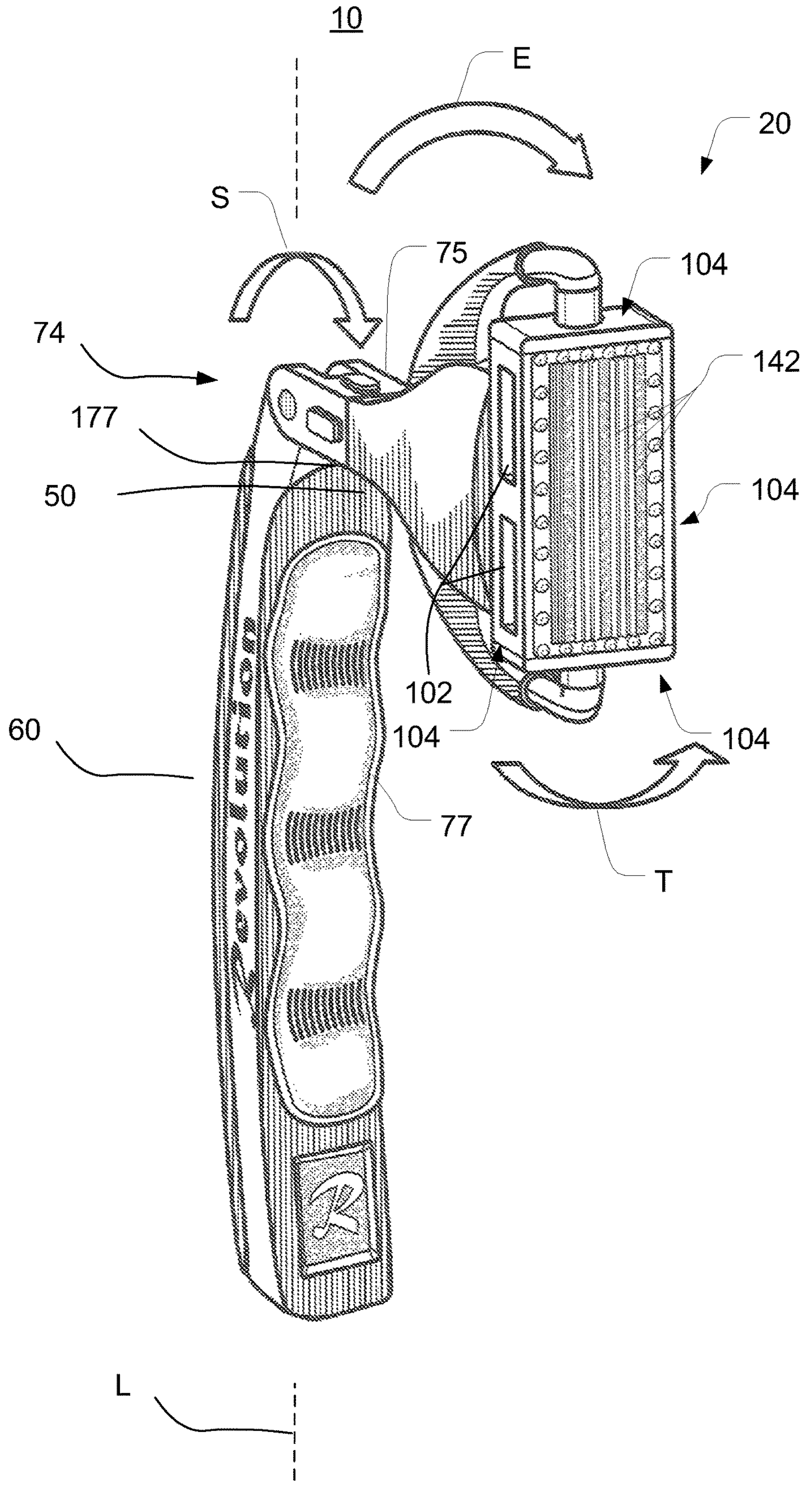
Figure 53:
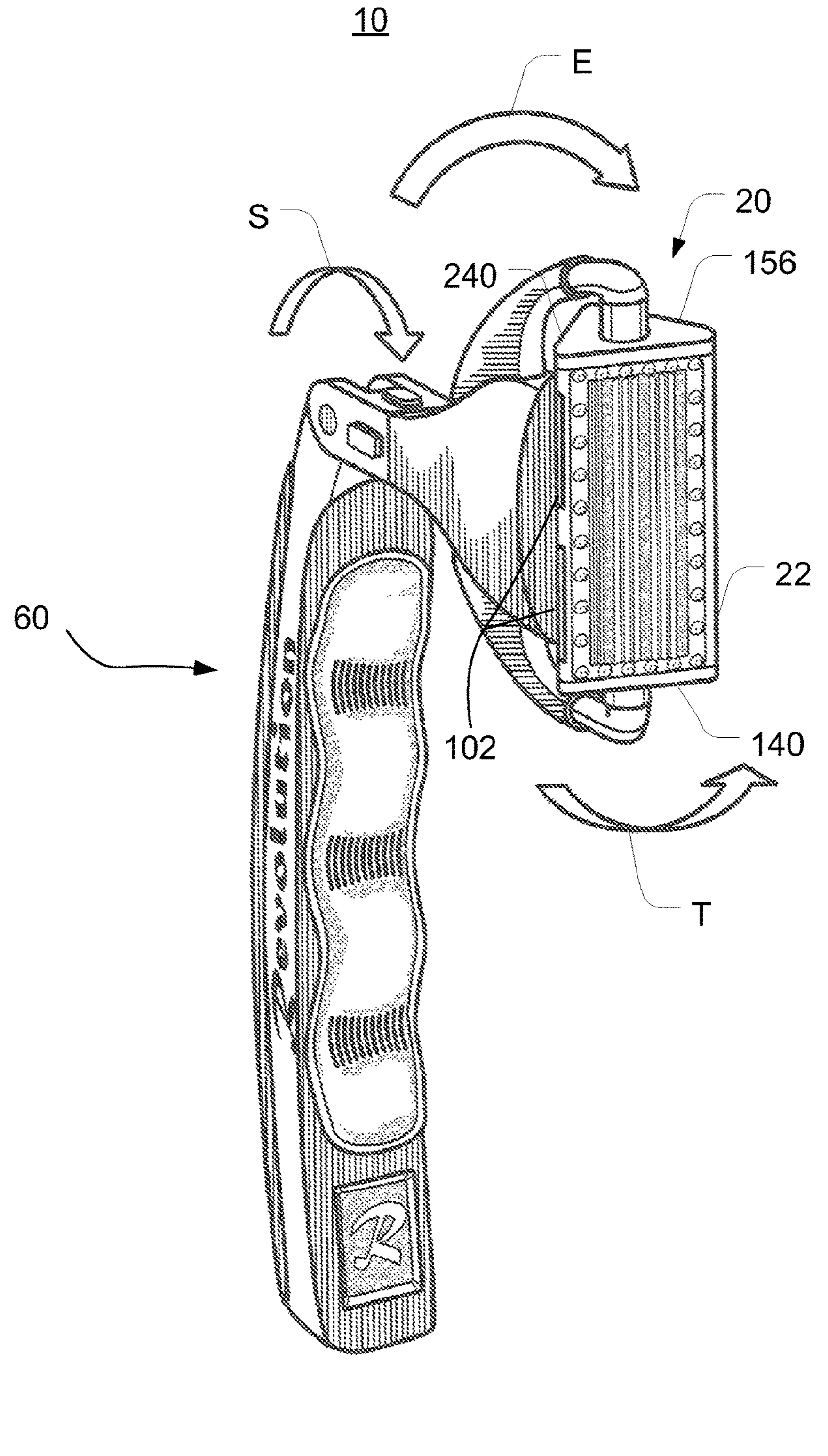
Figure 54:
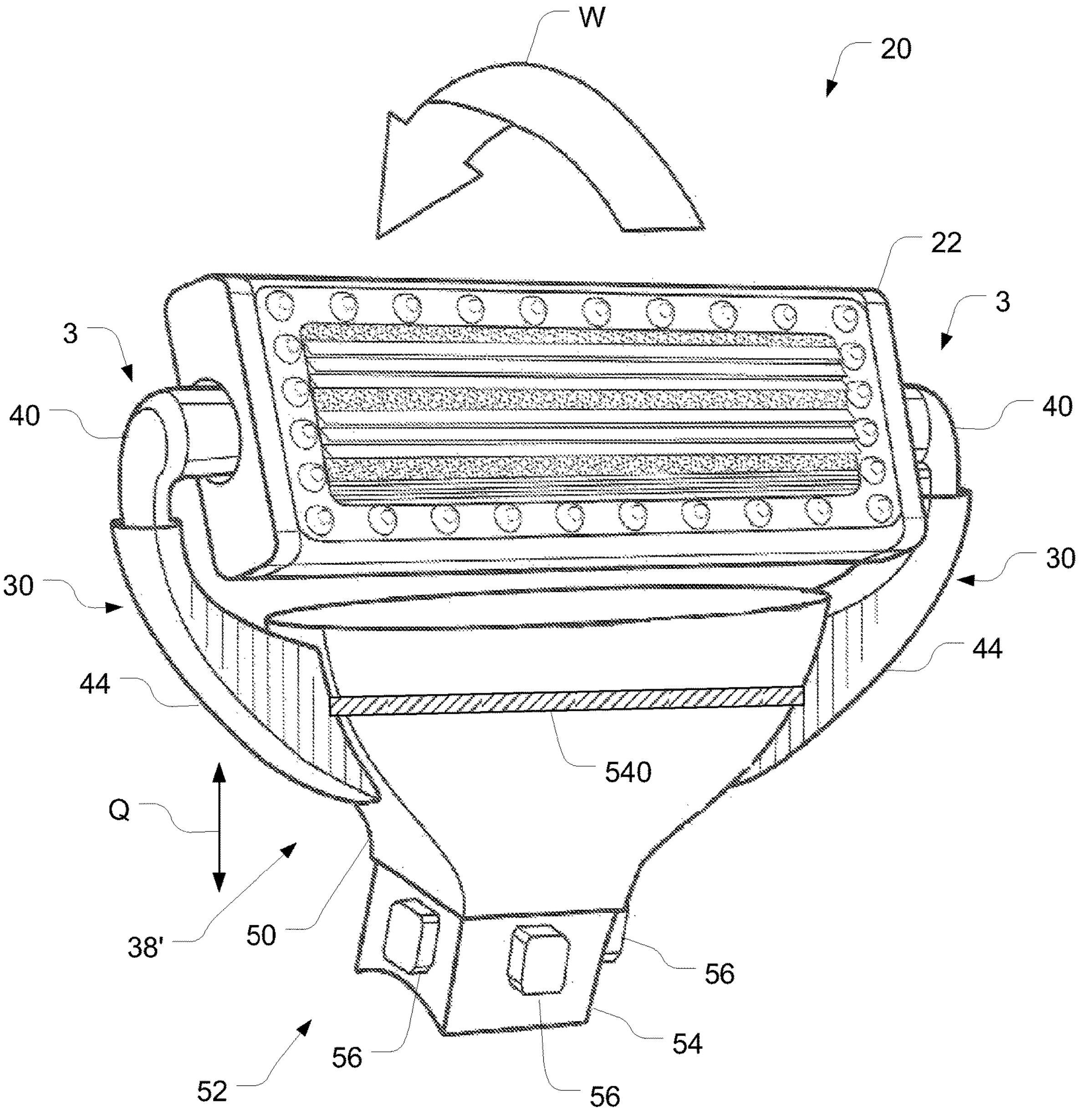
Figure 56:
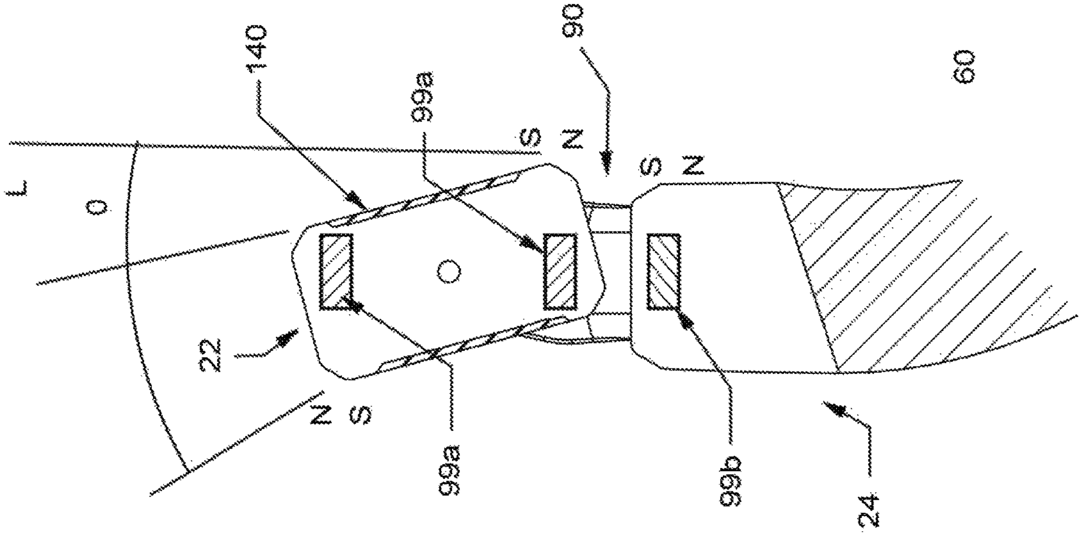
Figure 55:
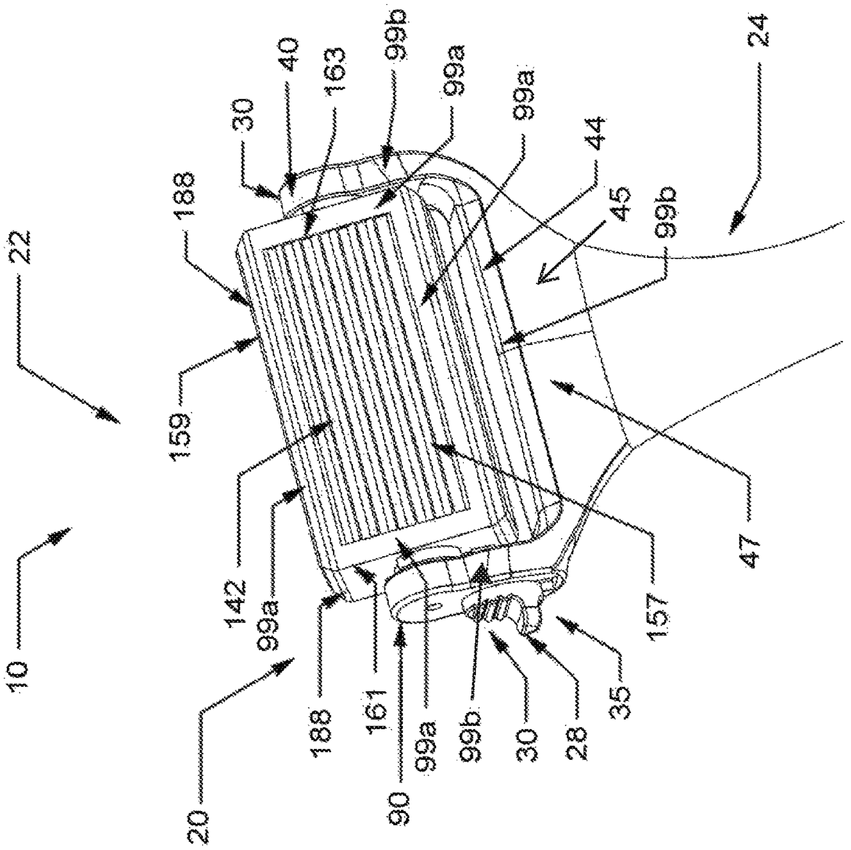
Figure 57:
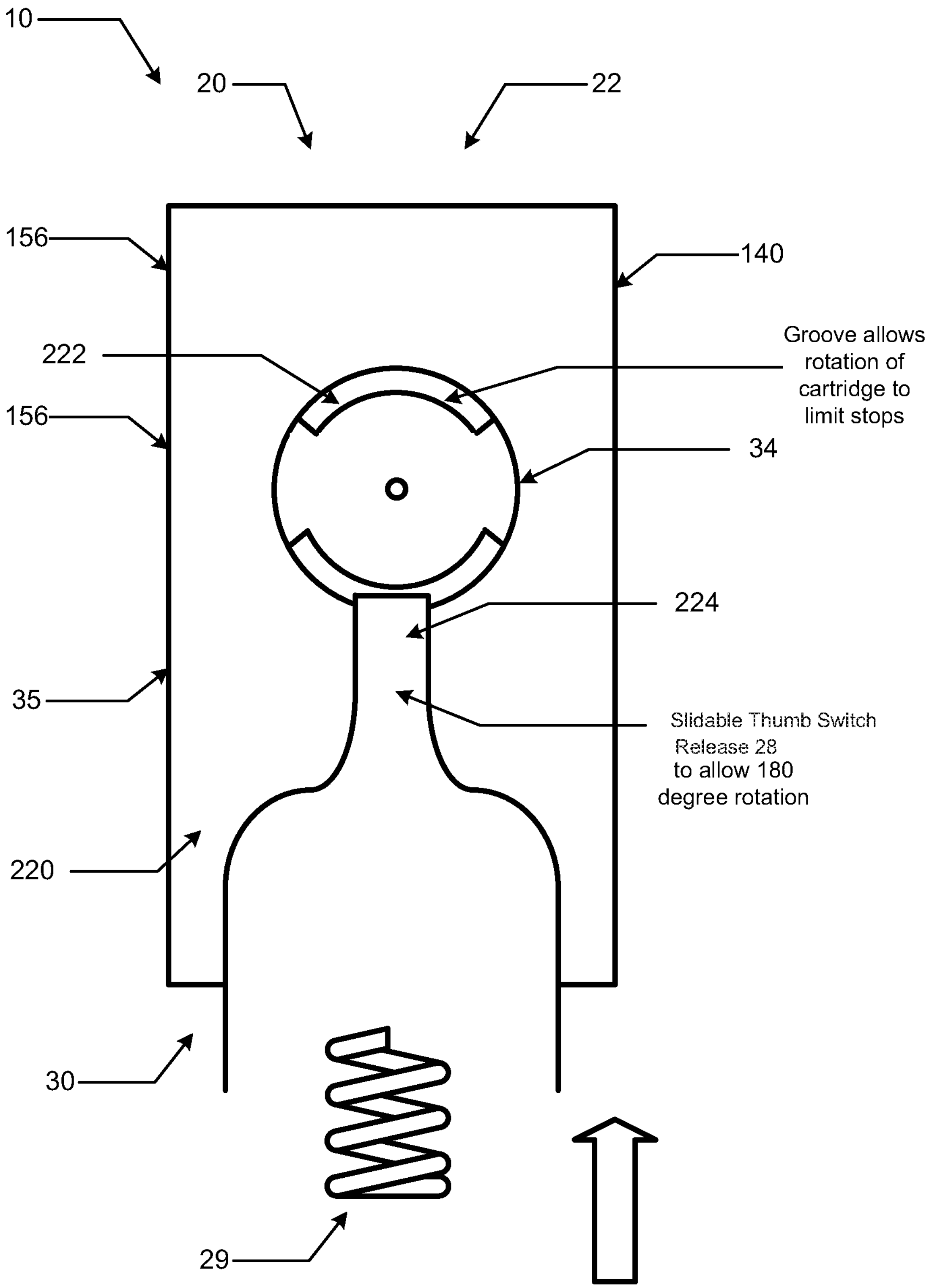
Figure 58:
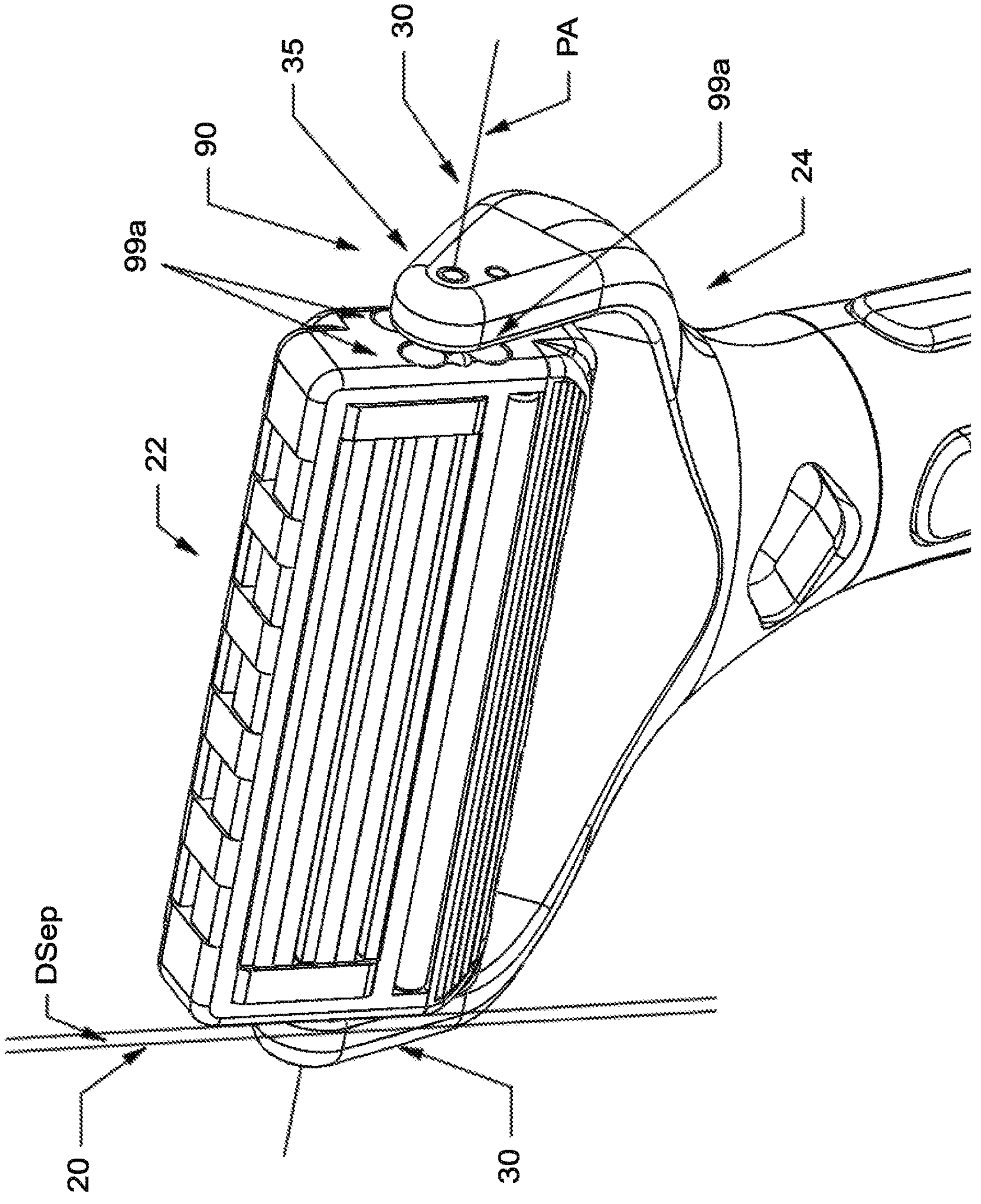
Figure 59A:
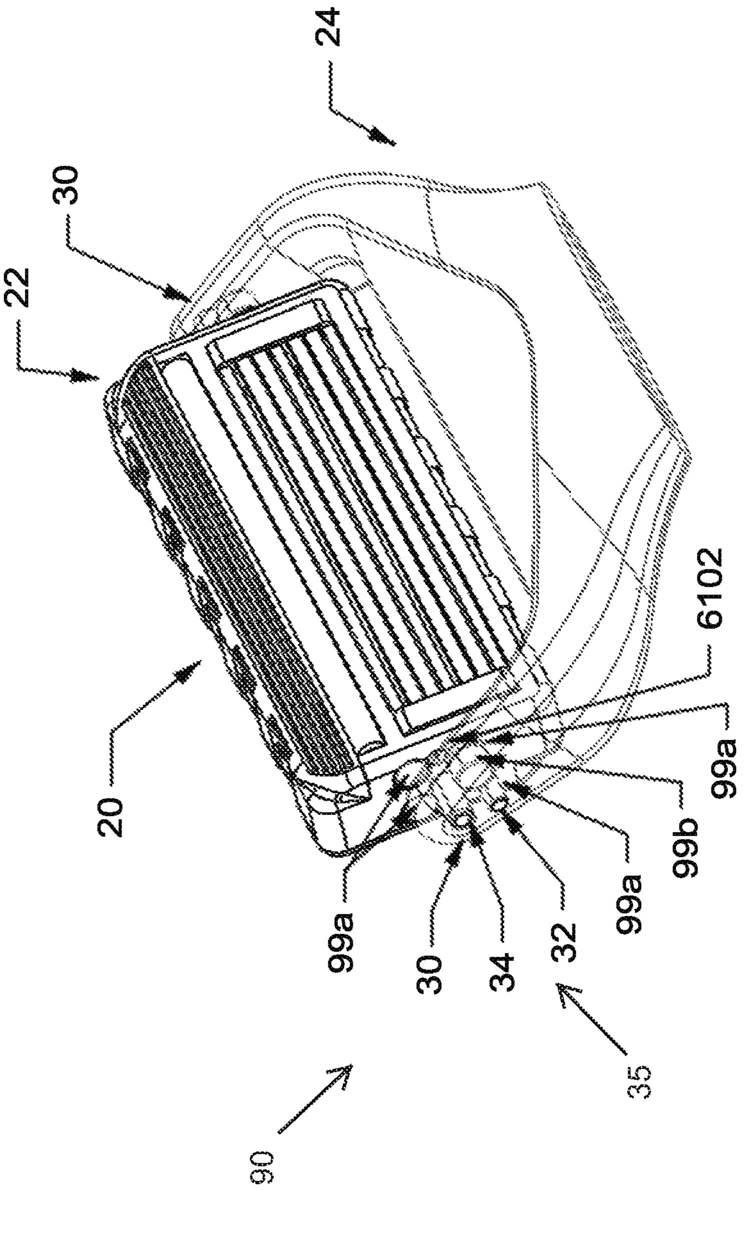
Figure 59B:
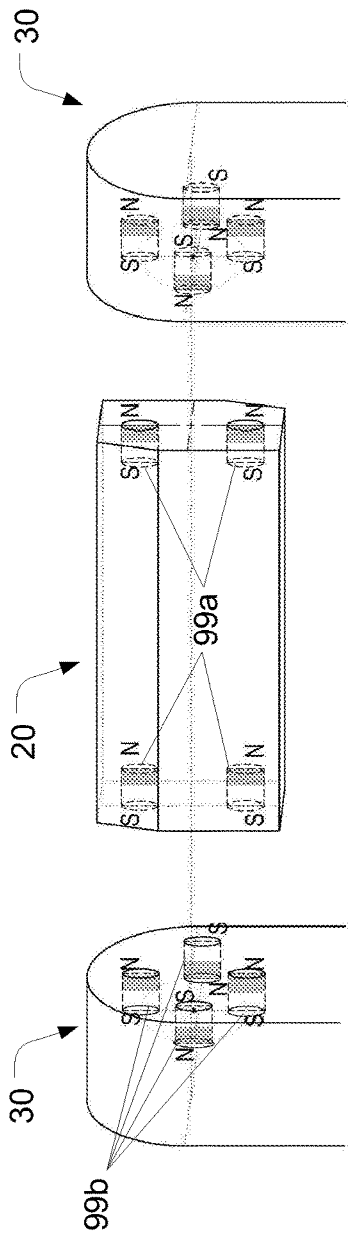
Figure 59C:
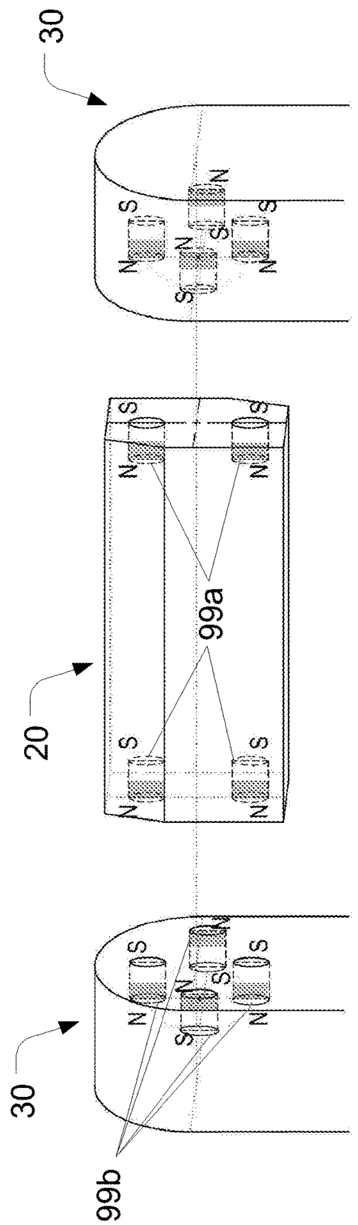
Figure 59D:
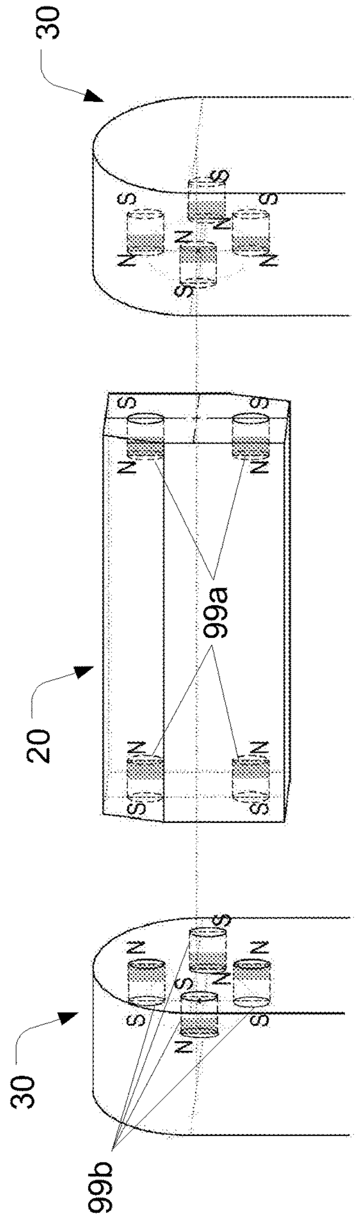
Figure 60:
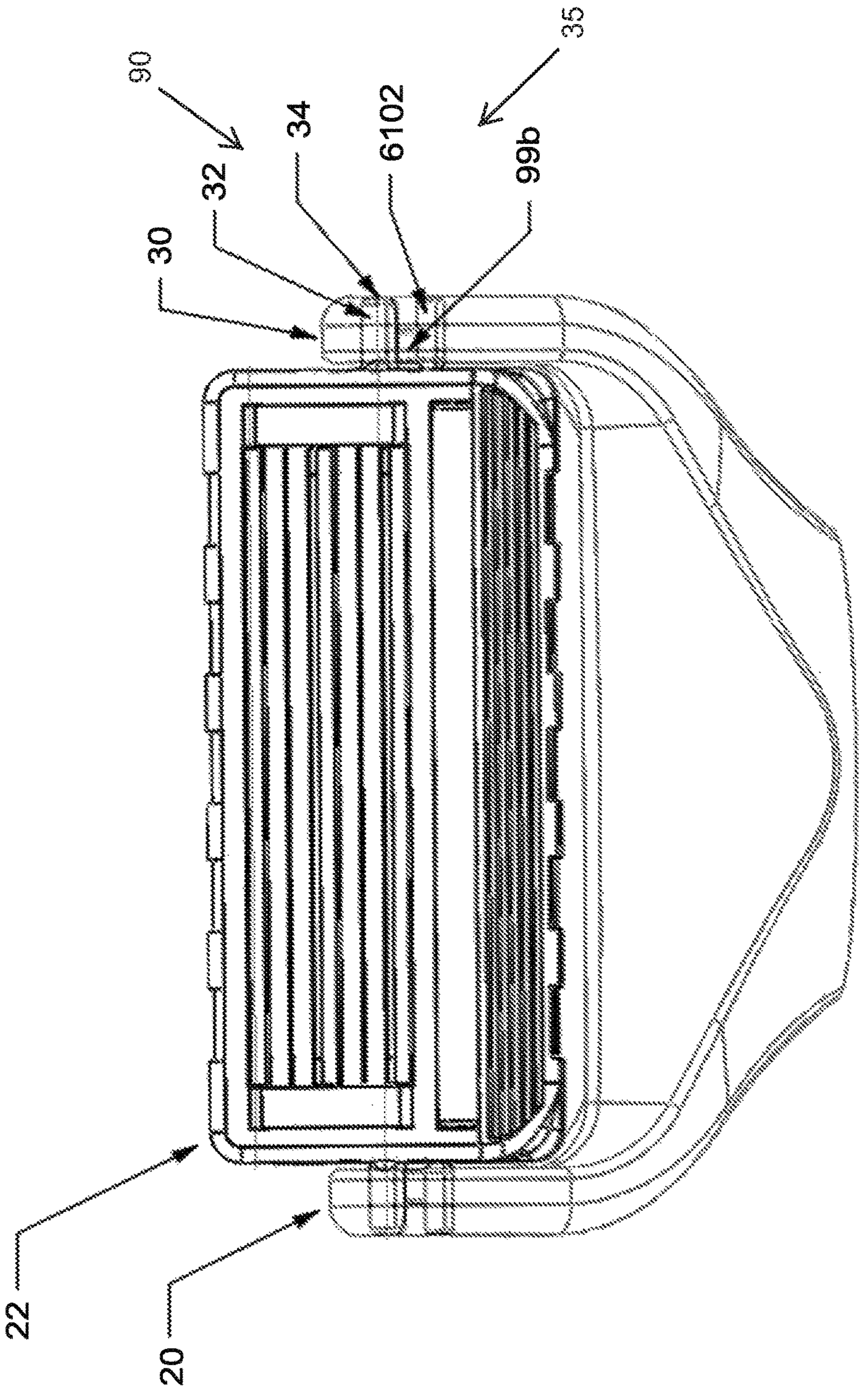
Figure 61:
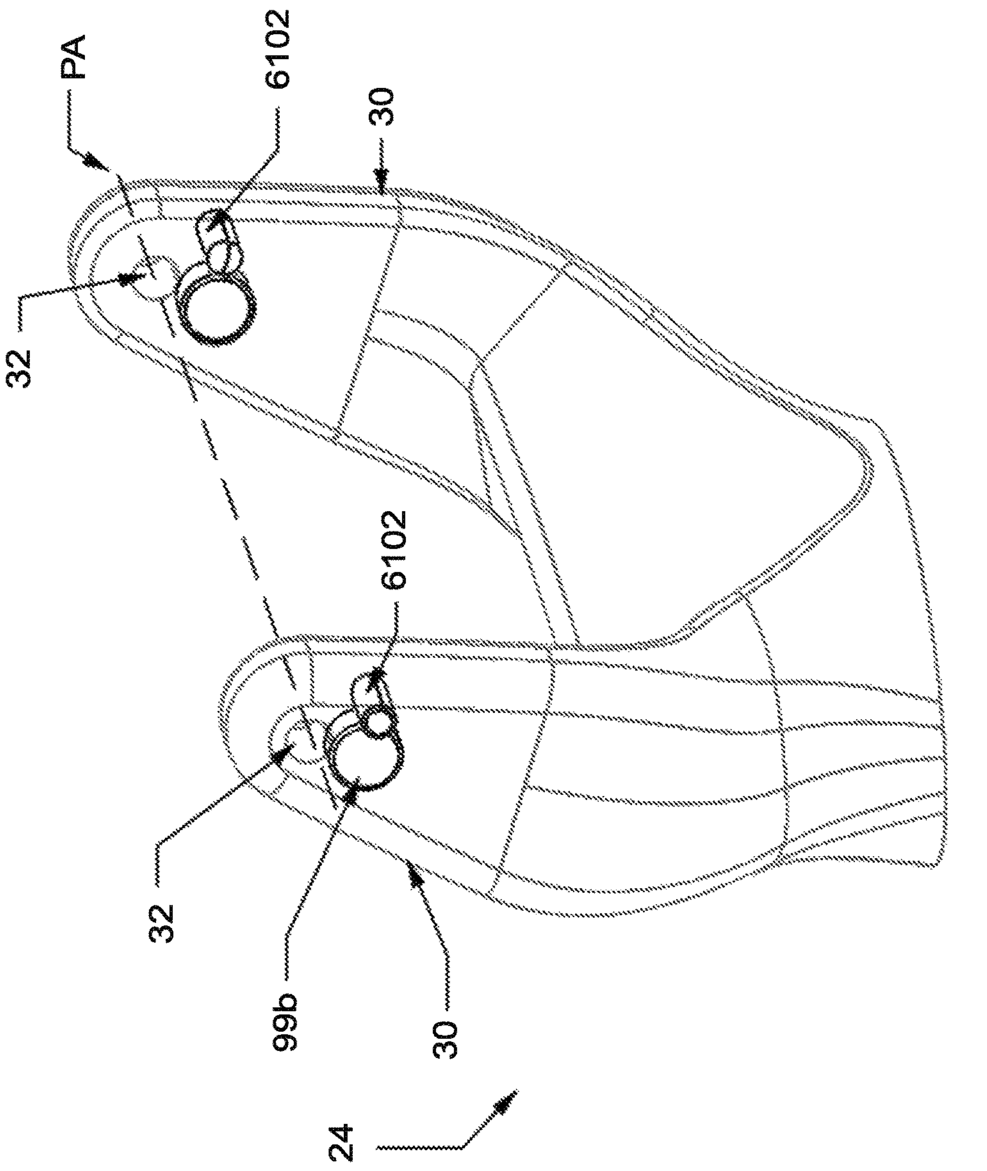
Figure 62:
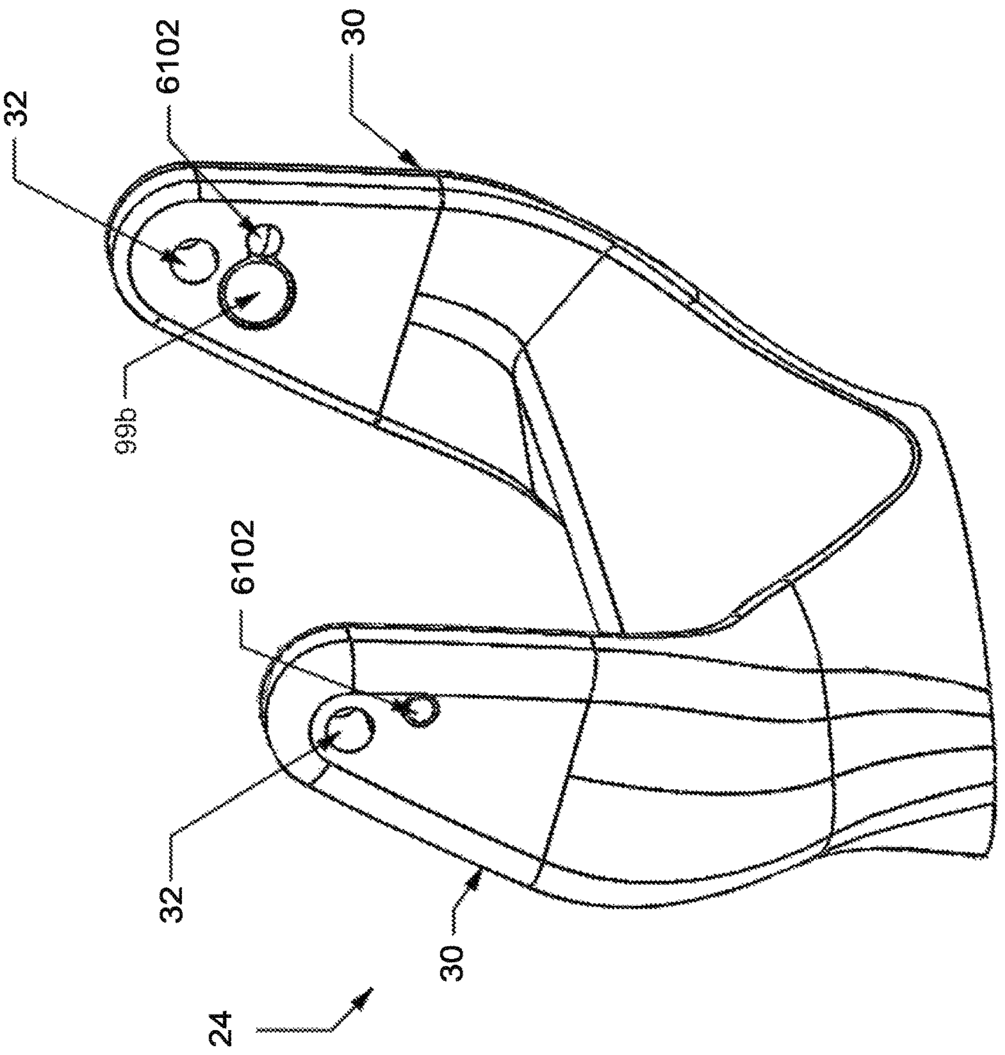
Figure 63:
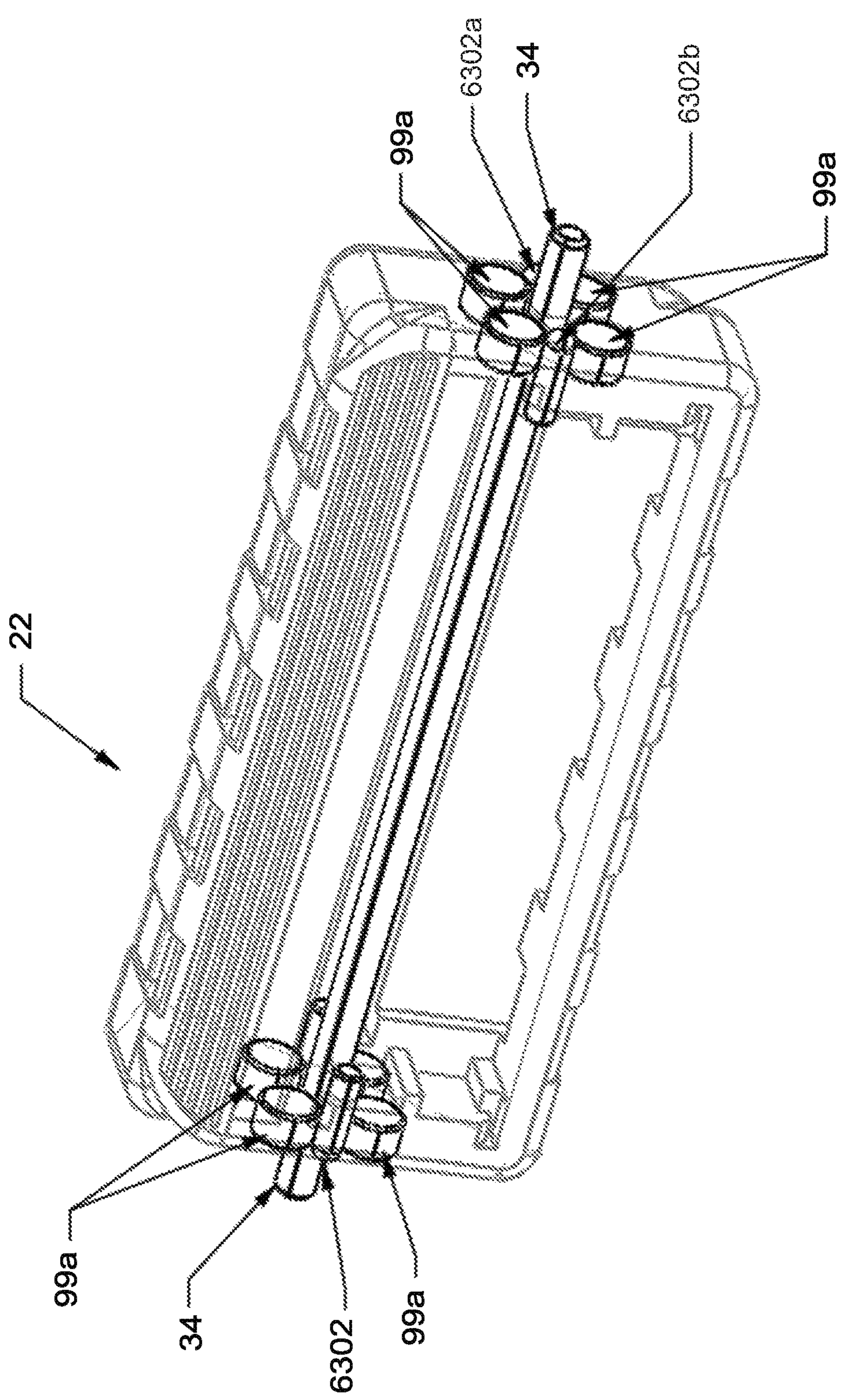
Figure 64:
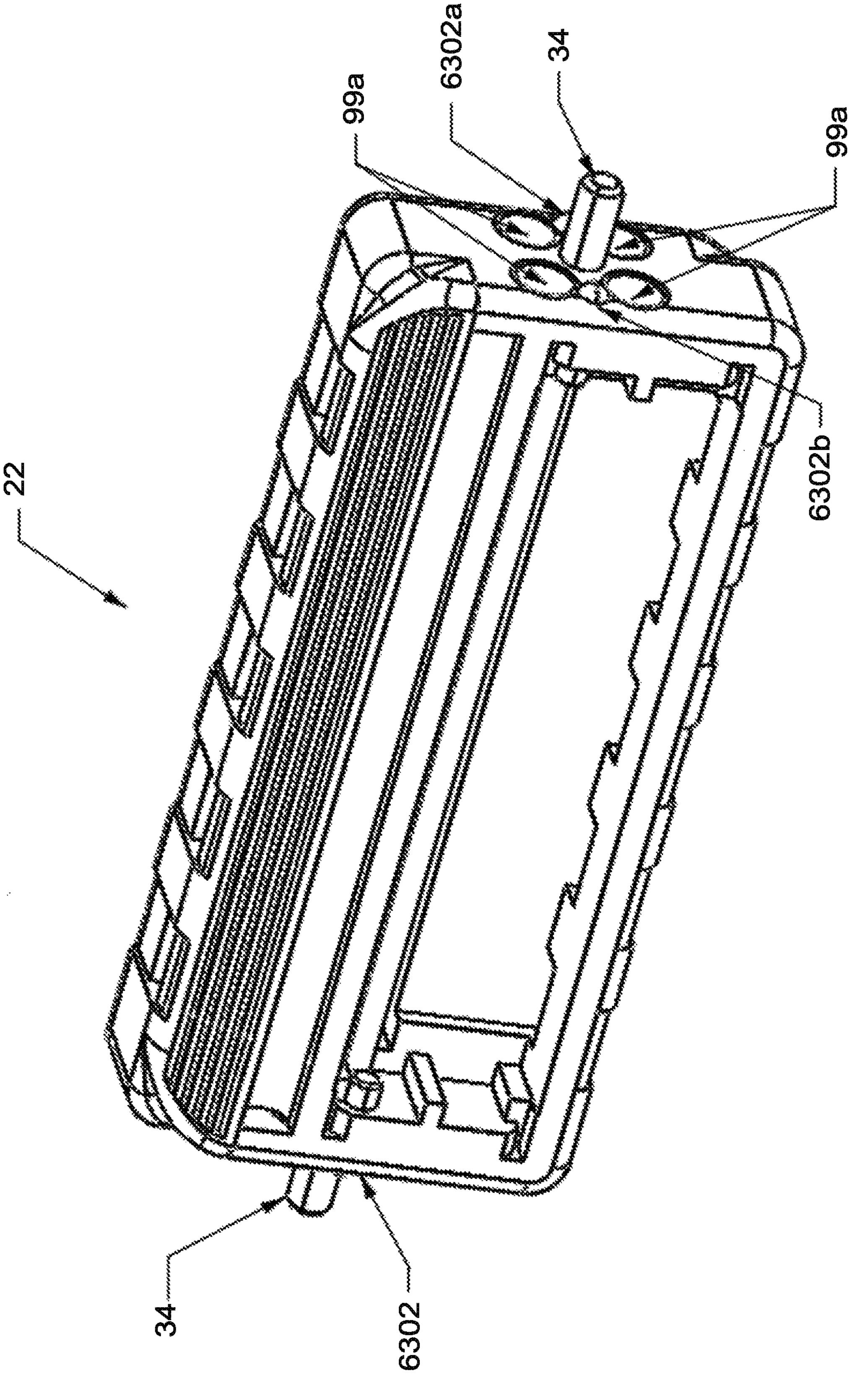
Figure 65:
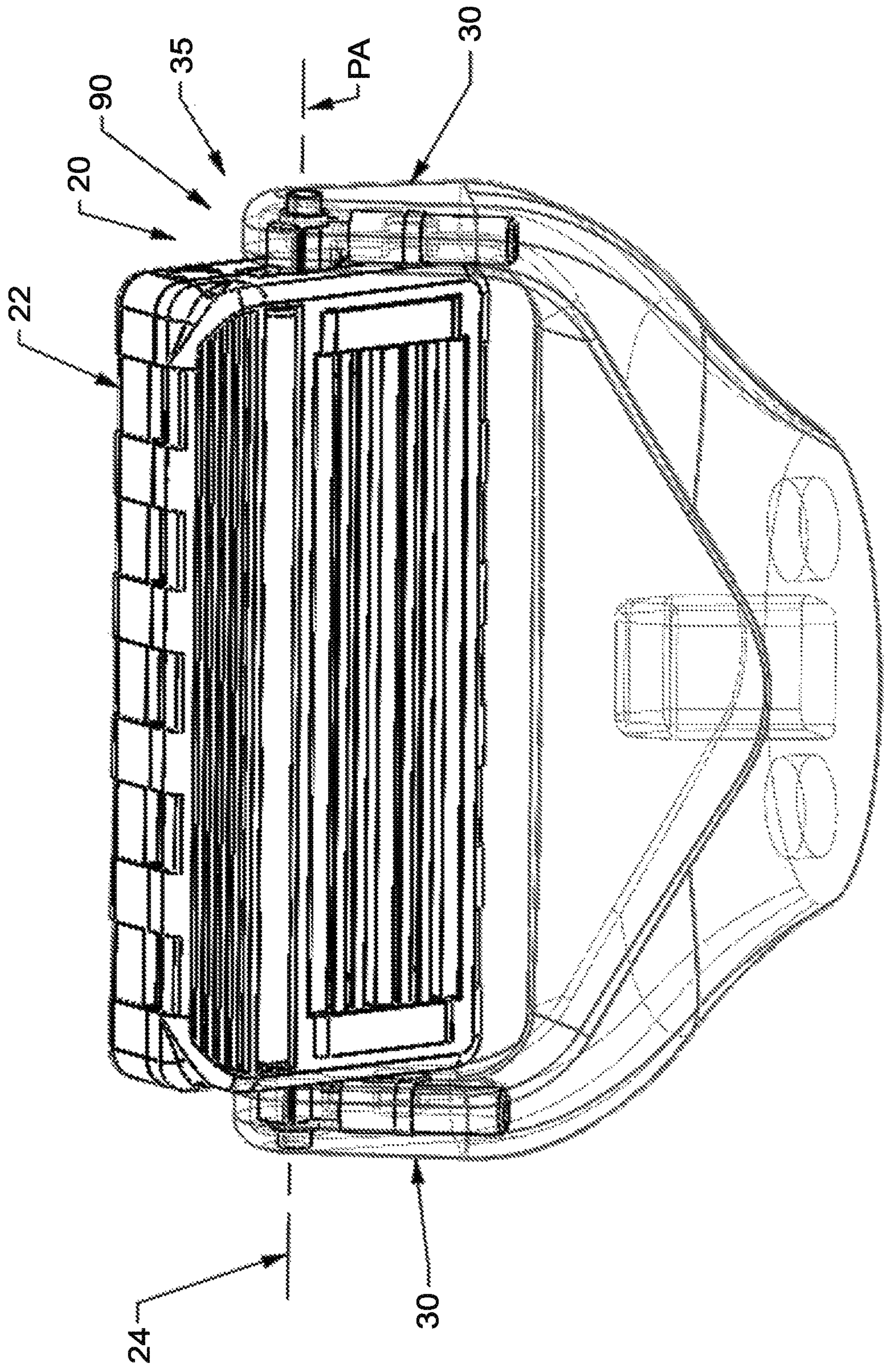
Figure 66:
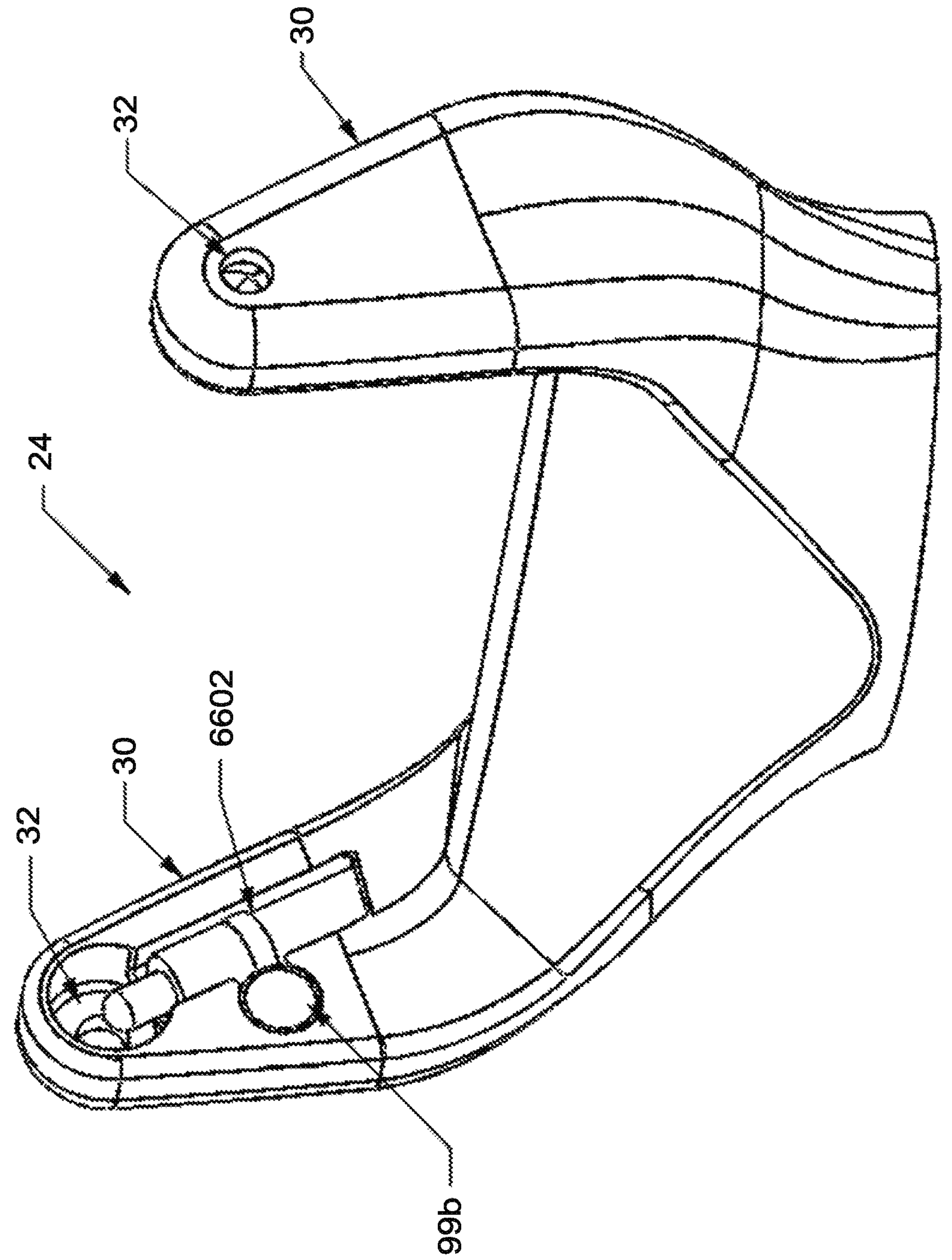
Figure 67:
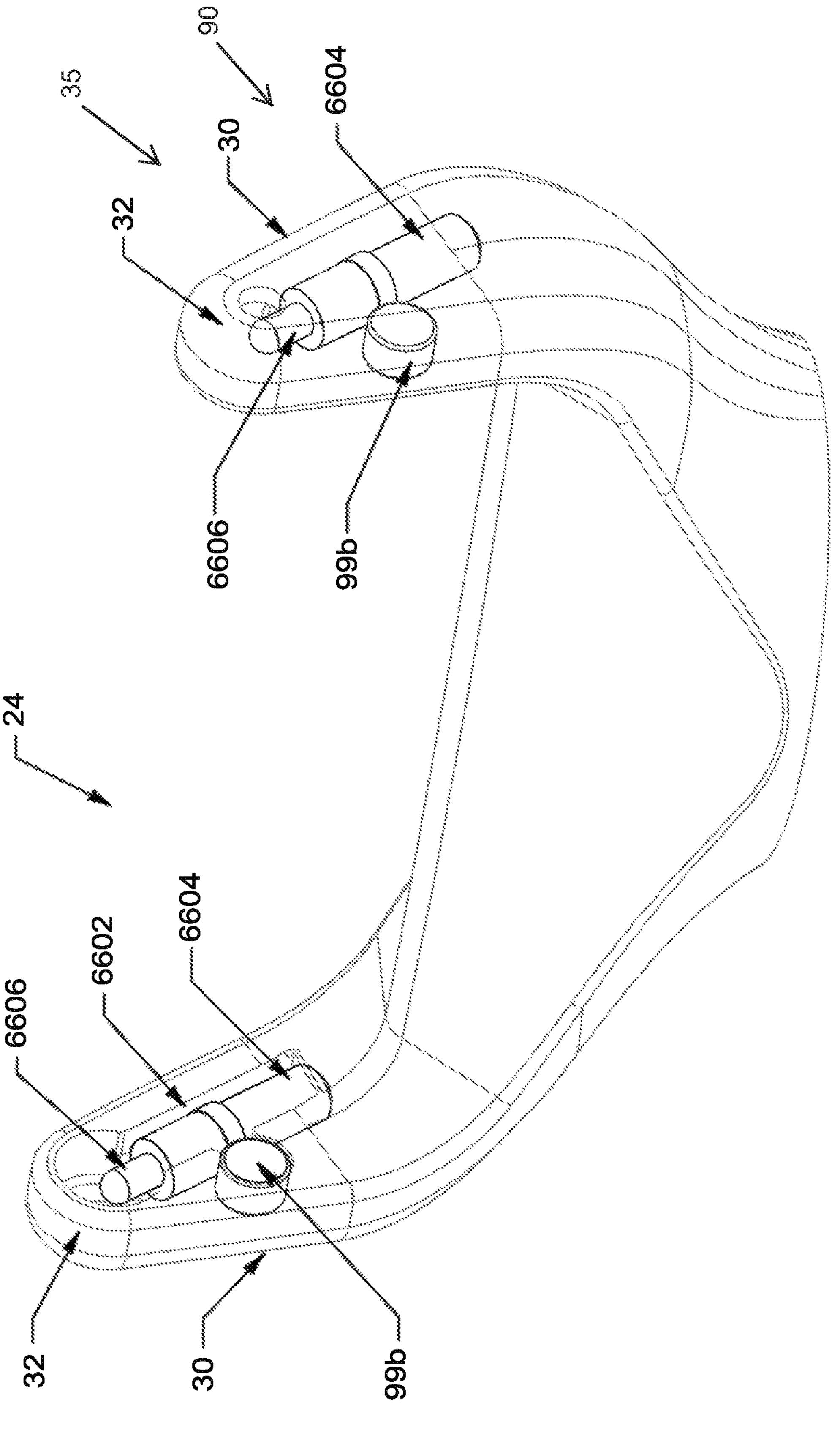
Figure 68:
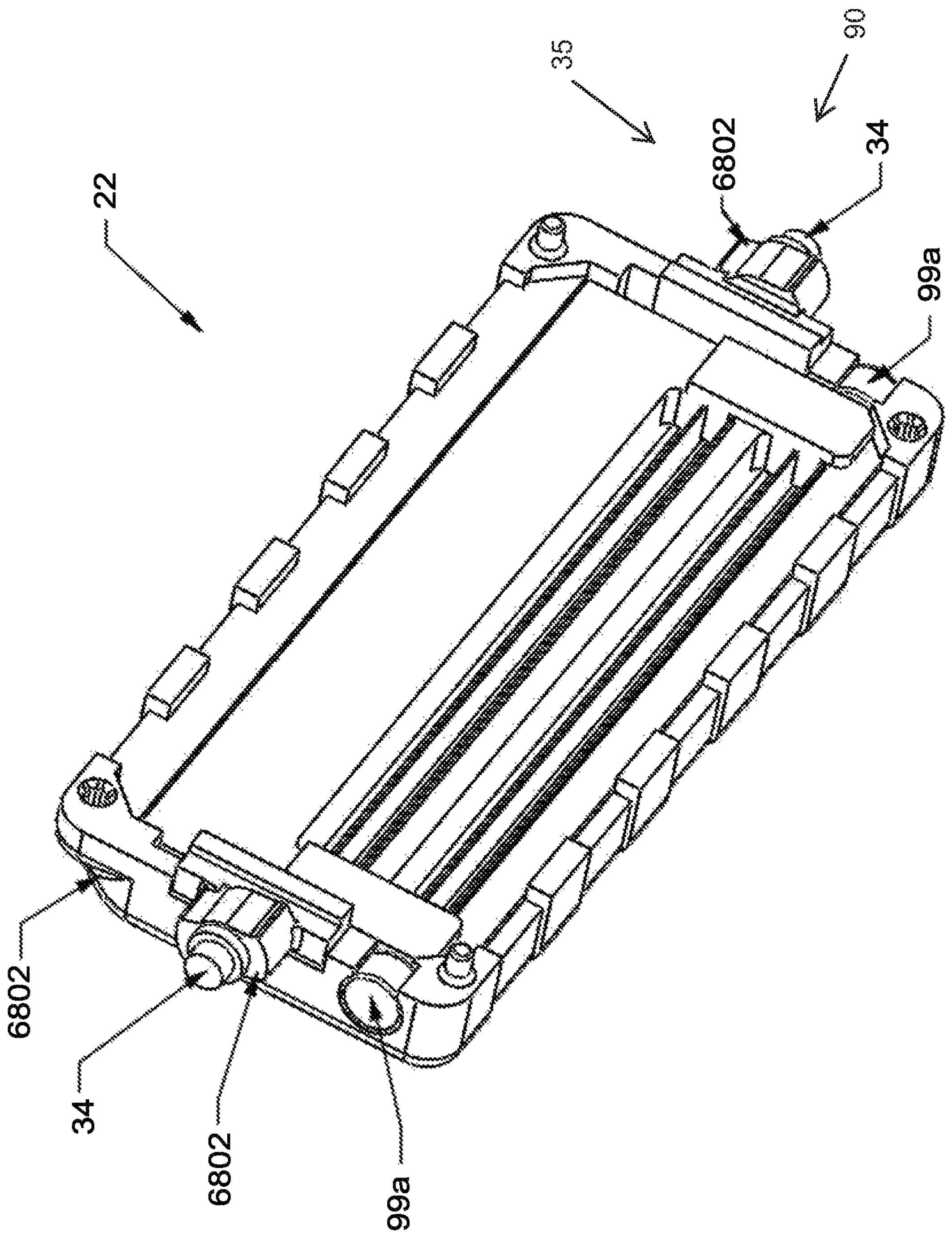
Figure 69:
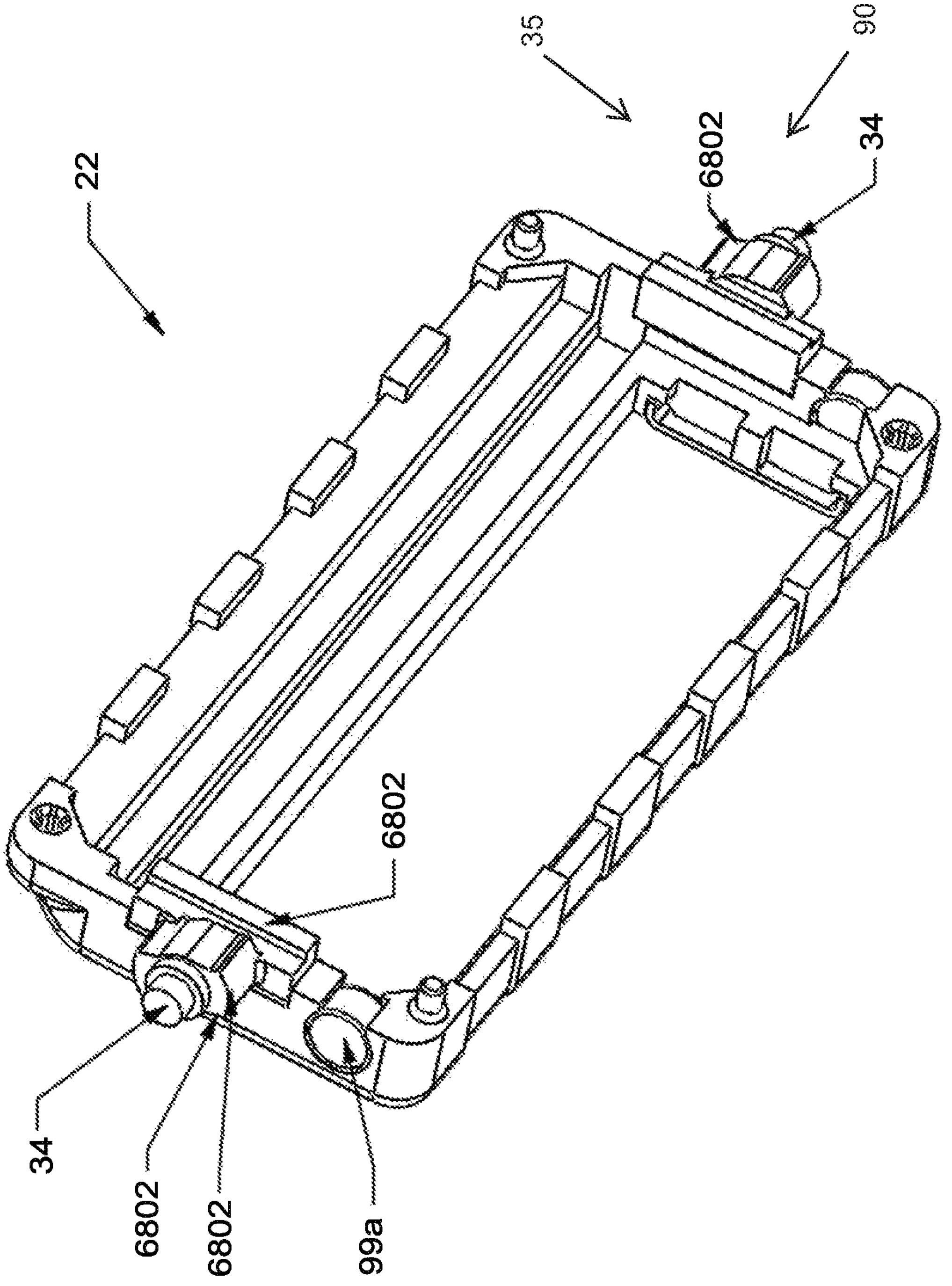
Figure 70:
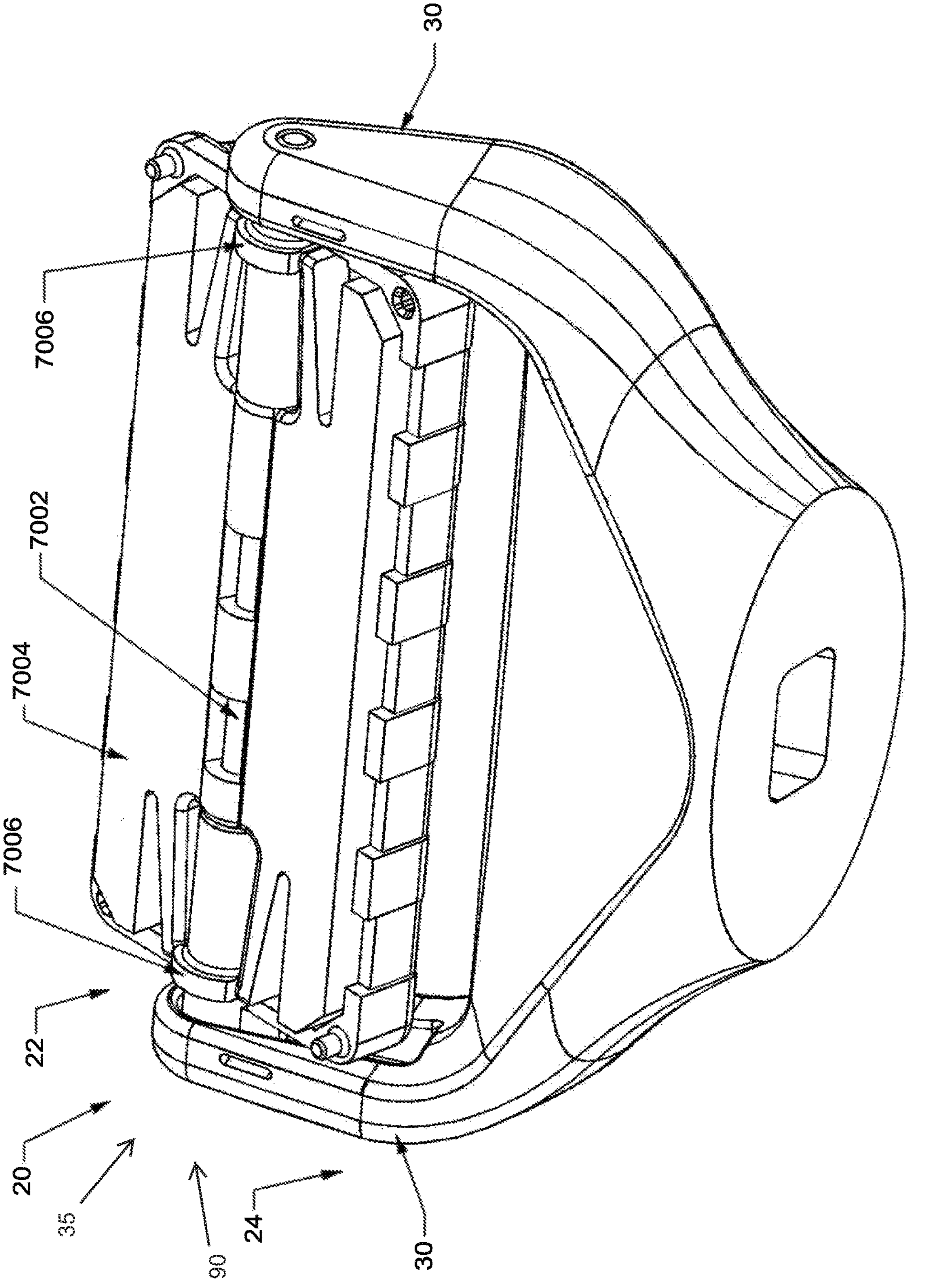
Figure 71:
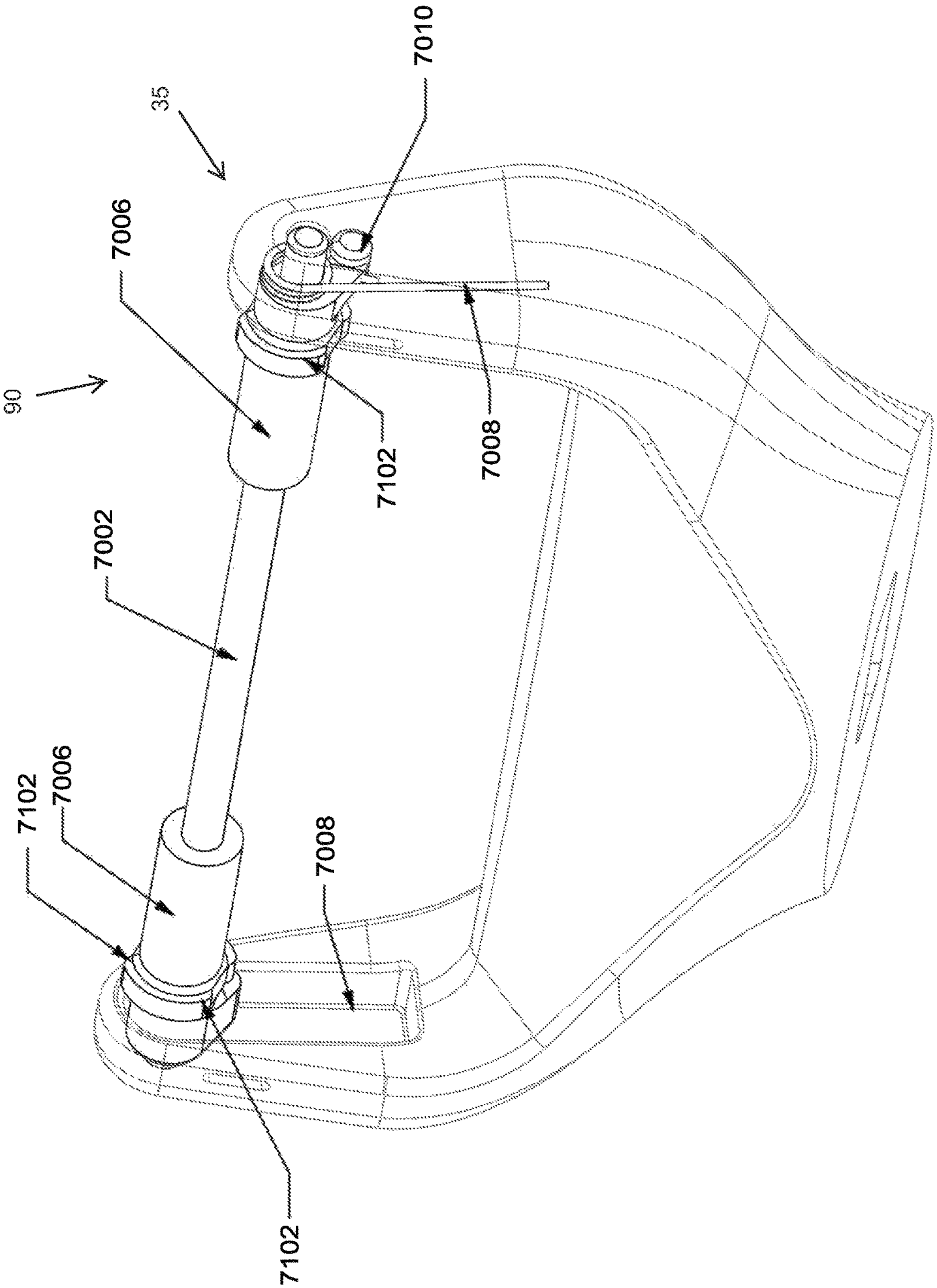
Figure 72:
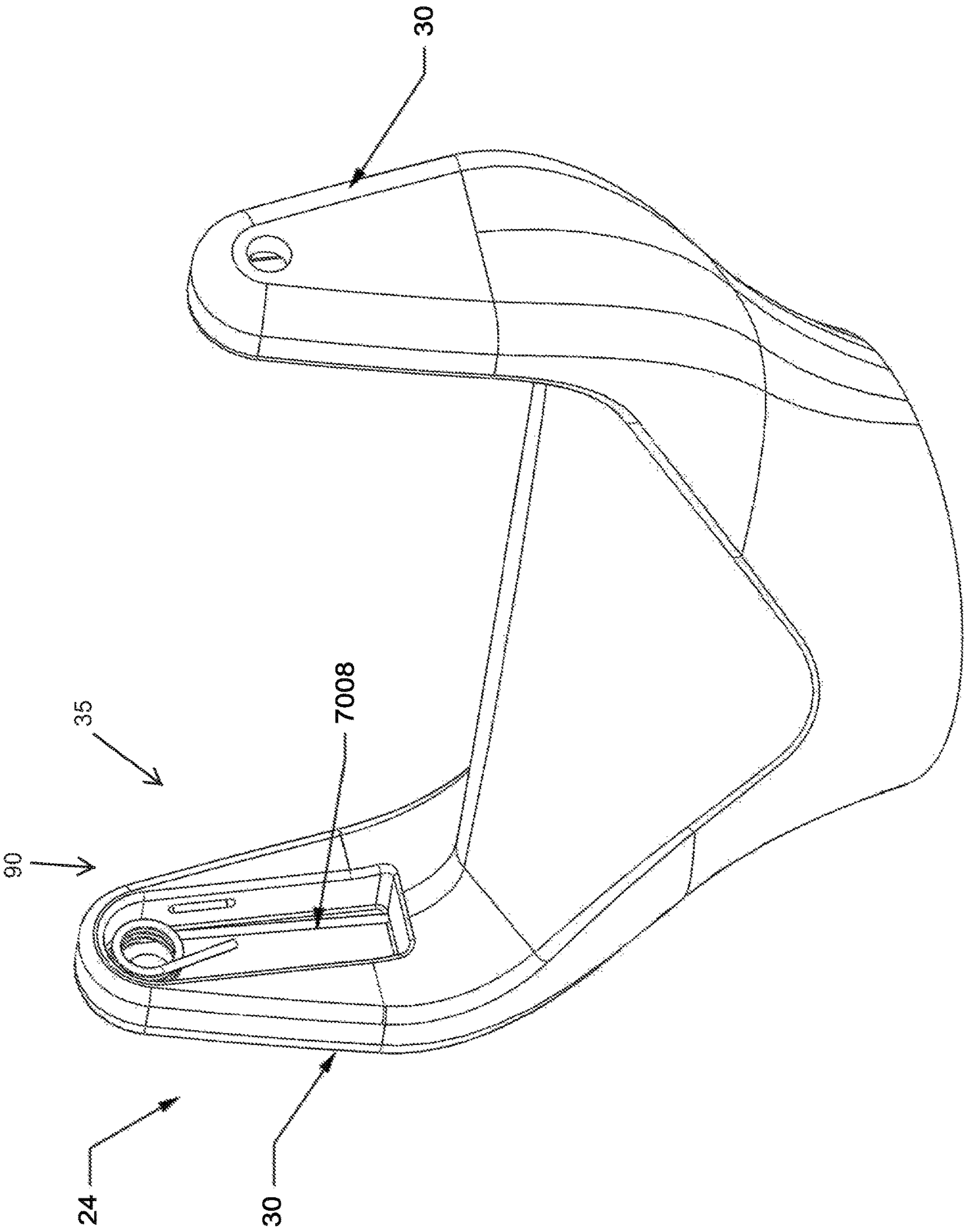
Figure 73:
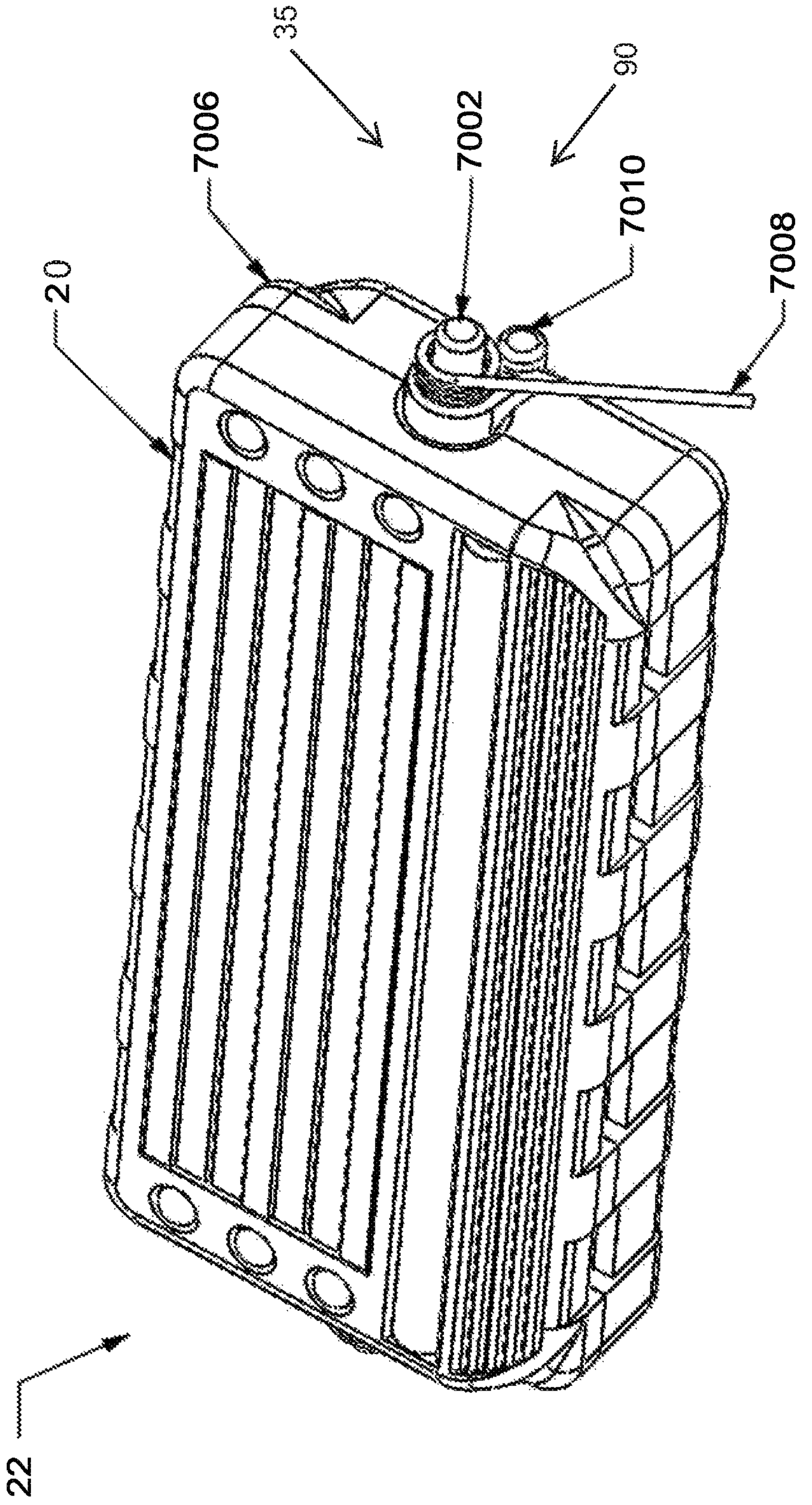
Figure 74:
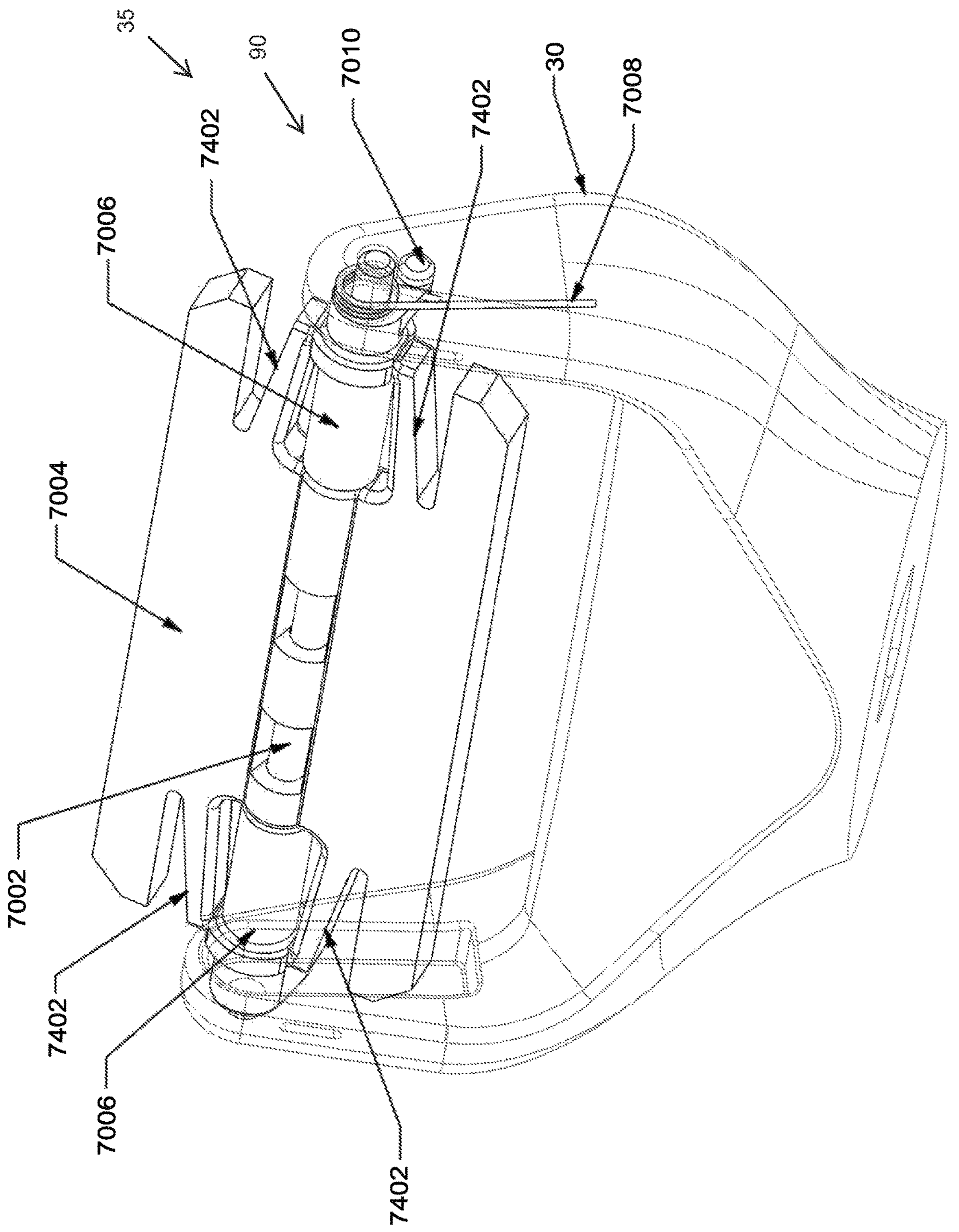
Figure 75:
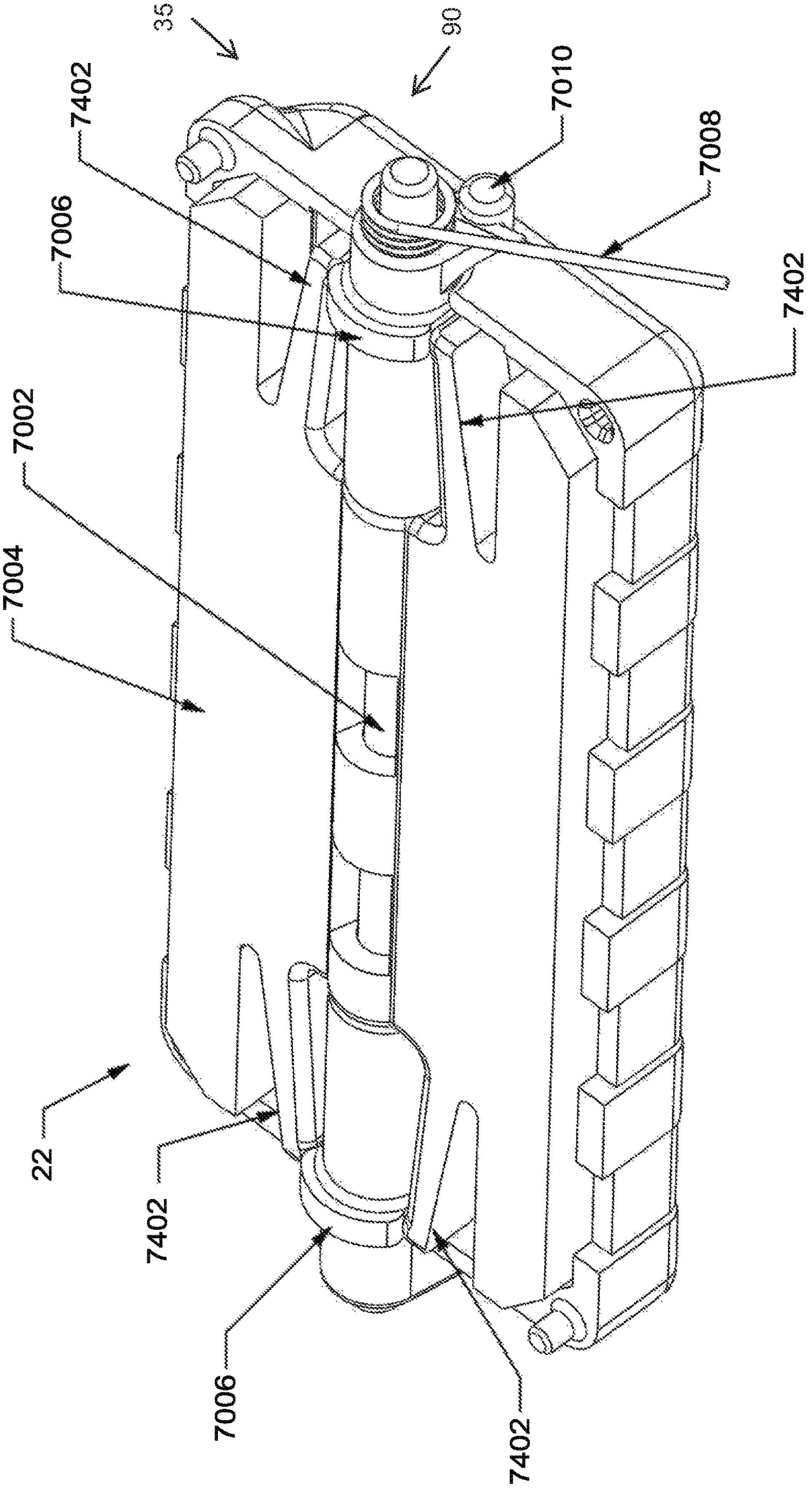
Figure 76:
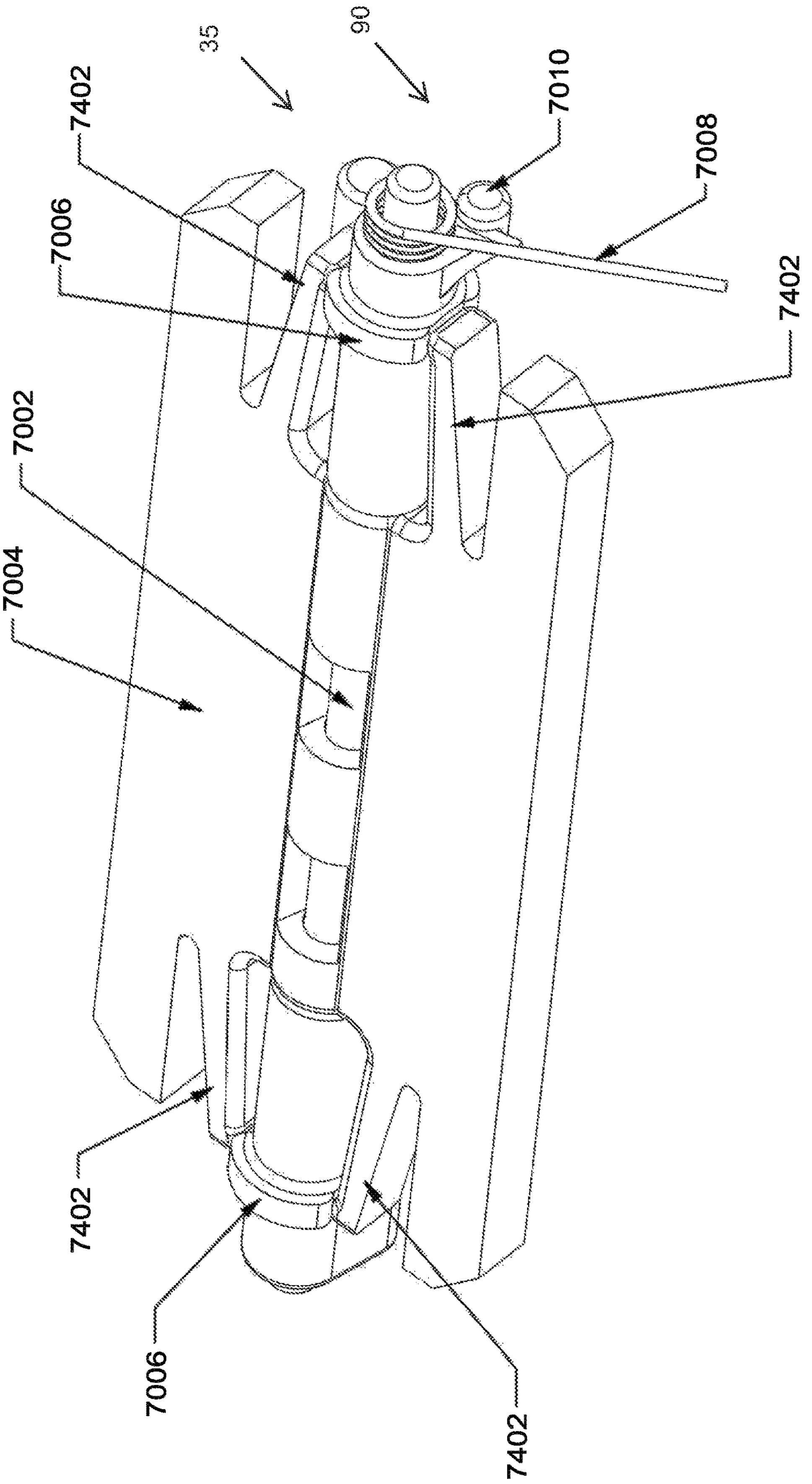
Figure 77:
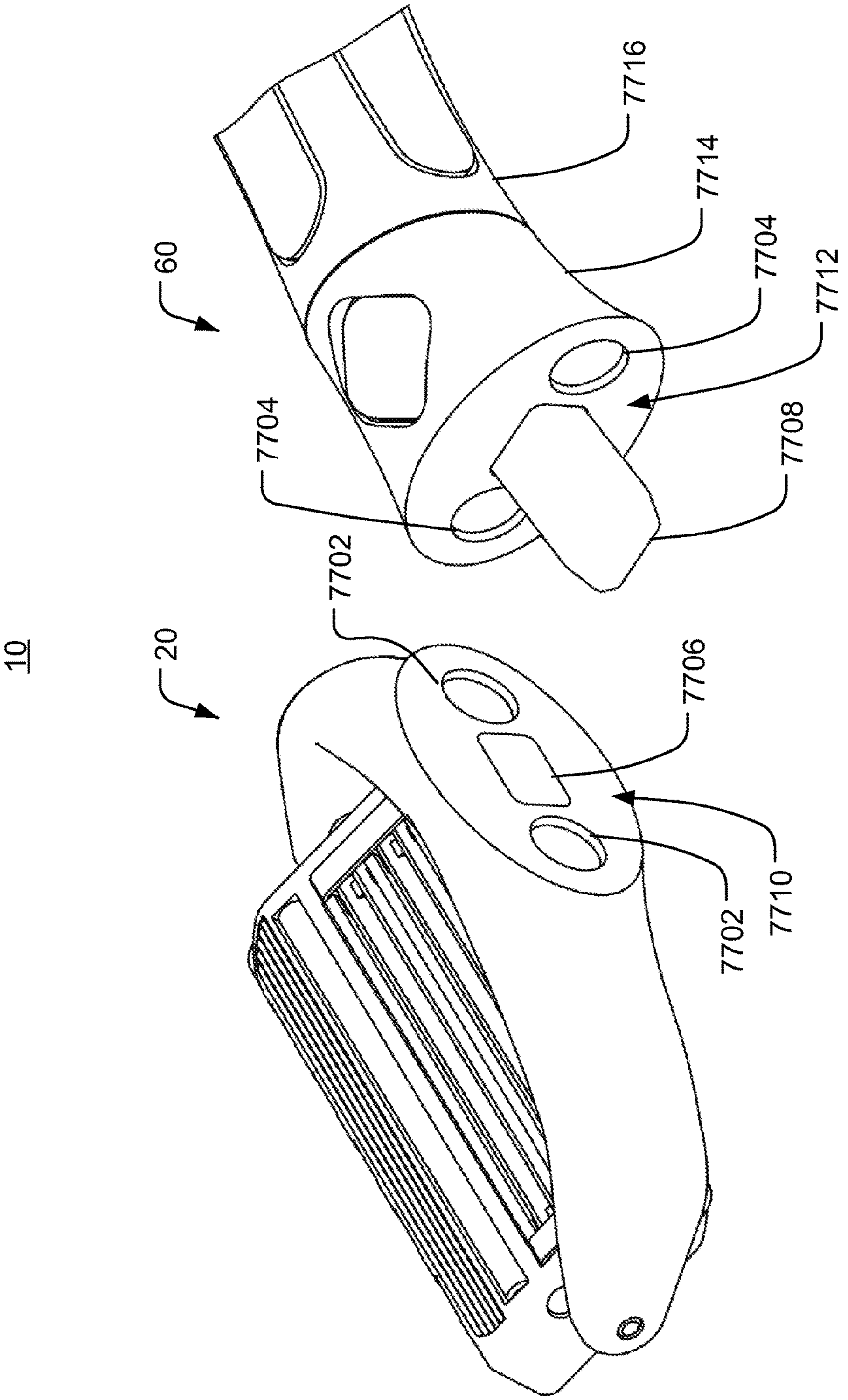
Figure 78:
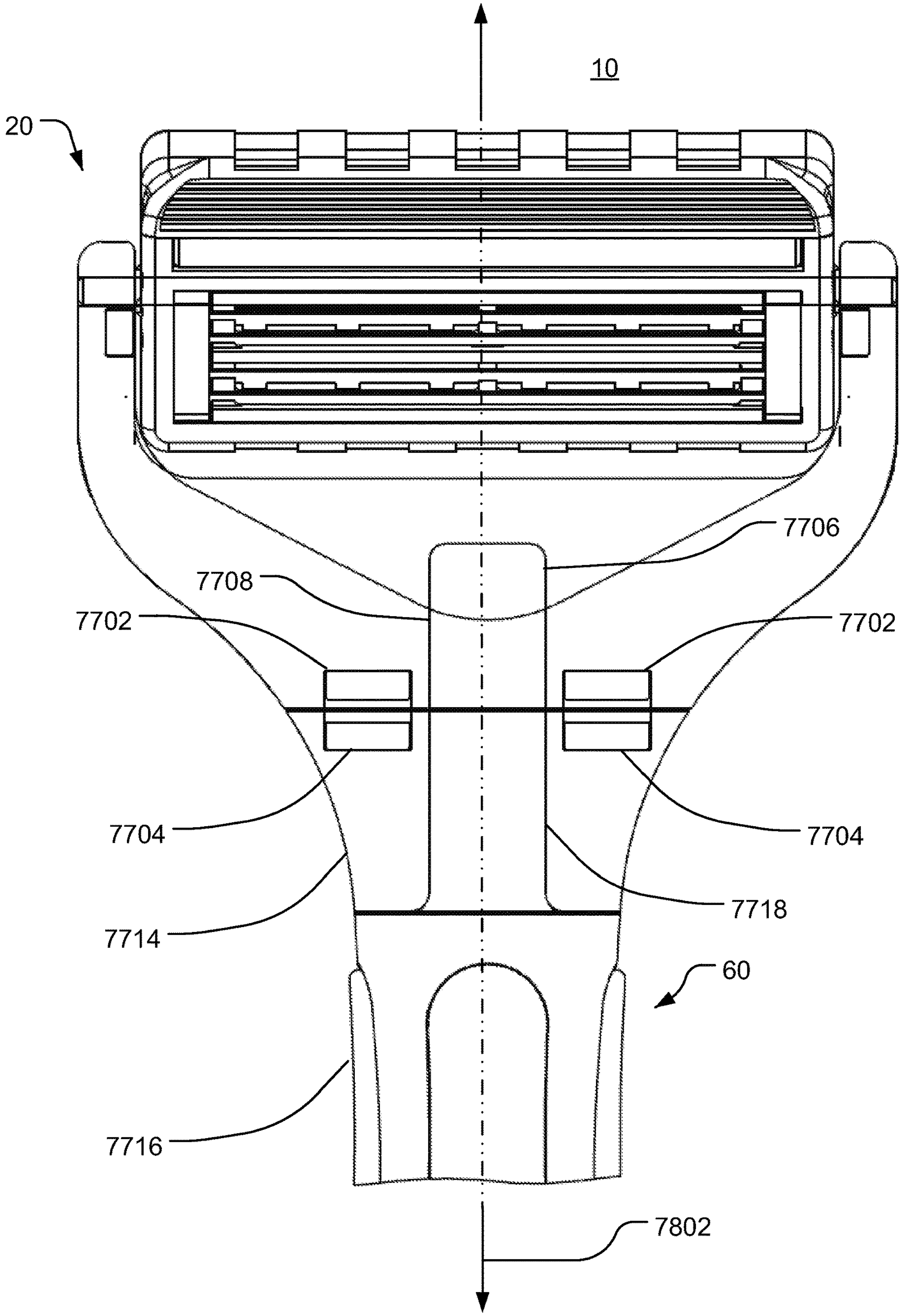
Figure 79:
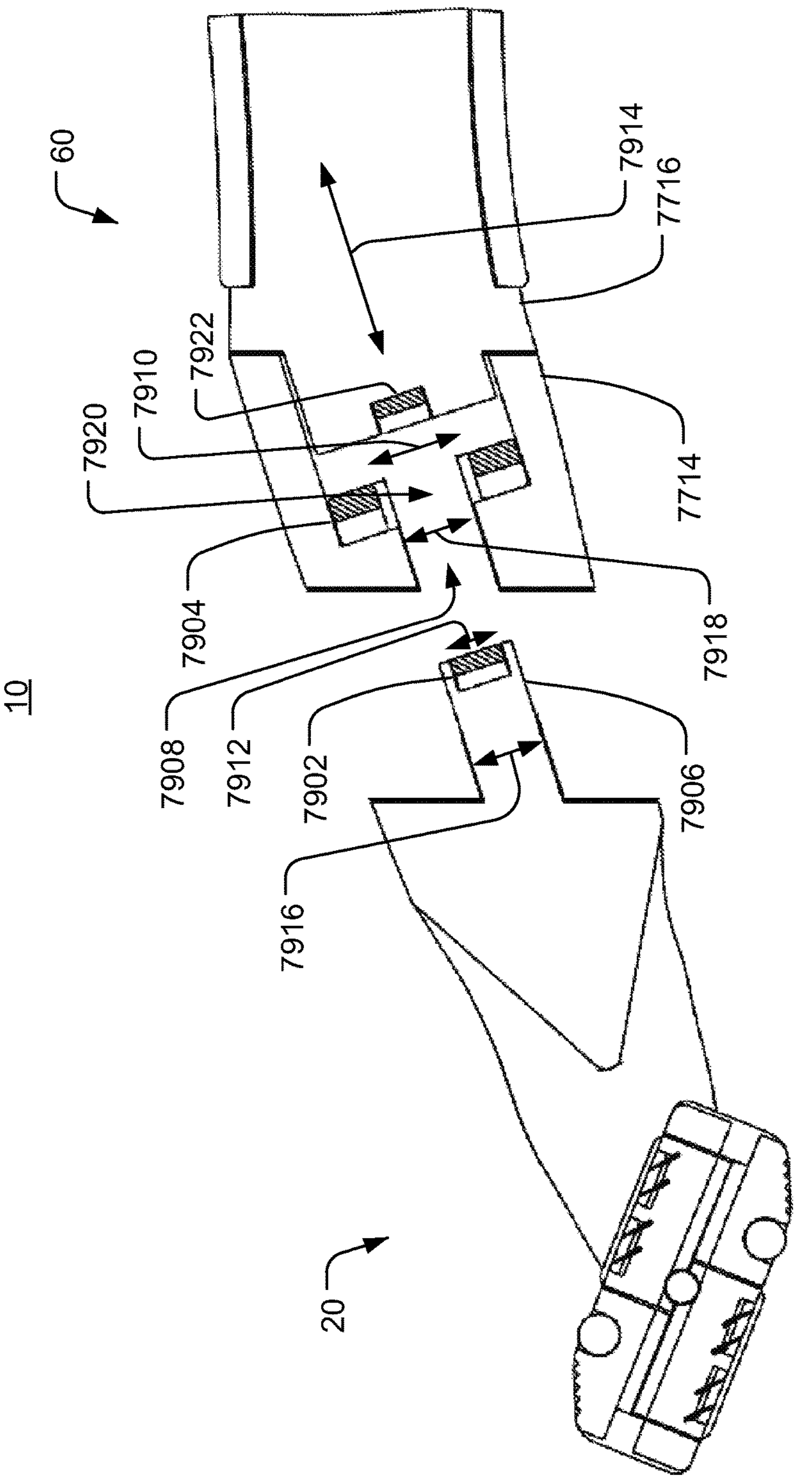
Figure 80:
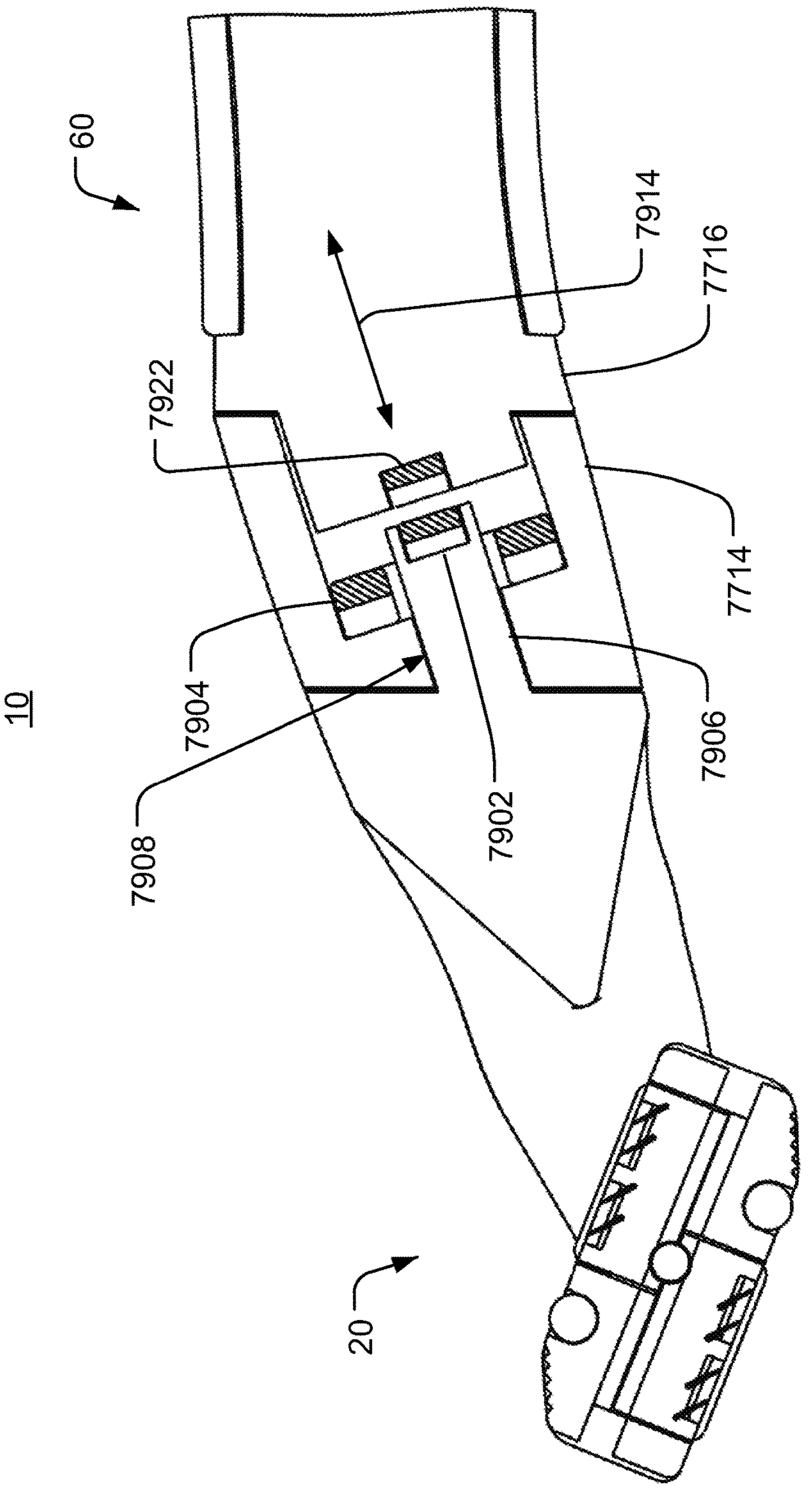
Figure 81A:
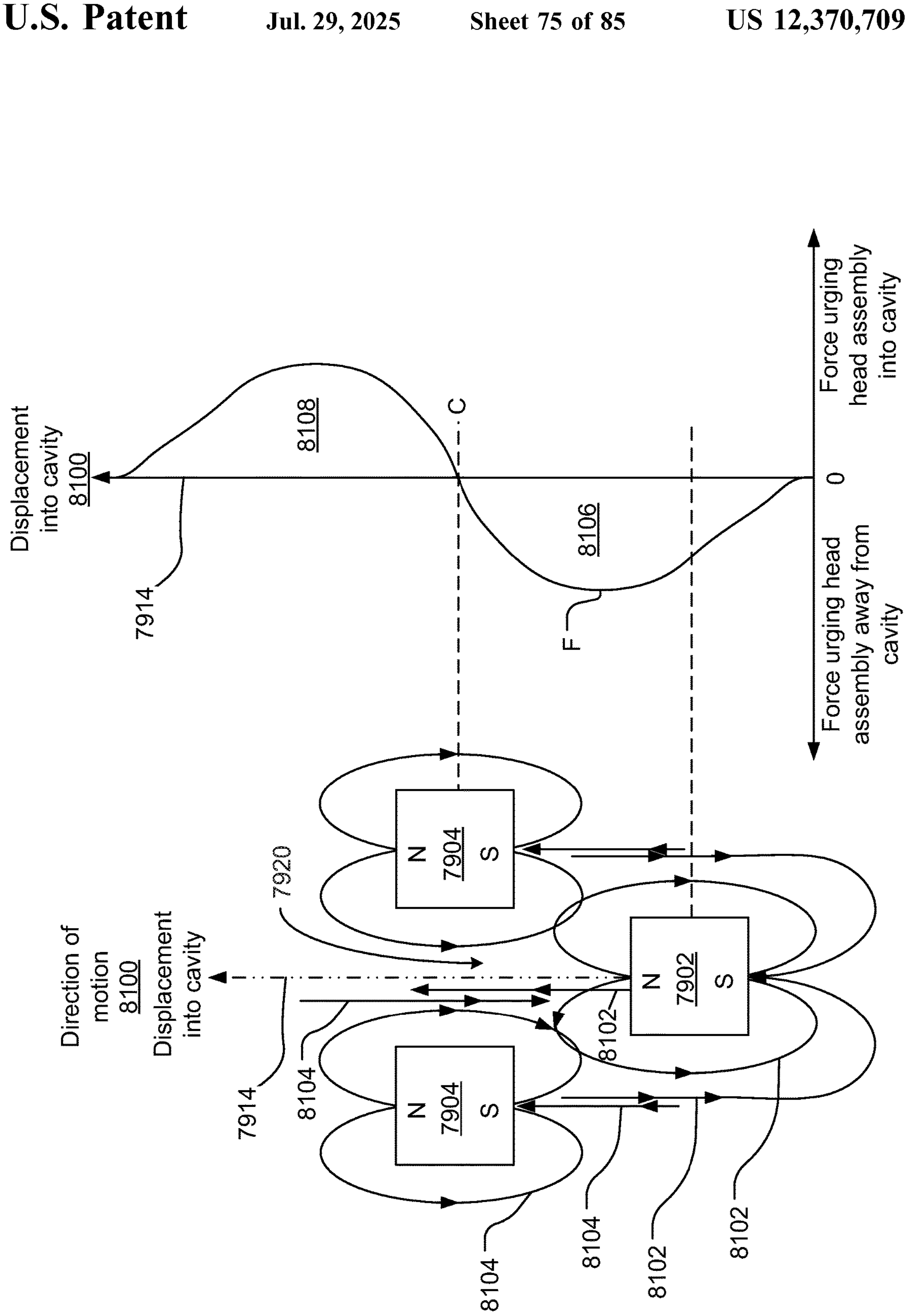
Figure 81B:
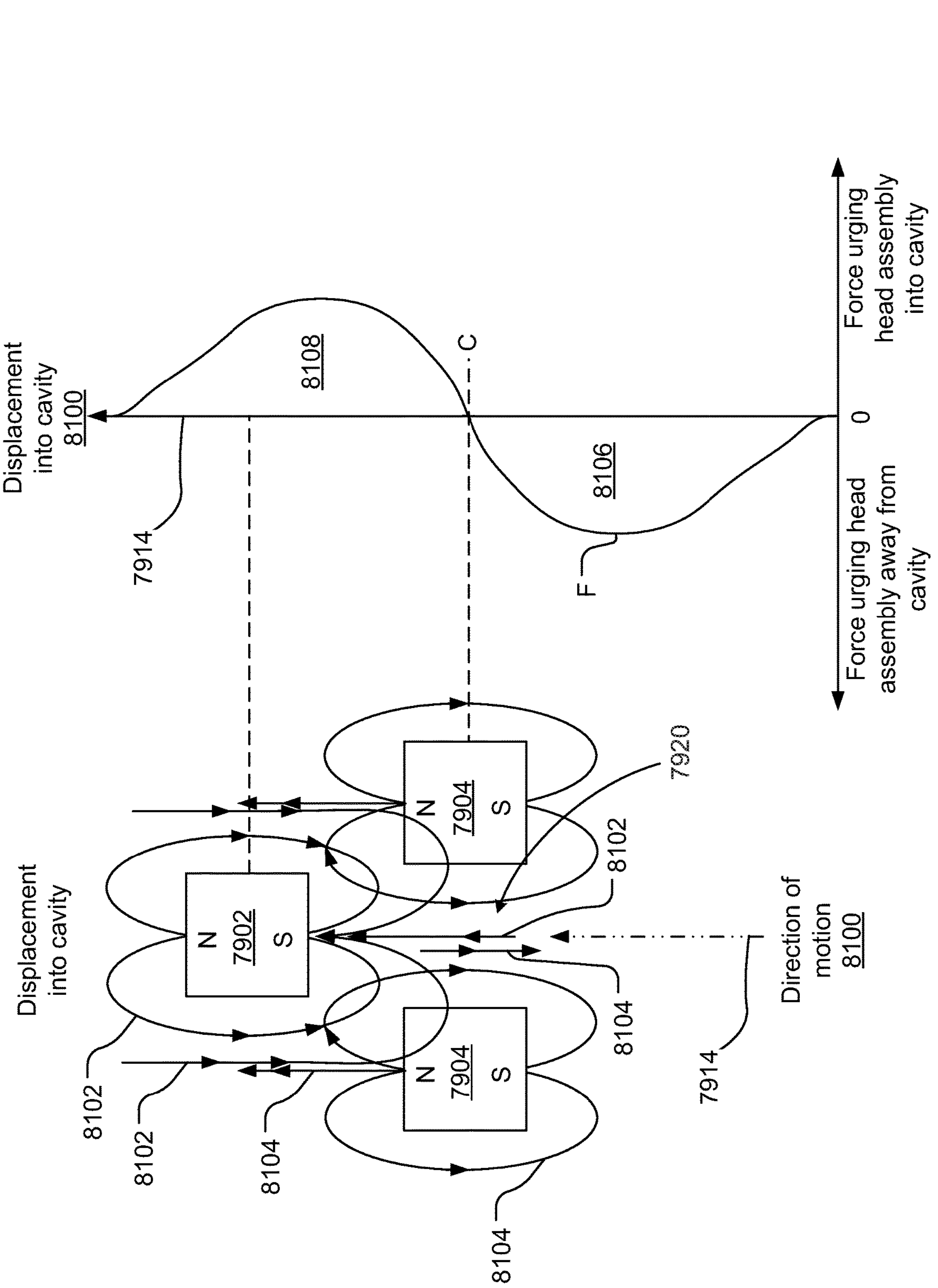
Figure 82:
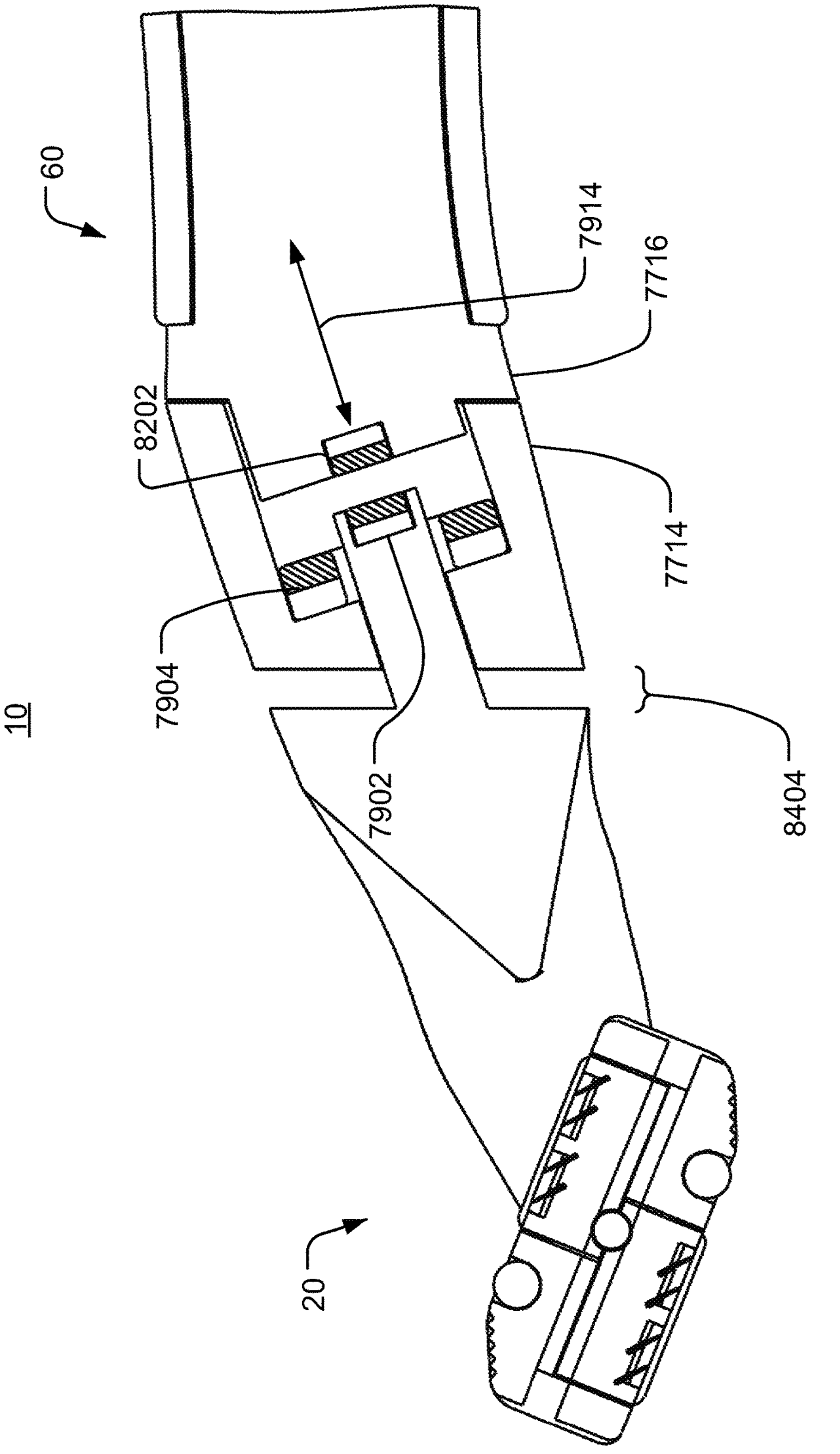
Figure 83:
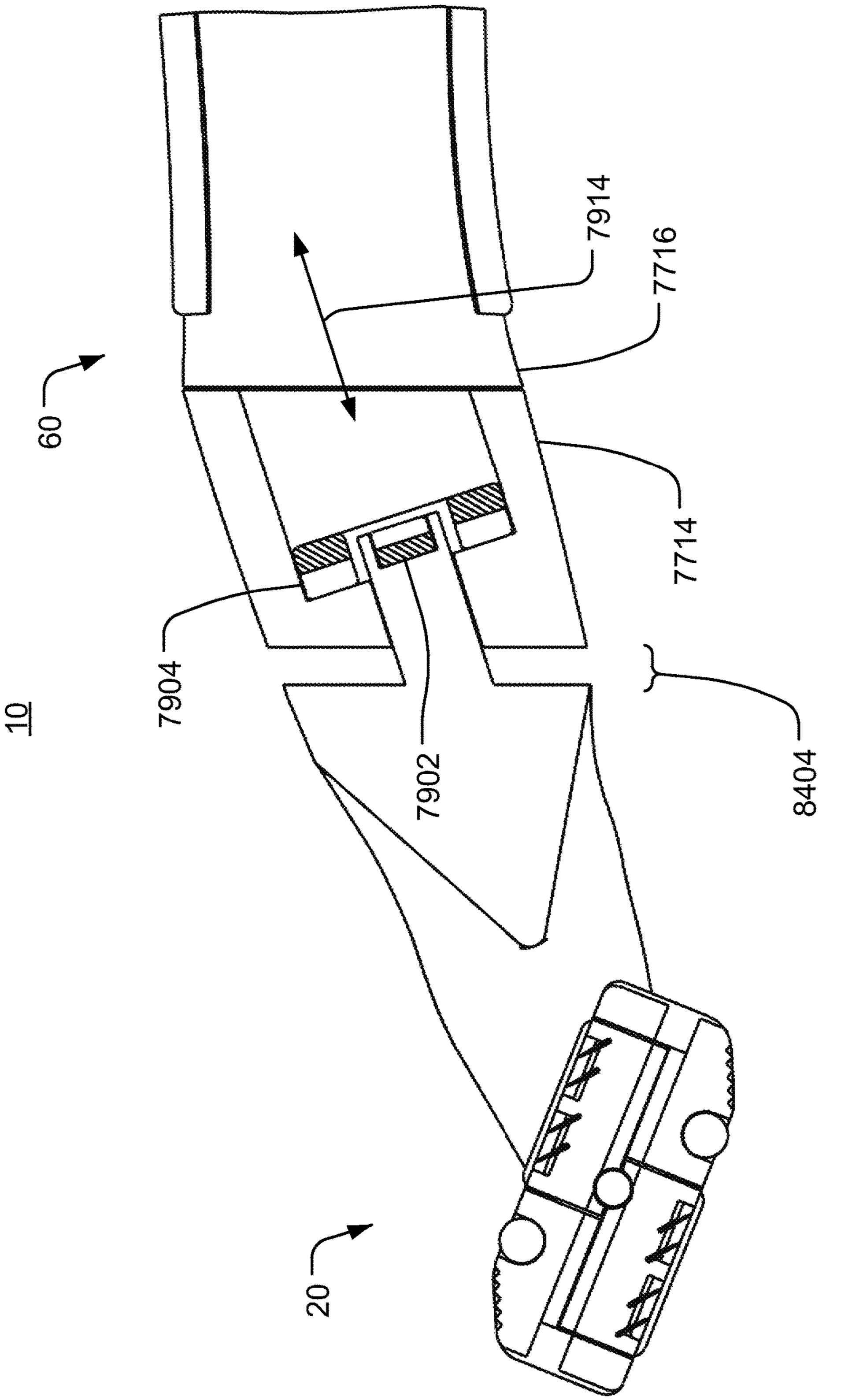
Figure 84:
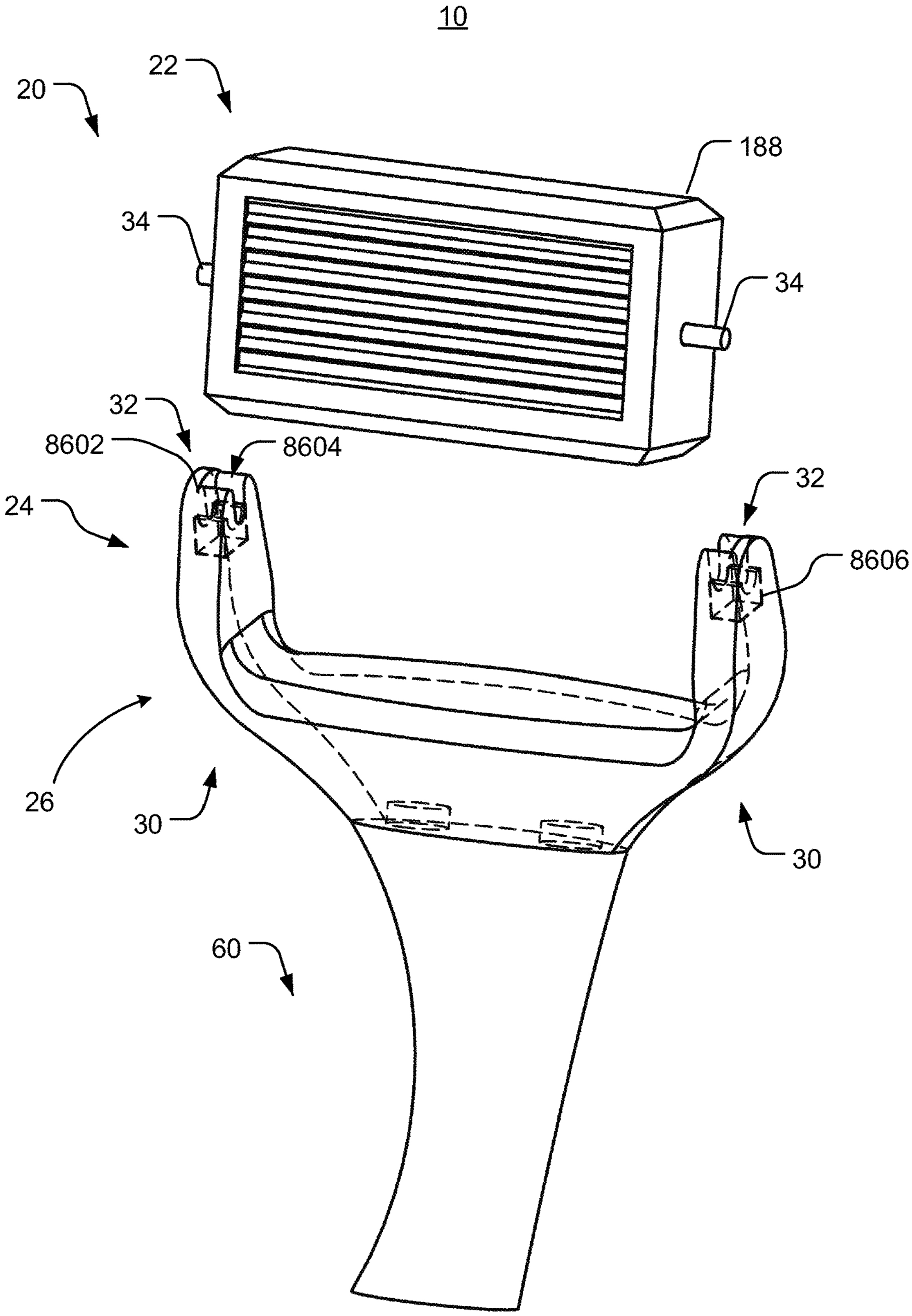
Figure 85:
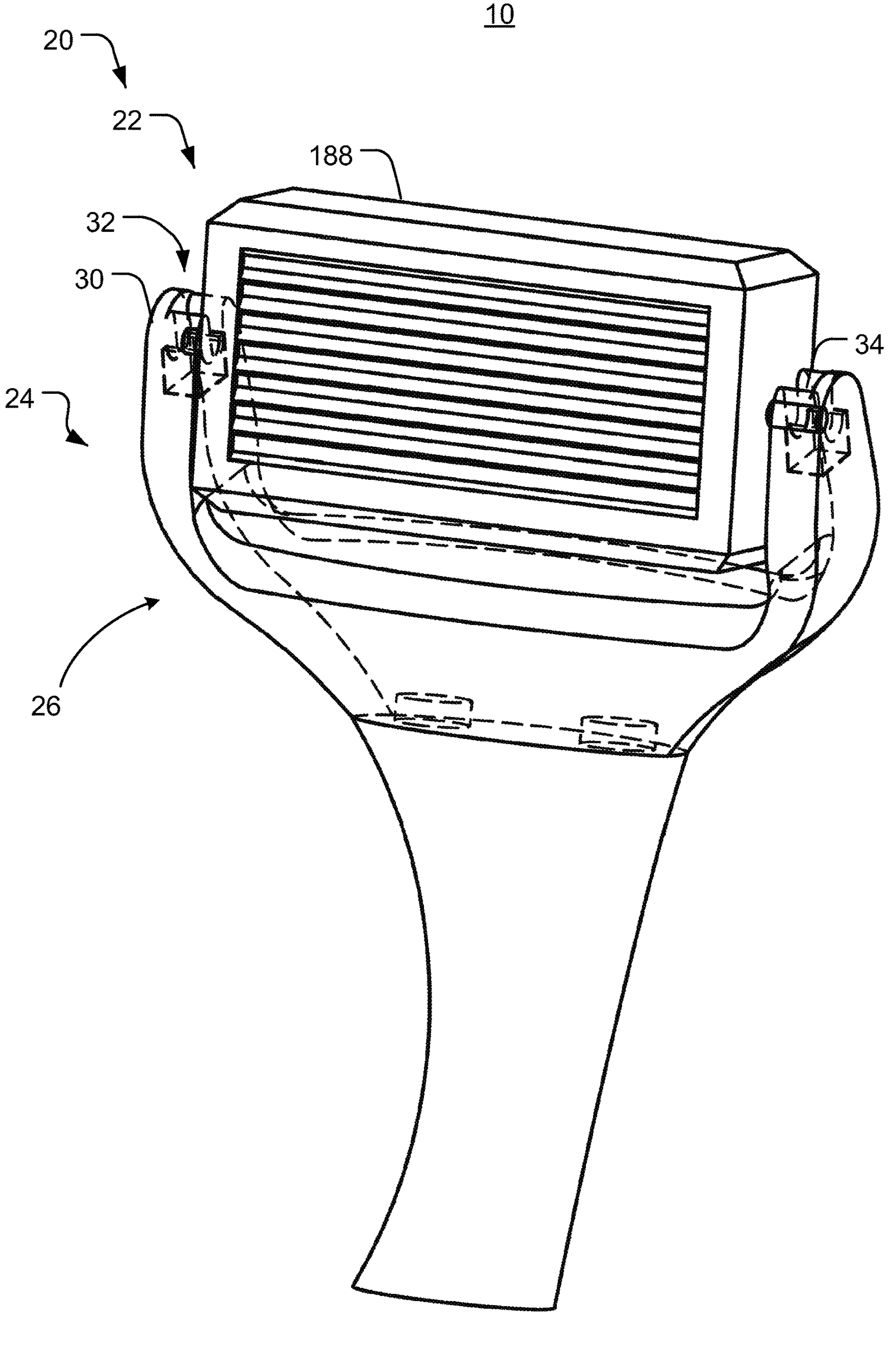
Figure 86:
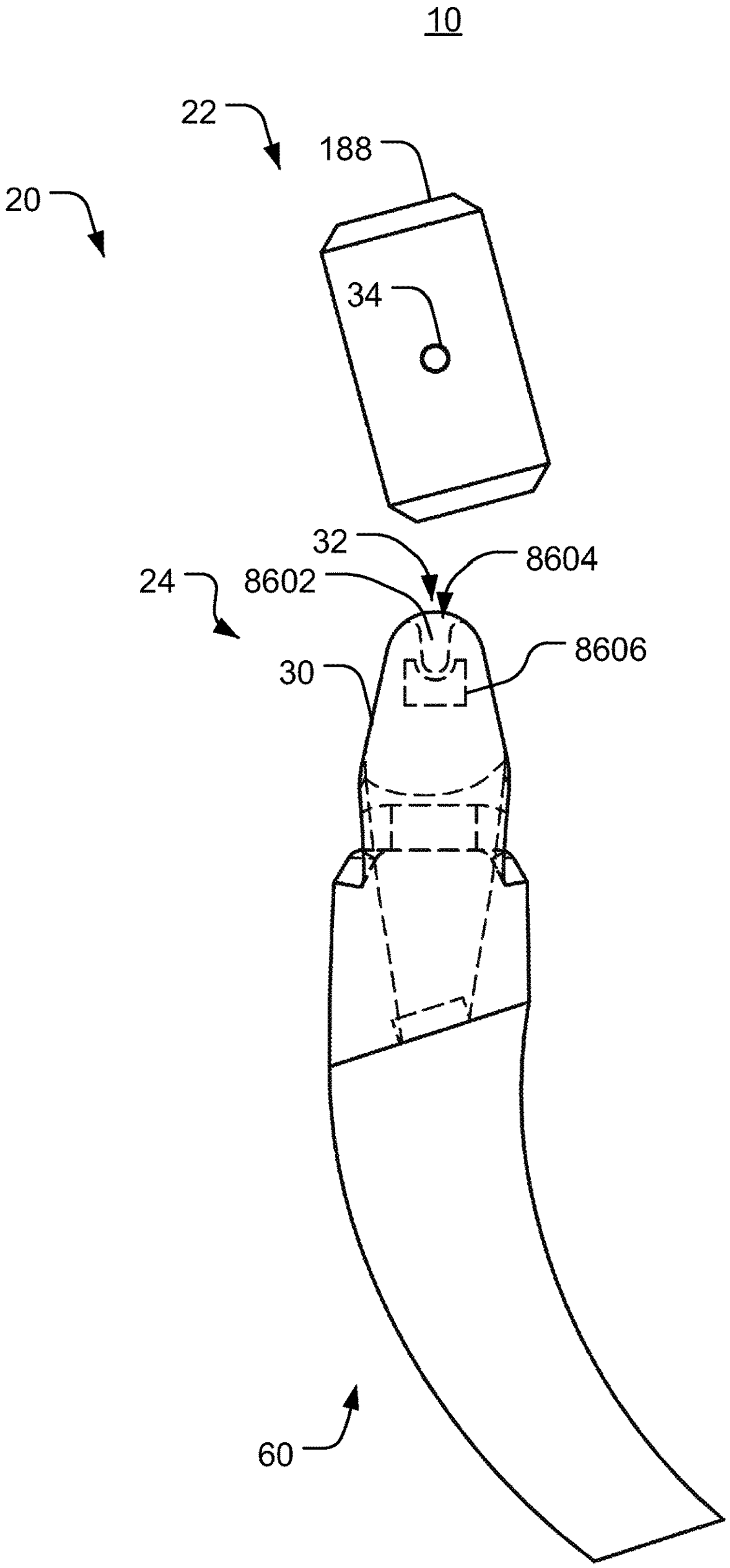
Figure 87:
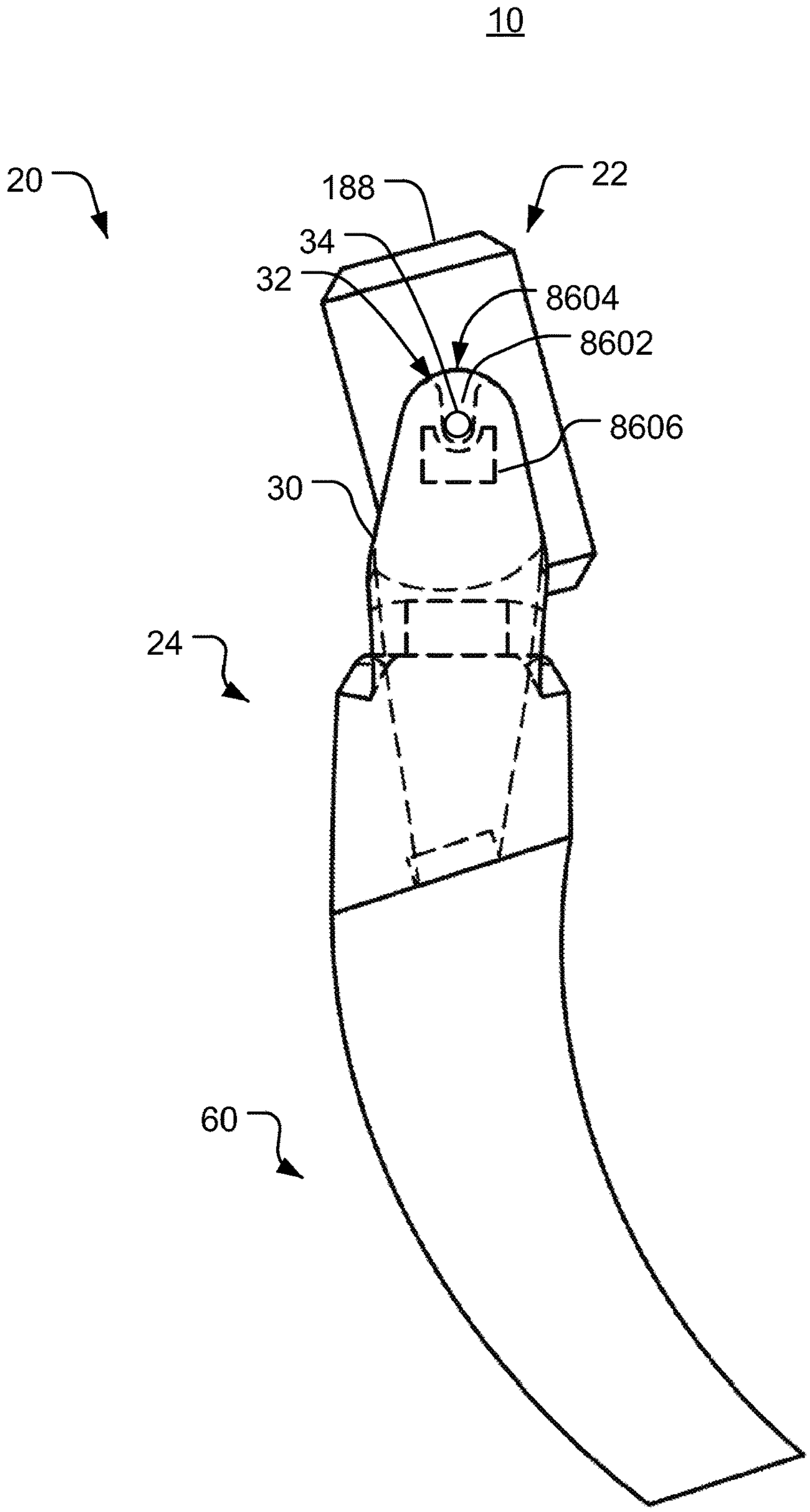
Figure 88:
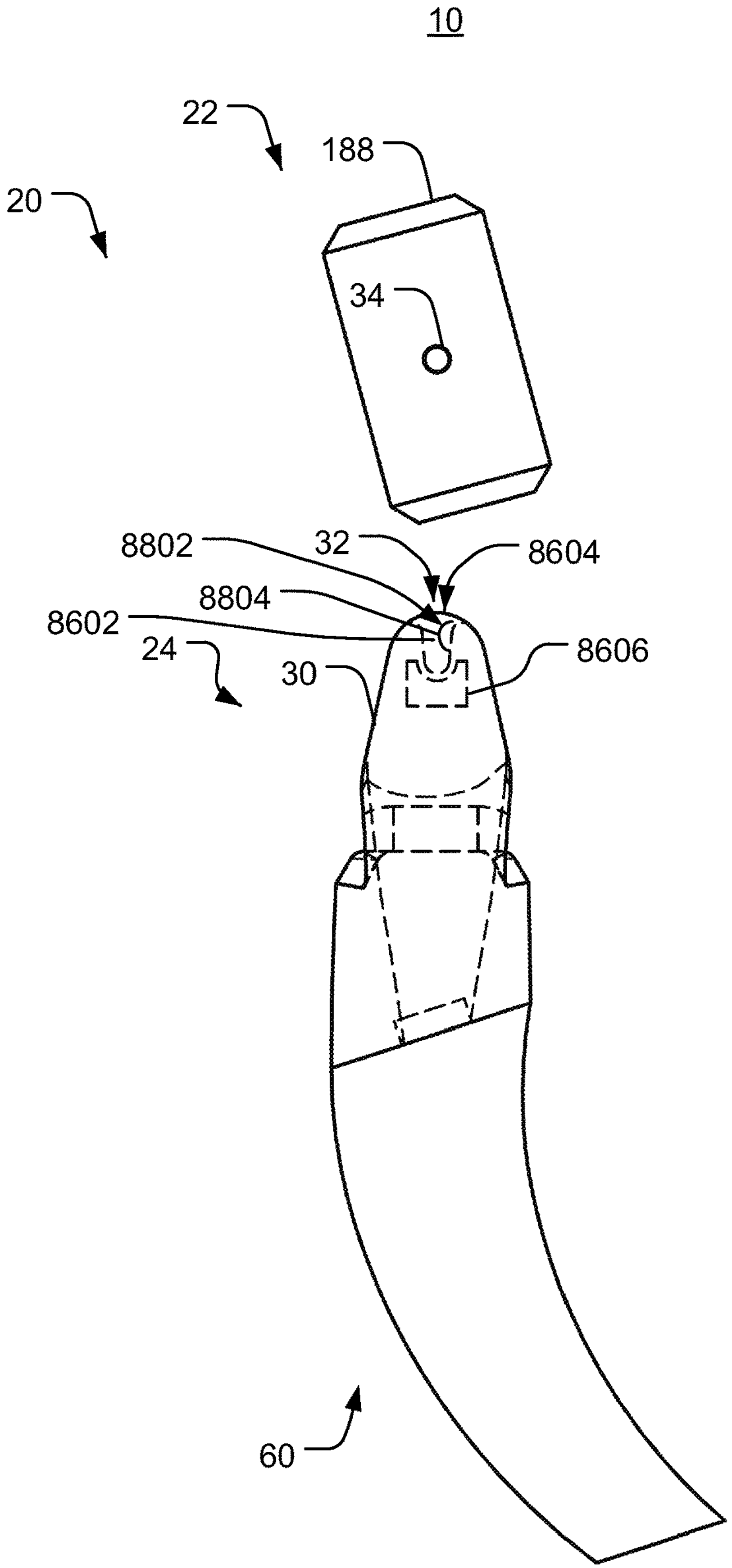
Figure 89:
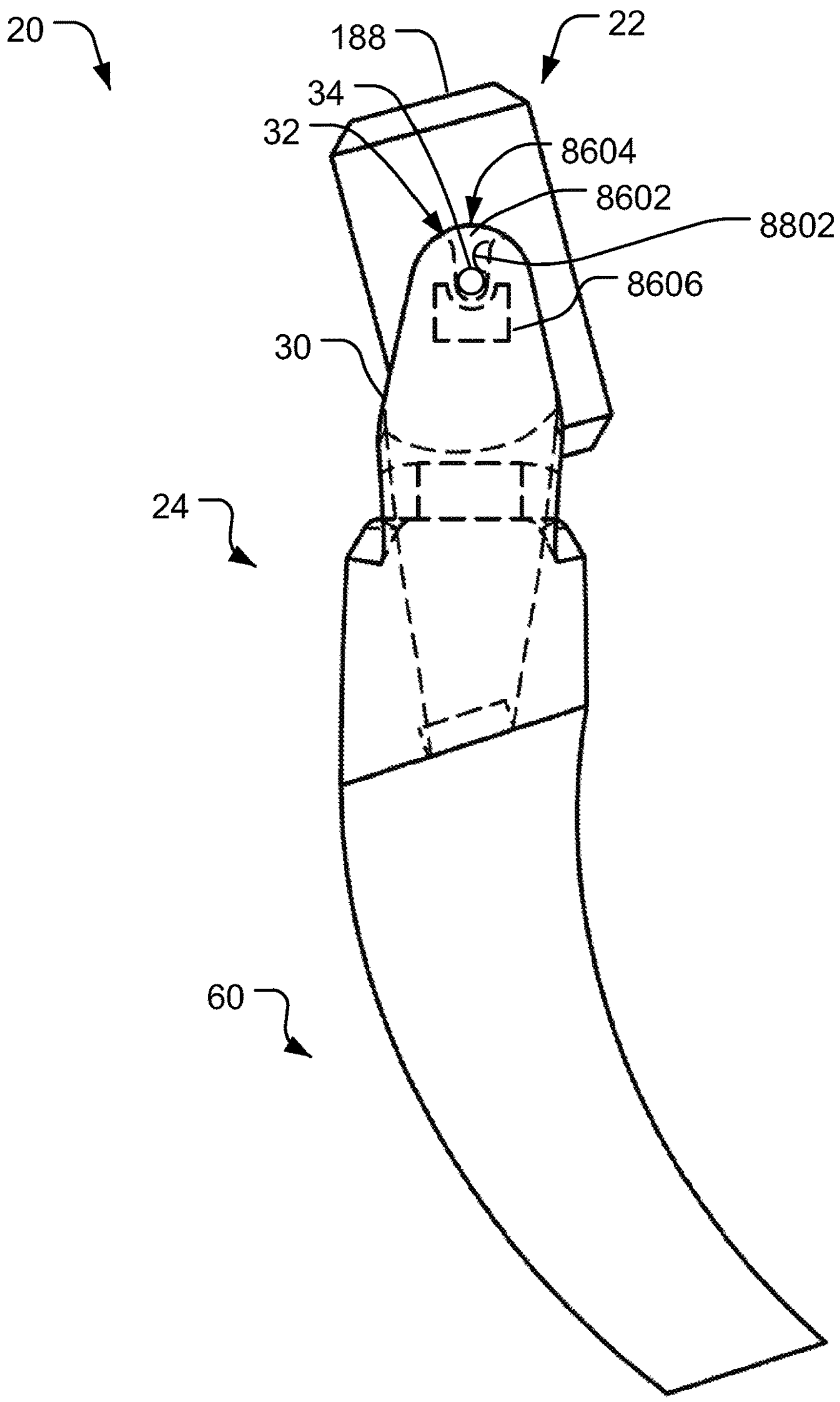
Figure 92:
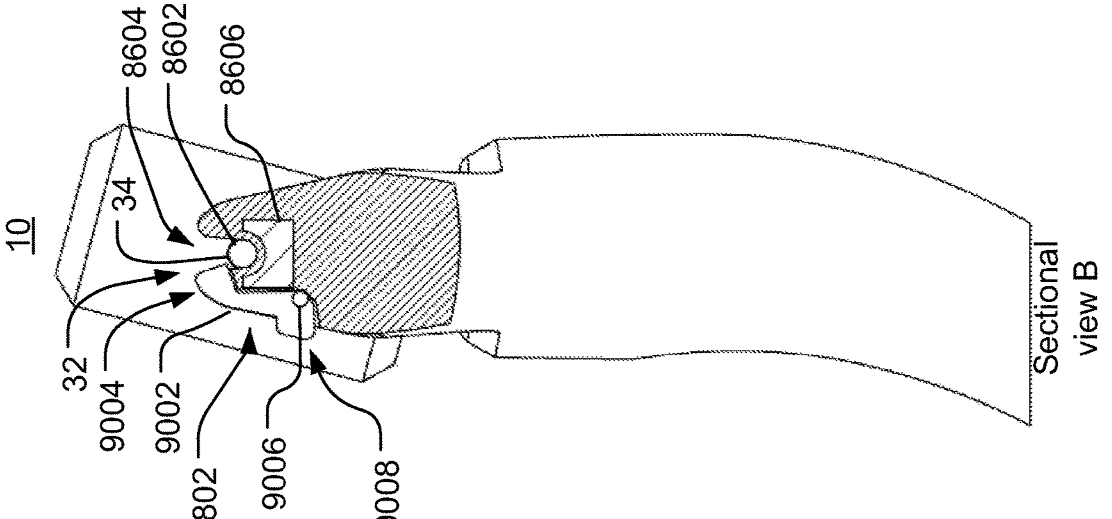
Figure 91:
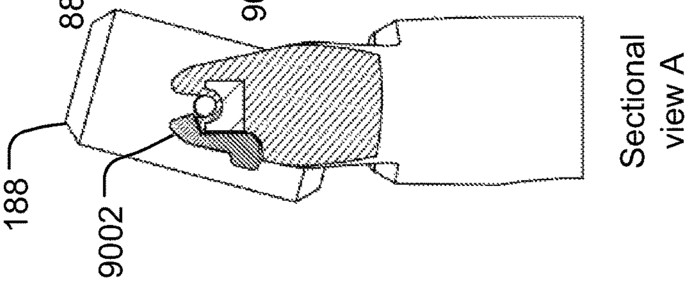
Figure 90:
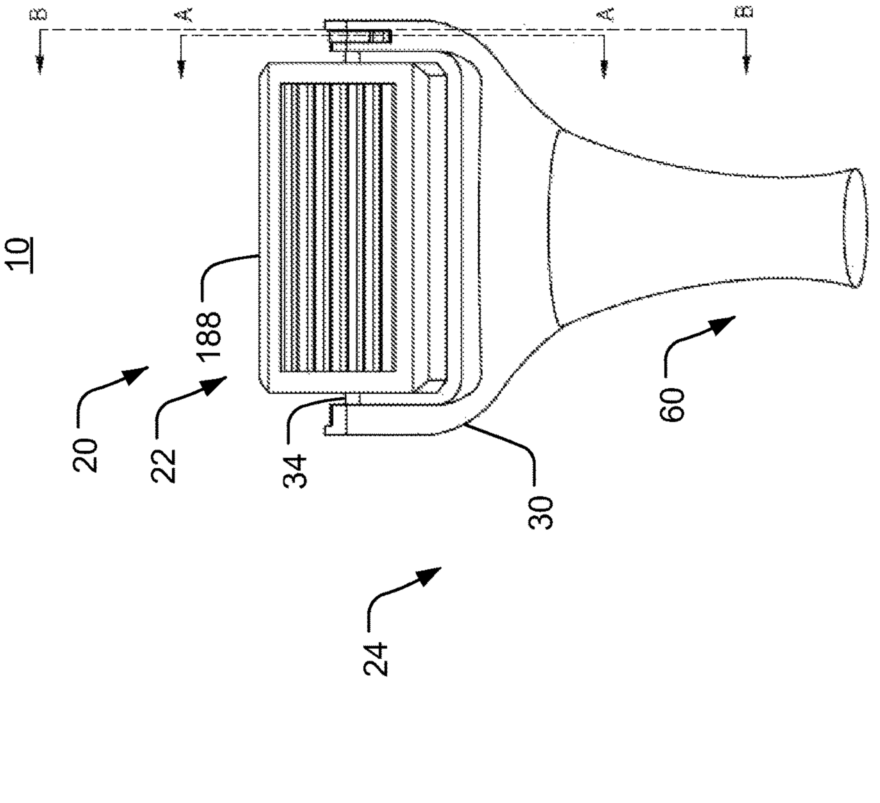

FIG. 13;

FIG. 15 shows yet a further embodiment of a resistive pivot mechanism consistent with the present disclosure;

FIGS. 16A and 16B show yet additional embodiments of a resistive pivot mechanism consistent with the present disclosure;

FIGS. 17A and 17B show further embodiments of a resistive pivot mechanism consistent with the present disclosure;

FIG. 18 generally illustrates one embodiment of a blade cartridge including a resistive pivot mechanism consistent with the present disclosure;

FIG. 19 generally illustrates one embodiment of a resistive pivot mechanism taken along lines 19-19 of FIG. 18 consistent with the present disclosure;

FIG. 20 generally illustrates one embodiment of a resistive pivot mechanism taken along lines 20-20 of FIG. 19 consistent with the present disclosure;

FIGS. 21 and 22 generally illustrate another embodiment of a resistive pivot mechanism similar to those of FIGS. 19 and 20;

FIGS. 23 and 24 generally illustrate another embodiment of a resistive pivot mechanism including a ballast mechanism consistent with the present disclosure;

FIGS. 25-27 illustrate one embodiment of a hinge and swivel mechanism consistent with the present disclosure;

FIG. 28 shows one embodiment of a blade cartridge centering mechanism;

FIG. 29 shows one embodiment of a blade cartridge centering mechanism consistent with FIG. 28;

FIG. 30A shows an enlarged front view of a blade cartridge according to one embodiment of the present disclosure;

FIG. 30B shows an enlarged front view of a blade cartridge according to another embodiment of the present disclosure;

FIG. 31 shows a cross-sectional view of a section of a blade cartridge including a retractable ball bearing according to one embodiment of the present disclosure;

FIG. 32 shows a cross-sectional view of a section of a blade cartridge including a retractable ball bearing according to another embodiment of the present disclosure;

FIG. 33 shows a cross-sectional view of a section of a blade cartridge including a retractable ball bearing according to another embodiment of the present disclosure;

FIGS. 34-35B show cross-sectional views of a blade cartridge including self-lubricating retractable ball bearing/elongated ball bearing/roller pin according to another embodiment of the present disclosure;

FIGS. 35C-35E show various views of a retention clip for securing a ball bearing within the blade cartridge;

FIGS. 35F-35H show various views of a blade retention clip for securing one or more razor blades within the blade cartridge;

FIG. 36 shows an enlarged front view of a blade cartridge according to another embodiment of the present disclosure;

FIG. 37 shows an enlarged front view of a blade cartridge according to another embodiment of the present disclosure;

FIG. 38 shows an end view of yet another embodiment of a blade cartridge consistent with the present disclosure;

FIG. 39 shows an end perspective view of the blade cartridge consistent with FIG. 38;

FIG. 40 shows an end view of one embodiment of a pivot pin/cylinder that may be used with one embodiment of a resistive pivot mechanism in conjunction with the blade cartridge of FIGS. 38 and 39;

FIGS. 41-45 show further views consistent with FIGS. 38-40;

FIGS. 46-49 show additional views of a razor consistent with FIGS. 25-27;

FIGS. 50-52 show additional views of a blade cartridge consistent with the present disclosure;

FIG. 53 shows another view of a razor consistent with the present disclosure;

FIG. 54 shows one embodiment of a razor having a resistive swing mechanism consistent with the present disclosure;

FIG. 55 shows a perspective view of another shaving device including another embodiment of a resistive pivot mechanism consistent with the present disclosure;

FIG. 56 shows a side view of the shaving device of FIG. 55 with the resistive pivot mechanism;

FIG. 57 shows a close-up side view of the shaving device of FIG. 55;

FIG. 58 shows another embodiment of a resistive pivot mechanism;

FIG. 59A shows the resistive pivot mechanism of FIG. 58 wherein the blade cartridge support member is partially transparent;

FIG. 59B shows one arrangement the blade cartridge magnets and the blade cartridge support member magnets;

FIG. 59C shows another arrangement the blade cartridge magnets and the blade cartridge support member magnets;

FIG. 59D shows yet another arrangement the blade cartridge magnets and the blade cartridge support member magnets;

FIG. 60 shows another view of the resistive pivot mechanism of FIG. 59A;

FIG. 61 shows another view of the blade cartridge support member of FIG. 58 wherein the blade cartridge support member is partially transparent;

FIG. 62 shows another view of the blade cartridge support member of FIG. 61 wherein the blade cartridge support member is solid;

FIG. 63 shows another view of the blade cartridge of FIG. 58 wherein the blade cartridge is partially transparent;

FIG. 64 shows another view of the blade cartridge of FIG. 63 wherein the blade cartridge is partially solid;

FIG. 65 shows another embodiment of a resistive pivot mechanism;

FIG. 66 shows the resistive pivot mechanism of FIG. 65 wherein the blade cartridge support member is solid;

FIG. 67 shows the resistive pivot mechanism of FIG. 65 wherein the blade cartridge support member is partially transparent;

FIG. 68 shows a cross-sectional view of the blade cartridge of FIG. 65;

FIG. 69 shows another cross-sectional view of the blade cartridge of FIG. 65;

FIG. 70 shows a cross-sectional view of another embodiment of a resistive pivot mechanism;

FIG. 71 shows the resistive pivot mechanism of FIG. 70 wherein the blade cartridge support member is partially transparent along with an axle and cams;

FIG. 72 shows another view of the blade cartridge support member of FIG. 71 without the axle and cams;

FIG. 73 shows another view of the blade cartridge of FIG. 70 wherein the blade cartridge support member is partially solid;

FIG. 74 shows another view of the resistive pivot mechanism of FIG. 70 wherein the blade cartridge support member is partially transparent along with the axle, cams, and detent plate;

FIG. 75 shows a cross-sectional view of the blade cartridge of FIG. 70;

FIG. 76 shows another cross-sectional view of the blade cartridge of FIG. 70;

FIG. 77 shows one embodiment of a head assembly and a handle configured to be coupled together using one or more magnets in an unassembled state;

FIG. 78 generally illustrates the head assembly and the handle of FIG. 77 in an assembled state;

FIG. 79 shows a cross-sectional view of the head assembly and handle of FIG. 77 in an unassembled state;

FIG. 80 shows a cross-sectional view of the head assembly and handle of FIG. 77 in an assembled state;

FIGS. 81A and 81B illustrate the magnetic force at different displacements into the cavity consistent with the magnetic coupling of FIGS. 77-80;

FIG. 82 shows another embodiment of a magnetic connection between the head assembly and the handle;

FIG. 83 shows a further embodiment of a magnetic connection between the head assembly and the handle;

FIG. 84 shows one embodiment of a blade cartridge connection mechanism for securing a blade cartridge to a blade cartridge support member in an unassembled state;

FIG. 85 shows the blade cartridge connection mechanism of FIG. 84 in an assembled state;

FIG. 86 shows a cross-sectional view of the blade cartridge connection mechanism of FIG. 84 in an unassembled state;

FIG. 87 shows a cross-sectional view of the blade cartridge connection mechanism of FIG. 84 in an assembled state;

FIG. 88 shows one embodiment of a blade cartridge retentioner for securing a blade cartridge to a blade cartridge support member in an unassembled state;

FIG. 89 shows the blade cartridge retentioner of FIG. 88 in an assembled state;

FIG. 90 another embodiment of a blade cartridge retentioner for securing a blade cartridge to a blade cartridge support member in an unassembled state;

FIG. 91 shows a cross-section of the blade cartridge retentioner of FIG. 90 taken along lines A-A; and FIG. 92 shows a cross-section of the blade cartridge retentioner of FIG. 90 taken along lines B-B.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring now to the figures, FIGS. 1-4 show a personal, manual (i.e. non-powered) shaving device 10 according to one embodiment of the present disclosure, which is particularly useful for shaving human hair. As shown, shaving device 10 comprises a disposable head assembly 20 to shave the hair of a user of shaving device 10, as well as a handle 60 to hold and manipulate the shaving device 10.

Figure 1A:
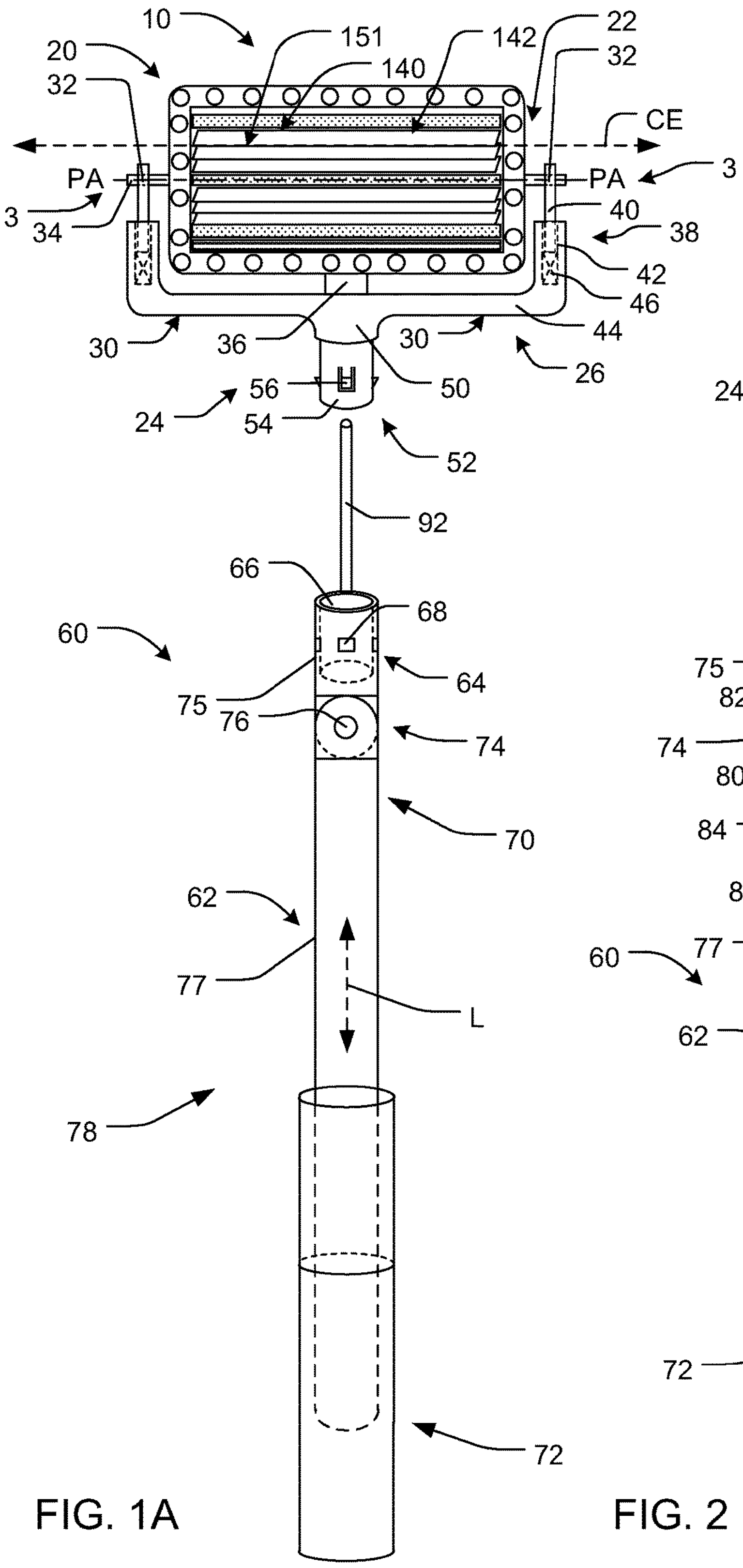
FIG. 1A shows a front view of a partially assembled shaving device consistent with one embodiment of the present disclosure.

As best shown by FIG. 1A, the disposable head assembly 20 comprises a blade cartridge 22 and a blade cartridge support member 24. As shown, blade cartridge support member 24 comprises a generally U-shaped cartridge support frame 26. U-shaped cartridge support frame 26 comprises two generally curved support arms 30. For example, the support arms 30 may have a generally C-shape or L-shape.

To facilitate pivotable attachment of blade cartridge 22 to the blade cartridge support member 24 and subsequent use thereof, the blade cartridge 22 and the blade cartridge support member 24 may include one or more hinges or pivot assemblies 3 that allows the blade cartridge 22 to rotate about a pivot axis PA (e.g., about a direction generally perpendicular to the longitudinal axis L of the handle 60.) As described herein, the hinge or pivot assembly 3 may be configured to allow the blade cartridge 22 to rotate approximately 180 degrees about pivot axis PA such that a front side 140 and rear side 156 of the blade cartridge 22 may be used. According to one embodiment, the hinge or pivot assembly 3 may be configured to allow the blade cartridge 22 to rotate approximately 360 degrees about pivot axis PA.

For example, the hinge or pivot assembly 3 may include a pivot receptacle 32 (e.g., in the form of a through-hole) disposed in each support arm 30 of the blade cartridge support member 24 (e.g., but not limited to, a distal section 40 of the support arms 30), each of which receives a pivot pin/cylinder 34 located on opposing lateral sides of the blade cartridge 22. The pivot pins/cylinders 34 may extend generally outwardly from the lateral sides of the blade cartridge 22. With the foregoing arrangement, the blade cartridge 22 is arranged between the support arms 30 and supported by each support arm 30 at a pivot connection (assembly), and the blade cartridge 22 is able to rotate about the pivot axis PA at any angle, up to and including 360° degrees. It should be appreciated that the location of one or more of the pivot receptacles 32 and the pivot pins 34 may be switched (e.g., one or more of the pivot receptacles 32 may be located in the blade cartridge 22 and one or more of the pivot pins 34 may extend outwardly from the support arms 30 of the blade cartridge support member 24)

In order to cushion use of blade cartridge 22 while shaving, one or more of the support arms 30 may include a cushioning mechanism 38. As shown, a second (distal) section 40 of each support arm 30 is configured to slide within a receptacle 42 (e.g., a slotted recess) of a first (proximal) section 44 of each support arm 30. Each receptacle 42 may include a compression (e.g., coil) spring or biasing device 46 at the bottom thereof. As used herein, proximal and distal may be understood relative to the user of shaving device 10.

In the foregoing manner, the biasing device 46 of the cushioning mechanism 38 may compress in response to a downward force placed on blade cartridge 22, with such compression biasing against the downward force. In doing so, such compression may absorb/dampen the downward force to cushion use of the blade cartridge 22. Furthermore, since the cushioning mechanism 38 of each support arm 30 is independent of one another, the cushioning mechanism 38 may enable each lateral end of the blade cartridge 22 to move and/or be cushioned independently. It should be understood that in other embodiments of shaving device 10, the blade cartridge support member 24 may not include a cushioning mechanism 38.

The head assembly 20 may be selectively detachably connectable to the handle 60 by the user. As may be appreciated, any mechanism for selectively coupling the blade cartridge support member 24 to the handle 60 may be used. For example, the blade cartridge support member 24 may include a support hub 50, which may be centrally disposed between the two support arms 30. The support hub 50 includes a mechanical connection element 52 which mechanically connects the blade cartridge support member 24 to a mechanical connection element 64 of elongated shaft 62 of handle 60.

Figure 2:
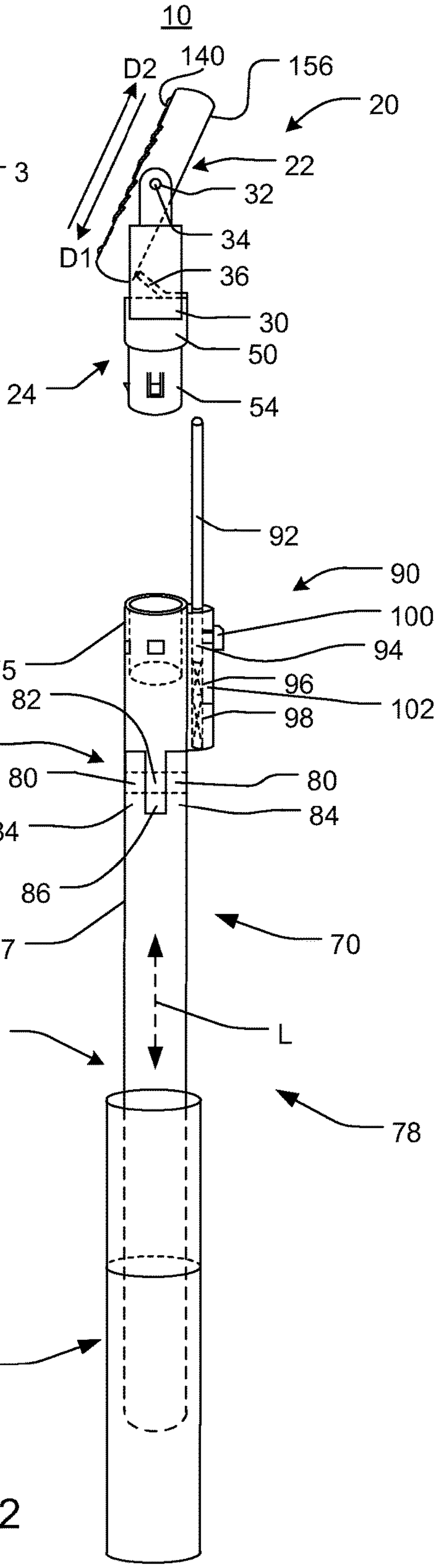
FIG. 2 shows a side view of the partially assembled shaving device of FIG. 1A.

For example, as shown by FIGS. 1A and 2, one embodiment of a connection element 52 of the blade cartridge support member 24 comprises a hollow (tubular) cylindrical shank 54 which is configured to fit within a cylindrical recess 66 of connection element 64 of handle 60. In order to provide a positive mechanical connection, cylindrical shank 54 includes a plurality of deformable (cantilevered and/or spring loaded) engagement tabs 56 which engage within engagement apertures 68. The deformable (cantilevered and/or spring loaded) engagement tabs 56 may, in one embodiment, be configured to be moved out of engagement with the engagement apertures 68 upon depressing of an actuation button 100 and/or by manually depressing each individual engagement tab with the user's hands/fingers.

Once the engagement tabs 56 are engaged within the engagement apertures 68, the head assembly 20 and handle 60 may be generally inhibited from separating from one another. Thereafter (e.g., after the useful life of the blade cartridge 22), the head assembly 20 and handle 60 may be detached from one another by depressing the engagement tabs 56 inward (e.g., by depressing a button or the like disposed on the handle 60 and/or the disposable head assembly 20 and/or by manually depressing each engagement tab with the user's hands/fingers), and pulling the cylindrical shank 54 of the blade cartridge support member 24 out of the cylindrical recess 66 of the handle 60. The used head assembly 20/blade cartridge 22 may then be replaced with a fresh head assembly 20/blade cartridge 22. Thus, as may be understood the head assembly 20 is selectively detachably connectable to the handle 60 by the user.

Figure 5:
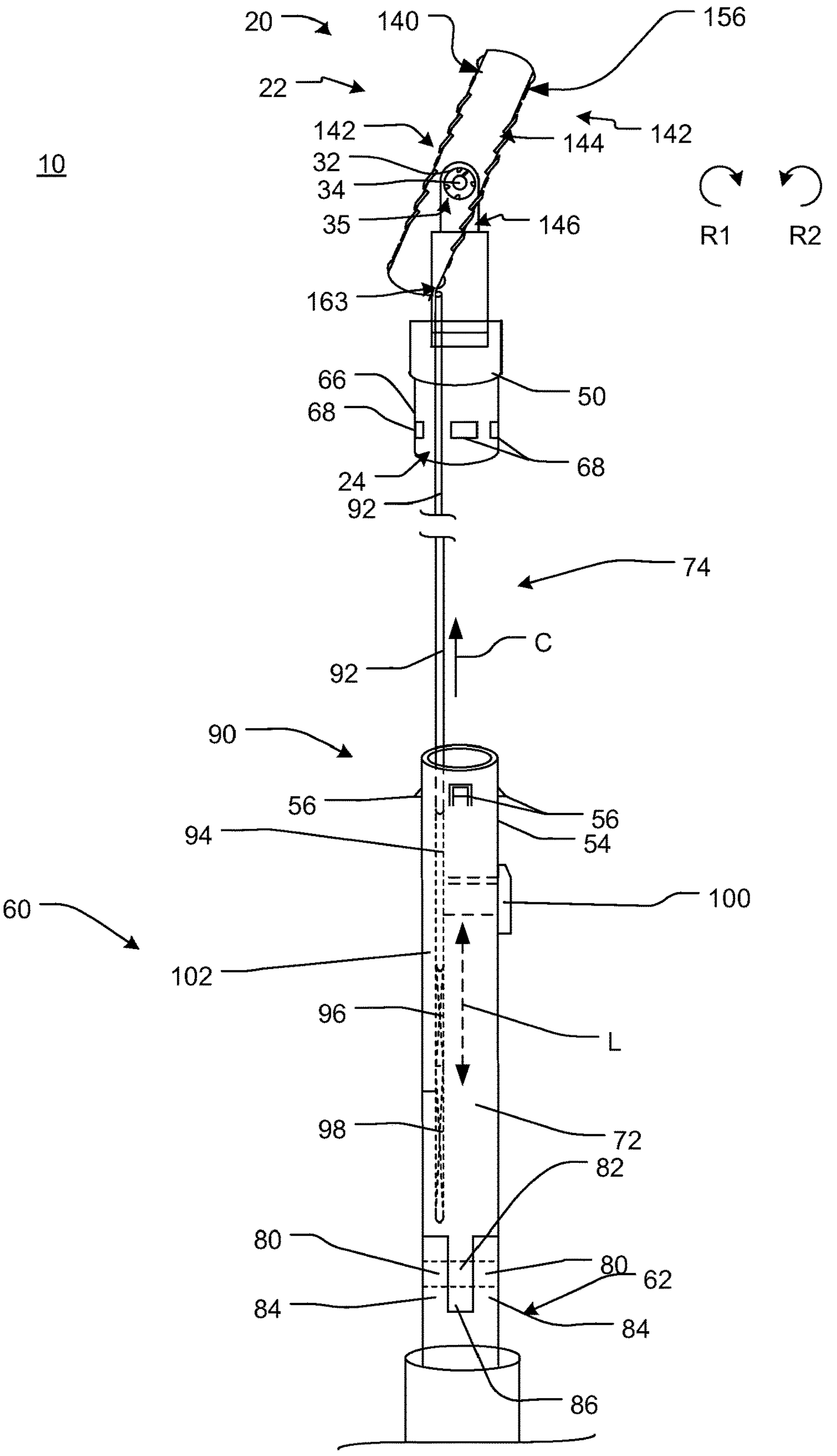
FIG. 5 shows another embodiment of the shaving device.

Although the shank 54 and recess 66 are shown as part of the blade cartridge support member 24 and the handle 60, respectively, it should be appreciated that the arrangement of the shank 54 and recess 66 may be switched (e.g., the shank 54 and recess 66 may be part of the handle 60 and the blade cartridge support member 24, respectively, see, for example, FIG. 5). Additionally, while the deformable (cantilevered and/or spring loaded) engagement tabs 56 and the engagement apertures 68 are shown as part of the shank 54 and recess 66, respectively, it should be appreciated that the arrangement of the deformable (cantilevered and/or spring loaded) engagement tabs 56 and the engagement apertures 68 may be switched (e.g., the deformable (cantilevered and/or spring loaded) engagement tabs 56 and the engagement apertures 68 may be part of the recess 66 and the shank

54, respectively). Again, it should be appreciated that the connection element 52 is not limited to arrangement illustrated and/or described herein unless specifically claimed as such, and that any connection element 52 that allows a user to selectively releasably couple the head assembly 20 to the handle 60 may be used.

The handle 60 (FIGS. 1A-1C) may optionally include one or more hinges 74 configured to allow the head assembly 20 to be selectively rotated relative to a portion of the handle 60 such that the orientation of the head assembly 20 (e.g., a longitudinal axis H of the head assembly 20) relative to the handle 60 (e.g., the longitudinal axis L of the handle 60) may be adjusted by the user. The hinge 74 may be positioned substantially anywhere along the length of the handle 60, but may be positioned proximate to a first (proximal) region of the handle 60 as generally illustrated.

Figure 1B:
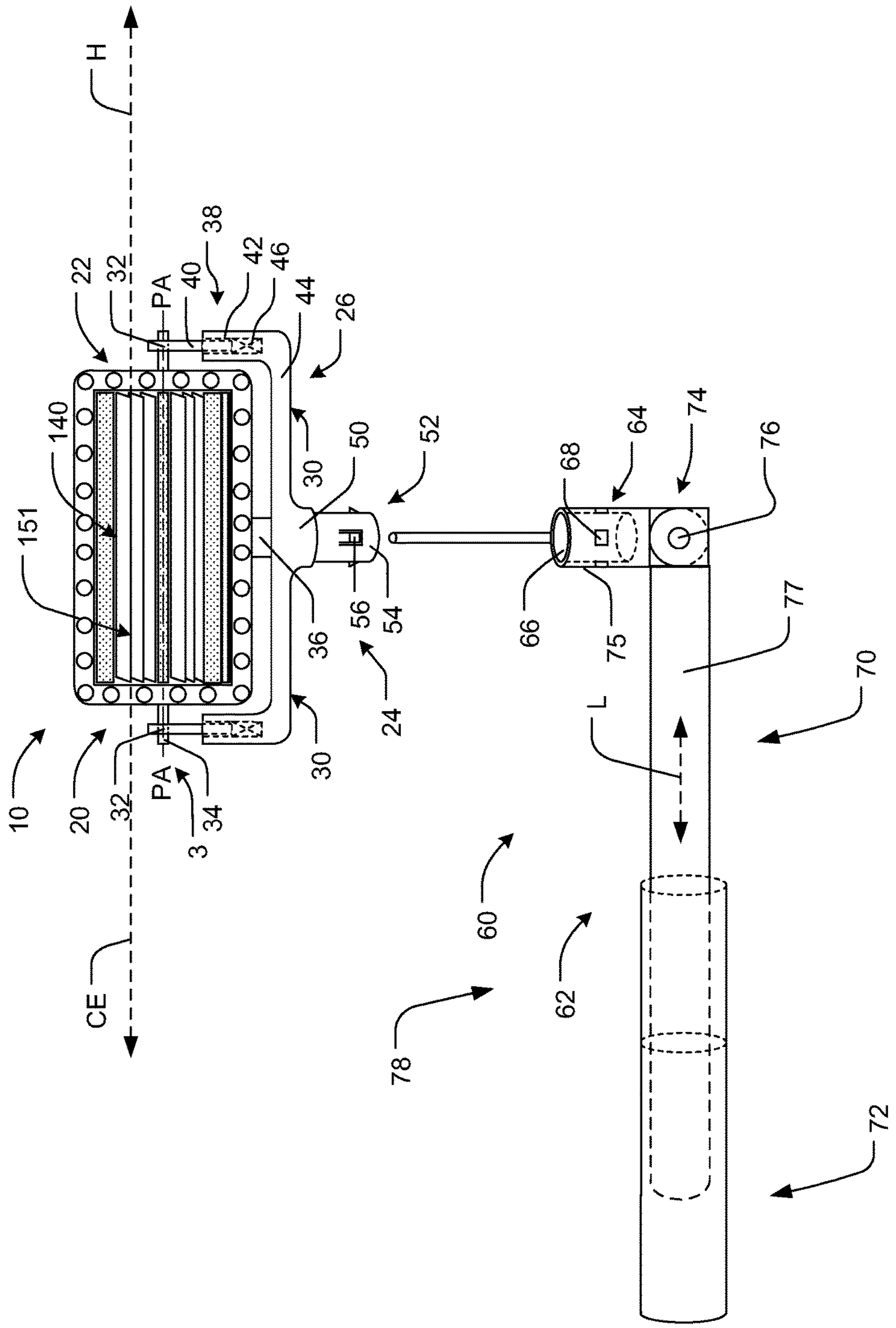
FIG. 1B shows a front view of a partially assembled shaving device of FIG. 1A with one embodiment of a hinge illustrating the head assembly generally parallel to the handle.
Figure 1C:
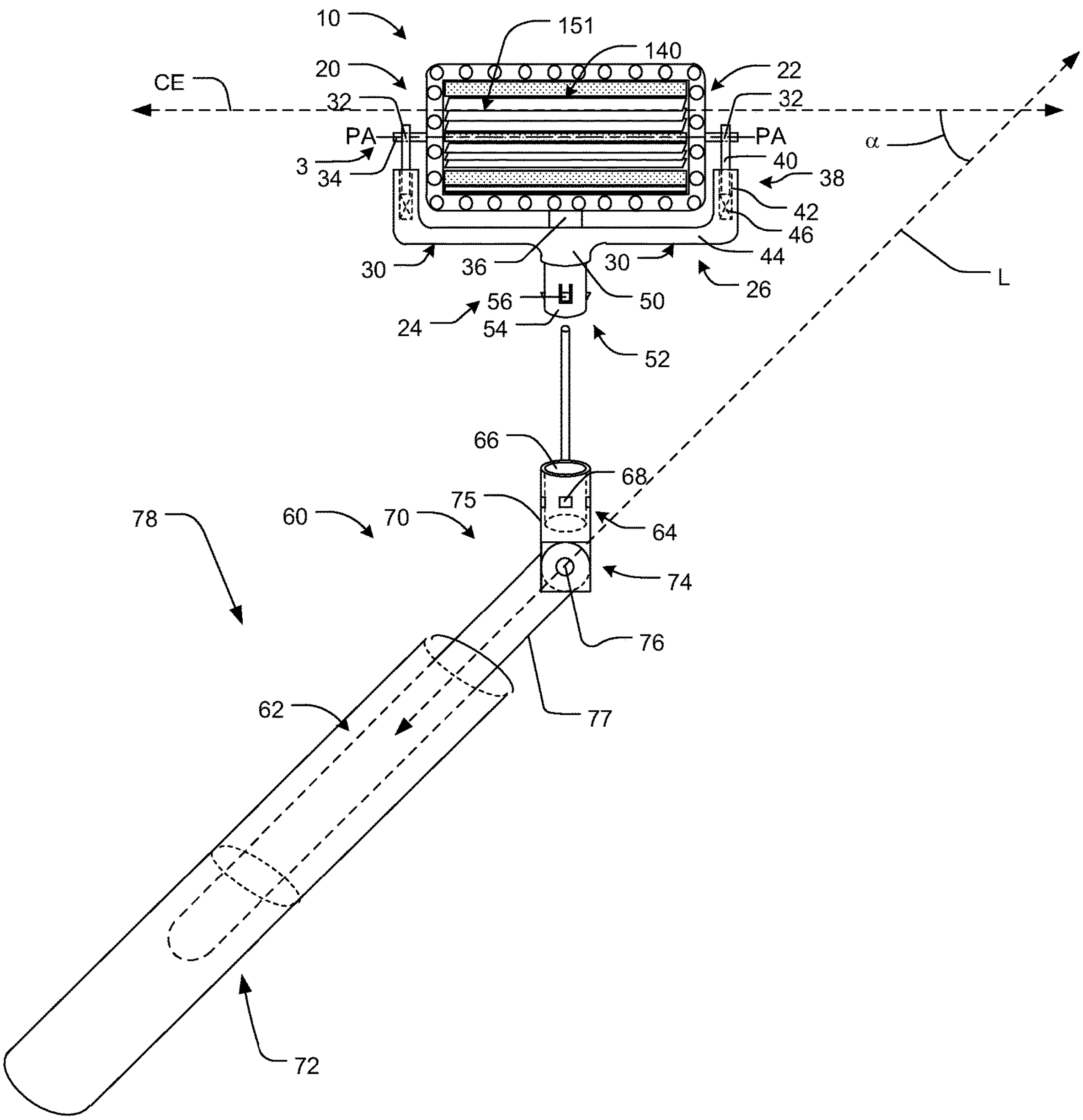
FIG. 1C shows a front view of a partially assembled shaving device of FIG. 1A with one embodiment of a hinge illustrating the head assembly at an angle $\alpha$ relative to the handle.

With reference to FIG. 1A, it may be appreciated that the cutting edge axis CE of the cutting edge 151 of one or more of the razor blades 142 of the head assembly 20 is aligned generally perpendicular (e.g., generally transverse/90 degrees) relative to the longitudinal axis L of the handle 60. As described herein (e.g., as generally illustrated in FIGS. 1B and 1C), the hinge 74 may be configured to allow the user to selectively rotate the head assembly 20 about a pivot point of the handle 60 such that the cutting edge axis CE of the cutting edge 151 of one or more of the razor blades 142 of the head assembly 20 is aligned at an angle $\alpha$ (see, for example, FIG. 1C) other than transverse/perpendicular/90 degrees relative to the longitudinal axis L of the handle 60. For example, FIG. 1B generally illustrates the cutting edge axis CE of the cutting edge 151 of one or more of the razor blades 142 of the head assembly 20 being generally parallel to the longitudinal axis L of the handle 60 while FIG. 1C generally illustrates the cutting edge axis CE of the cutting edge 151 of one or more of the razor blades 142 of the head assembly 20 at an angle $\alpha$ less than 90 degrees, for example, between 0 and less than 90 degrees, relative to the longitudinal axis L of the handle 60.

One embodiment of a hinge 74 consistent with the present disclosure is generally illustrated in FIGS. 1A and 2. The hinge 74 may include a hinge pin 76 that extends through receptacles 80, 82 of overlapping joint portions 84, 86 (see FIG. 2) of a first (proximal) shaft portion 75 and a second (distal) shaft portion 77 of the handle 60. In addition to enabling the first (proximal) elongated shaft section 75 and the second elongated (distal) shaft section 77 to rotate relative to one another, hinge pin 76 may also inhibit the first (proximal) shaft portion 75 and the second (distal) shaft portion 77 from separating relative to one another. The hinge 74 may optionally include a locking mechanism (e.g., but not limited to, a locking pawl, ratchet mechanism, or the like) configured to allow the user to generally lock or fix the relative position of the head assembly 20 relative to the handle 60.

It should be appreciated that the hinge 74 may also be configured to allow the user to selectively rotate the head assembly 20 about a pivot point of the handle 60 such that the cutting edge axis CE of the cutting edge 151 of one or more of the razor blades 142 of the head assembly 20 remains substantially transverse/perpendicular/90 degrees relative to the longitudinal axis L of the handle 60. For example, the arrangement of the hinge pin 76 and receptacles 80, 82 may be rotated approximately 90 degrees about the longitudinal axis L of the handle 60 from the arrangement illustrated in FIGS. 1A-1C.

The handle 60 may also optionally include an elongated shaft 62. The elongated shaft 62 optionally includes a telescoping handle extension 78 including a first and a least a second shaft section 70, 72 configured to telescopically slide relative to one another such that the overall length of the handle 60 may be adjusted by the user. It should be understood that one or more of the shaft sections 70, 72 may also optionally include one or more hinges 74 as described herein. It should also be understood that in other embodiments of shaving device 10, the elongated shaft 62 may be formed of a single section and not include the hinge 74, and the telescoping handle extension 78 may be eliminated.

Figure 3:
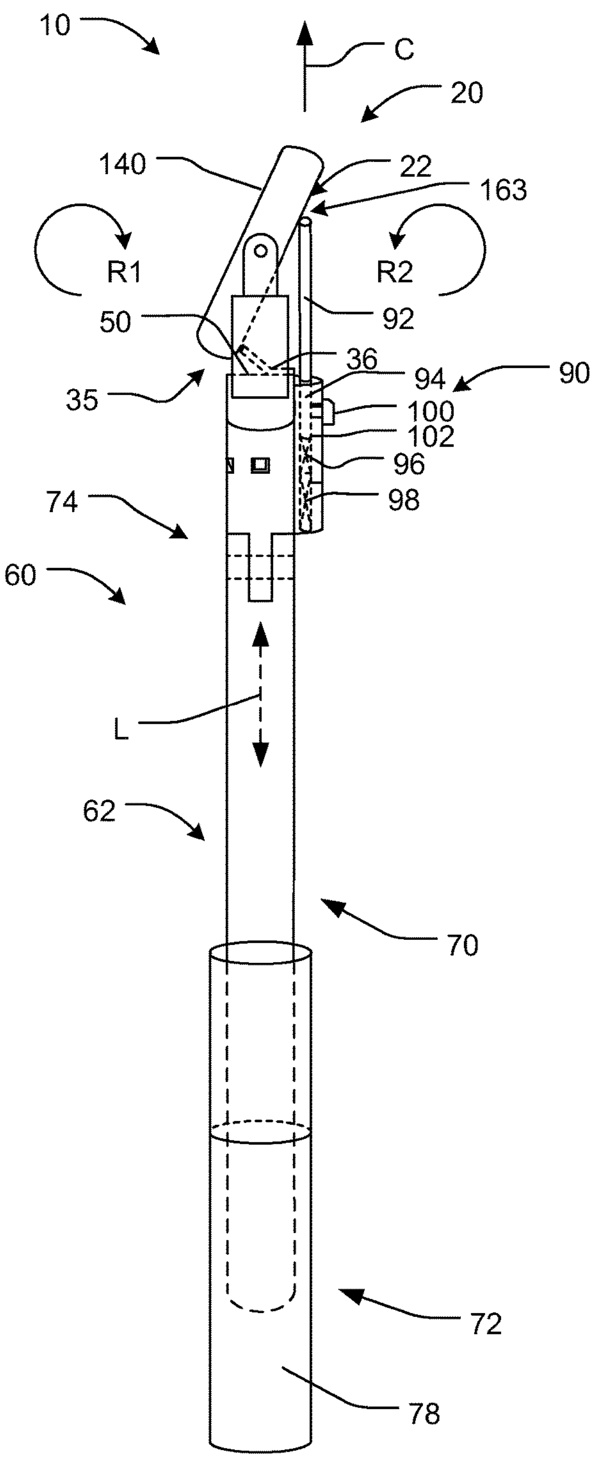
FIG. 3 shows a side view of the shaving device of FIG. 1A as fully assembled with a pivot biasing mechanism extended.
Figure 4:
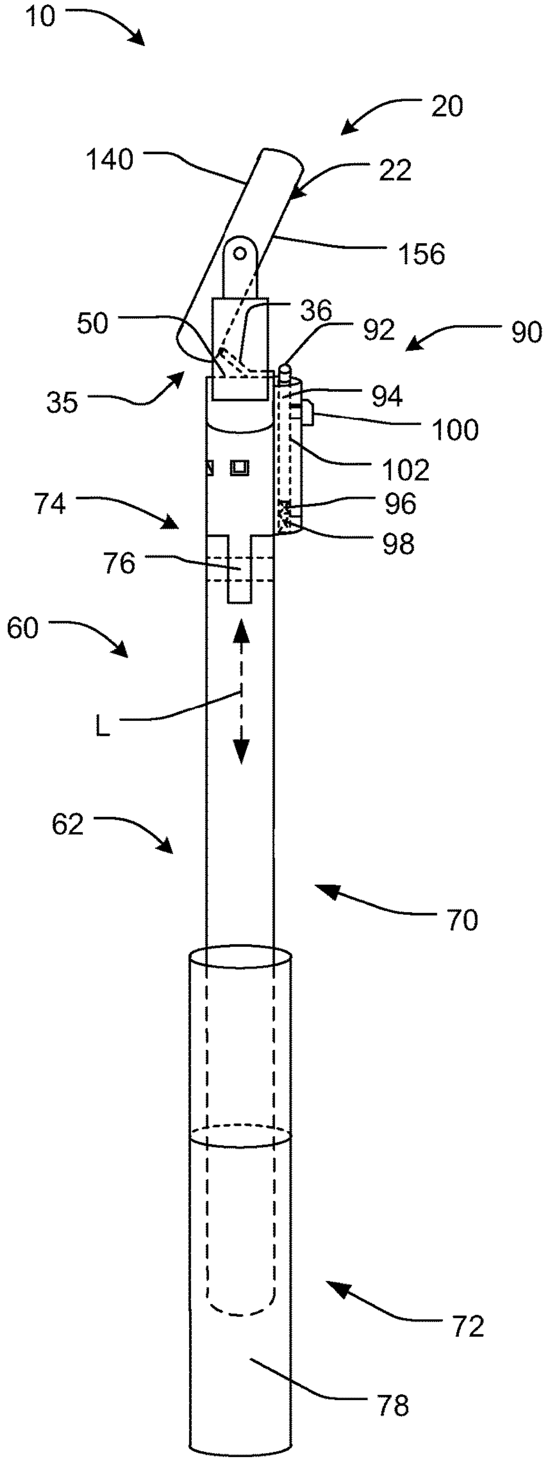
FIG. 4 shows a side view of the shaving device of FIG. 1A as fully assembled with a pivot biasing mechanism retracted.
Figure 6A:
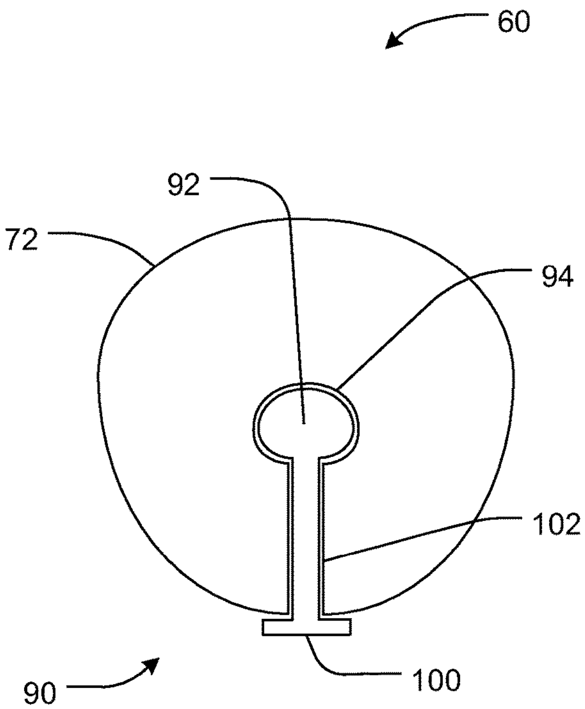
FIG. 6A shows a cross-sectional view taken through the handle of the shaving device of FIG. 6B taken along lines 6-6.
Figure 6B:
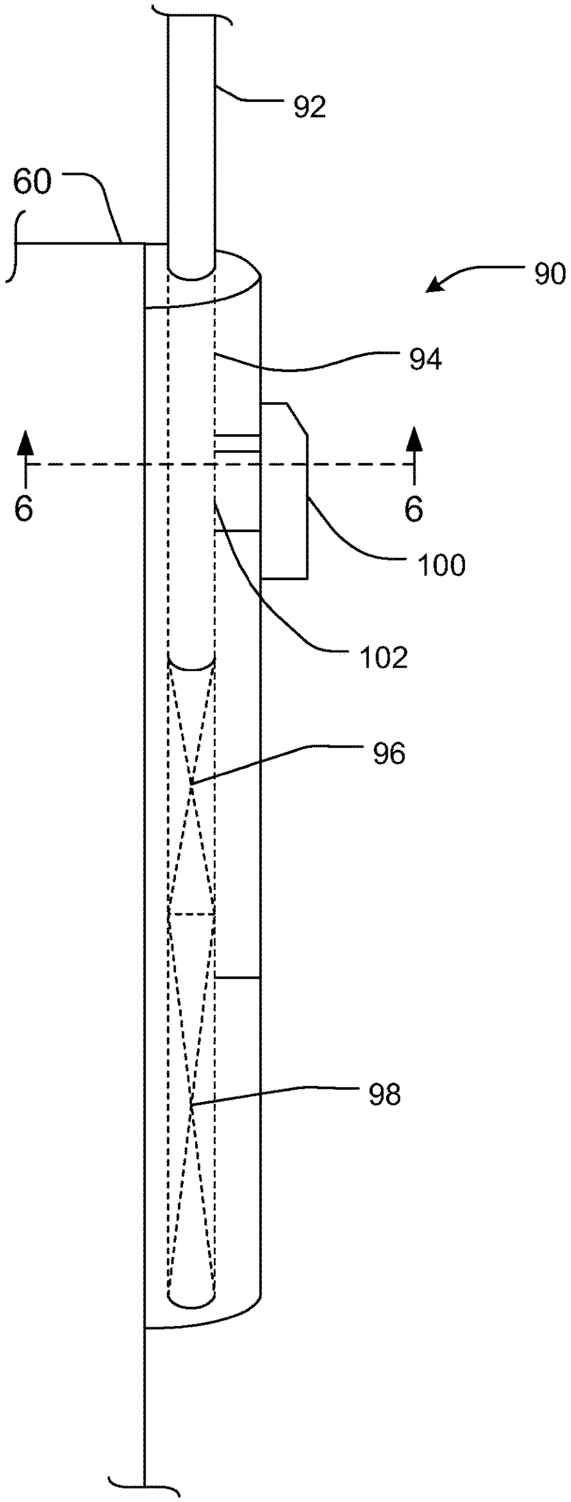
FIG. 6B shows a close-up of one embodiment of a blade cartridge pivot biasing mechanism.

With reference to FIGS. 3-5, the shaving device 10 (e.g., the handle 60) may optionally include one or more blade cartridge pivot biasing mechanisms 90 to control the rotation of the blade cartridge 22 about a pivot axis PA in a direction relative to blade cartridge support member 24. Pivot biasing mechanism 90 may include one or more elongated cylindrical rods 92 which slide within cylindrical recess 94 of handle 60. The elongated cylindrical rod 92 may be biased generally in the direction of arrow C (i.e., generally towards the blade cartridge 22 as generally illustrated in FIGS. 3 and 5). For example, the handle 60 may include a cylindrical recess 94 (best seen in FIGS. 6A and 6B) having one or more biasing devices (e.g., springs or the like) configured to urge the elongated cylindrical rod 92 generally in the direction of arrow C. In one embodiment, a first biasing device 96 (e.g., a coil spring or the like) may be disposed within the cylindrical recess 94 beneath cylindrical rod 92, and optionally a second biasing device 98 (e.g., a coil spring or the like) may also be disposed within the cylindrical recess 94 beneath the first biasing device 96. The second biasing device 98 may have a greater spring (force) constant than the first biasing device 96.

As may be appreciated, the blade cartridge 22 may pivot about pivot axis PA in rotation direction R1 and R2 during use of shaving device 10 as the blade cartridge 22 follows the contour of the skin surface being shaved. During such time, the distal end (e.g., spherical distal end) of cylindrical rod 92 makes contact with a rear side 156 of the blade cartridge 22 (i.e., the surface of the blade cartridge 22 generally opposite of the surface being used to during shaving) to urge the blade cartridge 22 to pivot about the pivot axis PA. As explained herein, the blade cartridge 22 may optionally include razor blades 142 on both the front side 140 and rear side 156. In such a case, the distal end of rod 92 may be configured to contact the blade cartridge 22 in an area 163 other than where the razor blades 142 are located.

According to one embodiment (FIGS. 3 and 4), the rod 92 may contact the blade cartridge 22 at a location above the pivot axis PA, and the pivot biasing mechanism 90 may urge the blade cartridge 22 in the opposite direction (e.g., in the direction R2). Alternatively, the rod 92 may contact the blade cartridge 22 at a location below the pivot axis PA as generally illustrated in FIG. 5, and the pivot biasing mechanism 90 may urge the blade cartridge 22 in the direction R1. As such, depending on where the biasing rod 92 contacts the blade cartridge (i.e., above the pivot axis PA in FIGS. 3-4 or below the pivot axis PA in FIG. 5), the pivot biasing mechanism 90 may urge the blade cartridge 22 generally in direction R2 (in FIGS. 3-4) or direction R1 (in FIG. 5) and may generally inhibit rotation of the blade cartridge 22 in the opposite direction of (e.g., R1 in FIG. 3-4 or R2 in FIG. 5) beyond a certain/predetermined point (degree of rotation) once the spring(s) 96, 98 bottom out.

Additionally, as explained in greater detail herein, in at least one embodiment, blade cartridge 22 may be configured to rotate approximately 180 degrees or more about the pivot axis PA such that the user can select either the front or rear surfaces 140, 156 of the blade cartridge 22. For example, the blade cartridge 22 may include shaving (razor) blades on both the front side 140 and rear side 156 thereof (see, for example, FIG. 5 or 8). Alternatively (or in addition), the blade cartridge 22 may include shaving (razor) blades on the front side 140 and a minor on the rear side 156.

According to one embodiment, the pivot biasing mechanism 90 may optionally include an actuation button 100. The actuation button 100 may be coupled to the rod 92 and may be configured to retract the rod 92 generally in the direction opposite to arrow C (see, for example, FIGS. 3 and 5) and out of the path of the blade cartridge as the blade cartridge 22 is rotated approximately 180 degrees (or more) about the pivot axis PA as generally illustrated in FIG. 4. For example, the actuation button 100 may travel in a guide track 102 (FIGS. 6A and 6B) provided by an elongated slot formed in the handle 60. The user may urge the actuation button 100 in the direction generally opposite of arrow C to retract rod 92 with sufficient force to compress the biasing device(s) 96, 98, thereby allowing the cylindrical rod 92 to retract far enough (e.g., generally in the direction opposite of arrow C and generally away from the blade cartridge 22) such that blade cartridge 22 may be rotated approximately 180 degrees (or more) about the pivot axis PA, for example, in the direction generally opposite the biasing direction of the rod 92 (e.g., direction R1 in FIGS. 3-4 and direction R2 in FIG. 5) without contacting rod 92. It should be appreciated that while the pivot biasing mechanism 90 is illustrated on the exterior of the handle 60 in FIGS. 6A and 6B, portions of the pivot biasing mechanism 90 may be located within an interior region of the handle 60 as generally illustrated herein.

According to another embodiment, the disposable head assembly 20 may optionally include one or more blade cartridge rotation limiters 35 configured to generally limit the range of rotation of the blade cartridge 22 relative to the handle 60 and/or blade cartridge support member 24 while using either the front or rear side 140, 156. The blade cartridge rotation limiters 35 may be configured to generally inhibit the blade cartridge 22 from pivoting about pivot axis PA beyond a certain/predetermined point (degree of rotation) in rotation direction R2 (in FIGS. 3-4) or rotation direction R1 (in FIG. 5). As such, the blade cartridge rotation limiter 35 may be configured to generally prevent rotation beyond a predetermined point.

With reference to FIG. 3, one embodiment of a blade cartridge rotation limiter 35 consistent with the present disclosure is generally illustrated. The blade cartridge rotation limiter 35 may include a resilient, deformable stop member or pawl 36 configured to contact against an opposite side of the blade cartridge 22 being used. For example, the deformable pawl 36 may contact an edge region of the blade cartridge 22 at a location below the pivot axis PA once the blade cartridge 22 pivots about pivot axis PA in rotation direction R2 beyond a certain/predetermined point (degree of rotation). While the deformable pawl 36 is illustrated extending outwardly from the support hub 50 and contacting a portion of the blade cartridge 22, it should be appreciated that this arrangement may be reverse. For example, the deformable pawl 36 may also be configured to extend outwardly from the blade cartridge 22 to contact a portion of the support hub 50.

In order to rotate the blade cartridge 22 approximately 180 degrees or more about the pivot axis PA, the pin 92 may be retracted as generally illustrated in FIG. 4 and the blade cartridge 22 may be rotated in the direction R1. As the blade cartridge 22 is rotated in direction R1, the blade cartridge 22 will contact the pawl 36. The pawl 36 (which may be formed of a polymer composition, such as an elastomer, or sheet metal) will deform downward (e.g., generally towards the hub 50 and/or support arms 30 of support frame 26) to allow the blade cartridge 22 to continue to rotate in direction R1. Once the blade cartridge 22 is past the pawl/resilient deformable stop member 36, the stop member 36 will return to its initial position, and inhibit the blade cartridge 22 from rotating backwards in rotation direction R2. This resilient deformable stop member 36 permits the blade cartridge 22 to be rotated in one direction, but inhibits the blade cartridge 22 from rotating in the opposite direction. Again (as noted above), while the pawl 36 is illustrated as extending from the support frame 26, the pawl 36 may extend from the blade cartridge 22 and may similarly resiliently deform as the blade cartridge 22 is rotated about the pivot axis PA.

With reference again to FIGS. 5 and 7, another embodiment of a blade cartridge rotation limiter 35 consistent with the present disclosure is generally illustrated. The blade cartridge rotation limiter 35 may include a resilient, deformable stop member or pawl 36 configured to contact against one or more of a plurality of teeth 37. In the embodiment illustrated in FIGS. 5 and 7, the pawl 36 extends generally radially outwardly from the pivot pin 34 and the teeth 37 extending generally radially inward from the pivot receptacles 32; however, it should be appreciated that the arrangement of the pawl 36 and the teeth 37 may be switched and that the pawl 36 may extend generally radially inwardly from the pivot receptacles 32 and the teeth 37 extend generally radially outwardly from the pivot pin 34.

Figure 7:
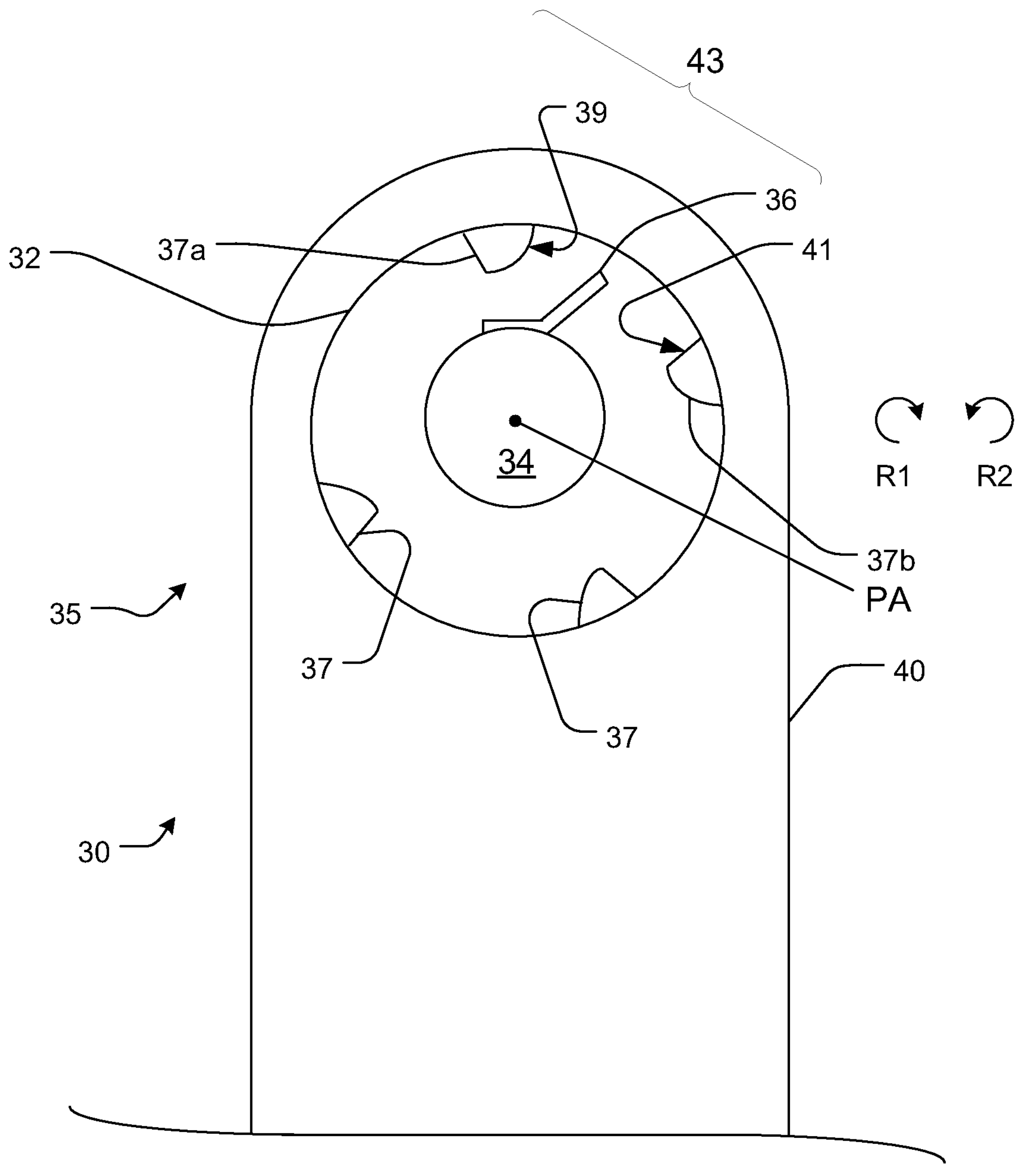
FIG. 7 shows one embodiment of a resistive pivot mechanism consistent with FIG. 5.

As best illustrated in FIG. 7, rotation of the pivot pin 34 in a first direction about the pivot axis PA (e.g., in direction R2 in the illustrated embodiment) may cause the pawl 36 to contact against a moderately sloped, tapered, curved, convex, concaved, and/or arcuate portion (e.g., first portion) 39 of a first tooth 37*a*, thereby causing the pawl 36 to resiliently deform out of the way of the first tooth 37*a* (e.g., deform generally radially inwardly in the illustrated embodiment) and allowing the pivot pin 34 to continue to rotate about the pivot axis PA in the first direction. Conversely, rotation of the pivot pin 34 in a second direction about the pivot axis PA (e.g., in direction R1 in the illustrated embodiment) may cause the pawl 36 to contact against a steeply sloped, upright, and/or generally vertical portion (e.g., second portion) 41 of a second tooth 37*b* (e.g., an adjacent tooth), thereby causing the pawl 36 to engage second portion 41 of the tooth 37*b* and generally preventing the pivot pin 34 from rotating about the pivot axis PA any further in the second direction beyond a predetermined point defined by the second tooth 37*b*. According to one embodiment, the pivot pin 34 may rotate about the pivot axis PA generally freely within a region 43 defined by two adjacent teeth (e.g., teeth 37*a*, 37*b*). The region 43 may also be considered to be a recess.

It should be appreciated that in any embodiment described herein, the spacing between the teeth may be larger and/or smaller than shown in the illustrations, which will permit a greater degree and/or smaller degree of rotation for the cartridge head.

The shaving razor 10 may optionally include a resistive pivot mechanism. The resistive pivot mechanism may be configured to allow the user to rotate the blade cartridge 22 about the pivot axis PA to select one of a plurality of sides/faces, and to allow the blade cartridge 22 to rotate within a predefined rotation range while at the selected blade/face position during normal use of the razor to conform to the user's skin contours. According to one embodiment, the resistive pivot mechanism may include a blade cartridge pivot biasing mechanism 90 (e.g., but not limited to, biasing pin 92) and/or a blade cartridge rotation limiter 35 (e.g., but not limited to, a pawl 36 and a plurality of teeth 37)). The biasing pin 92 may be configured to urge the blade cartridge 22 in the second direction (e.g., in the direction R1 in the illustrated embodiment) such that the pawl 36 contacts against the generally vertical portion 41 of the tooth 37*b*, thereby limiting the rotation of the blade cartridge 22 in the second direction (e.g., R1). The bias pin 92 may also generally prevent the blade cartridge 22 from rotating about the pivot axis PA beyond a predetermined point in the first direction (e.g., direction R2) unless the bias pin 92 is moved out of the way of the blade cartridge 22 as described herein.

With reference to FIGS. 5 and 7, a shaving force Fsu may be applied in the first direction (e.g., R2) by the user, which causes the blade cartridge 22 (and therefore the pivot pin/cylinder 34) to rotate in the first direction (e.g., R2) against the spring force of the biasing pin 92, and causing the pawl 36 to move away from the generally vertical portion 41 of the tooth 37*b*. Once force Fsu is reduced/removed, the force of the biasing pin 92 (e.g., resistive force Fres) causes the pivot pin/cylinder 34 to move back towards the initial starting position (e.g., wherein the pawl 36 is abutting against/contacting the generally vertical portion 41 of the tooth 37*b*).

To rotate the blade cartridge 22 to select a different face (e.g., either face 140 or face 156), the user may retract the bias pin 92 out of the path of the blade cartridge 22 as described herein, and may then rotate the blade cartridge 22 in the first direction (e.g., direction R2), thereby causing the pawl 36 to resiliently deform out of the way of the tooth 37*a* and allowing the pivot pin 34 to continue to rotate about the pivot axis PA in the first direction (e.g., R2). Once the user releases the biasing pin 92, the biasing pin 92 urges the blade cartridge 22 in the second direction (e.g., R1) until the pawl 36 contacts the generally vertical portion 41 of a tooth 37. As such, the rotation of the blade cartridge 22 about the pivot axis PA is generally limited to the region between the two teeth 37 adjacent to the pawl 36.

Again, it should be appreciated that the arrangement of the pawl 36 and teeth 37 with respect to the pivot pin 34 and the receptacle 32 may be switched, and as a result, the arrangement of the teeth 37 (i.e., the orientation of the first and second portions 39, 41) as well as the slope of the pawl 36 may be switched. Additionally, the arrangement of the teeth 37 (i.e., the orientation of the first and second portions 39, 41) as well as the slope of the pawl 36 may be switched depending on which direction (e.g., R1 or R2) the bias pin 92 is configured to urge the blade cartridge 22. For example, in the embodiment illustrated in FIGS. 5 and 7, the bias pin 92 is configured to urge the blade cartridge 22 in the second direction (e.g., direction R1). However, in other embodiments described herein (see, for example, FIGS. 3 and 8), the bias pin 92 is configured to urge the blade cartridge 22 in first direction (e.g., direction R2) and the orientation of the first and second portions 39, 41 of the teeth 37 as well as the slope of the pawl 36 may be switched from that shown in FIGS. 5 and 7.

Figure 8:
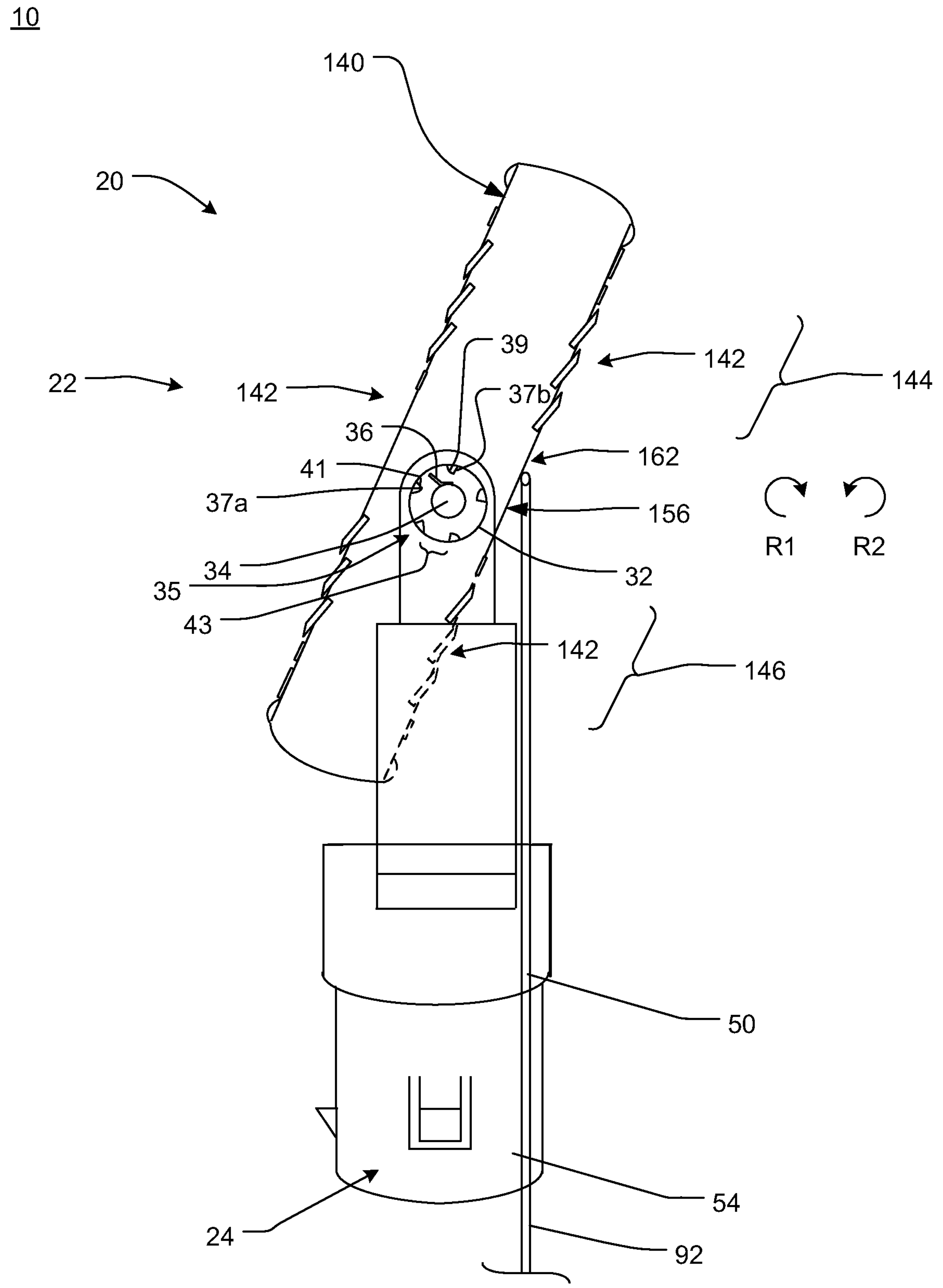
FIG. 8 shows another embodiment of a resistive pivot mechanism.

For example, with reference to FIG. 8, rotation of the pivot pin 34 in a first direction about the pivot axis PA (e.g., in direction R2 in the illustrated embodiment) may cause the pawl 36 to contact against a steeply sloped, upright, and/or generally vertical portion (e.g., second portion) 41 of a first tooth 37*a*, thereby causing the pawl 36 to engage second portion 41 of the first tooth 37*a* and generally preventing the pivot pin 34 from rotating about the pivot axis PA any further in the first direction (e.g., R2) beyond a predetermined point defined by the first tooth 37*a*. Conversely, rotation of the pivot pin 34 in a second direction about the pivot axis PA (e.g., in direction R1 in the illustrated embodiment) may cause the pawl 36 to contact against a moderately sloped, tapered, curved, convex, concaved, and/or arcuate portion (e.g., first portion) 39 of a second tooth 37*b* (e.g., an adjacent tooth), thereby causing the pawl 36 to resiliently deform out of the way of the second tooth 37*b* (e.g., deform generally radially inwardly in the illustrated embodiment) and allowing the pivot pin 34 to continue to rotate about the pivot axis PA in the second direction. According to one embodiment, the pivot pin 34 may rotate about the pivot axis PA generally freely within a region 43 defined by two adjacent teeth (e.g., teeth 37*a*, 37*b*).

The bias pin 92 may be configured to urge the blade cartridge 22 in the first direction (e.g., in the direction R2 in the illustrated embodiment) such that the pawl 36 contacts against the generally vertical portion 41 of the tooth 37*a*, thereby limiting the rotation of the blade cartridge 22 in the first direction (e.g., R2). The bias pin 92 may also generally prevent the blade cartridge 22 from rotating about the pivot axis PA beyond a predetermined point in the second direction (e.g., direction R1) unless the bias pin 92 is moved out of the way of the blade cartridge 22 as described herein.

During use of the razor 10, a shaving force Fsu may be applied in the second direction (e.g., R1) by the user, which causes the blade cartridge 22 (and therefore the pivot pin/cylinder 34) to rotate in the second direction (e.g., R1) against the spring force of the biasing pin 92, and causing the pawl 36 to move away from the generally vertical portion 41 of the tooth 37*a*. Once force Fsu is reduced/removed, the force of the biasing pin 92 (e.g., resistive force Fres of the biasing pin 92) causes the pivot pin/cylinder 34 to move back towards the initial starting position (e.g., wherein the pawl 36 is abutting against/contacting the generally vertical portion 41 of the tooth 37*a*).

To rotate the blade cartridge 22 to select a different face (e.g., either face 140 or face 156), the user may retract the bias pin 92 out of the path of the blade cartridge 22 as described herein (see, for example, FIG. 4), and may then rotate the blade cartridge 22 (FIG. 8) in the second direction (e.g., direction R1), thereby causing the pawl 36 to resiliently deform out of the way of the tooth 37*b* and allowing the pivot pin 34 to continue to rotate about the pivot axis PA in the second direction (e.g., R1). Once the user releases the biasing pin 92, the biasing pin 92 urges the blade cartridge 22 in the first direction (e.g., R2) until the pawl 36 contacts the generally vertical portion 41 of a tooth 37. As such, the rotation of the blade cartridge 22 about the pivot axis PA is generally limited to the region between the two teeth 37 adjacent to the pawl 36.

Figure 9:
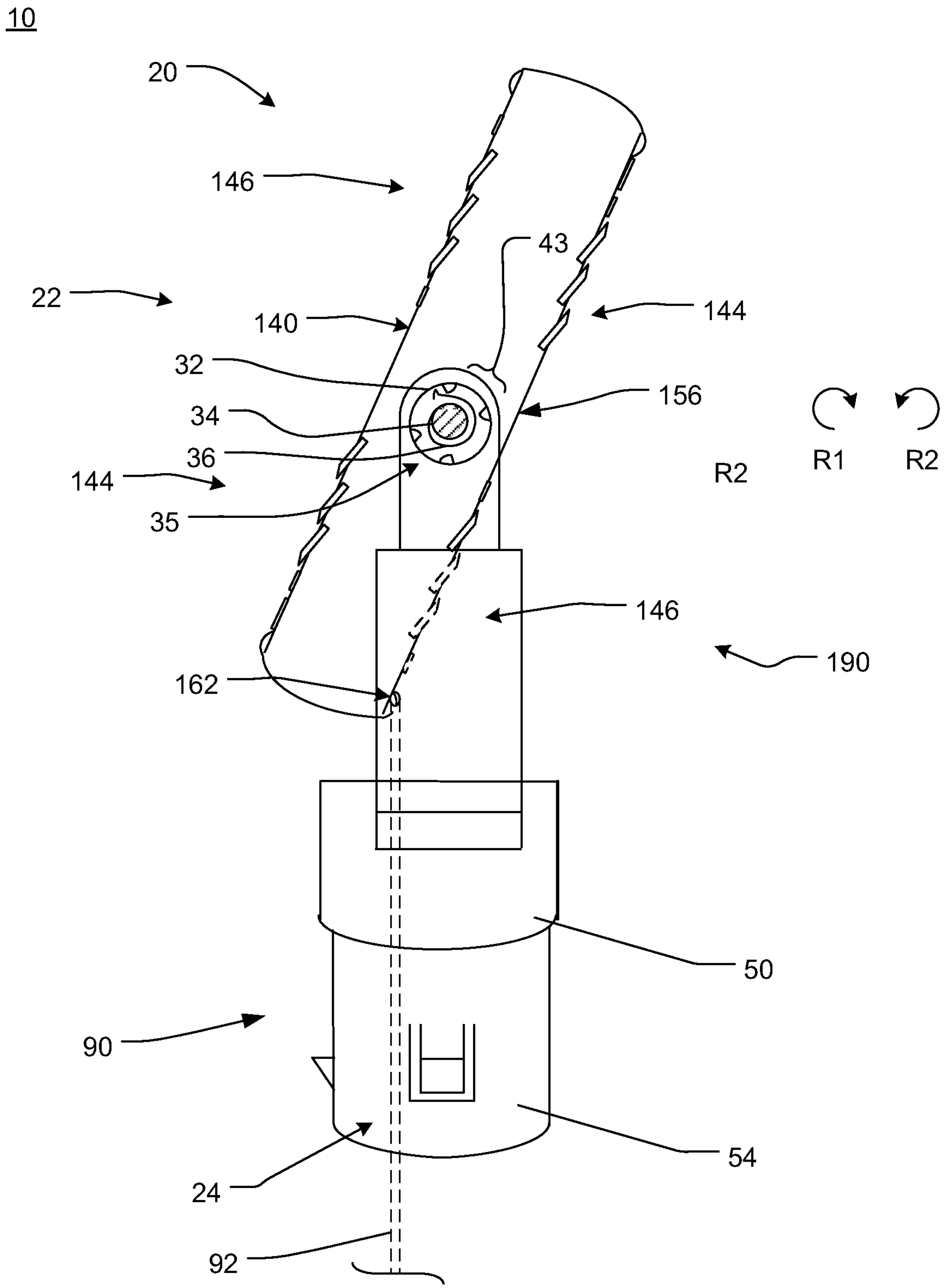
FIG. 9 shows yet another embodiment of a resistive pivot mechanism.
Figure 10:
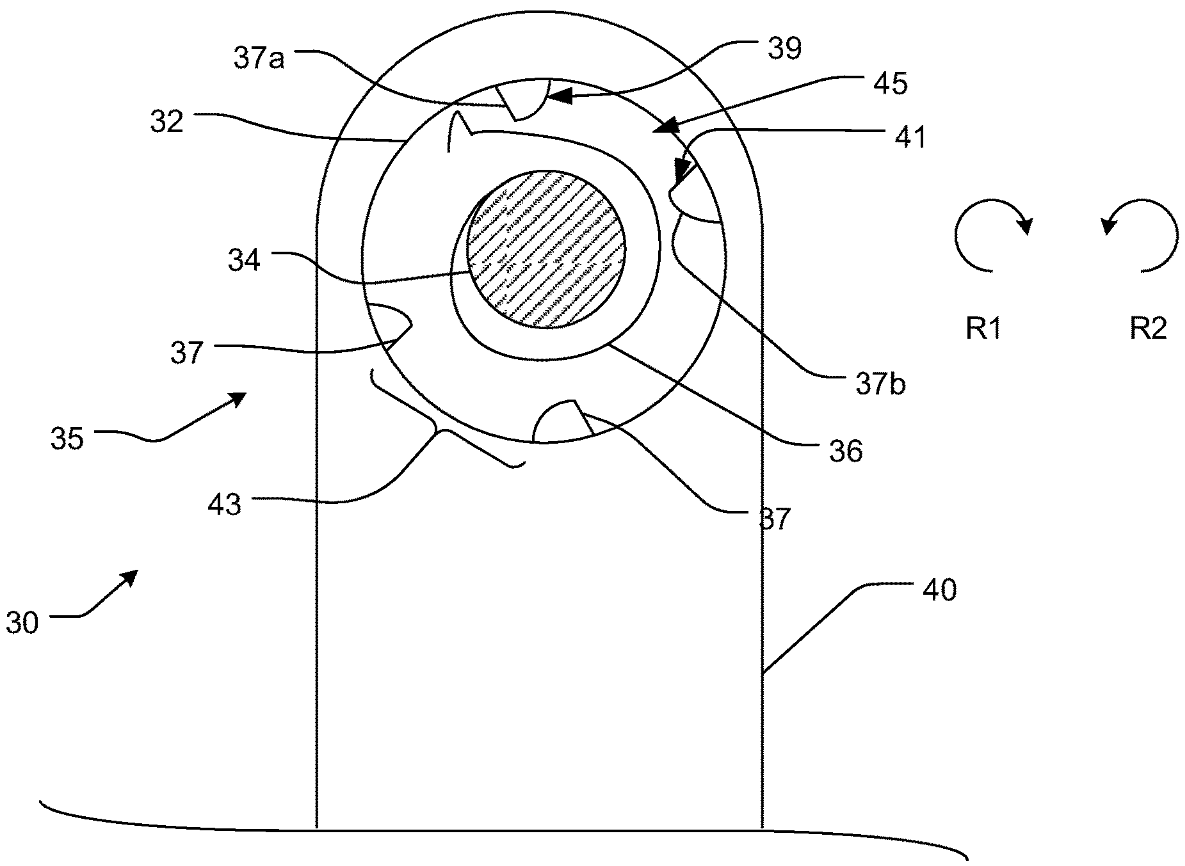
FIG. 10 shows another view of the resistive pivot mechanism consistent with FIG. 9.

Turning now to FIGS. 9 and 10, another embodiment of a resistive pivot mechanism is generally illustrated. The resistive pivot mechanism may include a blade cartridge pivot biasing mechanism 90 (e.g., but not limited to, biasing pin 92) and/or a blade cartridge rotation limiter 35 (e.g., but not limited to, a pawl/coiled pawl 36 and a plurality of teeth 37). In the illustrated embodiment, the resiliently deformable, coiled pawl 36 extends generally radially outward from the pivot pin 34 and the receptacle 32 includes a plurality of teeth 37 extending generally radially inward towards the pivot pin 34. It should be appreciated, however, that the arrangement of the coiled pawl 36 and the teeth 37 vis-à-vis the pivot pin 34 and the receptacle 32 may be switched, and that the coiled pawl 36 may extend generally radially inward from the receptacle 32 and the teeth 37 may extend generally radially outward from the pivot pin 34.

The biasing pin 92 may be configured to urge the blade cartridge 22 in the second direction (e.g., in the direction R1 in the illustrated embodiment) such that the distal end of the pawl 36 contacts against the generally vertical portion 41 of the tooth 37*a* (FIG. 10), thereby limiting the rotation of the blade cartridge 22 in the second direction (e.g., R1). The bias pin 92 may also generally prevent the blade cartridge 22 from rotating about the pivot axis PA beyond a predetermined point in the first direction (e.g., direction R2) unless the bias pin 92 is moved out of the way of the blade cartridge 22 as described herein.

During use of the razor 10, a shaving force Fsu may be applied in the second direction (e.g., R1) by the user, which causes the blade cartridge 22 (and therefore the pivot pin/cylinder 34) to rotate in the second direction (e.g., R1) against the spring force of the coiled pawl 36. Once force Fsu is reduced/removed, the force of the coiled pawl 36 (e.g., resistive coil force Fres) causes the pivot pin/cylinder 34 to move back towards the initial starting position (e.g., wherein the force of the biasing pin 92 and the coil pawl 36 are substantially equal).

The user may also apply a shaving force Fsu in the first direction (e.g., R2) causing the blade cartridge 22 (and therefore the pivot pin/cylinder 34) to rotate in the first direction (e.g., R2) against the spring force of the biasing pin 92, and optionally causing the pawl 36 to move away from the generally vertical portion 41 of the tooth 37*a*. Once force Fsu is reduced/removed, the force of the biasing pin 92 (e.g., resistive force Fres) causes the pivot pin/cylinder 34 to move back towards the initial starting position (e.g., wherein the force of the biasing pin 92 and the coil pawl 36 are substantially equal).

To rotate the blade cartridge 22 to select a different face (e.g., either face 140 or face 156), the user may retract the bias pin 92 out of the path of the blade cartridge 22 as described herein (see, for example, FIG. 4), and may then rotate the blade cartridge 22 in the second direction (e.g., direction R1), thereby causing the coiled pawl 36 to resiliently deform out of the way of the tooth 37*a* and allowing the pivot pin 34 to continue to rotate about the pivot axis PA in the second direction (e.g., R1). Once the user releases the biasing pin 92, the biasing pin 92 urges the blade cartridge 22 in the second direction (e.g., R1) until the distal end of the coiled pawl 36 contacts the generally vertical portion 41 of a tooth 37. As such, the rotation of the blade cartridge 22 about the pivot axis PA is generally limited to the region (i.e., controlled by the position) between the two teeth 37 adjacent to the pawl 36.

While the biasing pin 92 and the coil pawl 36 are illustrated in FIGS. 9 and 10 as urging the blade cartridge 22 in directions R1 and R2, respectively, it should be appreciated that the biasing pin may be configured to urge the blade cartridge 22 in direction R2 and the coil pawl 36 may be configured to urge the blade cartridge 22 in direction R1), and the orientation of the teeth 37 may also be switched. One of ordinary skill in the art would understand such modification in view of the present disclosure.

Figure 11:
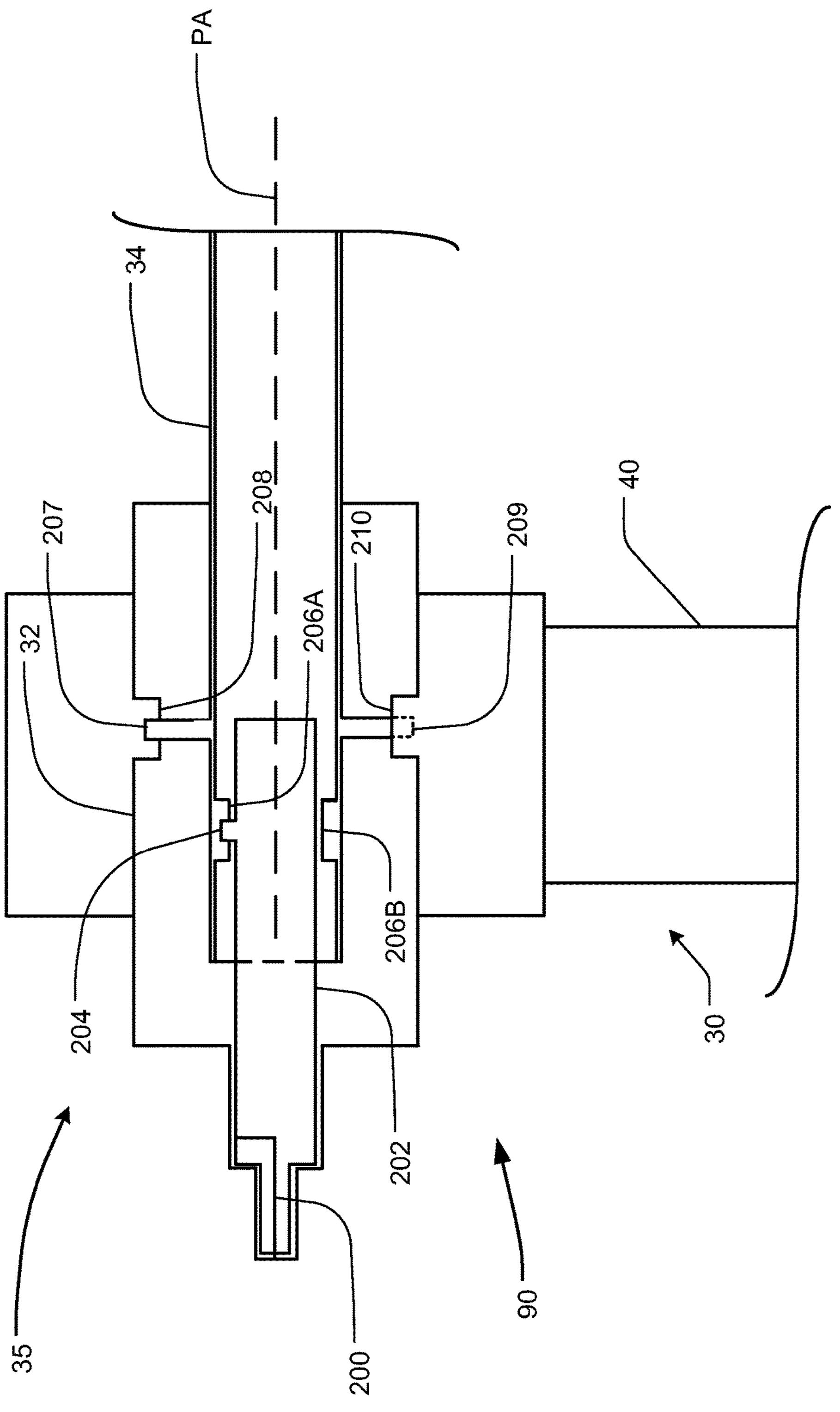
FIG. 11 shows another embodiment of a resistive pivot mechanism consistent with the present disclosure.
Figure 12:
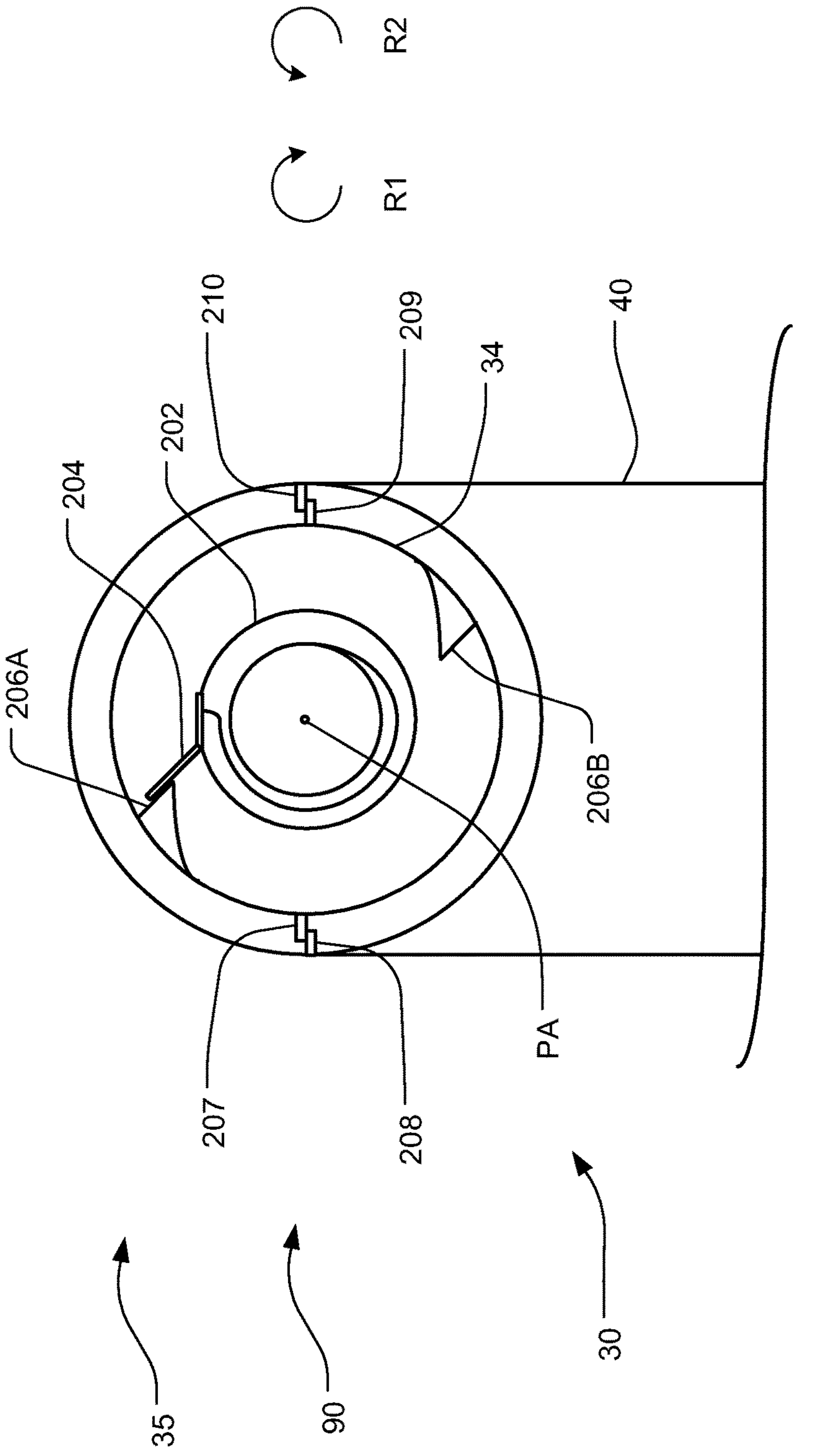
FIG. 12 shows another view of the resistive pivot mechanism consistent with FIG. 11.

Turning now to FIGS. 11 and 12, yet another embodiment of a resistive pivot mechanism is generally illustrated. The resistive pivot mechanism may include a blade cartridge pivot biasing mechanism 90 and a blade cartridge rotation limiter 35. As noted herein, the resistive pivot mechanism is configured to allow the user to rotate the blade cartridge 22 (only the pivot pin/cylinder 34 is shown for clarity) about the pivot axis PA to select one of a plurality of sides/faces, and to allow the blade cartridge 22 to rotate within a predefined rotation range while at the selected blade/face position during normal use of the razor to conform to the user's skin contours.

In the illustrated embodiment, the blade cartridge pivot biasing mechanisms 90 and blade cartridge rotation limiter 35 may include a biasing device 200 (e.g., but not limited to, a torsion spring or the like) having a first end coupled to the arm 30 and a second end configured to urge a biased pivot cylinder 202 in a first direction (e.g., rotation direction R2) about the pivot axis PA. The biased pivot cylinder 202 includes a pawl 204. The pawl or resilient pawl 204 may extend generally radially outward from the biased pivot cylinder 202. The biasing device 200 may urge the biased pivot cylinder 202 in the first direction (e.g., R2) such that the pawl 204 of the biased pivot cylinder 202 engages a first tooth 206A (which may be configured to extend generally radially inward from the pivot pin/cylinder 34), thereby urging the pivot pin/cylinder 34 in the first direction (e.g., R2) and causing one or more pivot cylinder stop members 207, 209 (which may be configured to extend generally radially outward from the pivot pin/cylinder 34) to engage one or more arm stop members 208, 210, respectively, of the arm 30. The engagement of the pivot cylinder stop members 207, 209 with the arm stop members 208, 210 generally limits the rotation of the pivot pin/cylinder 34 (and therefore the blade cartridge 22) in the first direction (e.g., R2) while the blade cartridge 22 is set at a first blade face position (e.g., a position of the blade cartridge 22 with respect to the handle 60 corresponding to a first face of the blade cartridge 22 operable to be used by a user of the razor 10). For example, the engagement of the pivot cylinder stop members 207, 209 with the arm stop members 208, 210 generally sets the initial starting position of the blade cartridge 22 while set at the first blade position.

During use of the razor 10, the shaving force Fsu is applied in a second direction (e.g., R1) by the user, which causes the blade cartridge 22 (and therefore the pivot pin/cylinder 34) to rotate in the second direction (e.g., R1) against the spring force of the biasing device 200, and causing the pivot cylinder stop members 207, 209 to move away from the arm stop member 208, 210, respectively. Once force Fsu is reduced/removed, the force of the biasing device 200 (e.g., resistive force Fres) causes the pivot pin/cylinder 34 to move back towards the initial starting position (as illustrated FIG. 11).

To rotate the blade cartridge 22 to another blade face position (e.g., a second or third blade face position corresponding to one of the other faces of the blade cartridge 22), the user applies a rotating force Fr to the blade cartridge 22 in the first direction (e.g., R2), thereby causing the pivot cylinder stop members 207, 209 to deform over arm stop members 208, 210, respectively, until the pivot cylinder stop members 207, 209 come into contact again with arm stop members 208, 210, respectively. Additionally, the rotating force Fr causes biased pivot cylinder 202 to rotate slightly about the pivot axis PA until the pawl 204 deforms over tooth 206B and the pawl 204 comes into contact with the generally vertical/straight portion of tooth 206B. The blade cartridge 22 may therefore be rotated approximately 180 degrees such that the opposite face of the blade cartridge 22 may be utilized by the user.

It should be appreciated that while FIGS. 11-12 illustrate a resistive pivot mechanism configured to allow the user to select between two faces of the blade cartridge 22, the resistive pivot mechanism may be configured to allow the user to select between more than two faces of the blade cartridge 22. In particular, the support arm 30 may include stop members 208, 210 spaced apart such that the pivot cylinder stop members 207, 209 may contact one or more of the arm stop members 208, 210 at positions corresponding to a first, second, and at least third initial starting position. The first, second, and at least a third initial starting positions correspond, respectively, to a first, second, and at least a third face of the blade cartridge 22. Additionally (or alternatively), it should be appreciated that the rotating force Fr may cause the arm stop members 208, 210 to deform over the pivot cylinder stop members 207, 209, respectively, until the pivot cylinder stop members 207, 209 come into contact again with arm stop members 208, 210, respectively. As such, either the arm stop members 208, 210 and/or the pivot cylinder stop members 207, 209 may be resiliently deformable. Moreover, it should be appreciated that the pivot pin/cylinder 34 and/or the biased pivot cylinder 202 may include bearing surfaces (not shown for clarity) configured to align the pivot pin/cylinder 34 and/or the biased pivot cylinder 202 with respect to each other and/or the receptacle in the support arm 30.

Figure 13:
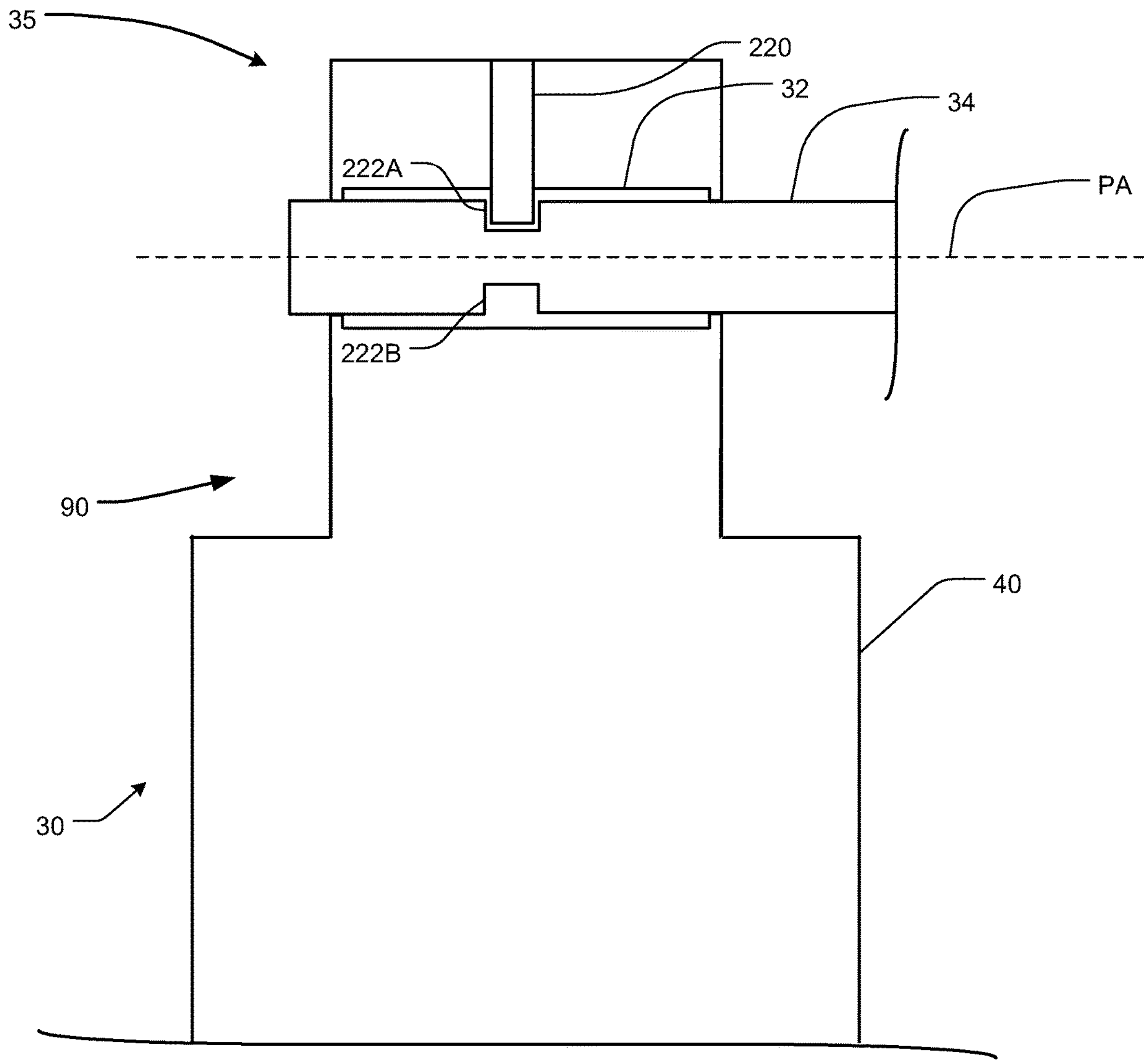
FIG. 13 shows yet another embodiment of a resistive pivot mechanism consistent with the present disclosure.
Figure 14:
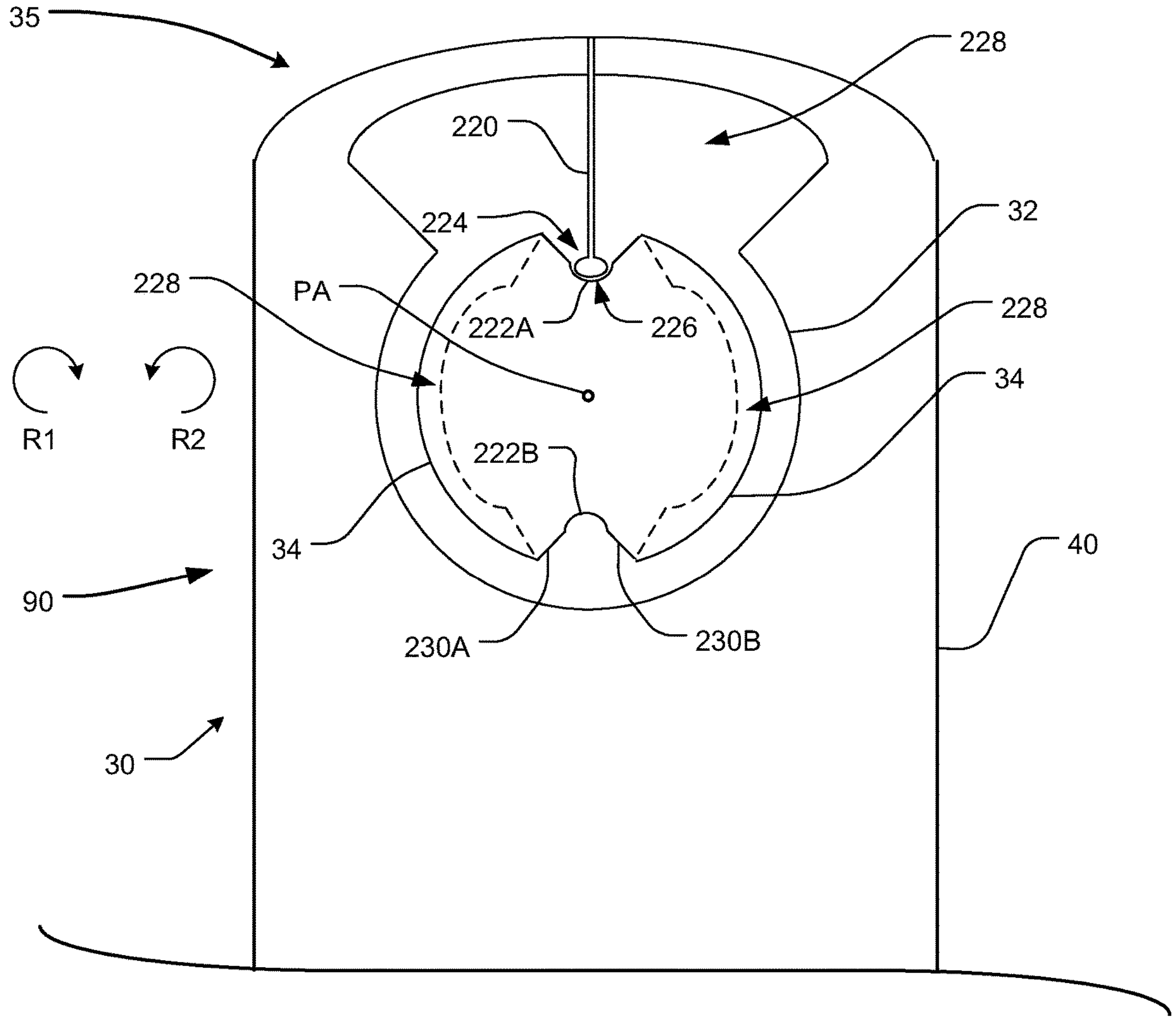

With reference to FIGS. 13 and 14, a further embodiment of a resistive pivot mechanism is generally illustrated. The resistive pivot mechanism allows the user to rotate the blade cartridge 22 (only the pivot pin/cylinder 34 is shown for clarity) about the pivot axis PA to select one of a plurality of sides/faces, and that allows the blade cartridge 22 to rotate within a predefined rotation range while at the selected blade/face position during normal use of the razor to conform to the user's skin contours.

The resistive pivot mechanism may include at least one pawl or resilient pawl 220 configured to extend generally radially inward from the receptacle 32 of the arm 30. The pivot pin/cylinder 34 may include a plurality of recesses 222 configured to receive a distal end 224 of the pawl 220. According to one embodiment, the distal end 224 of the pawl 220 may have a shape generally corresponding to a portion of the recess 222A to aid in retaining the pawl 220 relative to the recess 222A. For example, the distal end 224 may have a generally spherical shape while the recess 222A may include a portion 226 having a generally hemispherical shape having a diameter approximately equal to the distal end 224. The location of the recesses 222 may each correspond to one of the plurality of faces of the blade cartridge 22. Thus, while only two recesses 222A, 222B are shown, it may be appreciated that the pivot pin/cylinder 34 may include three or more recesses 222 corresponding to three or more faces of the blade cartridge 20.

It should be appreciated that in any embodiment described herein, the length of the pawl and/or the depth and/or width of the recess may be larger and/or smaller than shown in the illustrations, which will permit a greater degree and/or smaller degree of rotation for the cartridge head within the pre-determined rotation range.

As may be appreciated, the length and flexibility/rigidity of the pawl, in combination with the design of the recesses, may determine the degree of rotation of the blade cartridge (e.g., the predefined rotation range) relative to the initial starting position corresponding to the selected face.

With reference to FIG. 15, a variation of the resistive pivot mechanism of FIGS. 13 and 14 is generally illustrated. The resistive pivot mechanism of FIG. 15 is similar to that of FIGS. 13 and 14; however, the pawl 220 is configured to extend generally radially outward from the pivot pin/cylinder 34, and is configured to engage a selected one of a plurality of recesses 222 formed in the arm 30.

In practice (FIGS. 13-15), the user may rotate the blade cartridge 22 (and thus the pivot pin/cylinder 34) such that the desired face of the blade cartridge 22 is in the appropriate position relative to the handle 60. Once in the directed position, the distal end 224 of the pawl 220 may be received in the recess 222A (e.g., but not limited to, the retaining portion 226). This arrangement may be defined as the initial starting position. As a shaving force Fsu is applied to the blade cartridge 20 (and thus the pivot pin/cylinder 34), the pawl 220 applies a resistive force Fres against the blade cartridge 22 urging the blade cartridge 22 in the opposite direction of the shaving force Fsu, and generally towards the initial starting position. Thus, the blade cartridge 22 may rotate about the pivot axis PA within a range relative to the initial starting position.

The number of degrees that the blade cartridge 22 may rotate about the pivot axis PA relative to the initial starting position may depend on the intended use. For example, the blade cartridge 22 may rotate within a range of approximately 5 degrees to approximately 90 degrees about the pivot axis PA relative to the initial starting position, and any range therein. According to another embodiment, the blade cartridge 22 may rotate within a range of approximately 5 degrees to 60 degrees about the pivot axis PA relative to the initial starting position, and any range therein. According to yet another embodiment, the blade cartridge 22 may rotate within a range of approximately 5 degrees to approximately 25 degrees about the pivot axis PA relative to the initial starting position, and any range therein. According to yet a further embodiment, the blade cartridge 22 may rotate within a range of approximately 5 degrees to approximately 15 degrees about the pivot axis PA relative to the initial starting position, and any range therein.

To rotate the blade cartridge 22 to another blade face position (e.g., a second or third blade face position corresponding to one of the other faces of the blade cartridge 22), the user applies a rotating force Fr to the blade cartridge 22 in a first direction (e.g., R1 or R2), thereby causing the pivot pin/cylinder 34 (FIGS. 13-15) to rotate in the first direction (e.g., R1 or R2) until the pawl 220 resilient deforms out of the initial recess 222A. The pivot pin/cylinder 34 and/or arm 30 may optionally include one or more grooves, slots, cavities, or the like 228 (FIGS. 14 and 15) that the pawl 220 may move into as the pivot pin/cylinder 34 is rotated about the pivot axis PA. The user continues to rotate the blade cartridge 22 until the face of the blade cartridge 22 is in the desired location relative to the handle 60. Once in the desired location, the pawl 220 (e.g., the distal end 224 of the pawl 220) will be received in the corresponding recess 222B.

As may be appreciated, one or more of the recesses 222 (FIGS. 13-15) may have a generally concaved configuration. More specifically, the sides 230A, 230B of the recess 222 may slope or taper generally downwardly and/or inwardly towards the pivot axis PA, thereby providing a smoother transition as the pawl 220 enters the recess 222. Alternatively, while not shown, one or more of the recesses 222 (FIGS. 13-15) may have generally vertical, upright, and/or convex configuration, thereby increasing the amount of force needed to deform the pawl 220 out of the recess 222. This configuration may allow pawl 220 to be less rigid, while ensuring that the pawl 220 remains located within the recess 222.

Turning now to FIG. 16A, another embodiment of the resistive pivot mechanism is generally illustrated. The resistive pivot mechanism may be similar to that of FIGS. 13 and 14, however, one or more of the recesses 222 (which are formed in the pivot pin/cylinder 34) may include one or more resiliently deformable flaps 250 and the resilient pawl 220 may optionally include a spring 254. FIG. 16B is similar to FIG. 16A, but the pawl 220 includes a spring 254 extending from the receptacle 32 of the arm 30 and terminating at the distal end 224. The distal end 224 of the pawl 220 may have a shape generally corresponding to a portion of the recess 222A to aid in retaining the pawl 220 relative to the recess 222A. For example, the distal end 224 may have a generally spherical and/or oval shape while the recess 222A may include a portion 226 having a generally hemispherical and/or oval shape having a diameter approximately equal to the distal end 224. FIGS. 17A and 17B are similar to FIGS. 16A and 16B, respectively, but are based on the resistive pivot mechanism of FIG. 15 in which the recesses 222 are formed in the support arm 30 and the resilient pawl 220 extends from the pivot pin/cylinder 34.

With reference to FIGS. 16A-17B, the resiliently deformable flaps 250 extend across at least a portion of the opening of the recesses 222. For example, the resiliently deformable flaps 250 may extend from a portion of the recesses 222 and/or area surrounding the recesses 222. The first and second resiliently deformable flaps 250*a*, 250*b* may extend partially across the opening of a recess 222, and may define a deformable opening 252. The resiliently deformable flaps 250*a*, 250*b* may be configured to resiliently deform such that the distal end 224 of the pawl 220 can pass through the deformable opening 252 and be at least partially received in the recess 222. The resiliently deformable flaps 250 may aid in retaining the distal end 224 of the pawl 220 in the recesses 222.

According to one embodiment, at least a portion of the shaft of the resilient pawl 220 may optionally include a spring such as, but not limited to, a torsion spring, coil spring, or the like 254. The spring 254 may be configured to engage the recess 222 and/or the resiliently deformable flaps 250, and may allow the predefined rotation range within which the blade cartridge 22 rotates to be increased. Upon application of sufficient rotational force.

For example, the resiliently deformable flaps 250 may aid in retaining the distal end 224 of the resilient pawl 220, which in turn may engage the spring 254. Upon application of sufficient rotating force Fr to the blade cartridge 22 by the user, the spring 254 may be "maxed out" and will pull the resilient pawl 220 through the resiliently deformable flaps 250, and the blade cartridge 22 can be rotated to select a new face as described herein.

With reference now to FIGS. 18-20, yet a further embodiment of resistive pivot mechanism is generally illustrated. In particular, FIG. 18 generally illustrates one embodiment of a disposable head assembly 20 consistent with at least one embodiment of the present disclosure, FIG. 19 is a cross-section taken along lines 19-19 of FIG. 18, and FIG. 20 is a cross-section taken along lines 20-20 of FIG. 19. It should be appreciated that the disposable head assembly 20 shown in FIG. 18 is provided for illustrative purposes only, and that the resistive pivot mechanism may be used with any razor 10 and/or disposable head assembly 20 described herein.

With reference to FIGS. 19 and 20, the resistive pivot mechanism may be similar to that of FIGS. 13-17B, however, one or more recesses 322 are formed in blade cartridge 22 and one or more resiliently deformable pawl 320 are formed in a portion of the arm 30 that is recessed (e.g., countersunk) into a portion (e.g., a cavity or recess) 310 of the blade cartridge 22. As described herein, the pawl 320 may include any pawl configuration described herein. The recesses 322 (which may be formed within the cavity 310) may include any recess configuration described herein and may be arranged to generally correspond to one or more of the faces (e.g., 140, 156, etc.) of the blade cartridge 22. The pawl 320 may be engaged within the recesses 322 to allow the blade cartridge 22 to move within the predefined rotation range. For example, the pawl 320 may bend within the recess 322. Alternatively (or in addition), the pawl 320 may move within the recess 322, the size of the recess 322 may define (at least in part) the predefined rotation range. FIGS. 21 and 22 are similar to FIGS. 19 and 20, but the pawl(s) 320 extend from a portion (e.g., a cavity or recess) 310 of the blade cartridge 22 and the recess(es) 322 are formed in a portion of cavity 310 of the blade cartridge 22.

Turning now to FIGS. 23 and 24, yet a further embodiment of a resistive pivot mechanism is generally illustrated. The resistive pivot mechanism may include one or more pawls 420 and recesses 422 as generally described herein. For example, one or more pawls 420 may extend from the arm 30 and one or more recesses 422 may be formed in a portion of cavity 410 of the blade cartridge 22 as generally illustrated in FIG. 23. Alternatively (or in addition), one or more pawls 420 may extend from a portion of cavity 410 of the blade cartridge 22 and one or more recesses 422 may be formed in a portion of the arm 30 as generally illustrated in FIG. 24. It may be appreciated, however, one or more of the pawls 420 and/or recesses 422 may be located anywhere on the blade cartridge 22 and/or the pivot arm 34 as described herein.

The resistive pivot mechanism may also include one or more ballast devices 450 configured to move within at least a portion of the blade cartridge 22. For example, the ballast device 450 may be configured to slide within one or more passageways 452 defined within the blade cartridge 22. The passageways 452 may extend generally perpendicularly to the pivot arms 34. The ballast devices 450 may be configured to urge the blade cartridge 22 generally towards the initial starting position as generally illustrated. The active face of the blade cartridge 22 (i.e., the face being used by user, for example, to shave) may be arranged at an initial starting position which is generally at an angle I of approximately 10 to 30 degrees with respect to the longitudinal axis L of the handle 60.

For example, the weight of the ballast devices 450 may urge the blade cartridge 22 generally in the direction of arrow K until the pawl 420 engages against a portion of the recess 422 as generally illustrated in FIGS. 23 and 24. The blade cartridge 22 may be moved in the direction generally opposite of arrow K within the recesses 422, and the ballast device 450 will urge the blade cartridge 22 generally towards the initial starting position.

To rotate the blade cartridge 22 to another face, the user rotates the blade cartridge 22 relative to the handle 60 until the pawl 420 engages another recesses 422 as generally described herein. Once the angle I of the blade cartridge 22 exceeds 90 degrees relative to the handle 60, the ballast devices 450 may slide to the other side of the blade cartridge 22. The ballast device 450 is therefore ready to urge the blade cartridge 22 generally towards the new initial starting position.

It should be appreciated that while one ballast device 450 is illustrated, the resistive pivot mechanism may include a plurality of ballast devices 450. Additionally, while a single ballast device 450 is shown in a passageway 452, it should be appreciated that a plurality of ballast devices 450 may be disposed within one or more passageways 452. Moreover, while the resistive pivot mechanism is generally illustrated having a pawl and a recess, it should be appreciated that the recess may be defined by one or more teeth or one or more resiliently deformable pawls.

Turning now to FIGS. 25-27, another embodiment of the razor 10 having a hinge 74 is generally illustrated. While the razor 10 of FIGS. 25-27 may be used with any blade cartridge known to those skilled in the art, the razor 10 of FIGS. 25-27 may be particularly useful with a blade cartridge 22 having at least one face 140 with at least one razor 142 aligned to cut in a first shaving direction D1 and at least one razor 142 aligned to cut in a second shaving direction D2 (e.g., but not limited to, the blade cartridge 22 as generally illustrated in FIG. 37).

With reference to FIG. 25, a side view of the razor 10 is shown. The handle 60 includes a first (proximal) shaft portion 75 coupled to a second (distal) shaft portion 77 by way of one or more hinges 74. The hinge 74 may include any hinge mechanism known to those skilled in the art, and may include, for example, a locking mechanism (e.g., but not limited to, a locking pawl, ratchet mechanism, or the like) configured to allow the user to generally lock and/or fix the relative position of the first shaft portion 75 relative to the second shaft portion 77 (e.g., the head assembly 20 relative to the handle 60).

For example, the hinge 74 may be configured to allow the first shaft portion 75 to swing approximately 90 degrees generally along the direction of arc S from the position shown in FIG. 25 to the position shown in FIG. 26. It may be appreciated that the hinge 74 allows the first shaft portion 75 to swing in a direction (e.g., plane or axis) that is generally perpendicular to cutting edge axis CE of the cutting edge 151 of one or more of the razor blades 142 of the head assembly 20.

The handle 60 (e.g., the first shaft portion 75) and/or the support hub 50 may optionally include a swivel or pivot 177 configured to allow the user to manually swivel or rotate the blade cartridge 22 approximately 90 degrees in an axis that is generally parallel to the longitudinal axis Lh of the first shaft portion 75 and/or the support hub 50 such that the cutting edge axis CE of the cutting edge 151 of one or more of the razor blades 142 of the head assembly 20 is aligned generally parallel to the longitudinal axis L of the handle 60 as generally illustrated in FIG. 27. The swivel 177 may include any swivel or pivot mechanism known to those skilled in the art, and may include, for example, a locking mechanism (e.g., but not limited to, a locking pawl, ratchet mechanism, or the like) configured to allow the user to generally lock and/or fix the relative position of the blade cartridge 22 relative to the first shaft portion 75 and/or support hub 50.

A razor 10 having a hinge 74 and swivel 177 as described above (and optionally including, but not limited to, the blade cartridge as generally illustrated and described in FIG. 37 herein) may be particularly useful for shaving a user's head and/or body. In particular, having the cutting edge axis CE of the cutting edge 151 of one or more of the razor blades 142 of the head assembly 20 aligned generally parallel to the longitudinal axis L of the handle 60 as generally illustrated in FIG. 27 may facilitate shaving a user's head and/or body compared with having the cutting edge axis CE of the cutting edge 151 of the razor blades 142 aligned generally perpendicular to the longitudinal axis L of the handle 60 as generally illustrated in FIG. 25.

The blade cartridge 22 in FIGS. 25-27 may optionally include any resistive pivot mechanism described herein. While not a limitation of the present disclosure unless specifically claimed as such, the blade cartridge 22 may include any of the resistive pivot mechanisms and/or any combination of the resistive pivot mechanisms described herein. The resistive pivot mechanisms described herein that do not include a biasing pin 92 may be particularly suited for use with the hinge 74 and swivel 177. As such, the blade cartridge 22 may be located closer to the second shaft portion 77 when arranged in the position shown in FIG. 27.

Turning now to FIGS. 28 and 29, the shaving razor 10 may optionally include a blade cartridge centering mechanism 100. The blade cartridge centering mechanism 100 may be configured to generally align the blade cartridge 22 with respect to the support arms 30. For example, blade cartridge centering mechanism 100 may be configured to generally align the pivot pin 34 within the receptacle 32 as the pivot pin 34 rotates therein. According to one embodiment, the pivot pin 34 may include at least one bearing surface 102 configured to generally engage with a bearing surface 104 of the receptacle 32. The bearing surfaces 102, 104 may have outer and inner diameters such that rotation of the pivot pin 34 is generally concentric with the center of the receptacle 32. Additionally (or alternatively), the pivot pin 34 may include at least one shoulder region 106 configured to generally engage with a shoulder region 108 of the receptacle 32 to generally align the blade cartridge 22 along the pivot axis PA (e.g., left/right as generally illustrated).

Referring now to FIG. 30A, one embodiment of a blade cartridge 22 having at least a first shaving side 140 is generally illustrated. First shaving side 140 comprises at least one razor blade 142. As shown, first shaving side 140 may comprise a plurality of razor blades 142. More particularly, first shaving side 140 may comprise a first set 144 of one or more razor blades 142 and a second set 146 of one or more razor blades 142. In the illustrated embodiment, each set 144, 146 is shown having three razor blades 142, though it will be appreciated that this is not a limitation of the present disclosure unless specifically claimed as such, and that each set 144, 146 may independently have one or more blades. In the present embodiment, all the razor blades 142 of each set 144, 146 are arranged to cut hair in a first shaving stroke direction D1, and the sets 144, 146 may be separated by an intermediate skin lubricating strip 176. As described herein, the razor blades 142 in the sets 144, 146 may optionally be arranged to cut hair in different directions (e.g., one set 146 may be configured to cut hair in a first shaving stroke direction D1 and the other set 144 may be configured to cut hair in a second shaving stroke direction D2).

Blade cartridge 22 may include a continuous outer housing (frame) 188 around a periphery of the first shaving side razor blades 142, which may be formed of plastic or metal, such as stainless steel. The blade cartridge 22 (e.g., frame/housing 188) may include a front edge region 157, a rear/aft edge region 159, a first lateral edge region 161, and a second lateral edge region 163. As used herein, the terms "forward" and "aft" define the relative position between two or more things. A shaving aid "forward" of the razor blades 142, for example, is positioned so that the surface of the skin and/or hair to be shaved encounters the shaving aid before it encounters the razor blades 142, provided the shaving device 10/blade cartridge 22 is being stroked in its intended cutting direction, here direction D1. A shaving feature "aft" of the razor blades 142 is positioned so that the surface of the skin and/or hair to be shaved encounters the shaving aid after it encounters the razor blades 142, provided the shaving device 10/blade cartridge 22 is being stroked in its intended cutting direction, here direction D1. Additionally, the term "lateral" is used relative to the front and aft.

Blade cartridge 22 may optionally include one or more forward shaving aids 160 located in at least a portion of the front edge region 157 and/or one or more aft shaving aids 162 located in at least a portion of the rear/aft edge region 159. For example, a forward shaving aid 160 may be located in front of the razor blades 142 during a shaving stroke in direction D1 (e.g., in front of the first set 144 and/or second set 146) whereas an aft shaving aid 162 may be located behind the razor blades 142 during the shaving stroke in direction D1 (e.g., behind the second set 146 and/or the first set 144).

Blade cartridge 22 may also (or alternatively) include a first lateral (e.g. left) shaving aid 164 and a second lateral (e.g. right) shaving aid 166 located substantially adjacent to a first (e.g. left) longitudinal end 150 and an opposing second (e.g. right) longitudinal end 152 of the first shaving side razor blades 142, respectively, during the shaving stroke in direction D1.

As shown, forward shaving aid 160 may comprise at least one skin engaging strip 170 to provide frictional engagement with skin, particularly to be shaved by the first shaving side razor blades 142. Skin engaging strip 170 may comprise a plurality of flexible raised projections, particularly flexible elongated fins formed of a polymer composition, particularly that of an elastomer. Alternatively or in addition to the foregoing, forward shaving aid 160 may comprise at least one skin lubricating strip 172 to lubricate skin, particularly to be shaved by the first shaving side razor blades 142.

Alternatively or in addition to the foregoing, aft shaving aid 162 may also comprise at least one skin lubricating and/or moisturizing strip 174 to lubricate skin, particularly after being shaved by the first shaving side razor blades 142. Lubricating and/or moisturizing strip 174, as well as lubricating and/or moisturizing strips 172 and 176 may comprise at least one of a lubricant, a conditioner, a moisturizer, a soap, and a gel. As noted herein, the lubricating strip 176 may be disposed between the first and second sets of 144, 146 of razor blades 142. The lubricating strip 176 therefore further lubricates a portion of the user's skin having been shaved by the first set 146 of razor blades 142 before the second set 144 of razor blades 142 contacts the portion of the user's skin.

Alternatively or in addition to the foregoing, one or more of the forward shaving aid 160, the aft shaving aid 162, the first lateral shaving aid 164, and/or the second lateral shaving aid 166 may also comprise at least one roller strip, 182, 184, 186, respectively. The roller strip 180, 182, 184, 186 may include a plurality of ball bearings 190 (e.g., stainless steel) to massage/knead skin, as well as help facilitate an easier feel to shaving with a faster, smoother motion of the razor blade action regardless of the direction of shaving. According to one embodiment, the roller strips 180, 182, 184, 186 may be disposed along at least a portion of the front edge region 157, the rear/aft edge region 159, the first lateral edge region 161, and the second lateral edge region 163, respectively. In the illustrated embodiment, the ball bearings 190 are located completely around a periphery of the frame 188 and are in close proximity to each other; however, it should be appreciated that this not a limitation of the present disclosure unless specifically claimed as such, and the ball bearings 190 may be located around only a portion of the periphery of the frame 188 (e.g., about only a portion of the front edge region 157, the rear/aft edge region 159, the first lateral edge region 161, and/or the second lateral edge region 163).

With reference now to FIG. 30B, another embodiment of a blade cartridge 22 having at least a first shaving side 140 is generally illustrated. The blade cartridge 22 may be similar to the blade cartridge 22 as illustrated and described in FIG. 30A, however, one or more of the front edge region 157 and/or a rear/aft edge region 159 may also comprise at least one elongated ball bearing/roller pin 190. The elongated ball bearing/roller pin 190 may extend along a substantial portion of the front and/or a rear/aft edge regions 157, 159 (e.g., along substantially the entire width of the blade cartridge 22).

Turning now to FIG. 31, a cross-sectional view of one embodiment of a blade cartridge 22 having a ball bearing 190 consistent with the present disclosure is generally illustrated. The ball bearing 190 may be located in a receptacle (bore) 192 formed in frame 188 of the blade cartridge 22. Ball bearings 190 may be inserted into the receptacle 192 from the back side of the frame 188 (e.g., a surface generally opposite of the exposed surface 193 of the blade cartridge 22 that contacts the user's skin) and may include an exposed portion 191 that is exposed through and/or extends beyond bearing opening 194 and/or exposed surface 193 of the first shaving side 140 of the frame 188. (It should be appreciated that the ball bearings 190 described herein may also be arranged on the second shaving side 156.) The receptacle 192 may then be closed at the entrance by a closure 196, which may be press fit within the receptacle 192.

The exposed portion 191 may be configured to extend beyond the exposed surface 193 of the frame 188 such that the exposed portion 191 may contact against user's skin. One or more of the ball bearings 190 may be moveable or retractable generally along line B relative to the frame 188 (e.g., generally perpendicular to the exposed surface 193 of the frame 188) such the amount of the exposed portion 191 of the ball bearing 190 extends through bearing opening 194 and/or exposed surface 193 of the frame 188 may change.

For example, one or more of the ball bearings 190 may be seated on a biasing device 198 (e.g., a compression, torsion, or coil spring). The biasing device 198 may be configured to urge the ball bearing 190 generally outwardly beyond the exposed surface 193 of the frame 188. Upon application of a force in the opposite direction of the biasing device 198, the exposed portion 191 of the ball bearings 190 may be retracted relative to the exposed surface 193 of the frame 188 (e.g., into the bore 192) and the ball bearing 190 may move generally along line B. In such a manner, the biasing device 198 may cushion rolling of the ball bearings 190 on a user's skin.

Turning now to FIG. 32, a cross-sectional view of another embodiment of a blade cartridge 22 having a ball bearing 190 consistent with the present disclosure is generally illustrated. As shown in FIG. 32, the ball bearings 190 may be installed in frame 188 of the blade cartridge 22 from exposed surface 193 of the blade cartridge 22 that contacts the user's skin (e.g., the first shaving side 140), rather than the back side of the frame 188 as generally illustrated in FIG. 31. Biasing device 198 (e.g., compression, torsion, or coil spring) may first be placed in a recess 200 formed in the frame 188, and a ball bearing 190 may then be seated on the basing device 198. Thereafter, a housing/cover 202 may be installed in recess 200 with a press fit (forming a housing unit), with the housing/cover 202 including a receptacle 204 for ball bearing 190, as well as providing bearing opening 194.

Turning now to FIG. 33, a cross-sectional view of yet another embodiment of a blade cartridge 22 having a ball bearing 190 consistent with the present disclosure is generally illustrated. The ball bearing 190 may be installed in a housing/cover 202 which is inserted in recess 200 formed in the frame 188 in a sliding manner and secured with a closure 196 formed on the opposite side of the exposed surface 193 of the frame 188. A portion 201 of the frame 188 may extend generally circumferentially around and define the bearing opening 194 such that the exposed surface 193 of the frame 188 extends across at least a portion of the cover 202. Rather than enabling retraction of just the ball bearing 190, biasing device 198 and housing/cover 202 may be arranged such that both the ball bearing 190 and the housing/cover 202 may be retracted into recess 200. The portion 201 of the frame 188 extends across the cover 202 such that as the ball bearing 190 and the housing/cover 202 retract into recess 200, the opening 194 is defined by the portion 201 of the frame 188.

With reference to FIGS. 34-35B, further embodiments of a blade cartridge 22 having a ball bearing 190 and elongated ball bearing/roller pin 190, respectively, consistent with the present disclosure are generally illustrated. When the skin first makes contact with a razor blade, it is tight and tense. As part of the shaving experience, the user may elect to wash the area to be shaved with a warm facecloth or warm water prior to engaging the blades with the skin. While this helps, warm water may not always be available.

The ball bearing 190 and elongated ball bearing/roller pin 190 as generally illustrated in FIGS. 34-35B may feature a self-lubricating ball bearing and/or elongated ball bearing/roller pin which may function as a "skin massager" and skin lubricant applicator whilst facilitating a smoother, faster and more efficient shaving stroke. The ball bearings are configured to rotate freely in any direction. This eliminates the "drag" during a shaving stroke, which is commonly associated with the "glide strips" of razors. The curved contact surface of the ball bearing 190 and/or elongated ball bearing/roller pin 190 lends itself to rolling over and kneading the skin during a shaving stroke. This essentially massages the skin, loosening it up in preparation for shaving. Any of the ball bearings 190 and elongated ball bearing/roller pins 190 may optionally include a textured surface to aid in picking-up or grabbing the lubricant as it rotates.

The self-lubricating ball bearing 190 and/or elongated ball bearing/roller pin 190 may include a lubricant 197 configured to be in contact (e.g., but not limited to, direct contact) with the ball bearing 190 and/or elongated ball bearing/roller pin 190. The lubricant 197 may include a semi-solid or solid lubricant, and may also include moisturizers, exfoliates, scented and/or non-scented, and the like. During a shaving stroke, the razor is drawn over the skin and the ball bearing (s) 190 and/or elongated ball bearing(s)/roller pin(s) 190 rotate. As the ball bearing(s) 190 and/or elongated ball bearing(s)/roller pin(s) 190 rotate, they coat themselves with the skin lubricant 197. The lubricant 197 is then applied continually to the skin, before, during and after each shaving stroke.

The ball bearing 190 and/or elongated ball bearing/roller pin 190 may be biased as described herein. For example, a biasing device (e.g., a spring or the like) 198 may be disposed beneath the lubricant as generally illustrated in FIG. 34. The biasing device 198 may urge the lubricant 197 generally against the ball bearing 190, thereby causing the lubricant 197 to also urge the ball bearing 190 towards the opening 194. The biasing device 198 may cushion and/or dampen the force placed on the lubricant 197 and promote a smoother and more fluid rotation of the ball bearing 190 and/or elongated ball bearing/roller pin 190 while a downward force is being applied during a shaving stroke. As the lubricant 197 diminishes, the biasing device 198 continues to exert an upward force, always providing a positive contact between the lubricant 197 and the ball bearing 190 and/or elongated ball bearing/roller pin 190 until finally the lubricant 197 is used up.

Alternatively (or in addition), a biasing device 198 (e.g., but not limited to a spring) may be coupled to the ball bearing 190 and/or elongated ball bearing/roller pin 190, for example, as generally illustrated in FIGS. 35A and 35B. For example, the ball bearing 190 and/or elongated ball bearing/roller pin 190 may include pins 199 extending outward from opposite portions of the ball bearing 190 and/or elongated ball bearing/roller pin 190 (e.g., at opposite ends). The biasing device 198 may urge the pins 199 and therefore the ball bearing 190 and/or elongated ball bearing/roller pin 190 towards the opening 194. When the ball bearing 190 and/or elongated ball bearing/roller pin 190 is pushed in the opposite direction of the biasing device 198 (e.g., away from the opening 194), the ball bearing 190 and/or elongated ball bearing/roller pin 190 may contact a portion of the lubricant 197. Optionally, the lubricant 197 may be disposed on a base 195 which may be urged by one or more biasing device 198 generally towards the ball bearing 190.

Turning now to both FIGS. 35C-35E, one embodiment of a retention clip 3502 for mounting, securing, and/or otherwise coupling any of the ball bearings 190 described herein is generally illustrated. In particular, FIG. 35C generally illustrates one embodiment of a retention clip 3502 along with a lubricant 197, FIG. 35D generally illustrates one embodiment of just the retention clip 3502 and one embodiment of a ball bearing 190, and FIG. 35E generally illustrates one embodiment of just the retention clip 3502 (though it should be appreciated that these figures are provided only for illustrative purposes only). The retention clip 3502 may be configured to be received at least partially within a cavity 3504 formed in the blade assembly 22. The retention clip 3502 (FIGS. 35D and 35E) may include one or more legs or extensions 3506 extending outward (e.g., downward) from a base region 3508 (which may form the opening 191). A portion of the legs 3506 (e.g., the distal region) may include one or more barbs or the like 3510. The barbs 3510 are configured to engage against a portion of the surface 3512 (FIG. 35C) sidewall of the cavity 3504 to generally retain, secure, mount, and/or couple the retention clip 3502 to the cavity 3504/blade assembly 22, and therefore generally retain, secure, mount, and/or couple the ball bearing 190 (and optionally any lubricant 191 and/or the like) to the cavity 3504/blade assembly 22. The surface 3512 (FIG. 35C) sidewall of the cavity 3504 may optionally include a shoulder, recess, and/or groove 3514 configured to engage the barb 3510 and create a mechanical connection to further facilitate retaining the retention clip 3502 within the cavity 3504. The retention clip 3502 may allow the ball bearing 190 to be loaded/inserted from the outside/exterior (front and/or rear) of the blade cartridge 22, for example, during the assembly of the blade cartridge 22.

With reference to FIGS. 35F-35H, one embodiment of a blade cartridge 22 including a blade retention clip 3520 for mounting, securing, and/or otherwise coupling one or more (e.g., a plurality) of razor blades 140 is generally illustrated. The blade retention clip 3520 described herein may be used for mounting, securing, and/or otherwise coupling any razor blade known to those skilled in the art, and is not limited to any of the embodiments described herein unless specifically claimed as such. Additionally (or alternatively), the blade retention clip 3520 may be used for mounting, securing, and/or otherwise coupling any shaving aid(s) 160, skin engaging strip(s) 170, skin lubricating strip(s) 172, 176, skin lubricating and/or moisturizing strip(s) 174, or the like. As such, the blade retention clip 3520 may be used for mounting, securing, and/or otherwise coupling one or more razor blades and/or any combination of shaving aid(s) 160, skin engaging strip(s) 170, skin lubricating strip(s) 172, 176, skin lubricating and/or moisturizing strip(s) 174, or the like.

With reference to FIG. 35F, blade cartridge 22 may include a housing and/or frame 188 which may be formed of plastic or metal, such as stainless steel. The blade cartridge 22 (e.g., frame/housing 188) may include a front edge region 157, a rear/aft edge region 159, a first lateral edge region 161, and a second lateral edge region 163. In the illustrated embodiment, a blade retention clip 3520 is used at each longitudinal end 150, 152 of the razor blade 140, though this is for illustrative purposes and only one lateral end 150, 152 of the razor blade 140 may be secured with a blade retention clip 3520.

Turning now to FIG. 35G, the blade retention clip 3520 may be configured to be received at least partially within a retention cavity 3522 formed in the blade assembly 22 (e.g., the frame 188). The blade retention clip 3520 (FIG. 35H) may include one or more legs or extensions 3526 extending outward (e.g., downward) from a base region 3528 (which may extend across the mounting width Wm of one or more of the razor blades 140, shaving aid(s) 160, skin engaging strip(s) 170, skin lubricating strip(s) 172, 176, skin lubricating and/or moisturizing strip(s) 174, or the like that are being retained by the blade retention clip 3520). A portion of the legs 3526 (e.g., the distal region) may include one or more barbs or the like 3530. The barbs 3530 are configured to engage against a portion of the surface 3532 (FIG. 35G) sidewall of the blade cavity 3522 to generally retain, secure, mount, and/or couple the blade retention clip 3520 to the blade cavity 3522/blade assembly 22, and therefore generally retain, secure, mount, and/or couple the razor(s) 140 to the blade cavity 3522/blade assembly 22. The surface 3532 (FIG. 35G) sidewall of the blade cavity 3522 may optionally include a shoulder, recess, and/or groove 3534 configured to engage the barb 3530 and create a mechanical connection to further facilitate retaining the blade retention clip 3520 within the blade cavity 3522. The blade retention clip 3520 may allow the blade(s) 140 to be loaded/inserted from the outside/exterior (front and/or rear) of the blade cartridge 22, for example, during the assembly of the blade cartridge 22.

As described herein, a blade cartridge 22 consistent with at least one embodiment described herein may include a first and at least a second shaving side 140, 156 each including one or more razor blades 142 (see, for example, FIGS. 5 and 9). In one embodiment, the faces or sides 140, 156 may include identifying indicia to allow a user to identify one face or side from another. For example, the skin engagement strips (SES) and/or the lubrication strips may be colored differently on each respective face or side 140, 156. Alternatively (or in addition), one or more of the razor blades 142 may include indicia to allow a user to identify one face or side from another. For example, one or more of the razor blades 142 may be colored differently on each respective face or side 140, 156.

The second shaving side 156 may be the same as first shaving side 140 in all aspects described herein, albeit inverted relative to first shaving side 140 to facilitate proper orientation when the blade cartridge 22 is rotated 180 degrees. With reference to FIG. 36, the front and/or rear side 140, 156 may include only one set of one or more razor blades 142. Alternatively, the front and/or rear side 140, 156 may include a first and a second set 144, 146 of at least one razor blades 142 arranged to shave in opposite shaving directions D1 and D2 as generally illustrated in FIG. 37. A blade cartridge 22 having at least one razor to cut hair in a first shaving stroke direction D1 and at least one razor to cut hair in a second shaving stroke direction D2 on the same face 140, 156 may be particularly useful for a user that wishes to shave his/her head since the user may move the razor 10 in a "back and forth" motion without having to lift the razor from the area being shaved to begin a new stroke.

For example, a "body" blade dual cartridge combination configuration may feature one or more cartridge sides/faces having two sets 144, 146 (e.g., FIG. 37) of one or more blades 142 (e.g., but not limited to, three blades in each set), wherein first and second sets 144, 146 are arranged in opposing directions of cut D1, D2. The first and second sets 144, 146, of blades 142 may be separated by a lubrication strip 176. This is a particularly useful blade arrangement for consumers that shave their head or any other awkward area of the body, as they can use a "back and forth" shaving stroke motion, without having to lift the razor from the area being shaved to begin a new stroke. Optionally, the second side/face of the cartridge may include one or more blades 142 all arranged in the same direction of cut for conventional shaving (e.g., FIG. 36). This cartridge configuration gives the user great flexibility, as only one device is required to shave any part of their anatomy. One or more of the faces or sides 140, 156 may have a SES at the lower and upper portion of the cartridge 22. This arrangement may be particularly useful for a bodyblade dual combination as described herein, where the side that has the blades in opposing directions of cut would be the face or side 140, 156 that have the placement of the two SESs.

Turning now to FIGS. 38-45, a further embodiment of a blade cartridge 22 consistent with the present disclosure is generally illustrated. As discussed herein, the blade cartridge 22 may include more than two faces. In the illustrated embodiment, the blade cartridge 22 is shown having a generally triangular cross-section having three faces, namely, a first face 140, a second face 156, and a third face 240, respectively, configured to be rotated about the pivot axis PA. Any of the faces 140, 156, 240 may include any arrangement of razor blades, mirrors, ball bearings, etc. as described herein. While the faces 140, 156, 240 are illustrated having substantially the same dimensions, it should be appreciated that one or more of the faces 140, 156, 240 may be smaller than, or larger than, one or more of the other faces 140, 156, 240. Additionally, it may be appreciated that any of the resistive pivot mechanisms described herein, or any combination, may be modified to allow the blade cartridge 22 to be rotated (e.g., as generally illustrated by arrow H in FIGS. 41-45) to any one of the initial starting positions corresponding to any one of the faces 140, 156, 240 of the blade cartridge 22. For example, FIG. 40 generally illustrates one embodiment of a pivot pin/cylinder 34 consistent with FIG. 14 having three recesses 222A, 222B, and 222C corresponding to the three faces 140, 156, 240. It should be appreciated, however, that this is only one embodiment and that any resistive pivot mechanism described herein may be used with the blade cartridge 22 as shown in FIGS. 38-45.

Figure 46:
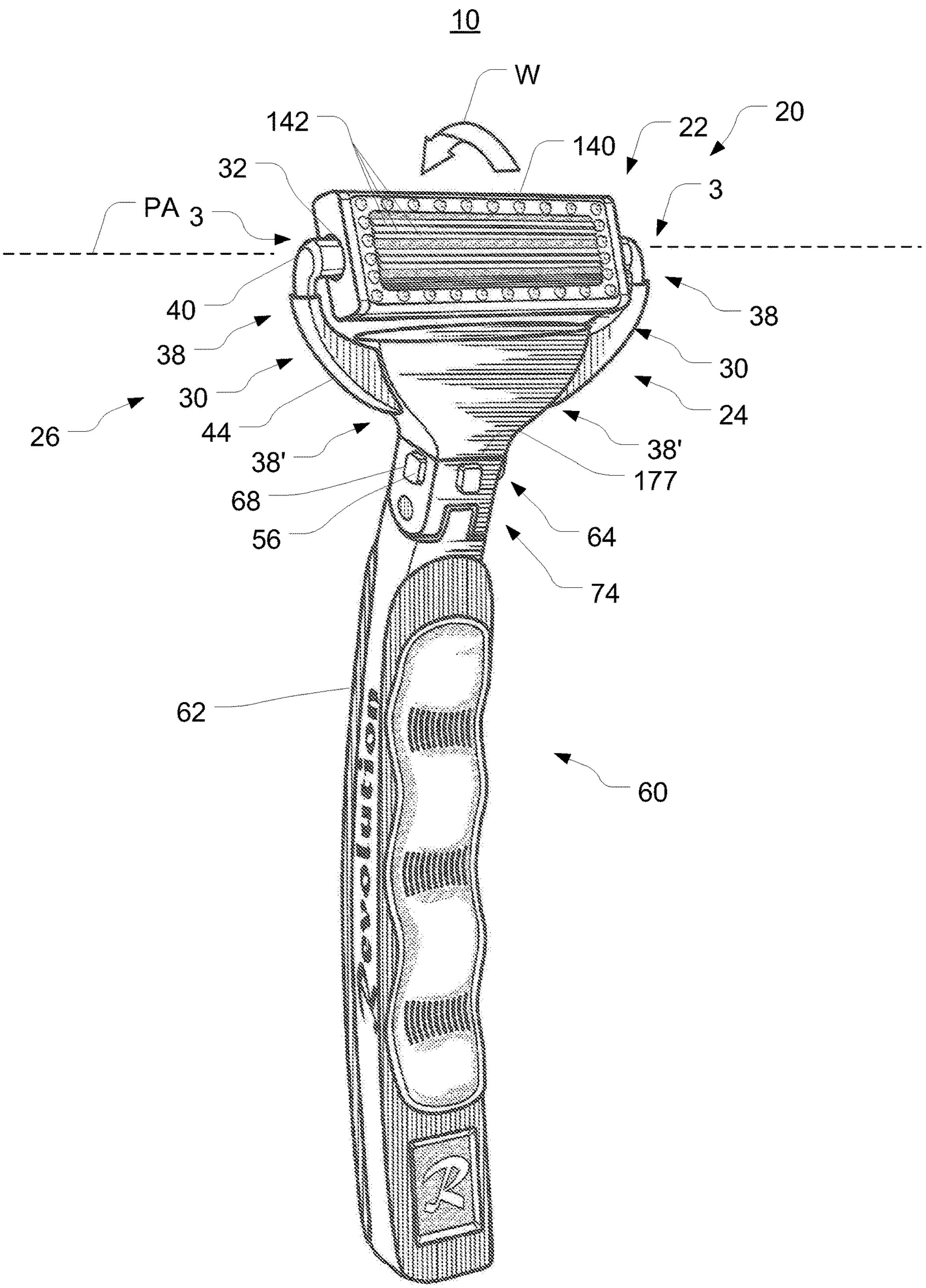

Turning now to FIG. 46, another view of a razor 10 consistent with the present disclosure is generally illustrated. The razor 10 includes a disposable head assembly 20 comprising a blade cartridge 22 and a blade cartridge support member 24. As shown, blade cartridge support member 24 comprises a generally U-shaped cartridge support frame 26. U-shaped cartridge support frame 26 comprises two generally curved support arms 30. For example, the support arms 30 may have a generally C-shape or L-shape.

To facilitate pivotable attachment of blade cartridge 22 to the blade cartridge support member 24 and subsequent use thereof, the blade cartridge 22 and the blade cartridge support member 24 may include one or more hinges or pivot assemblies 3 that allows the blade cartridge 22 to rotate about a pivot axis PA (e.g., about a direction generally perpendicular to the longitudinal axis L of the handle 60.) As described herein and generally illustrated in FIGS. 47-49, the hinge or pivot assembly 3 may be configured to allow the blade cartridge 22 to rotate (e.g., in the direction of arrow W) approximately 180 degrees about pivot axis PA such that a front side 140 and rear side 156 of the blade cartridge 22 may be used. According to one embodiment, the hinge or pivot assembly 3 may be configured to allow the blade cartridge 22 to rotate approximately 360 degrees about pivot axis PA.

Referring back to FIG. 46, the hinge or pivot assembly 3 may include a pivot receptacle 32 disposed in each support arm 30 of the blade cartridge support member 24 (e.g., but not limited to, a distal section 40 of the support arms 30), each of which receives a pivot pin/cylinder located on opposing lateral sides of the blade cartridge 22. The pivot pins/cylinders may extend generally outwardly from the lateral sides of the blade cartridge 22. With the foregoing arrangement, the blade cartridge 22 is arranged between the support arms 30 and supported by each support arm 30 at a pivot connection (assembly), and the blade cartridge 22 is able to rotate about the pivot axis PA at any angle, up to and including 360° degrees. It should be appreciated that the location of one or more of the pivot receptacles 32 and the pivot pins may be switched (e.g., one or more of the pivot receptacles 32 may be located in the blade cartridge 22 and one or more of the pivot pins may extend outwardly from the support arms 30 of the blade cartridge support member 24). Additionally, a portion of one or more of the support arms 30 (e.g., but not limited to, the distal section 40) may be at least partially received in one or more hub recesses or pivot receptacles 32 disposed in the lateral sides of the blade cartridge 22 as generally illustrated. Alternatively, it should be appreciated that a portion of one or more of the pivot pin/cylinders may be at least partially received in one or more recesses/hubs disposed in support arms 30 (e.g., but not limited to, the distal section 40 of the support arms 30).

In order to cushion use of blade cartridge 22 while shaving, one or more of the support arms 30 may include a cushioning mechanism 38. As shown, a second (distal) section 40 of each support arm 30 is configured to slide within a receptacle (e.g., a slotted recess) of a first (proximal) section 44 of each support arm 30. Each receptacle may include a compression (e.g., coil) spring or biasing device disposed therein. Alternatively (or in addition), first section 44 may include a cushioning mechanism 38. In particular, the cushioning mechanism 38' (see, for example, FIG. 50) is configured to allow the first section 44 (e.g., an arm fin or the like, 87) to slide (e.g., generally in the direction of arrow Q) within a receptacle (e.g., a slotted recess) of support hub 50. Each receptacle may include a compression (e.g., coil) spring or biasing device 46 disposed therein.

In the foregoing manner, the biasing device of the cushioning mechanisms 38 may compress in response to a downward force placed on blade cartridge 22, with such compression biasing against the downward force. In doing so, such compression may absorb/dampen the downward force to cushion use of the blade cartridge 22. Furthermore, since the cushioning mechanisms 38 of each support arm 30 is independent of one another, the cushioning mechanism 38 may enable each lateral end of the blade cartridge 22 to move and/or be cushioned independently. It should be understood that in other embodiments of shaving device 10, the blade cartridge support member 24 may not include a cushioning mechanism 38.

Figure 47:
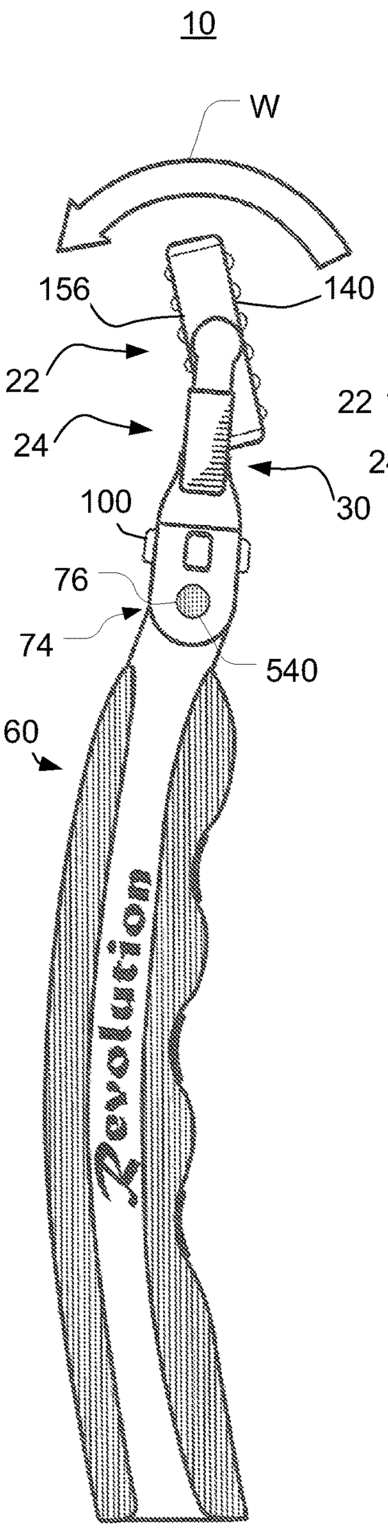

Referring now to FIGS. 47 and 50, the head assembly 20 may be selectively detachably connectable to the handle 60 by the user. As may be appreciated, any mechanism for selectively coupling the blade cartridge support member 24 to the handle 60 may be used. The blade cartridge support member 24 may include a support hub 50 (e.g., as shown in FIG. 50), which may be centrally disposed between the two support arms 30. The support hub 50 includes a mechanical connection element 52 which mechanically connects the blade cartridge support member 24 to a mechanical connection element 64 of elongated shaft 62 of handle 60 (e.g., as generally illustrated in FIG. 1A).

Figure 48:
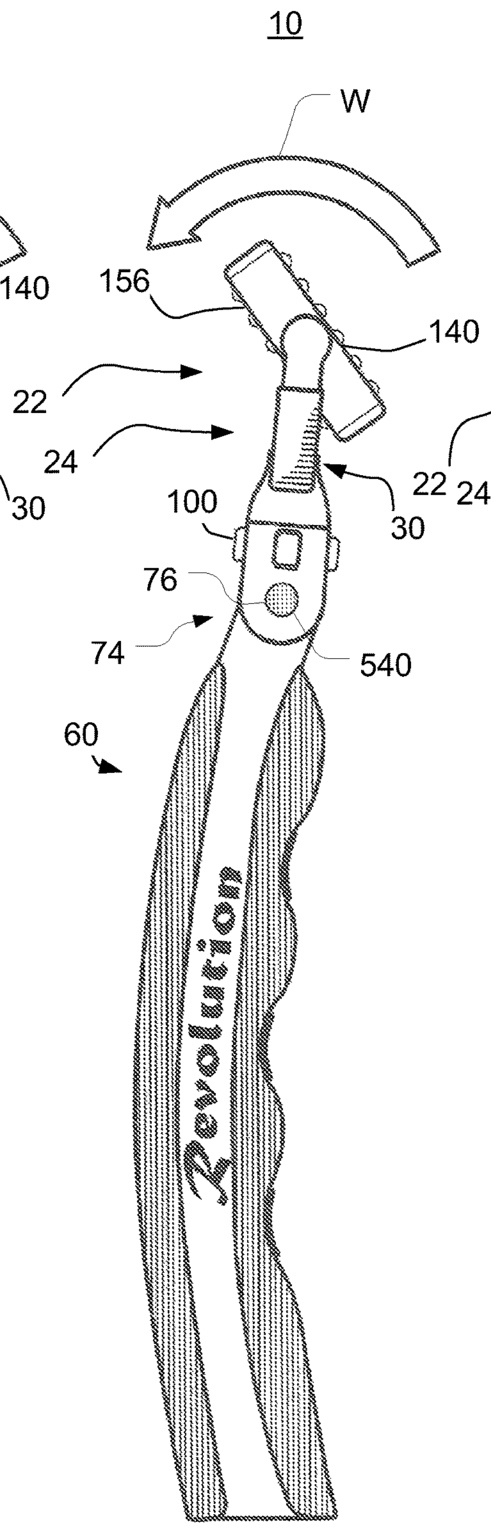
Figure 49:
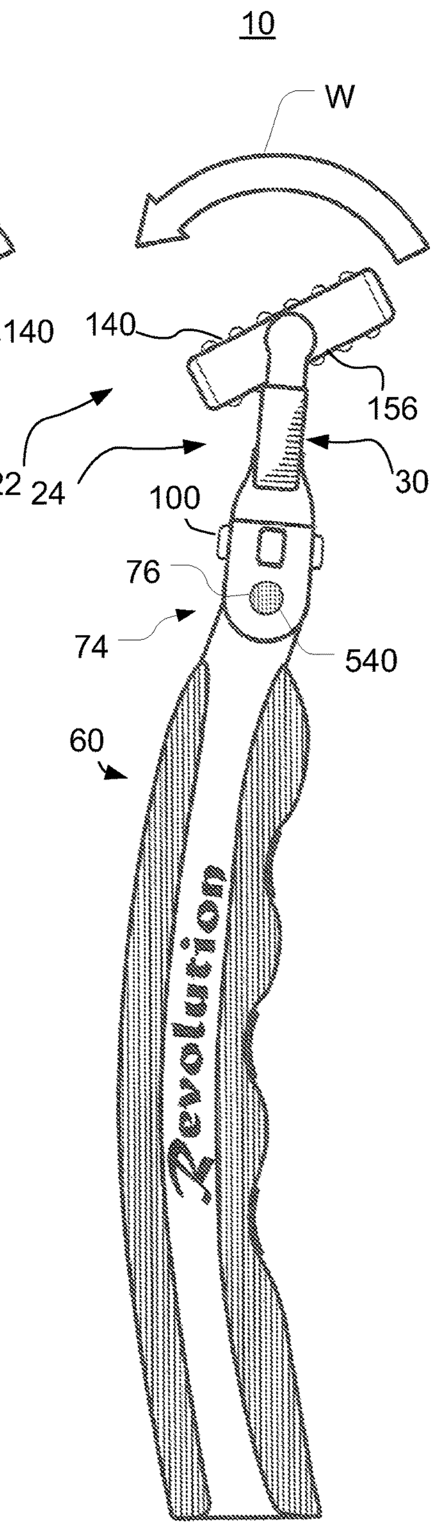

For example, as shown by FIG. 50, one embodiment of a connection element 52 of the blade cartridge support member 24 comprises a rectangular (e.g., square) shank 54 which is configured to fit within a corresponding recess 66 (e.g., rectangular and/or square recess) of connection element 64 of handle 60. In order to provide a positive mechanical connection, rectangular shank 54 includes a plurality of deformable (cantilevered) and/or spring loaded engagement tabs 56 which engage within engagement apertures 68 and fixes (e.g., locks) the position of the head assembly 20 relative to the handle 60. The deformable (cantilevered and/or spring loaded) engagement tabs 56 may, in one embodiment, be configured to be moved out of engagement with the engagement apertures 68 upon depressing of an actuation button 100 (e.g., as shown in FIGS. 47-49). Alternatively, the engagement tabs 56 may be pressed inwardly manually by the user, for example, using his/her thumbs and/or fingers of each hand respectively.

Once the engagement tabs 56 are engaged within the engagement apertures 68, the head assembly 20 and handle 60 may be generally inhibited from separating from one another. Thereafter (e.g., after the useful life of the blade cartridge 22), the head assembly 20 and handle 60 may be detached from one another by depressing the engagement tabs 56 inward (e.g., manually using the user's fingers and/or by depressing a button or the like disposed on the handle 60 and/or the disposable head assembly 20) out of engagement with the engagement aperture 68, and pulling the shank 54 of the blade cartridge support member 24 out of the recess 66 of the handle 60. The used head assembly 20/blade cartridge 22 may then be replaced with a fresh head assembly 20/blade cartridge 22. Thus, as may be understood the head assembly 20 is selectively detachably connectable to the handle 60 by the user.

Although the shank 54 and recess 66 are shown as part of the blade cartridge support member 24 and the handle 60, respectively, it should be appreciated that the arrangement of the shank 54 and recess 66 may be switched (e.g., the shank 54 and recess 66 may be part of the handle 60 and the blade cartridge support member 24, respectively, see, for example, FIG. 5). Additionally (or alternatively), while the deformable (cantilevered or spring loaded) engagement tabs 56 and the engagement apertures 68 are shown as part of the shank 54 and recess 66, respectively, it should be appreciated that the arrangement of the deformable (cantilevered or spring loaded) engagement tabs 56 and the engagement apertures 68 may be switched (e.g., the deformable (cantilevered or spring loaded) engagement tabs 56 and the engagement apertures 68 may be part of the recess 66 and the shank 54, respectively). Again, it should be appreciated that the connection element 52 is not limited to arrangement illustrated and/or described herein unless specifically claimed as such, and that any connection element 52 that allows a user to selectively releasably couple the head assembly 20 to the handle 60 may be used.

Turning now to FIGS. 46, 51, and 52, another embodiment of the razor 10 having a hinge 74 is generally illustrated. While the razor 10 of FIGS. 25-27 may be used with any blade cartridge known to those skilled in the art, the razor 10 of FIGS. 25-27 may be particularly useful with a blade cartridge 22 having at least one face 140 with at least one razor 142 aligned to cut in a first shaving direction D1 and at least one razor 142 aligned to cut in a second shaving direction D2 (e.g., but not limited to, the blade cartridge 22 as generally illustrated in FIG. 37).

The hinge 74 may be configured to allow the head assembly 20 to rotate from the position generally illustrated in FIG. 46 to the position generally illustrated in FIGS. 51 and 52. The handle 60 may include a first (proximal) shaft portion 75 (FIGS. 51-52) coupled to a second (distal) shaft portion 77 by way of one or more hinges 74. The hinge 74 may include any hinge mechanism known to those skilled in the art, and may include, for example, a locking mechanism (e.g., but not limited to, a locking pawl, ratchet mechanism, or the like) configured to allow the user to generally lock of fix the relative position of the first shaft portion 75 relative to the second shaft portion 77 (e.g., the head assembly 20 relative to the handle 60).

For example, the hinge 74 may be configured to allow the first shaft portion 75 to swing approximately 90 degrees generally along the direction of arc S from the position shown in FIG. 46 to the position shown in FIGS. 51 and 52. It may be appreciated that the hinge 74 allows the first shaft portion 75 to swing in a direction (e.g., plane or axis) that is generally perpendicular to cutting edge axis CE (not shown for clarity) of the cutting edge of one or more of the razor blades 142 of the head assembly 20 when the razor 10 is in the position illustrated in FIG. 47.

The handle 60 (e.g., the first shaft portion 75) and/or the support hub 50 may optionally include a swivel or pivot 177 configured to allow the user to swivel or rotate the blade cartridge 22 approximately 90 degrees (e.g., as indicated by arrow E in FIGS. 51 and 52) in an axis that is generally parallel to the longitudinal axis of the first shaft portion 75 and/or the support hub 50 such that the cutting edge axis CE of the cutting edge of one or more of the razor blades 142 of the head assembly 20 is aligned generally parallel to the longitudinal axis of the handle 60 as generally illustrated in FIGS. 51 and 52. The swivel 177 may include any swivel or pivot mechanism known to those skilled in the art, and may include, for example, a locking mechanism (e.g., but not limited to, a locking pawl, ratchet mechanism, or the like) configured to allow the user to generally lock of fix the relative position of the blade cartridge 22 relative to the first shaft portion 75 and/or support hub 50.

Alternatively, the user may manually detach the head assembly 20 from the handle 60 and rotate the head assembly 20 to the desired position as shown. For example, the connection between the head assembly 20 and the handle 60 may be configured to allow the head assembly 20 to be aligned in two or more different orientations relative to the handle 60. By way of a non-limiting example, the connection between the head assembly 20 and the handle 60 may be generally symmetrical, for example, generally circular and/or square.

A razor 10 having a hinge 74 and swivel 177 as described above may be particularly useful for shaving a user's head and/or body. In particular, having the cutting edge axis CE of the cutting edge 151 of one or more of the razor blades 142 of the head assembly 20 aligned generally parallel to the longitudinal axis L of the handle 60 as generally illustrated in FIGS. 51 and 52 may facilitate shaving a user's head and/or body compared with having the cutting edge axis CE of the cutting edge of the razor blades 142 aligned generally perpendicular to the longitudinal axis L of the handle 60 as generally illustrated in FIG. 46.

The blade cartridge 22 in FIGS. 46, 51 and 52 may optionally include any hinge and/or resistive pivot mechanism described herein to allow the blade cartridge 22 to rotate about the pivot axis PA (e.g., as generally illustrated by arrow T). While not a limitation of the present disclosure unless specifically claimed as such, the blade cartridge 22 may include any of the resistive pivot mechanisms described in FIGS. 11-17. The resistive pivot mechanisms described in FIGS. 11-17 may be particularly suited for use with the hinge 74 and swivel 177 since they do not include the biasing pin 92. As such, the blade cartridge 22 may be located closer to the second shaft portion 77 when arranged in the position shown in FIGS. 51 and 52.

As discussed herein, a razor 10 having a hinge 74 and swivel 177 may be used with any blade cartridge 22 described herein. By way of a non-limiting example, a razor 10 having a hinge 74 and swivel 177 with a blade cartridge having three faces (i.e., a first face 140, a second face 156, and a third face 240) is generally illustrated in FIG. 53.

With reference to FIGS. 51-53, the razor 10 (and in particular, the blade cartridge 22) may optionally include one or more (e.g., a plurality) of wash-out apertures 102. The wash-out apertures 102 may be disposed along one or more of the edge faces 104 of the blade cartridge 22, and may be configured to generally prevent the blade cartridge 22 from clogging with hair and/or shaving cream during the shaving process. In particular, the wash-out apertures 102 may allow hair and/or shaving cream to "wash through" the wash-out apertures 102 by rinsing the blade cartridge 22 with water.

Turning now to FIG. 54, one embodiment of a head assembly 20 including a resistive swing mechanism 540 is generally illustrated. The head assembly 20 includes one or more arms 30 that are rotatably coupled to the support hub 50. The resistive swing mechanism 540 may include one or more biasing devices (e.g., but not limited to, a spring or the like) configured to urge one or more of the arms 30 in a direction generally opposite to arrow W. In use, the user may apply a force generally in the direction of arrow W while shaving and the resistive swing mechanism 540 may allow the blade cartridge 22 to swing in the direction of arrow W. It should be appreciated that while the arms 30 are illustrated moving/swinging relative to the support hub 50, first section 44 of the arms 30 may be stationary relative to the support hub 50 and second section 40 of the arms 30 may be biased as described herein to allow the blade cartridge 22 to swing in the direction of arrow W. Alternatively (or in addition), the resistive swing mechanism 540 may be incorporated into the hinge pin 76, for example, as generally illustrated in FIGS. 47-49. As such, the head assembly 20 may be biased generally in the direction opposite of arrow W relative to the handle 60, and the head assembly 20 may move generally in the direction of arrow W relative to the handle 60 when the user applies a force while shaving.

Turning to FIGS. 55-57, another embodiment of a resistive pivot mechanism is generally illustrated. The resistive pivot mechanism may include a blade cartridge pivot biasing mechanism 90 and/or a blade cartridge rotation limiter 35. As explained herein, the blade cartridge pivot biasing mechanism 90 may allow the blade cartridge 22 to rotate both clockwise and counter clockwise about the pivot axis PA relative to the initial starting position. The initial starting position may correspond to a location/orientation/position of the blade cartridge 22 relative to the blade cartridge support member 24 and/or handle 60 when no external forces are applied to the blade cartridge 22. Each face (e.g., face 140, 156) may have a corresponding initial starting position.

The resistive pivot mechanism may create a biasing force which urges the blade cartridge 22 towards an initial starting position. For example, the biasing force created by the blade cartridge pivot biasing mechanism 90 may include a spring force and/or a magnetic force. The magnetic force may be an attractive magnetic force (e.g., a magnetic force causing the blade cartridge 22 to be urged/pulled towards the blade cartridge support member 24 or handle 60) and/or a repelling magnetic force (e.g., a magnetic force causing the blade cartridge 22 to be urged away from the blade cartridge support member 24 or handle 60). The magnetic force (either attractive and/or repelling) may be between (e.g., generated by) two or more magnets having their poles aligned to either create an attractive or repelling force. For example, one or more magnets may be coupled/secured to the blade cartridge 22 and one or more magnets may be coupled/secured to the blade cartridge support member 24.

The magnetic force may be generated between one or more magnets coupled/secured to the blade cartridge 22 and a ferromagnetic material coupled/secured to the blade cartridge support member 24 (it should be appreciated that the arrangement of the magnets and the ferromagnetic material relative to the blade cartridge 22 and blade cartridge support member 24 may also be reversed).

One or more of the magnets may be either permanent magnets and/or electromagnets. It may also be appreciated that when an electromagnet is used, the current may be adjusted to selectively change the orientation of the resulting magnetic field.

With reference to FIG. 55, one embodiment of a blade cartridge pivot biasing mechanism 90 that creates a magnetic biasing force to urge the blade cartridge 22 towards the initial starting position is generally illustrated. In the illustrated embodiment, the blade cartridge pivot biasing mechanism 90 comprises at least one magnet 99*a* located in the blade cartridge 22 (which may be referred to as a blade cartridge magnet 99*a*) and at least one magnet 99*b* located in the blade cartridge support member 24 (which may be referred to as a blade cartridge support member magnet 99*b*). One or more of the blade cartridge magnet(s) 99*a* and/or the blade cartridge support member magnet(s) 99*b* may be permanent magnets and/or electromagnets. The power source (e.g., one or more batteries or the like) for the electromagnet is not shown for clarity.

As shown, one or more blade cartridge magnets 99*a* may be located within the blade cartridge frame 188. For example, one or more blade cartridge magnets 99*a* may extend longitudinally along an axis generally parallel to the pivot axis PA of the blade cartridge frame 188. In particular, one or more blade cartridge magnets 99*a* may be disposed along outer longitudinal regions 157, 159 of the blade cartridge frame 188 (e.g., adjacent blades 142), which may be further understood to be the front edge region 157 and the rear/aft edge region 159 relative to cutting direction as explained herein.

In addition to, or as an alternative to being located in the outer longitudinal region(s) 157, 159 of the blade cartridge frame 188, one or more blade cartridge magnets(s) 99*a* may be located in one or both of the outer lateral regions 161, 163 of the blade cartridge frame 188 of the blade cartridge 22. The blade cartridge magnet(s) 99*a* may be fully encapsulated within the blade cartridge frame 188 (i.e. not visible) or may have one or more exposed surfaces on the blade cartridge frame 188.

When one or more blade cartridge magnets 99*a* are located in the outer longitudinal region 157, 159 of the blade cartridge frame 188, one or more cooperating blade cartridge support member magnets 99*b* may be located in a portion of the blade cartridge support member 24 which is opposed beneath the outer longitudinal region 157, 159 of the blade cartridge frame 188 when the blade cartridge 22 is in its use position. More particularly, the blade cartridge support member magnet 99*b* may be located in the base 45 of the yoke 47 of the blade cartridge support member 24, which may include a proximal section 44 of at least one of the support arms 30.

Alternatively, or in addition to the above, when one or more blade cartridge magnets 99*a* are located in the outer lateral region 161, 163 of the blade cartridge frame 188, one or more cooperating blade cartridge support member magnets 99*b* may be located in a corresponding distal section 40 of at least one of the support arms 30.

As explained in greater detail below, the magnetic fields generated by the blade cartridge magnet(s) 99*a* and blade cartridge support member magnet(s) 99*b* may create an attractive and/or repelling biasing force that urges the blade cartridge 22 towards the initial starting position. The magnetic biasing force may urge the blade cartridge 22 towards the initial starting position as long as the blade cartridge 22 is within a range of predetermined pivot angles θ, and more particularly at an intermediate pivot angle θ in a middle of the range of predetermined pivot angles, as shown in FIG. 56.

With respect to operation, as best shown in FIG. 56, the cooperating blade cartridge magnet(s) 99*a* and blade cartridge support member magnet(s) 99*b* are arranged such that the polarity of their respective magnetic fields, as shown by their north poles N and south poles S, are either attracted and/or repelling to each other over a range of predetermined pivot angles, with the interaction of the attractive and/or repelling magnetic fields increasing towards a maximum level at the intermediate pivot angle θ in a middle of the range of predetermined pivot angles θ (e.g., generally corresponding to the initial starting position).

As shown, the range of pivot angles θ, as well as the intermediate pivot angle θ where the force of the attracting and/or repelling magnetic fields is at its greatest level, may be determined by the angle formed between the front face 140 of the blade cartridge 22 and a longitudinal axis of the longitudinal axis L of the handle 60 of the shaving device 10.

Thus, it should be understood that the cooperating blade cartridge magnet(s) 99*a* and blade cartridge support member magnet(s) 99*b* are arranged such that the magnetic interaction between the interacting (attracting and/or repelling) magnetic fields of the cooperating blade cartridge magnet(s) 99*a* and blade cartridge support member magnet(s) 99*b* varies with a rotation of the blade cartridge 22 and a rotational position of the blade cartridge 22.

Furthermore, it should also be understood, that when the cooperating blade cartridge magnet(s) 99*a* and blade cartridge support member magnet(s) 99*b* are arranged such that there is a magnetic interaction between the attracting and/or repelling magnetic fields of the cooperating blade cartridge magnet(s) 99*a* and blade cartridge support member magnet (s) 99*b*, the force of the interacting (attracting and/or repelling) magnetic fields will rotate the blade cartridge 22 towards the intermediate pivot angle θ in a middle of the range of predetermined pivot angles θ, i.e. to a position where the blade cartridge magnet(s) 99*a* and blade cartridge support member magnet(s) 99*b* are aligned (e.g., fully aligned) with one another and the interaction of the magnetic fields is at its greatest force (e.g., the initial starting position), absent any overriding biasing force.

Referring now to FIG. 57, shaving device 10 may optionally include a blade cartridge rotation limiter 35. Blade cartridge rotation limiter 35 allows the user to rotate the blade cartridge 22 about the pivot axis PA to select one of a plurality of sides/faces 140, 156, and that allows the blade cartridge 22 to rotate within a predefined rotation range while at the selected blade/face position during normal use of the razor to conform to the user's skin contours.

Blade cartridge rotation limiter 35 may include at least one pawl 220 configured to extend generally upward from arm 30. The pivot pin/cylinder 34 of blade cartridge 22 may include a plurality of recesses 222 configured to receive a distal end 224 of the pawl 220. The location of the recesses 222 may each correspond to one of the plurality of faces 140, 156 of the blade cartridge 22. When the distal end 224 of the pawl 220 is engaged in recess 222, each recess 222 may allow the blade cartridge 22 to rotate in a range of 1 to 90 degrees, and more particularly in a range of 2 to 45 degrees, and even more particularly in a range of 5 to 30 degrees.

The pawl 220 may be located at the end of a slidable thumb switch release 28 (FIG. 57), which is biased by upward (engagement) by a spring 29. Slidable thumb switch release 28 may be depressed downward against the bias of spring 29 to remove the distal end 224 of the pawl 220 from recess 222 to rotate blade cartridge 22 outside the confines and limitations of recess 222. After being retracted, the slidable thumb switch release 28 may be released, and the distal end 224 of the pawl 220 may enter a different recess 222 corresponding to another face (e.g., 140, 156) of the blade cartridge 22 after rotation of the blade cartridge 22 thereto. The size of the recess 222 and the pawl 220 will therefore determine the range of rotation corresponding to each face (e.g., 140, 156) of the blade cartridge 22.

In the foregoing embodiment, pawl 220 and more particularly distal end 224, may be rigid and non-deformable. However, in an alternative embodiment, at least the distal end 224 of the pawl 220 may be resiliently deformable and slidable thumb switch release 28 may be eliminated. In such embodiment, pawl 220 and more particularly distal end 224, may be disengaged from recess 222 by deformation of the pawl 220 with a rotation force applied to the blade cartridge 22.

It should also be appreciated that while the recess 222 is illustrated as being part of the blade cartridge 22 and the pawl 220 is illustrated as being coupled to the blade cartridge support member 24, the orientation of these components may be reversed.

It should be appreciated that the blade cartridge pivot biasing mechanism 90 of FIGS. 55-57 may be incorporated into any resistive pivot mechanism described herein. For example, the blade cartridge pivot biasing mechanism 90 of FIGS. 55-57 may be combined within any blade cartridge rotation limiter 35 described herein.

Turning now to FIGS. 58-64, yet another embodiment of a resistive pivot mechanism is generally illustrated. With reference to FIG. 58, the resistive pivot mechanism may include a blade cartridge pivot biasing mechanism 90 configured to apply a magnetic biasing force to urge the blade cartridge 22 towards the initial starting position while allowing the blade cartridge 22 to rotate clockwise and counter clockwise about the pivot axis PA, and/or a blade cartridge rotation limiter 35 to allow the blade cartridge 22 to rotate within a predefined range from the initial starting position.

Turning now to FIGS. 59A and 60, a partially transparent view of the blade cartridge pivot biasing mechanism 90 and blade cartridge rotation limiter 35 is generally illustrated in which the blade cartridge support member 24 is partially transparent. Similar to the embodiment of FIGS. 55-57, the blade cartridge pivot biasing mechanism 90 of FIGS. 58-64 features a plurality of magnets 99*a*, 99*b* that are arranged such that the magnetic fields cause the blade cartridge 22 to be biased towards the initial starting position. Additionally, blade cartridge rotation limiter 35 of FIGS. 58-64 features one or more detents, pawls (e.g., resiliently deformable pawls), and/or recesses on the blade cartridge 22 and/or the blade cartridge support member 24 that are configured to generally limit the rotation of the blade cartridge 22 within a predefined range of rotation relative to the initial starting position and/or to provide an indication to the user that another face (e.g., 140 or 156) of the blade cartridge 22 is being selected.

With continued reference to FIGS. 59-60 as well as FIGS. 61-62, one embodiment of the blade cartridge support member 24 is generally illustrated. The blade cartridge support member 24 includes one or more blade cartridge support member magnets 99*b* coupled to one or more of the support arms 30. The blade cartridge support member magnets 99*b* may be placed anywhere on the blade cartridge support member 24 such as, but not limited to, generally below the pivot axis PA/pivot receptacles 32. While the blade cartridge support member magnets 99*b* are generally illustrated having a generally cylindrical shape, it should be appreciated that the blade cartridge support member magnets 99*b* may have other shapes. For example, the blade cartridge support member magnets 99*b* may have a generally arcuate shape that generally extends along a rotation radius from pivot axis PA that generally corresponds to the distance (i.e., radius) of the blade cartridge magnet 99*a* from the pivot axis PA as described herein. Additionally, while only one blade cartridge support member magnet 99*b* is shown coupled to each arm 30, one or more arms 30 may have a plurality of blade cartridge support member magnets 99*b* or no blade cartridge support member magnets 99*b*.

The blade cartridge support member 24 may also optionally include one or more detents, pawls, and/or recesses 6102 that engage with corresponding elements of the blade cartridge 22 to generally limit the rotation of the blade cartridge 22 within a predefined range of rotation relative to the initial starting position and/or to provide an indication to the user that another face (e.g., 140 or 156) of the blade cartridge 22 is being selected. In the illustrated embodiment, the blade cartridge support member 24 is shown having one detent 6102 extending generally outwardly from each support arm 30. The detent 6102 may be resiliently deformable or generally rigid. While each support arm 30 is shown having one detent 6102, it may be appreciated that one or more of the support arms 30 may include a plurality of detents 6102 or no detents 6102. Additionally, it should be appreciated that one or more of the support arms 30 may include one or more recesses and/or pawls configured to engage with a detent, pawl, or recess on the blade cartridge 22.

With continued reference to FIGS. 59-60 as well as FIGS. 63-64, one embodiment of the blade cartridge 22 is generally illustrated. The blade cartridge 22 includes one or more blade cartridge magnets 99*a* coupled thereto. For example, the blade cartridge 22 may include one or more (e.g., a plurality) of blade cartridge magnets 99*a* coupled to one or more lateral ends of the blade cartridge 22. The blade cartridge magnets 99*a* may be arranged about the pivot axis PA, for example, about the pivot pin/cylinders 34, and may be disposed a distance (e.g., radius) from the pivot axis PA such that the blade cartridge magnets 99*a* and the blade cartridge support magnets 99*b* are generally aligned at generally the same distance (radius) from the pivot axis PA. The magnets 99*a*, 99*b* may also be aligned such that the separation distance $D_{sep}$ (FIG. 59A) between the blade cartridge magnets 99*a* and the blade cartridge support magnets 99*b* is generally minimized when the magnets 99*a*, 99*b* are aligned and generally facing each other. Aligning the magnets 99*a*, 99*b* such that the radius from the pivot axis PA is generally the same may enhance the biasing force of the magnets 99*a*, 99*b*, thereby increasing the biasing force urging the blade cartridge 22 towards the initial starting position.

While the blade cartridge 22 in FIGS. 63 and 64 is illustrated having four blade cartridge magnets 99*a* on each end, it should be appreciated that this is an illustrative example and that the blade cartridge 22 may have greater than or less than four blade cartridge magnets 99*a*. Additionally, one or more of the blade cartridge magnets 99*a* may have a generally arcuate shape having a radius that generally corresponds to the distance (e.g., radius) of the blade cartridge support magnets 99*b* from the pivot axis PA. Moreover, while the blade cartridge support member 24 in FIGS. 61 and 62 is illustrated having one blade cartridge support member magnet 99*b* on each arm 30, it should be appreciated that this is an illustrative example and that the blade cartridge support member 24 may have greater than or less than one blade cartridge support member magnet 99*b* on each arm 30 (e.g., only one arm 30 may include one or more blade cartridge support member magnet 99*b* or both arms may include at least one blade cartridge support member magnet 99*b*).

As discussed herein, the blade cartridge magnets 99*a* and the blade cartridge support member magnets 99*b* may be arranged to bias the blade cartridge towards an initial starting position. The blade cartridge magnets 99*a* and the blade cartridge support member magnets 99*b* may therefore be arranged in any manner to achieve this effect. For example, FIGS. 59B, 59C, and 59D generally illustrate various embodiments of possible arrangements of the blade cartridge magnets 99*a* and the blade cartridge support member magnets 99*b*, along with possible alignments of the various poles of the blade cartridge magnets 99*a* and the blade cartridge support member magnets 99*b*. It should be appreciated that this is provided for illustrative purposes only, and that the present disclosure is not limited to a particular arrangement of the blade cartridge magnets 99*a* and the blade cartridge support member magnets 99*b* unless specifically claimed as such.

The blade cartridge 22 may also optionally include one or more detents, pawls, and/or recesses 6302 that engage with corresponding detents, pawls, and/or recesses 6102 of the blade cartridge support member 24 to generally limit the rotation of the blade cartridge 22 within a predefined range of rotation relative to the initial starting position and/or to provide an indication to the user that another face (e.g., 140 or 156) of the blade cartridge 22 is being selected.

In the illustrated embodiment, the blade cartridge 22 is shown having one or more detents 6302 extending generally outwardly from one or more lateral ends of the blade cartridge 22. The detents 6302 may be arranged about the pivot axis PA, for example, about the pivot pin/cylinders 34, and may be disposed a distance (e.g., radius) from the pivot axis PA such that the detents 6302 of the blade cartridge 22 and the detent 6102 of the blade cartridge support member 24 are generally aligned at generally the same distance (radius) from the pivot axis PA. The detents 6102, 6302 may extend outwardly from blade cartridge support member 24 and the blade cartridge 22, respectively, such that detents 6102, 6302 generally interfere with each as the blade cartridge 22 is rotated about the pivot axis PA. For example, the detents 6102, 6302 may generally contact each other as the blade cartridge 22 is rotated about the pivot axis PA. The contact of the detents 6102, 6302 may generally inhibit further rotation of the blade cartridge 22 in the clockwise and/or counter clockwise direction.

For example, two detents 6302*a*, 6302*b* may be aligned on generally opposite sides of the pivot axis PA (e.g., generally 180 degrees apart from each other). Aligning the detents 6302*a*, 6302*b* 180 degrees apart from each other will generally allow the blade cartridge 22 to rotate approximately 90 degrees in each direction (e.g., clockwise and counter clockwise) from the initial starting position. It should be appreciated that the number of and alignment of the detents 6302 may be selected to allow the blade cartridge 22 to rotate within any predefined range. By way of example, additional detents 6302 may be arranged less than 180 degrees from each (e.g., less than 90 degrees from the initial starting position) to allow the blade cartridge 22 to rotate less than 90 degrees from the initial starting position.

According to one embodiment, the detents 6102, 6302 may be generally rigid. As such, contact between the detents 6102, 6302 will generally prevent further rotation of the blade cartridge 22 without application of a face selection force. As used herein, a face selection force is defined as an amount of force in excess of the normal force applied to the blade cartridge 22 during normal shaving. To rotate the blade cartridge 22 beyond the predefined rotation range to select a different face (e.g., 140 or 156), the user may apply a face selection force to the blade cartridge 22 that may cause one or more of the support arms 30 of the blade cartridge support member 24 to deflect outwardly and increase the separation distance $D_{sep}$ between the blade cartridge 22 and the blade cartridge support member 24, thereby allowing the detents 6302 of the blade cartridge 22 to rotate past the detents 6102 of the blade cartridge support member 24. Once the detents 6302 of the blade cartridge 22 past beyond the detents of the blade cartridge support member 24, the resistive force applied by the blade cartridge support member 24 against the blade cartridge 22 will significantly decrease, thereby indicating to the user that another face (e.g., 140, 156) has been selected. The face selection force may be selected such that user will have to deliberately apply the necessary force to select a face so that another face cannot be selected accidentally during normal shaving use.

It should be appreciated that while the blade cartridge 22 and blade cartridge support member 24 are shown having two detents 6302 and one detent 6102 on each end, respectively, the number and arrangement of the detents 6302, 6102 may be switched and/or changed depending on the intended application.

Additionally, it should be appreciated that while the detents 6302, 6102 have been described as being rigid, one or more of the detents 6302, 6102 may be resiliently deformable. In such an arrangement, the support arms 30 may be generally rigid (i.e., the support arms 30 do not have to deflect in order to select another face).

Moreover, it should be appreciated that one or more of the detents 6302, 6102 may be replaced with a recess and/or a pawl. By way of a non-limiting example, the detents 6302 on the blade cartridge 22 may be replaced with a recess, and a detent 6102 on the blade cartridge support member 24 may be received within the recess. The length of the recess may generally correspond to the desired predefined range of rotation about the pivot axis PA. To select another face, the user will apply a face selection force that either deforms the detent 6102 and/or deflects the support arms 30. Of course, the detent 6102 on the blade cartridge support member 24 may be replaced with a recess and the detent 6302 on the blade cartridge 22 may be received within the recess. Alternatively, in case, one or more of the detents 6302, 6102 may be replaced with a pawl (e.g., a resiliently deformable pawl) that engages a corresponding recess on the blade cartridge 22 and/or blade cartridge support member 24. Moreover, one or more of the detents 6302, 6102 may engage a corresponding pawl (e.g., resiliently deformable pawl) on the blade cartridge 22 and/or blade cartridge support member 24.

It should further be appreciated that the blade cartridge pivot biasing mechanism 90 of FIGS. 58-64 may be incorporated into any resistive pivot mechanism described herein. For example, the blade cartridge pivot biasing mechanism 90 of FIGS. 58-64 may be combined within any blade cartridge rotation limiter 35 described herein. Moreover, the blade cartridge rotation limiter 35 of FIGS. 58-64 may be used with any blade cartridge pivot biasing mechanism 90 described herein. While the magnets 99*a*, 99*b* are shown on the lateral ends of the blade cartridge 22 and the support arms 30 of the blade cartridge support member 24, it should be appreciated that the magnets 99*a*, 99*b* may be disposed in the front edge region 157 and a rear/aft edge region 159 as well as in the yoke region 47 (e.g., as generally illustrated in FIGS. 55-57).

It should also be further appreciated that while the cartridge pivot biasing mechanism 90 is shown having both blade cartridge magnets 99*a* and blade cartridge support member magnets 99*b*, either of these magnets 99*a*, 99*b* may be eliminated and replaced with a ferromagnetic element such that the remaining magnet 99*a* or 99*b* will generate an attractive magnetic biasing force urging the blade cartridge 22 towards the initial starting position.

Turning now to FIGS. 65-69, a further embodiment of a resistive pivot mechanism is generally illustrated. The resistive pivot mechanism may include a blade cartridge pivot biasing mechanism 90 and/or a blade cartridge rotation limiter 35. As explained herein, the blade cartridge pivot biasing mechanism 90 may allow the blade cartridge 22 to rotate both clockwise and counter clockwise about the pivot axis PA relative to the initial starting position. The initial starting position may correspond to a location/orientation/position of the blade cartridge 22 relative to the blade cartridge support member 24 and/or handle 60 when no external forces are applied to the blade cartridge 22. Each face (e.g., face 140, 156) may have a corresponding initial starting position.

The cartridge pivot biasing mechanism 90 may include any cartridge pivot biasing mechanism 90 described herein. In the embodiment illustrated in FIGS. 65-69, the cartridge pivot biasing mechanism 90 includes one or more magnets 99*a* and/or 99*b* configured to create a magnetic biasing force as described herein. Thus, for the sake of brevity, the details of the cartridge pivot biasing mechanism 90 will not be described in further detail.

With continued reference to FIG. 65 as well as FIGS. 66-67, one embodiment of the blade cartridge support member 24 is generally illustrated. The blade cartridge support member 24 may include one or more biased pawls or pins 6602. The biased pawls or pins 6602 may include a cylinder 6604 and a pin 6606 biased, for example, by a spring, pneumatic pressure, or the like. The cylinder 6604 may be separate from the blade cartridge support member 24 or integral (e.g., the cylinder 6604 may be formed by the support arms 30). The pin or pawl 6606 may be biased to extend outwardly from the cylinder 6604. While each support arm 30 is illustrated with a biased pawl/pin 6602, it may be appreciated that each support arm 30 may have more than one biased pawl/pin 6602 or no biased pawl/pin 6602.

With continued reference to FIG. 65 as well as FIGS. 67-69, one embodiment of the blade cartridge 22 is generally illustrated. The blade cartridge 22 may include one or more cams or recesses 6802 corresponding to each face (e.g., 140, 156) of the blade cartridge 22. The cam or recess 6802 may be coupled to one or more of the pivot pin/cylinders 34. The cam or recess 6802 may be configured to receive and/or engage the pin or pawl 6606 of the biased pawl/pin 6602. The contour and/or length of the cams or recesses 6802 and the pin/pawl 6606 may determine the predefined rotation range for the blade cartridge 22. For example, the pin/pawl 6606 may be received in and engage a contoured surface (e.g., cam surface) such that the blade cartridge 22 may rotate with relative ease within the predefined rotation range during normal shaving use. To rotate the blade cartridge 22 to select another face (e.g., 140, 156), the user may apply a face selection force to the blade cartridge 22. The face selection force may be sufficient to cause the pin/pawl 6606 to be retracted against the force of the biasing mechanism within the cylinder 6604 (e.g., spring or the like) such that the pin/pawl 6606 may disengage the cam or recess 6802. As the user continues to rotate the blade cartridge 22, the pin/pawl 6606 will engage another cam/recess 6802 corresponding to the selected face (e.g., 140, 156). It should be appreciated that the arrangement of the biased pawl/pins 6602 and the cams 6802 may be switched.

Turning now to FIGS. 70-76, a further embodiment of a resistive pivot mechanism is generally illustrated. The resistive pivot mechanism may include a blade cartridge pivot biasing mechanism 90 and/or a blade cartridge rotation limiter 35. As explained herein, the blade cartridge pivot biasing mechanism 90 may allow the blade cartridge 22 to rotate both clockwise and counter clockwise about the pivot axis PA relative to the initial starting position. The initial starting position may correspond to a location/orientation/position of the blade cartridge 22 relative to the blade cartridge support member 24 and/or handle 60 when no external forces are applied to the blade cartridge 22. Each face (e.g., face 140, 156) may have a corresponding initial starting position.

With reference to FIG. 70, one embodiment of head assembly 20 is generally illustrated in which the blade cartridge 22 is shown in cross-section with parts removed. The blade cartridge 22 is coupled to an axle 7002 by way of a detent plate 7004 that engages one or more cams 7006 of the axle 7002. The axle 7002 is biased clockwise and/or counter-clockwise about the pivot axis PA by way of one or more biasing devices (e.g., one or more springs including, but not limited to, one or more torsion springs 7008 that are coupled to one or more support arms 30 of the blade cartridge support member 24 as generally illustrated in FIGS. 71-73). For example, one or more of the support arms 30 may include a cavity, groove, or the like to receive at least a portion of one or more springs 7008. In particular, at least two springs 7008 may be at least partially wound around a portion of the axle 7002 and may engage against one or more arms/ears 7010 (e.g., FIG. 71) extending outwardly from one or more of the cams 7006 to urge the arms/ears and the cams 7006 clockwise or counter-clockwise, respectively, about the pivot axis PA. Because the cams 7006 are coupled to the axle 7002, and the axle 7002 is coupled to the blade cartridge 22 through the detent plate 7004, the springs 7008 thereby urge the blade cartridge 22 either clockwise or counter-clockwise about the pivot axis PA relative to an initial starting position.

The detent plate 7004 is coupled/secured to the frame of the blade cartridge 22. As noted above, the detent plate 7004 couples the blade cartridge 22 to the axle 7002. In particular, the detent plate 7004 (FIGS. 74-76) includes one or more resiliently deformable detents 7402 that engage against cam surfaces 7102 (best seen in FIG. 71) of the cams 7006 to releasably couple the detent plate 7004 (and thus the frame of the blade cartridge 22) to the cams 7006, and thus releasably couple the frame of the blade cartridge 22 to the axle 7002.

To select another face, the user may apply a face selection force to the blade cartridge 22 to urge the blade cartridge 22 either clockwise or counter-clockwise. As the blade cartridge 22 rotates, the springs 7008 will apply a resistive force. Once resistive force of the springs exceeds the clamping force of the resiliently deformable detents 7402, the resiliently deformable detents 7402 will disengage from the cam surface 7102, thereby allowing the detent plate 7004 (and thus the frame of the blade cartridge 22) to rotate relative to the cams 7006 and the axle 7002. As the user continues to rotate the blade cartridge 22 around the cams 7006 and axle 7002, the resiliently deformable detents 7402 will engage against the cam surface in an alignment corresponding to the selected face (e.g., 140, 156). For example, the user may rotate the blade cartridge 22 approximately 180 degrees once the resiliently deformable detents 7402 disengage from the cams 7006. Once the desired face of the blade cartridge 22 has been selected, the user releases the blade cartridge 22 and the springs 7008 will cause the blade cartridge 22 to be aligned (e.g., centered) at the new initial starting position within the predefined rotation range.

According to another feature of the present disclosure, the head assembly 20 may be coupled to the handle 60 using one or more magnets. For example, one or more magnets may be coupled/secured to a portion of the head assembly 20 and one or more magnets may be coupled/secured to a portion of the handle 60 (e.g., the collar). The magnets in the head assembly 20 and handle 60 may be configured to generate an attractive magnetic force that is sufficient to join the head assembly 20 to the handle 60 during normal shaving use. Additionally, one or more mechanical fasteners (e.g., clips, snaps, threads, posts, recesses, etc.) may be used. For example, the head assembly 20 may include a recess/cavity configured to receive a post/protrusion extending from the handle 60. While the head assembly 20 and the handle 60 may each include magnets, it should be appreciated that only the head assembly 20 or the handle 60 may include one or more magnets, and the other component may include a ferromagnetic material that is attracted by the magnetic field of the magnets. One or more of the magnets may include an electromagnet and/or permanent magnet. It should also be appreciated that the magnetic coupling of the head assembly 20 and the handle 60 may be used with any head assembly 20 and handle 60 described herein.

Turning now to FIGS. 77-78, one embodiment of a head assembly 20 and a handle 60 configured to be coupled together using one or more magnets consistent with the present disclosure is generally illustrated. In particular, FIG. 77 generally illustrates the head assembly 20 and the handle 60 in a dissembled state, while FIG. 78 generally illustrates the head assembly 20 and the handle 60 in an assembled state. It should be appreciated that the magnetic connection described herein may be used with any head assembly known to those skilled in the art including, but not limited to, any head assembly described herein.

As may be seen, one or more magnets 7702 may be coupled/secured to a portion of the head assembly 20 and one or more magnets 7704 may be coupled/secured to a portion of the handle 60 (e.g., the collar 7714). The magnets 7702, 7704 in the head assembly 20 and handle 60 may be configured to generate an attractive magnetic force that is sufficient to join the head assembly 20 to the handle 60 during normal shaving use. Additionally, one or more mechanical fasteners (e.g., clips, snaps, threads, posts, recesses, etc.) may be used. For example, the head assembly 20 may include a recess/cavity 7706 configured to receive a post/protrusion 7708 extending from the handle 60 (though it should be appreciated that the arrangement of the recess/cavity 7706 and post/protrusion 7708 may be switched).

While the head assembly 20 and the handle 60 may each include magnets 7702, 7704, optionally the head assembly 20 or the handle 60 may include one or more magnets, and the other component may include a ferromagnetic material that is attracted by the magnetic field of the magnets. One or more of the magnets 7702, 7704 may include an electromagnet and/or permanent magnet. It should also be appreciated that the magnetic coupling of the head assembly 20 and the handle 60 may be used with any head assembly 20 and handle 60 described herein.

One or more magnets 7702, 7704 may be exposed to the exterior surface 7710, 7712 of the head assembly 20 and/or handle 60. In such an embodiment, one or more magnets 7702, 7704 may contact each other when in the assembled state.

Alternatively (or in addition), one or more magnets 7702, 7704 may be covered by the exterior surface 7710, 7712 of the head assembly 20 and/or handle 60. In such an embodiment, one or more magnets 7702, 7704 may not contact each other and instead, a magnetic space or gap may exist between the magnets 7702, 7704 when in the assembled state. Providing a magnetic space or gap between the magnets 7702, 7704 when in the assembled state may allow the head assembly 20 to move longitudinally (e.g., generally along arrow 7802 in FIG. 78) relative to the handle 60. This movement of the head assembly 20 relative to the handle 60 may provide a shock absorbing effect while shaving and/or serve as an indicator to the user that the user is applying too much pressure while shaving. According to one embodiment, the post/protrusion 7708 may be biased forward such that the post/protrusion 7708 contacts the base of the recess/cavity 7706 when initially assembled. During use, force applied to either the head assembly 20 and/or handle 60 may cause the head assembly 20 to apply a force against the bias force of the post/protrusion 7708, thereby moving the post/protrusion 7708 against the biasing force and allowing the head assembly 20 to move relative to the handle 60.

As discussed herein, the handle 60 may include a collar 7714 which is mounted, secured, and/or otherwise coupled to the body portion 7716 of the handle 60 or is moulded as part of the handle. Optionally, the collar 7714 may be incorporated as part of the body portion 7716 as a singular unit. According to one embodiment, the post/protrusion 7708 may extend generally outward from the body portion 7716 and may be at least partially received within a post cavity 7718 in the collar 7714. One advantage to this arrangement is that the magnets 7704 may be secured (e.g., but not limited to, overmolded) into the collar 7714, and the collar 7714 may then be secured to the body portion 7716. This may allow for the number, size, shape, and/or arrangement of the magnets 7704 to be easily changed for various designs without having to change the manufacturing (e.g., but not limited to, molding) of the body portion 7716. It may also allow for a single collar 7714 to be used with a plurality of different body portions 7716.

Turning now to FIGS. 79-80, another aspect of a head assembly 20 and a handle 60 configured to be coupled together using one or more magnets consistent with the present disclosure is generally illustrated. In particular, FIG. 79 generally illustrates the head assembly 20 and the handle 60 in a dissembled state, while FIG. 80 generally illustrates the head assembly 20 and the handle 60 in an assembled state. It should be appreciated that the magnetic connection described herein may be used with any head assembly known to those skilled in the art including, but not limited to, any head assembly described herein.

Whereas the embodiments described in FIGS. 77-78 may utilize magnetic attractive force to couple the head assembly 20 and the handle 60 together (e.g., the poles of one or more of the magnets 7702, 7704 are aligned such that the magnetic field(s) create an attractive force urging the head assembly 20 and the handle 60 towards each other), the head assembly 20 and handle 60 of FIGS. 79-80 include at least two magnets (e.g., central magnet 7902 and annular magnet 7904) having their poles aligned such that their magnetic fields create a magnetic repulsion force which, as described herein, couples the head assembly 20 and the handle 60 together.

For example, the head assembly 20 may include a protrusion (e.g., head protrusion) 7906 which includes one or more central magnets 7902 configured to be at least partially received in a cavity (e.g., handle cavity) 7908 including one or more annular magnets 7904, and also configured to be at least partially received in a central region of the annular magnet 7904. The annular magnet 7904 may include one or more annular, annulus, and/or toroid (e.g., circular, ring-shaped, discoid, or the like) shaped magnets (e.g., either permanent magnet and/or electromagnet). Alternatively (or in addition), the annular magnet 7904 may include a plurality of (e.g., array) of magnets disposed about in a generally annular, annulus, and/or toroid (e.g., circular, ring-shaped, discoid, doughnut, or the like) configuration to generate a generally annular, annulus, and/or toroid magnetic field (e.g., a magnetic field having magnetic field lines that form a generally annular, annulus, and/or toroid pattern). The central magnet 7902 may include any magnet (e.g., permanent magnet and/or electromagnet) such as, but not limited to, a disc magnet or the like.

As mentioned above, the head assembly 20 and handle 60 may be coupled together using repulsive magnetic forces between the head assembly magnets 7902 and the handle magnets 7904. In particular, the inventors have discovered that if a central magnet 7902 and an annular magnet 7904 (having an inside dimension ID 7910 that is equal to or larger than the outside dimension OD 7912 of the central magnet 7902) are constrained to move generally axially along axis 7914 relative to one another (e.g., by virtue of the OD 7916 of the protrusion 7906 relative to the ID 7918 of the cavity 7908) such that the central magnet 7902 can pass through the central region 7920 of the annular magnet 7904, and are further orientated such that the magnetic poles face in the same direction along the axis 7914, then the resulting force vs. displacement curve (see, e.g., FIGS. 81A-81B) closely resembles that of a traditional mechanical detent.

In particular, with reference to FIGS. 81A and 81B, diagrams illustrating the displacement (e.g., movement) of the central magnet 7902 relative to the annular magnet 7904, along with the resulting magnetic force (e.g., into or away from the cavity 7908) is generally illustrated. With reference to FIG. 81A, as the magnets 7902, 7904 approach each other in direction 8100 along axis 7914 (e.g., the head assembly 20 is advanced towards the handle 60), the repulsive force F created by the magnetic fields 8102, 8104 therebetween will initially create a force (e.g., region 8106) resisting the movement of the head assembly 20 towards the cavity 7908 and will grow (e.g., increase) as the central magnet 7902 approaches the annular magnet 7904 and then begin to decrease (e.g., substantially to zero) when the magnets 7902, 7904 are aligned at position C (e.g., the magnetic fields 8102, 8104 of the magnets 7902, 7904 will balance each other, and substantially no force will be created that urge the head assembly 20 and the blade 60 along the axis 7914). It may be appreciated that when the central magnet 7902 and the annular magnet 7904 are aligned at position C, an unstable equilibrium is achieved. It may be difficult to get the central magnet 7902 and the annular magnet 7904 to stay at this position. This unstable equilibrium is what creates the detent feel.

With reference to FIG. 81B, as the magnet 7902 continues to move in direction 8100 along axis 7914 past position C (e.g., they begin to pass through the central region 7920 of the annular magnet 7904), the repulsive force F created by the magnetic fields 8102, 8104 therebetween switch relative to region 8106 and create a force (e.g., region 8108) urging the head assembly 20 towards the handle 60. This region 8108 of force initially continues to grow until the magnetic fields begin to dissipate. In region 8108, the force begins to push the central magnet 7902 away from annular magnet 7904, thereby urging the head assembly 20 towards the handle 60. From the standpoint of the user pushing the head assembly 20 towards the handle 60, the perception is of an initial resistance increasing to a peak force, followed by an "assist" as the central magnet 7902 passes through the central region 7920 of the annular magnet 7904 and the opposite direction repulsive force takes over. If a hard stop is properly placed (e.g., the protrusion 7906 "bottoms out" relative to the cavity 7908 by virtue of either the distal end of the protrusion 7906 contacting the base of the cavity 7908, the base region of the protrusion 7906 contacting the proximal surface surrounding the opening to the cavity 7908, and/or tapered surfaces of the protrusion 7906 and the cavity 7908 contacting each other), the repulsive force in region 8108 will hold the head assembly 20 against the handle 60, resulting in secure retention between the head assembly 20 and the handle 60.

The repulsive magnetic connection is the result of a feature of the interaction between magnetic field lines of the central magnet 7902 passing through a central region 7920 of an annular magnet 7904 (e.g., that there are field lines in the central region 7920 of the annular magnet 7904 that are directionally opposed to the field lines emanating from the face (e.g., flat face) between the ID and OD. As a result, as the central magnet 7902 approaches the ID of the annular magnet 7904 (FIG. 81A), even though the poles of the central magnet 7902 and annular magnet 7904 are orientated with opposite poles toward each other (which would cause an attractive magnetic force if there were no hole or central region 7920 in the annular magnet 7904), the annular magnet's field 8104 within the ID opposes the magnetic field

8102 of the central magnet 7902, causing a repulsive magnetic force. Again, it should be appreciated that the same effect may be created if the annular magnet 7904 is replaced by a plurality of discrete magnets arranged in a generally circular array.

Turning back to FIGS. 79 and 80, an optional helper magnet 7922 may be provided proximate to the base of the cavity 7908. The helper magnet 7922 may have poles aligned with respect to the central magnet 7902 to create an attractive magnetic force therebetween. The attractive magnetic force between the central magnet 7902 and the helper magnet 7922 may further increase the retention force between the head assembly 20 and the handle 60, while still retaining the unique "detent" feature which the user would experience during insertion of the head assembly 20 into the handle 60.

In the illustrated embodiment, the annular magnet 7904 and the cavity 7908 are part of the collar 7714, though it should be appreciated that this is not a limitation of the present disclosure unless specifically claimed as such. Additionally, it should be appreciated that while the head assembly 20 and the handle 60 are illustrated having a head protrusion 7906 received within a handle cavity 7908, this arrangement may be reversed (e.g., the head assembly 20 may include a head assembly cavity having the annular magnet 7904 and the handle 60 may include a handle protrusion having the central magnet 7902), and a person of ordinary skill in the art would understand any additional modifications necessary based on the instant disclosure.

Turning now to FIG. 82, another embodiment of a magnetic connection between the head assembly 20 and the handle 60 is generally illustrated. The magnetic connection may be similar to the arrangement illustrated in FIGS. 79-80, except the optional helper magnet 7922 may be replaced with a floating/repulsion magnet 8202. In particular, the floating/repulsion magnet 8202 may have its poles reversed compared to the helper magnet 7922 so that it repels, rather than attracts, the central magnet 7902. The floating/repulsion magnet 8202 thereby causes the central magnet (and thus the head assembly 20) to balance (or hover or float) at a point between the annular magnet 7904 and the floating/repulsion magnet 8202. If a suitable gap or space 8404 is left between the mating surfaces of the head assembly 20 and the handle 60, the head assembly 20 will appear to float axially along axis 7914, while always returning to the balance point following deflection, thereby giving the razor system 10 a small shock absorbing effect. The head assembly 20 may therefore move axially within the space 8404 along axis 7914. It may be appreciated that as the central magnet 7902 is urged towards the floating/repulsion magnet 8202, the repulsive force therebetween increases as the central magnet 7902 and the floating/repulsion magnet 8202 get closer, until they touch at which point the perception is of a hard stop. This closely mimics the behavior of a compression spring which increases in resistive force with displacement until ultimately attaining solid height.

Similar to FIGS. 79-80, it should be appreciated that while the head assembly 20 and the handle 60 are illustrated having a head protrusion 7906 received within a handle cavity 7908, this arrangement may be reversed (e.g., the head assembly 20 may include a head assembly cavity having the annular magnet 7904 and floating/repulsion magnet 8202 and the handle 60 may include a handle protrusion having the central magnet 7902), and a person of ordinary skill in the art would understand any additional modifications necessary based on the instant disclosure. The space 8404 may optionally be covered with a resiliently deformable sock, gaiter, or the like. Additionally, it should be appreciated that the magnetic connection described herein may be used with any head assembly known to those skilled in the art including, but not limited to, any head assembly described herein.

Turning now to FIG. 83, another embodiment of a magnetic connection between the head assembly 20 and the handle 60 is generally illustrated. Similar to FIG. 82, the magnetic connection may include a floating feature, however, the floating/repulsion magnet 8202 of FIG. 82 may be omitted and instead, the balancing may be achieved by the relationship of the poles of the central magnet 7902 relative to the annular magnet 7904 (i.e., such that the poles of the central magnet 7902 are opposite the poles of the annular magnet 7904). The effect of the detent can still be achieved manually, although the resistance as the head assembly 20 approaches the handle 60 during insertion may be reduced compared to the arrangement illustrated in FIGS. 79-80. The balance point between the central magnet 7902 and the annular magnet 7904 occurs when the two magnets 7902, 7904 are coplanar or substantially coplanar; minor deflection in either direction along axis 7914 will be followed by a return to the balance point. For short deflections, the behavior is very similar to that of the arrangement illustrated in FIG. 82; however, the return force of FIG. 83 decreases with larger deflection (rather than increasing as in the arrangement of FIG. 82) since in the absence of the floating/repulsion magnet 8202, the only return force is generated by the attraction between the central magnet 7902 and the annular magnet 7904 which grow farther away with increasing deflection. It should be appreciated that the magnetic connection described herein may be used with any head assembly known to those skilled in the art including, but not limited to, any head assembly described herein.

Turning now to FIGS. 84-85, a blade cartridge connection mechanism for securing a blade cartridge 22 to a blade cartridge support member 24. In particular, FIGS. 84 and 85 generally illustrate a perspective view of the blade cartridge 22 and blade cartridge support member 24 in a unassembled and an assembled state, respectively, while FIGS. 86 and 87 generally illustrate a cross-sectional side view of the blade cartridge 22 and blade cartridge support member 24 in a unassembled and an assembled state, respectively.

The blade cartridge 22 may include any blade cartridge known to those skilled in the art including, but not limited to, any blade cartridge 22 described herein. The head assembly 20 may optionally include any resistive pivot mechanism described herein such as, but not limited to, a magnetic resistive pivot mechanism. As shown, blade cartridge support member 24 comprises a generally U-shaped cartridge support frame 26 having two generally curved support arms 30 (a generally C-shape or L-shape); however, it should be appreciated that this is not a limitation of the present disclosure unless specifically claimed as such.

The blade cartridge 22 may include a frame 188 (which may be either one piece or multi-piece such as, but not limited to, a clam-shell design) having one or more pivot pin/cylinder 34 extending outwardly from the lateral edges of the frame 188 (e.g., a single pivot pin/cylinder 34 that extends across the entire frame 188 or a first and a second pivot pin/cylinder 34 extending outwardly from a first and a second lateral edge of the frame 188, respectively). One or more portions (e.g., distal end regions) of the pivot pin/cylinder 34 may include one or more magnets and/or ferrous materials.

The blade cartridge support member 24 includes one or more pivot receptacles 32. For example, each support arm

30 may include a pivot receptacle 32. At least one of the pivot receptacles 32 may include a receiving pocket or cavity 8602 (best seen in FIG. 86) configured to receive at least a portion of the pivot pin/cylinder 34 located on one of the opposing lateral sides of the blade cartridge 22 (e.g., as generally illustrated in FIGS. 85 and 87).

With reference again to FIG. 86, the pocket or cavity 8602 may include an open end 8604 through which the pivot pin/cylinder 34 may be received into the pocket or cavity 8602. The pocket or cavity 8602 may also include tapered entry and/or tapered sidewalls to facilitate entry of the pivot pin/cylinder 34 into the pocket or cavity 8602. According to one embodiment, the pivot receptacle 32 includes one or more blade cartridge pivot and retention magnets 8606 (e.g., one or more permanent magnets and/or electromagnets) configured to create an attractive magnetic force with the pivot pin/cylinder 34 received therein. For example, the pivot pin/cylinder 34 may include a ferrous material that is magnetically attracted to the blade cartridge pivot and retention magnets 8606, thereby mounting, securing, and/or otherwise coupling the blade cartridge 22 to the blade cartridge support member 24. Alternatively (or in addition), the pivot pin/cylinder 34 may include a magnet having its poles align such that it is magnetically attracted to the blade cartridge pivot and retention magnets 8606, thereby mounting, securing, and/or otherwise coupling the blade cartridge 22 to the blade cartridge support member 24. In either case, the blade cartridge 22 may rotate about the pivot axis PA relative to the blade cartridge support member 24 at any angle, up to and including 360° degrees.

In practice, the user may position the unassembled blade cartridge 22 proximate to the opening 8604 of the pocket or cavity 8602 until the magnetic attraction generated between the pivot pin/cylinder 34 and the pocket or cavity 8602 (by the one or more blade cartridge pivot and retention magnets 8606) causes the pivot pin/cylinder 34 (and therefore the blade cartridge 22) to attach to the pocket or cavity 8602 of the pivot receptacle 32. Likewise, the user may dispose (e.g., remove) the blade cartridge 22 from the pivot receptacle 32 by manually (or using a tool) pry or dislodge the pivot pin/cylinder 34 (and therefore the blade cartridge 22) from the pocket or cavity 8602 of the pivot receptacle 32.

It should be appreciated that while the pivot receptacle 32 is illustrated having one or more blade cartridge pivot and retention magnets 8606, the blade cartridge pivot and retention magnets 8606 may optionally be disposed in only one or more of the pivot pin/cylinders 34. In such an arrangement, the pivot receptacle 32 may include a ferrous material that is magnetically attracted to the blade cartridge pivot and retention magnets 8606 of the pivot pin/cylinder 34.

It should also be appreciated that while each arm 30 of the blade cartridge support member 24 is shown having a pivot receptacle 32 including one or more blade cartridge pivot and retention magnets 8606, only one arm 30 may include the pivot receptacle 32 having one or more blade cartridge pivot and retention magnets 8606

Moreover, the location of one or more of the pivot receptacles 32 and the pivot pins 34 may be switched (e.g., one or more of the pivot receptacles 32 may be located in the blade cartridge 22 and one or more of the pivot pins/cylinders 34 may extend outwardly from the support arms 30 of the blade cartridge support member 24).

Additionally, while the blade cartridge 20 is shown being releasably coupled to the handle 60, the support member 24 and the handle 60 may optionally be an integral, unitary or one-piece construction.

Turning now to FIGS. 88-92, any one of the embodiments described herein with respect to FIGS. 84-87 may optionally include one or more blade cartridge retentioners 8802. The blade cartridge retentioners 8802 may be configured to reduce and/or prevent accidental removal/ejection of the blade cartridge 22 from the blade cartridge support member 24. According to one embodiment, (as illustrated in FIGS. 88-89), the blade cartridge retentioners 8802 may include one or more biasing devices such as, but not limited to, a spring clip and/or resiliently deformable protrusion 8804. The blade cartridge retentioners 8802 may extend outward from a portion of the cavity 8602, e.g., proximate to the opening thereof. In practice, the user may insert the pivot pin/cylinder 34 into the cavity 8602. As the pivot pin/cylinder 34 is inserted into the cavity 8602, the blade cartridge retentioners 8802 may be resiliently deformed, deflected, and/or moved out of the way until the pivot pin/cylinder 34 passes by the blade cartridge retentioners 8802 and the pivot pin/cylinder 34 is seated within the cavity 8602. Once seated/received in the cavity 8602 (as generally illustrated in FIG. 89), the blade cartridge retentioners 8802 may generally prevent the pivot pin/cylinder 34 from moving out of engagement with the cavity 8602 unless a sufficiently large force is exerted to deform, deflect, and/or move the blade cartridge retentioners 8802 out of the way.

Alternatively (or in addition), the blade cartridge retentioners 8802 may include one or more biasing devices such as, but not limited to, a detent, resiliently deformable pawl, lever, or the like 9002 as generally illustrated in FIGS. 90-92. For example, the lever 9002 may be spring biased (spring not visible) and may include an engagement portion (e.g., an engagement ramp) 9004 configured to extend at least partially across an opening of the cavity 8602 when in a retention position (as generally illustrated in FIGS. 90-92), and to pivot about a pivot point 9006 such that the lever 9002 may be rotated out of the way and the pivot pin/cylinder 34 may enter and/or exit the cavity 8602. The lever 9002 may also include an actuation region 9008 (e.g., but not limited to, a raised portion) that allows the user to rotate the lever 9002 about the pivot 9006. As may therefore be appreciated, the lever 9002 may be biased to the engagement position.

Again, it should be appreciated that the arrangement of the cavity 8602 and the pivot pin/cylinder 34 with respect to the blade cartridge 22 and the blade cartridge support member 24 may be reversed, and as such the blade cartridge retentioners 8802 may be reversed. It should also be appreciated that the cartridge pivot and retention magnets 8606 may be eliminated.

Any of the magnets described herein may be either permanent magnets and/or electromagnets. It may also be appreciated that when an electromagnet is used, the current may be adjusted to selectively change the orientation of the resulting magnetic field. The magnets may include any type of magnet such as, but not limited to, rare-earth (lanthanide) magnets (including, but not limited to, neodymium magnets and samarium-cobalt magnets), single-molecule magnets, single-chain magnets, nano-structured magnets, Alnico magnets, or the like. The magnets may include magnetic coverings and/or layers. For example, the magnets may include magnetically doped materials such as, but not limited to, magnetic paint, magnetic polymers, magnetic ceramics, magnetic composites, and/or the like.

The razor blades 142 of the head assembly 20 may be front and/or rear loaded during assembly of the head assembly 20.

It should be appreciated that any of the resistive pivot mechanisms described herein (such as, but not limited to, the magnetic resistive pivot mechanisms) may be used with any head assembly, and is therefore not limited to a multi-faced head assembly. For example, the resistive pivot mechanisms described herein may be used with a head assembly having razor blades only a single face, and that only pivots about the single face. The resistive pivot mechanisms described herein may also be used with a head assembly of any conventional shaving device, which may have razor blades disposed on only one face of a single sided cartridge head assembly, that only pivots about the single side containing the razor blades. It should be further appreciated that any of the resistive pivot mechanisms described herein (such as, but not limited to, the magnetic resistive pivot mechanisms) may provide the added benefit of greatly increasing the predefined degree of rotation, particularly compared to traditional single sided razors, thereby providing the user with a more contoured shave.

Any one of the embodiments described herein may include a head assembly 20 which is rotatable about the longitudinal axis of the handle 60. For example, the user may select a new face by simply rotating the head assembly 20 in a plane that is substantially perpendicular to the longitudinal axis of the handle 60.

A razor consistent with one or more of the embodiments described herein may feature numerous benefits and/or advantages. For example, a razor consistent with at least one embodiment may feature a more environmentally friendly design because certain components of the dual and tri sided cartridge systems may utilize less material during the manufacturing process, than that of any two standard single sided cartridges that are assembled individually such as, but not limited to, the connection hub, the support arms and the cartridge housing.

Additionally, or alternatively, packaging that currently holds four or five standard single sided cartridges would only need a slight modification to be able to accommodate the equivalent number of razors consistent with at least one embodiment of the present disclosure. Essentially enabling the manufacturer to transport the equivalent of eight to ten standard single cartridges in a slightly modified container that previously held only four or five standard single cartridges. Consistent with at least one embodiment of the present disclosure, this may promote a more environmentally friendly design as the amount of containers needed to transport cartridges is dramatically reduced and roughly cut in half.

According to another embodiment, a blade cartridge having a pivot point located at or approximately the center of the cartridge head assembly, is advantageous to the user. For example, this design allows and maximizes the amount of "surface area blade contact" with the skin. Particularly over contoured areas with difficult terrain, such as the head, neck chin, body anatomy of the trunk area (including the genitals) and the legs. In contrast to the pivot point described herein, having the pivot point located at the bottom of the cartridge is disadvantageous because the bottom portion of the cartridge naturally lifts away from the surface of the skin when the biasing rod "bottoms out" as the razor is drawn over the area being shaved. This results in missed hairs and causes the user to perform additional shaving strokes. The reason this happens is because after the biasing rod bottoms out, the user continues to apply rotation to the cartridge by raising the handle upwards whilst performing a downward shaving stroke or vice versa. This in turn continues to rotate the cartridge, lifting it away from the skin, which as mentioned previously, causes missed hairs and forces the user to perform additional shaving strokes. At least one embodiment of the blade cartridge described herein solves this problem because having the pivot point located at the center of the cartridge head assembly, coupled with the resistive pivot mechanism, allows the razor cartridge to follow the exact contour of the skin. This increases the surface area blade contact with the area being shaved and results in fewer missed hairs.

According to yet another embodiment, a razor with a dual or tri-sided rotating cartridge as described herein has significant advantages to both the consumer and the manufacturer. To the consumers and manufacturers that are environmentally sensitive and cost conscious, this design addresses both of these important concerns. A recently released consumer report from the EPA, indicated that in the USA alone, over 2 billion disposable razor cartridges are discarded annually. As described herein, one or more embodiments of the present disclosure addresses both the economic advantages to the manufacturer and the important environmental issue mentioned above because as previously mentioned, during the manufacturing process certain components of the dual cartridge system may utilize less material than that of two standard single cartridges which are assembled individually. For example, the arms, the connection hub and the cartridge head assembly may all use less material during manufacturing than that of the standard single cartridges which were assembled individually. Therefore, it is reasonable to assume that a dual or tri-sided razor cartridge system (including the containers in which the cartridges are packaged and shipped) may use less material during manufacturing than that of two standard single cartridges and their respective containers, may be more economical to manufacture and subsequently much kinder to the environment. One important reason for this is because the reduction in manufacturing and packaging material causes the amount of cartridge containers required for shipping to be reduced. This lowers the frequency of transportation needs for distribution purposes, which cuts back on the amount of fuel being burned and released into the atmosphere, and generally reduces both green house gas emissions as well as unnecessary environmental waste.

As may be appreciated, it is becoming increasingly more popular to shave various parts of ones anatomy, and there are numerous shaving devices to facilitate this. As may be appreciated, having numerous shaving devices is expensive and cumbersome. At least one embodiment of the present disclosure features blade cartridges that will have different blade configurations depending on which cartridge the user selects, thereby giving the user the distinct advantage of needing only one device (where multiple devices were previously required) to perform multiple shaving tasks.

For example, a "standard" dual cartridge configuration may feature each cartridge side having a "3 & 3" blade arrangement in which six blades are all facing the same direction of cut, separated in the center by a lubrication strip. This configuration is particularly useful for conventional shaving purposes.

A "body" blade dual cartridge combination configuration may feature each cartridge side having a "3 & 3" blade arrangement in which six blades are separated in the center by a lubrication strip, but each side will be configured differently. On one side of the cartridge, the two sets of three blades may be separated by the lubrication strip in the center, and will be arranged in opposing directions of cut. This is a particularly useful blade arrangement for consumers that shave their head or any other awkward area of the body, as they can use a "back and forth" shaving stroke motion, without having to lift the razor from the area being shaved to begin a new stroke. Alternatively, on the second side of the cartridge, all of the blades may be in the same direction of cut for conventional shaving. This cartridge configuration gives the user great flexibility, as only one device is required to shave any part of their anatomy.

Lubrication is an essential component in the never ending quest to give the user a smoother, faster, more efficient and nick free shaving experience. Therefore, at least one embodiment consistent with the present disclosure may feature lubrication strips placed before the blades make contact to the skin and after the shaving stroke is completed. In contrast, placing the lubrication strip at the top edge of the cartridge to lubricate the skin at the end of a shaving stroke may be adequate; however, this arrangement does not provide for lubrication during the motion of a shaving stroke. At least one embodiment consistent with the present disclosure addresses this critical issue by placing a lubrication strip in the center of the cartridge, thereby dividing the blade configuration and further lubricating the skin during the midst of a shaving stroke. As a result, a smoother, faster and more efficient shaving stroke may be provided resulting in an all-round better shaving experience for the user.

Moreover, at least one embodiment consistent with the present disclosure may feature a cushioning mechanism. Having a cushioning mechanism located within the arms (and optionally again at the end of each arm where it attaches to the connection hub assembly), gives this design the significant advantage of independently cushioning each end of the cartridge, thereby providing the blade cartridge a greater range of movement and facilitating a closer and more contoured shaving experience.

At least one embodiment of the present disclosure may feature an extendable/telescoping handle with a hinged neck and detachable head assembly. This arrangement may permit the user to position the cartridge at a right angle to the handle and allow the user to rotate the position of the cartridge head, such that it is aligned generally parallel to the longitudinal axis of the handle. This cartridge position is particularly useful when shaving awkward or hard to reach areas of the user's body like the head, back and legs etc.

According to one aspect, the present disclosure may feature a shaving device comprising a head assembly. The head assembly may include a support member configured to be detachably coupled to a handle and a blade cartridge having a first and a second face wherein at least one of the first or second faces comprises at least one razor blade. The blade cartridge may be configured to be rotatably coupled to the support member about a pivot axis PA such that the blade cartridge is pivotable by a user to select one of the first or second faces.

According to another aspect, the present disclosure may feature a shaving device comprising a handle and a head assembly. The head assembly may include a support member and a blade cartridge. The support member may be configured to be detachably coupled to the handle and include a first and a second support arm comprising a first and a second pivot receptacle. The blade cartridge may include a first and a second face wherein at least one of the first or second faces comprises at least one razor blade extending generally parallel to a longitudinal axis of the blade cartridge. The blade cartridge may further include a first and a second pivot pin extending outwardly from opposing lateral sides of the blade cartridge along a pivot axis PA of the blade cartridge. The pivot axis PA may extend generally parallel to the longitudinal axis of the blade cartridge, and the first and the second pivot pins may be configured to be rotatably coupled to the first and the second pivot receptacles, respectively, such that the blade cartridge may be pivoted about the pivot axis PA to select a first or a second initial starting position corresponding to the first or the second face, respectively.

The shaving device may optionally include a resistive pivot mechanism configured to allow a user to rotate the blade cartridge about the pivot axis PA to select one of a first or second face position corresponding to the first and second faces of the blade cartridge, respectively. The resistive pivot mechanism may be configured to allow the blade cartridge to rotate within a predefined rotation range while at the selected face position. The number of degrees that the blade cartridge may rotate about the pivot axis PA relative to the initial starting position may depend on the intended use. For example, the blade cartridge may rotate within a range of approximately 5 degrees to approximately 90 degrees about the pivot axis PA relative to the initial starting position, and any range therein. According to another embodiment, the blade cartridge may rotate within a range of approximately 5 degrees to 60 degrees about the pivot axis PA relative to the initial starting position, and any range therein. For example, the blade cartridge may rotate within a range of approximately 5 degrees to 45 degrees about the pivot axis PA relative to the initial starting position. According to yet another embodiment, the blade cartridge may rotate within a range of approximately 5 degrees to approximately 25 degrees about the pivot axis PA relative to the initial starting position, and any range therein. According to yet a further embodiment, the blade cartridge may rotate within a range of approximately 5 degrees to approximately 15 degrees about the pivot axis PA relative to the initial starting position, and any range therein.

According to another aspect, the present disclosure may feature a method comprising rotating a blade cartridge coupled to a support member about a pivot axis PA to select one of a plurality of faces of the blade cartridge, wherein at least one of the plurality of faces includes at least one razor blade.

While preferred embodiments of the present disclosure have been described, it should be understood that various changes, adaptations and modifications can be made therein without departing from the spirit of the invention(s) and the scope of the appended claims. The scope of the present disclosure should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. A shaving device comprising:

a handle;

a blade cartridge support member configured to extend from the handle, the blade cartridge support member comprising:

a first arm extending from a yoke, wherein a position of said first arm is fixed relative to the handle;

a second arm extending from said yoke; and a first blade cartridge support member magnet coupled to said first arm;

a blade cartridge comprising:

a first face and a second face, wherein at least one of said first face or second face comprises at least one razor blade; and a first lateral end and a second lateral end;

one or more pivot pins extending at least partially between said first arm and said second arm and configured to pivotably couple said blade cartridge to said first arm and said second arm of said support member such that said blade cartridge is configured to rotate about a pivot axis extending through said one or more pivot pins and through said blade cartridge; and a first blade cartridge magnet coupled to said first lateral end, said first blade cartridge magnet configured to generate a magnetic force with said first blade cartridge support member magnet to urge said blade cartridge about said pivot axis back towards an initial starting position in response to a shaving force which urges said blade cartridge away from said initial starting position.

2. The shaving device of claim 1, wherein said first blade cartridge support member magnet is disposed proximate a distal end of said first arm.

3. The shaving device of claim 1, further comprising a second blade cartridge magnet coupled to said first lateral end.

4. The shaving device of claim 3, wherein said first blade cartridge magnet and said second blade cartridge magnet are disposed on opposite sides of said pivot axis.

5. The shaving device of claim 4, wherein said first blade cartridge magnet is configured to be generally aligned with said first blade cartridge support member magnet when said first face of blade cartridge is aligned in a first shaving position and wherein said second blade cartridge magnet is configured to be generally aligned with said first blade cartridge support member magnet when said second face of blade cartridge is aligned in a second shaving position.

6. The shaving device of claim 1, further comprising a second blade cartridge support member magnet coupled to said first arm.

7. The shaving device of claim 1, further comprising:

a second blade cartridge magnet coupled to said first lateral end; and a second blade cartridge support member magnet coupled to said first arm.

8. The shaving device of claim 7, wherein said first blade cartridge magnet and said second blade cartridge magnet are disposed on opposite sides of said pivot axis.

9. The shaving device of claim 8, wherein said first blade cartridge magnet is configured to be generally aligned with said first blade cartridge support member magnet when said first face of blade cartridge is aligned in a first shaving position and wherein said second blade cartridge magnet is configured to be generally aligned with said first blade cartridge support member magnet when said second face of blade cartridge is aligned in a second shaving position.

10. The shaving device of claim 1, further comprising:

a second blade cartridge support member magnet coupled to said second arm; and a second blade cartridge magnet coupled to said second lateral end, said second blade cartridge magnet configured to generate a magnetic force with said second blade cartridge support member magnet to urge said blade cartridge towards an initial starting position.

11. The shaving device of claim 1, wherein said first blade cartridge magnet is arranged disposed a distance from the pivot axis PA such that said first blade cartridge magnet and said first blade cartridge support magnet are generally aligned at generally a same distance from said pivot axis PA.

12. The shaving device of claim 1, further comprising at least one blade cartridge rotation limiter configured to generally limit the rotation of said blade cartridge within a predefined range of rotation relative to said initial starting position.

13. The shaving device of claim 12, wherein said at least one blade cartridge rotation limiter comprises a detent.

14. The shaving device of claim 1, further comprising at least one blade cartridge rotation limiter configured to provide an indication to a user that another face of said blade cartridge is being selected.

15. The shaving device of claim 14, wherein said at least one blade cartridge rotation limiter is configured to deform when rotating said blade cartridge about said pivot axis to select said another face.

16. A shaving device comprising:

a handle;

a first arm extending from said handle, wherein a position of said first arm is fixed relative to the handle;

a second arm extending from said handle;

a blade cartridge comprising a first face and a second face, wherein at least one of said first face or second face comprises at least one razor blade;

one or more pivot pins configured to extend along a pivot axis, said pivot axis passing through said first arm, said second arm, and a first lateral end and a second lateral end of said blade cartridge;

a first magnet coupled to said first arm and facing said first lateral end of said blade cartridge; and a second magnet configured to rotate with said blade cartridge;

wherein said blade cartridge is configured to pivot about said pivot axis away from an initial starting position in response to a shaving force applied to said blade cartridge; and wherein said first magnet and said second magnet are configured to generate a magnetic force which urges said blade cartridge back towards said initial starting position.

17. The shaving device of claim 16, further comprising a second blade cartridge magnet coupled to said first lateral end.

18. The shaving device of claim 17, wherein said first face and said second face of said blade cartridge each include at least one razor blade.

19. A shaving device comprising:

a handle;

a first arm extending from said handle, wherein a position of said first arm is fixed relative to the handle;

a second arm extending from said handle;

a first magnet and a second magnet coupled to said first arm, wherein a position of said first and said second magnet is fixed relative to the handle;

a blade cartridge comprising first and second opposite lateral ends and a first face including at least one razor blade, wherein said blade cartridge is configured to be coupled to said first and said second arm and to rotate about a pivot axis, said pivot axis extending through said first and said second lateral end and first and said second arm; and a third magnet and a fourth magnet configured to rotate with said blade cartridge as said blade cartridge rotates about said pivot axis;

wherein said first magnet, said second magnet, said third magnet, and said fourth magnet are configured to generate a magnetic force to urge said blade cartridge back towards an initial starting position in response to a shaving force which urges said blade cartridge away from said initial starting position;

wherein said first and said second magnet are disposed on opposite sides of said pivot axis; and wherein said third and said fourth magnet are disposed on opposite sides of said pivot axis.

20. The shaving device of claim 19, further comprising at least one blade cartridge rotation limiter configured to generally limit the rotation of said blade cartridge within a predefined range of rotation relative to said initial starting position and provide an indication to a user that another face of said blade cartridge is being selected.

* * * * *